United States Patent
Kakuta et al.

(10) Patent No.: US 6,324,154 B1
(45) Date of Patent: Nov. 27, 2001

(54) AUTOMATIC DISC-CHANGING APPARATUS, DISC-CHUCKING APPARATUS, DISC APPARATUS AND POSITION-DETECTING APPARATUS

(75) Inventors: Yoshinori Kakuta; Akira Sakuta; Masami Tomita; Kunihiko Nakagawa, all of Nagaokakyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/536,026

(22) Filed: Mar. 27, 2000

Related U.S. Application Data

(62) Division of application No. 08/944,785, filed on Oct. 6, 1997, now Pat. No. 6,115,210, which is a division of application No. 08/522,532, filed on Sep. 5, 1995, now Pat. No. 5,726,828, which is a continuation of application No. 08/103,908, filed on Aug. 10, 1993, now abandoned.

(30) Foreign Application Priority Data

| Aug. 19, 1992 | (JP) | 4-220158 |
| Nov. 13, 1992 | (JP) | 4-303648 |
| Jan. 20, 1993 | (JP) | 5-007283 |
| Jan. 27, 1993 | (JP) | 5-011573 |
| Apr. 12, 1993 | (JP) | 5-084533 |
| Jun. 1, 1993 | (JP) | 5-130616 |

(51) Int. Cl.[7] ............... G11B 7/09; G11B 19/20
(52) U.S. Cl. ............................. 369/264; 369/270
(58) Field of Search .................... 369/208, 258, 369/263, 264, 266, 270, 271, 282; 360/98.07, 98.08, 99.04, 99.05, 99.08, 99.12, 67 R, 156, 268

(56) References Cited

U.S. PATENT DOCUMENTS

| 4,482,993 | * 11/1984 | Agostini ..................... 369/264 |
| 4,581,667 | 4/1986 | Gerfast . |
| 4,661,868 | 4/1987 | Tezuka . |
| 4,710,831 | 12/1987 | Nishimura . |
| 4,779,165 | 10/1988 | Elsaesser et al. . |
| 4,874,976 | 10/1989 | Ohsawa et al. . |
| 4,941,140 | * 7/1990 | Ono et al. ..................... 369/264 |
| 5,006,940 | 4/1991 | Hamachi et al. . |
| 5,123,000 | 6/1992 | Fitzgerald et al. . |
| 5,128,818 | 7/1992 | Koizumi et al. . |
| 5,142,523 | 8/1992 | Kamoshita . |
| 5,148,332 | 9/1992 | Tomita et al. . |
| 5,172,360 | 12/1992 | Decoster . |
| 5,177,731 | * 1/1993 | Tanaka et al. ............... 369/264 |
| 5,195,078 | 3/1993 | Ikedo et al. . |
| 5,274,516 | 12/1993 | Kakuta et al. . |
| 5,414,687 | * 5/1995 | Ohmori et al. ............... 369/50 |
| 5,689,388 | 11/1997 | Oka et al. . |

FOREIGN PATENT DOCUMENTS

| 57198584(A) | 12/1982 | (JP) . |
| 5872779 | 5/1983 | (JP) . |
| 58161188(A) | 9/1983 | (JP) . |
| 5936365 | 2/1984 | (JP) . |
| 609042 | 1/1985 | (JP) . |
| 6132246 | 2/1986 | (JP) . |
| 61193560 | 12/1986 | (JP) . |
| 62124662 | 6/1987 | (JP) . |
| 62202351(A) | 9/1987 | (JP) . |
| 63155452(A) | 6/1988 | (JP) . |
| 1151058(A) | 6/1989 | (JP) . |
| 1165949(U) | 11/1989 | (JP) . |
| 0242674(A) | 2/1990 | (JP) . |
| 02246044(A) | 10/1990 | (JP) . |
| 3230363(A) | 10/1991 | (JP) . |
| 5334788(A) | 12/1993 | (JP) . |

* cited by examiner

*Primary Examiner*—David L. Ometz

(57) ABSTRACT

A disc apparatus for recording information to and reproducing information from a disc includes a turntable with a magnetized surface; an excitation coil disposed opposite the magnetized surface of the turntable; a drive circuit driving a focus actuator; a detector detecting focusing error; and a control circuit. The control circuit controls energization of the excitation coil in accordance with the detector so as to move the turntable in the axial direction via the magnetic force between the excitation coil and the magnetized turntable.

8 Claims, 84 Drawing Sheets

FIG.13
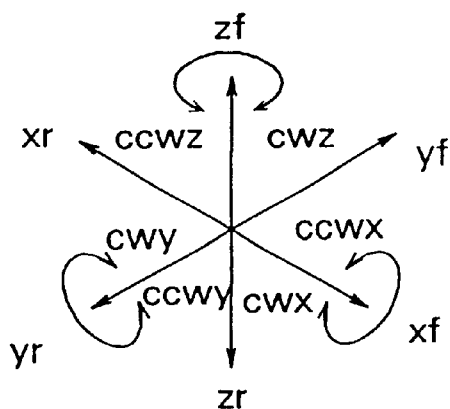
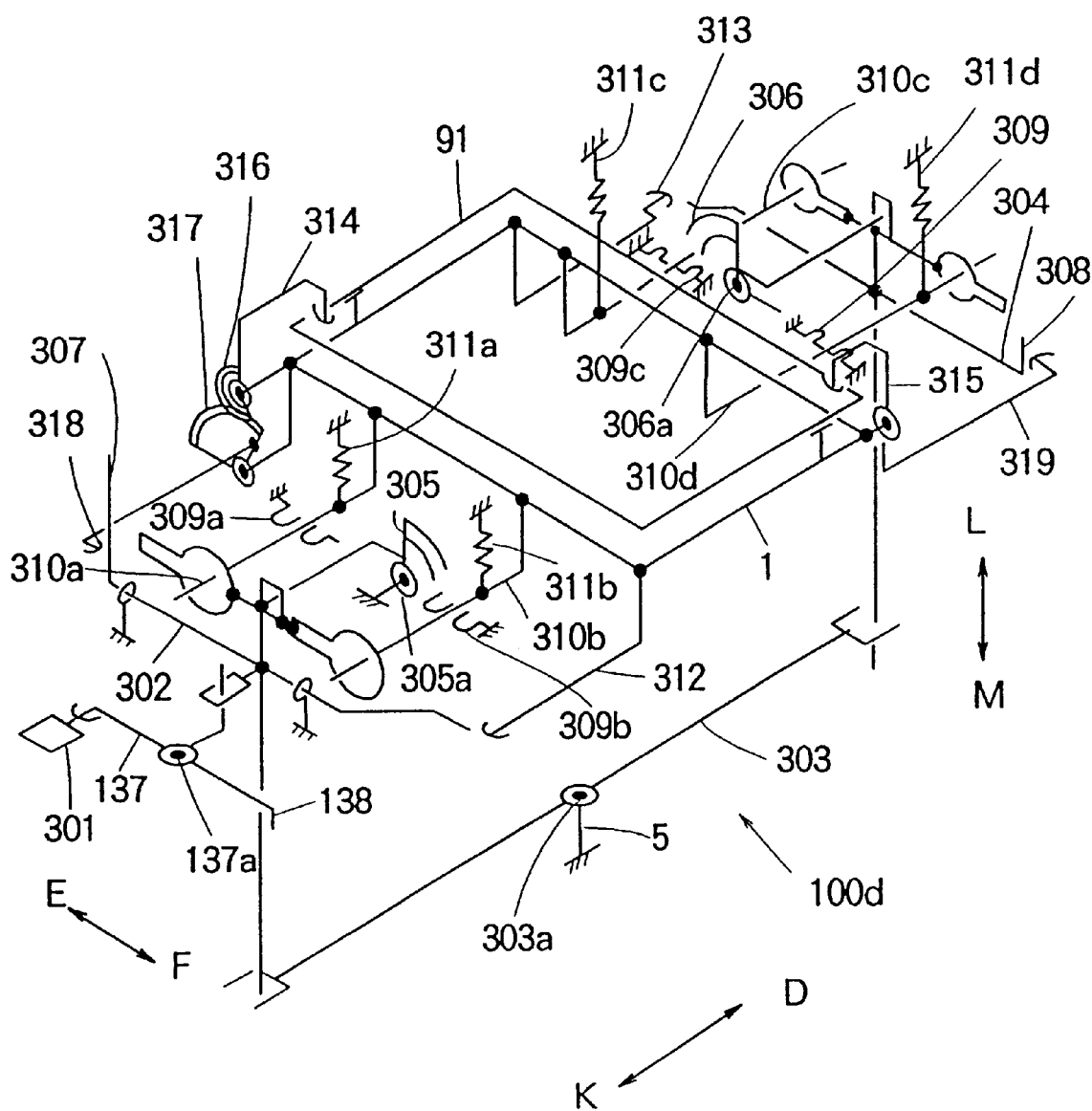

FIG.98

| SIGNIFICANCE | FIXED | ENGAGED | CROSSED | IMMOVABLE |
|---|---|---|---|---|
| SYMBOL | | | | |

| SIGNIFICANCE | SLIDING MOTION | SLIDING CONTACT | BUTT CONTACT | ROTARY MOTION |
|---|---|---|---|---|
| SYMBOL | | | | |

| SIGNIFICANCE | ROTARY GEAR | WORM | RACK AND PINION |
|---|---|---|---|
| SYMBOL | | | |

| SIGNIFICANCE | ROD/GUIDE BLOCK | STOPPER | SPRING (EXPANSION AND CONTRACTION) | LEAF SPRING |
|---|---|---|---|---|
| SYMBOL | | | | |

US 6,324,154 B1

AUTOMATIC DISC-CHANGING APPARATUS, DISC-CHUCKING APPARATUS, DISC APPARATUS AND POSITION-DETECTING APPARATUS

This application is a divisional of U.S. Pat. No. 6,115,298 application Ser. No. 08/944,785, filed on Oct. 6, 1997, U.S. Pat. No. 5,726,828, which is a Division of Ser. No. 08/522, 532, filed Sep. 5, 1995, abandoned which is a Continuation of Ser. No. 08/103,908, filed Aug. 10, 1993, the entire contents of which are hereby incorporated by reference.

FIELD OF THE INVENTION

The present invention relates to a recording and reproducing apparatus capable of accepting a plurality of cartridges each containing a recording medium in the form of disc, wherein there is a compact automatic disc-changing apparatus capable of freely changing the cartridge that is loaded onto the turntable.

The present invention further relates to a recording and reproducing apparatus using an audio, video or other recording medium in the form of disc, wherein there is a disc-chucking apparatus for holding the disc stationary in the recording and reproducing apparatus.

The present invention further relates a position-detecting apparatus applied to sensing the operating mode of the mechanism in a recording and reproducing apparatus for audio or video discs, video tape, etc.

BACKGROUND OF THE INVENTION

FIG. 88 is a conceptual diagram showing the structure and operation of a conventional automatic disc-changing apparatus as disclosed, for example, in Japanese Patent Kokai Publication 36365/1984 (Showa 59-36365). The significance of the symbols used in FIG. 88 is as given in FIG. 98.

In FIG. 98, "fixed" refers to a state in which two members do not move with relation each other, "engaged" refers to a state in which two members are mounted with an interrelationship between them (the two members are not fixed), "immovable" refers to a state in which the member is fixed with respect to chassis; and "butt contact" refers to a state in which the end of one member is touching against another member.

As is shown in FIG. 88, a conventional automatic disc-changing apparatus has as its principle constituents a player 1 supported on a chassis 5; a magazine rack 3 that accommodates compact discs resting on support pans 28; an elevator 2 that is capable of vertical travel along guide rails 14a, 14b and 14c and accommodates the magazine rack 3; and a carrier 4 mounted at the rear place of the player 1 and the elevator 2 (the upper left-hand portion in FIG. 88) but in this figure shown in the upper portion and causing movement of the compact discs in the magazine rack 3, together with support pan 28.

The apparatus shown in FIG. 88 moves in the following manner. The user first places compact discs on a plurality of support pans 28 (of which only one is shown in the figure), inserts the support pans 28 into a shelf-like structure 27 in the magazine rack 3, and inserts the magazine rack 3 into the elevator 2.

Then, by causing a rotating shaft 57 of a motor 56 to rotate, rollers 54 and 55, over which a belt 58 has been passed, also rotate, thereby rotating screw rods 52 and 53 which are fixed to them, and raising an elevating frame 8 which has threaded holes 50 and 51, into which the rods 52 and 53 screw. At this time the upper edge 8a of the elevating frame 8 makes butt contact with an arm 9a supporting a pressure ring 9, causing the pressure ring 9 to move upward. Simultaneously with this action, the elevator 2 is caused to ascend or descend by a winder 15, which is driven by the rotation of a motor 15a, by means of which a suspension cord 18, from which the elevator 2 is suspended by a suspension ring 17, is wound in or out, thereby transporting the support pan 28 carrying the desired compact disc to above the player 1.

Next a solenoid 36 is activated, moving an actuator plate 34 towards the elevator 2 (toward the lower right in the figure) against the compressive force of a tension spring 35. If a rotating shaft 48 of a motor 47 is rotated under these conditions, pulleys 45 and 46, over which a belt 49 has been passed. rotates, thereby transmitting driving power to drive wheels 43 and 44 by means of idlers 41 and 42, which provides a pressure contact with the pulleys 45 and 46. The support pan 28 is brought into pressure contact to the drive wheels 43 and 44 and is moved from the magazine rack 2 to the elevating frame 8 of the player 1. In the elevating frame 8, the support pan 28 is transported along guide grooves 11 and 12, after which the motor 56 is activated lowering the elevating frame 8 and placing the compact disc on turntable 6. At this time the pressure ring 9 is also lowered, holding the compact disc on top of turntable 6. Optical pickup 7 is then moved to the player 1, upon which the compact disc rests, where it reads information from the disc and sends the information read to the reproducing circuit (not shown).

After completion of the performance, the motor 56 is activated raising the elevating frame 8 and the pressure ring 9, and the carrier 4 is activated to return the support pan 28 to its previous location in the magazine 3.

Again, FIG. 89 is a vertical cross-sectional diagram showing a conventional disc-chucking apparatus as disclosed, for example, in Japanese Utility Model Kokai Publication No. 193560/1986 (Showa 61-193560). FIG. 90 is a vertical cross-sectional diagram showing this conventional disc-chucking apparatus with a disc resting thereon, in which a reference numeral 1021 designates the base of the apparatus; 1022 a spindle fixed to the base 1021; 1023 a disc that is the medium for recording a video, audio or other signal and has at its center a clamping plate 1042 formed from a soft magnetic material; 1031 a cartridge accommodating a disc 1023; 1024 a support piece, which positions the disc 1023 in the vertical direction; 1025 a centering piece that acts to position the disc 1023 in the radial direction; 1026 a guide piece having an inclined portion for guiding the centering piece 1025 when the disc 1023 is to be loaded into the apparatus; 1027 a chucking magnet, having either the single magnetic domain structure shown in FIG. 91 or the striped magnetic domain structure shown in FIG. 92, for attracting the disc 1023 into intimate contact with the support piece 1024; 1028 a turntable comprising the support piece 1024, the centering piece 1025, the guide piece 1026 and the chucking magnet 1027; 1029 a bearing supporting turntable 1028 in its rotation around spindle 1022; and 1030 a motor to drive the turntable 1028 in its rotation.

The motor 1030 is held stationary on the base 1021 and is provided with a core 1062 wound with a coil that is not shown, a rotor 1063 that rotates together with turntable 1028, and a magnet 1064 fixed to the rotor 1063.

FIG. 93 is a conceptual diagram showing one example of a disc loading and unloading apparatus for a recording and reproducing apparatus using a disc-chucking apparatus, in which a reference numeral 1032 designates a holder holding the cartridge 1031; 1033 a pivot constituting the center of rotation of the holder 1032; 1034 a spring to make the holder 1032 rotate in the clockwise direction; 1035 a engagement portion provided on the holder 1032; 1036 a hook; 1037 a pivot constituting the center of rotation of the hook 1036; 1038 a spring to apply pressure to rotate the hook 1036 in the counterclockwise direction; 1039 a positioning pin to act as a positioning member for the cartridge 1031; 1040 a holding member to press and hold the cartridge 1031 provided on the holder 1032 against the recording and reproducing apparatus; 1041 a spring for the same; and 1043 a disc loading apparatus comprising the components listed above.

Following is a description of the operation. The disc 1023 is loaded into the recording and reproducing apparatus by disc loading apparatus 1043. Referring to FIG. 93, if the cartridge 1031 is inserted in the holder 1032 and the holder 1032 is pressed downwards, the hook 1036 is engaged with engagement portion 1035 of the holder 1032, keeping it stationary with respect to the recording and reproducing apparatus. Meanwhile the cartridge 1031 is pressed and held against the positioning piece 1039 of the base 1021 by the pressure piece 1040. At this time, the disc 1023 is guided by the guide piece 1026 of the turntable 1028, and its position is determined by the centering piece 1025 and the support piece 1024 so that it is separated from the support piece inside cartridge 1031, and the clamping plate 1042 is attracted by the chucking magnet 1027 so that it is fixed to the turntable 1028. The turntable 1028 is then driven in a rotary manner by the motor 1030 and the signal is recorded or reproduced by means of a magnetic head or optical head.

FIG. 94 is a plan view showing the structure of a conventional position-detecting apparatus as disclosed, for example, in Japanese Patent Kokai Publication No. 32246/1986 (Showa 61-32246), in which a reference numeral 1354 designates a motor; 1371 a worm gear held with respect to the rotating shift of the motor 1354; and 1351 a slider capable of moving in the directions indicated by arrows 1351A and 1351B. A reference numeral 1353 designates a contact gear having contacts 1391 (FIG. 96) on the reverse surface; and 1370 a position-detecting circuit board having an arcuate pattern 1392 (FIG. 95) of the obverse surface. A reference numeral 1372 designates a transmission gear train that engages with worm gear 1371 and transmits driving power from the motor 1354; 1380 a drive gear that engages transmission gear train 1372 and drives contact gear 1353: and 1356 a drive gear that engages with the contact gear 1353 to drive the slider 1351. A reference numeral 1375 designates the spindle of the drive gear 1380; 1352 the spindle of the contact gear; and 1387 the spindle of the drive gear 1356.

FIG. 95 is a plan view showing an arcuate pattern 1392 on a position-detecting circuit board 1370 of the conventional position-detecting apparatus, in which a reference numeral 1392 designates the arcuate pattern for position detection; 1393 a common electrode; and 1394, 1395 and 1396 detection electrodes.

FIG. 96 is a vertical cross-sectional diagram showing the contact gear of the conventional position-detecting apparatus, and FIG. 97 is a view taken along a line S97—S97 in FIG. 96, in which a reference numeral 1391 designates position-detecting contacts.

Following is a description of the operation. The rotational driving power of the motor 1354 is transmitted from the worm gear 1371 through transmission gear train 1372 to the drive gear 1380 to drive contact gear 1353. The drive gear 1356 is also driven rotationally by the contact gear 1353 to drive the slider 1351. The stopping point for the slider 1351, is detected when the contacts 1391 on the reverse surface of the contact gear 1353 come into friction contact with the arcuate pattern 1392 on the top of the position-detecting circuit board 1370 so that a current path is established between common electrode 1393 and one or two of detection electrodes 1394, 1395 and 1396, thereby providing the prescribed signal, output.

However, a problem with the conventional automatic disc-changing apparatus shown in FIG. 88 is that the drive mechanism that imparts vertical motion to the elevating frame, the drive mechanism that imparts vertical motion to the elevator, and the drive mechanism, which transports the support pan on which the compact disc rests are individually provided with motors, and a solenoid is specially provided to provide pressure contact of the carrier pulley against the support pan, so that the structure is complicated and the cost of the apparatus is high.

An additional problem is that when the support pan is transported from the magazine rack to the player, vertical motion is imparted to the elevator, in which the support pans are stacked in the height direction, but since the moving elevator is of great volume (or its height dimension is large), the apparatus is too large to be installed in automobiles.

A further problem is that replacing the compact discs in the magazine rack requires a two-step procedure in which the magazine rack is first removed from the elevator and the support pans in the magazine rack are then withdrawn, making it inconvenient to use.

In the conventional disc-chucking apparatus shown in FIG. 89 through FIG. 93, the disc 1023 is attracted by the chucking magnet 1027, which is fixed to the turntable 1028. For this reason, in removing the disc 1023 from the turntable 1028, the hook 1030 is rotated clockwise as seen in FIG. 93 either manually or by a motor or other actuator to release engagement portion 1035.

When this occurs, the holder 1032 leaps upward due to the action of spring 1034. At this point the holder 1032 must pull the disc 1023 upward against the attractive force of the chucking magnet 1027, requiring that the spring force of the spring 1034 be greater than the sum of the attractive force of the chucking magnet 1027 and the weights of the cartridge 1031 and the holder 1032. This results in a problem in that any increase in the attractive force of the chucking magnet 1027 requires an increase in the force required to load the holder 1032 into the apparatus, adversely affecting the operational feel. Further if the attractive force of the chucking magnet 1027 is too small, a problem arises in that the force holding the disc 1023 to the turntable 1028 is reduced, so that when the apparatus is acted upon by vibration or other external disturbance, disc 1023 is easily separated from turntable 1028, rendering the accurate reading of the signals difficult.

Another problem with the conventional disk-chucking apparatus is that turntable 1028 is supported on a spindle 1022, which is fixed to base 1021, so that when the apparatus is acted upon by vibration or other external disturbance, vibration is transmitted to the turntable 1028 and applied to the disc 1023, rendering the accurate reading of the signals difficult.

Another problem with the conventional disc-chucking apparatus is that it requires two magnets: a magnet 1064, which is used in the motor 1030 for the rotating of the turntable 1028, and a chucking magnet 1027 for attracting and holding the disc 1023, with the result that the number of components is increased and costs rise.

Another problem with the conventional disc-chucking apparatus is that it requires two holding members: rotor 1063 for holding magnet 1064 of the motor 1030, and the turntable 1028 for holding the chucking magnet 1027, with the result that the number of components is increased and costs rise.

Yet another problem with the conventional disc-chucking apparatus is that it requires a great deal of force to remove the the clamping plate 1042 that is attracted to the chucking magnet 1027 from the apparatus.

Again, in the conventional position-detecting apparatus shown in FIG. 94 through FIG. 97, is that the stopping point is detected when contacts 1391 on the reverse surface of the contact gear 1353 come into friction contact with the arcuate pattern 1392 on the top of position-detecting circuit board 1370 so that a current path is established between common electrode 1393 and one or two of detection electrodes 1394, 1395 and 1396. This raises it problem of reliability, in that there is a danger of faults occurring due to wear or corrosion of contacts 1391 or arcuate pattern 1392.

Further, letting P be the number of position detection points and n be the requisite number of contacts (including common contacts), the requisite number of contacts n may be found by rounding up m, wherein $$m = \log_2 (P+2)$$

In general the number of the detection points P is two, at the beginning and at the end, so that the minimum number of contacts n required is two. Also contacts 1391 must be arranged along the radius of the contact gear 1353. This raises a problem in terms of the compactness of the apparatus, in that the contact gear 1353 is enlarged in the radial direction.

SUMMARY OF THE INVENTION

It is an object of the present invention to provide an automatic disc-changing apparatus that is inexpensive, compact and convenient to use.

It is a further object of the present invention to provide a disc-chucking apparatus that offers secure attraction and holding of the disc to the turntable, without sacrificing the operational feel of the apparatus.

It is a further object of the present invention to provide a disc apparatus in which the vibration of the base will not easily be applied to the disc.

It is a further object of the present invention to provide a disc apparatus that has fewer components and is lower in cost.

It is a further object of the present invention to provide a position-detecting apparatus in which compactness can be easily achieved even if the number of operational modes is increased.

According to one aspect of the invention, there is provided an automatic disc-changing apparatus, capable of selectively transporting a cartridge accommodating a disc-type information recording and reproducing medium, either from a standby position at which can be loaded a plurality of such cartridges to a recording and reproducing position above a player differing in vertical and horizontal position from the standby position, or from the recording and reproducing position to the standby position, comprising: a plurality of cartridge holders for holding each of the cartridges; a holding mechanism for standby, for holding the plurality of cartridge holders in the standby position; a holding mechanism for transport, for selectively holding one of the cartridge holders; a transfer mechanism for moving the holding mechanism for transport in the horizontal direction; and an elevator mechanism for moving the holding mechanism for transport in the vertical direction.

According to another aspect of the invention, there is provided the automatic disc-changing apparatus described above, wherein the elevator mechanism comprises a first motor; a first slide cam for moving horizontally between the standby position and the recording and reproducing position; a first motion-transmitting mechanism for causing the first slide cam to move horizontally due to rotational driving power of the first motor; and an elevating base for being engaged with the first slide cam and moving vertically in linkage with horizontal motion of the first slide cam; and wherein a pair of the first slide cams is arranged in parallel with each other and one of the pair of the first slide cam is arranged on either side of the player: each of the first slide cams comprises a vertical plane portion and a flange portion projecting horizontally from the vertical plane portion, in which the flange portions are provided with elongated slots in the direction at right angles to the direction of motion of the first slide cams; the first motion-transmitting mechanism comprises a loading lever that receives rotary driving power from the first motor and rotates around a vertical shaft; and engaging pins implanted at either end of the loading lever is engaged, respectively, with the elongated slots in the flanges; and the apparatus further comprising a clamping lever for clamping the cartridge to the player; and a second slide cam for moving horizontally in a direction kit right angles to the direction of motion of the transfer mechanism in response to the rotation of the loading lever.

According to another aspect of the invention, there is provided an automatic disc-changing apparatus, capable of selectively transporting a cartridge accommodating a disc-type information recording and reproducing medium, either from a standby position at which can be loaded a plurality of such cartridges to a recording and reproducing position above a player differing in vertical and horizontal position from the standby position, or from the recording and reproducing position to the standby position, comprising: a plurality of cartridge holders for holding each of the cartridges; a holding mechanism for standby, for holding the plurality of cartridge holders in the standby position; a holding mechanism for transport, for selectively holding one of the cartridge holders; a transfer mechanism for moving the holding mechanism for transport in the horizontal direction; and an elevator mechanism for moving the holding mechanism for transport in the vertical direction, wherein the elevating mechanism comprises a third motor; a pantograph mechanism; a cam mechanism which activates the pantograph mechanism in response to rotary motion of the third motor.

According to another aspect of the invention, there is provided an automatic disc-changing apparatus, capable of selectively transporting a cartridge accommodating a disc-type information recording and reproducing medium, either from a standby position at which can be loaded a plurality of such cartridges to a recording and reproducing position above a player differing in vertical and horizontal position from the standby position, or from the recording and reproducing position to the standby position, comprising: a plurality of cartridge holders for holding each of the cartridges; a holding mechanism for standby, for holding the plurality of cartridge holders in the standby position; a holding mechanism for transport, for selectively holding one of the cartridge holders; a transfer mechanism for moving the holding mechanism for transport in the horizontal direction;

and an elevator mechanism for moving the holding mechanism for transport in the vertical direction; and the automatic disc-changing apparatus further comprising a duplicate insertion prevention plate which is rotatable around a horizontal shaft at the top of each of the insertion ports, and which is approximately horizontal and in butt contact with an upper surface of the cartridge holder when the cartridge holder is loaded into the holding mechanism for standby, but approximately vertical when the cartridge holder has been separated by means of the transfer mechanism from the holding mechanism for standby; and a regulating member which is fixed further into depths of the apparatus, when the regulating member establishes butt contact with the duplicate insertion prevention plate, the range of motion of the duplicate insertion prevention plate is regulated.

According to another aspect of the invention, there is provided an automatic disc-changing apparatus, capable of selectively transporting a cartridge accommodating a disc-type information recording arid reproducing medium, either from a standby position at which can be loaded a plurality of such cartridges to a recording and reproducing position above a player differing in vertical and horizontal position from the standby position, or from the recording and reproducing position to the standby position, comprising: a plurality of cartridge holders for holding each of the cartridges; a holding mechanism for standby, for holding the plurality of cartridge holders in the standby position; a holding mechanism for transport, for selectively holding one of the cartridge holders; a transfer mechanism for moving the holding mechanism for transport in the horizontal direction; an elevator mechanism for moving the holding mechanism for transport in the vertical direction; a display for displaying contents information recorded on the disc-type information recording medium; audio signal storage circuitry for storing audio signal information on the disc-type information recording medium being reproduced; and control circuit such that when, during reproduction, a new cartridge is loaded into another cartridge holder, the cartridge being reproduced is temporarily returned to the standby position and at the same time the audio signal information of the cartridge is continuously reproduced by means of the audio signal information stored in the audio signal storage circuitry; the new cartridge is transported to the recording and reproducing position and the contents information on the disc-shaped information recording medium of the new cartridge is read and displayed on the display; the new cartridge is then returned to the standby position; the cartridge first being reproduced is placed to the recording and reproducing position and continuously reproduced.

According to another aspect of the invention, there is provided a disc-chucking apparatus, in which a disc-type recording medium is held to a rotatable turntable of a disc apparatus for recording and reproducing a signal, using light or magnetism with respect to a disc having at its center a soft magnetic material, comprising: means for applying magnetic attractive force to the clamping plate; and means for controlling the magnetic attractive force.

According to another aspect of the invention, there is provided a disc apparatus for recording and reproducing signals using light or magnetism comprising: a disc-chucking mechanism for holding a (disc to a rotatable turntable; a spindle rotatably for supporting the turntable; and a resilient body for applying a prescribed pressing force to the spindle in an axial direction of the spindle.

According to another aspect of the invention, there is provided a disc apparatus for recording and reproducing signals using light or magnetism, comprising: a disc-chucking mechanism for holding a disc having a clamping plate to a rotatable turntable; and a magnetic material provided between a magnet of a motor for driving the turntable and the disc clamping plate, and permeable to the magnetic flux of the magnet of the motor.

According to another aspect of the invention, there is provided a disc apparatus for recording and reproducing signals using light or magnetism, comprising: a disc-chucking mechanism for holding a disc to a rotatable turntable; and a magnet forming at least a part of the turntable; wherein the turntable has a first surface for holding the disc and a second surface on the opposite side; a magnetized surface of the magnet is provided on the second surface of the turntable, and an excitation coil is disposed oppositely to the magnetized surface, so that the turntable is used as the magnet forming part of a drive motor and as the disc clamping magnet.

According to another aspect of the invention, there is provided a disc apparatus for recording and reproducing signals using light or magnetism, comprising: a rotatable spindle; a turntable secured to the spindle and holding a disc; and a vibration-damping material interposed between the chassis and the spindle.

According to another aspect of the invention, there is provided a disc apparatus for recording and reproducing signals using light or magnetism, comprising: a rotatable turntable having a first surface holding the disc and a second surface on the opposite side; and an excitation coil; wherein a part of the turntable is magnetized, and the magnetized surface is formed on the side of the second surface; and the excitation coil is disposed oppositely to the magnetized surface of the turntable, and the turntable can be floated by the application of current to the excitation coil.

According to another aspect of the invention, there is provided a disc apparatus for recording and reproducing signals using light or magnetism, comprising: a turntable supported rotatably with respect to a base, with a first surface for holding the disc and a second surface on the opposite side, and in part magnetized and the magnetized surface is formed on the side of the second surface; a drive motor for driving the turntable, which has a magnet and a core and has a magnetic gap between the magnet and the core near periphery of the motor, arid in which a spindle of the motor and a spindle of the turntable are in common; and an excitation coil disposed oppositely to the magnetized surface of the turntable mounted on a base; and wherein the magnet and the coil of the drive motor are so disposed that their center heights are offset in the height direction; and height of the turntable is positioned by energizing the excitation coil to achieve all equilibrium between the repulsive force of the magnetized turntable arid the excitation coil, and the attractive force between the core and the magnet.

According to another aspect of the invention, there is provided a disc apparatus for recording and reproducing signals using light or magnetism, comprising: a mechanism for transporting discs or cartridges accommodating discs; a turntable supported rotatably and slidably in the axial direction with respect to a base, having a first surface holding the disc and a second surface on the opposite side, and in part magnetized with the magnetized surface formed on the side of the second surface; an excitation coil mounted on a base and disposed oppositely to the magnetized surface of the turntable; a control circuit for controlling the movement of the turntable in the axial direction and the drive of the cartridge transport mechanism, and controlling the energization of the excitation coil in linkage with the operation of the transport mechanism.

According to another aspect of the invention, there is provided a disc apparatus for recording and reproducing signals using light or magnetism, comprising: a turntable supported rotatably and slidbly in the axial direction with respect to a base, having a first surface for holding the disc and a second surface on the opposite side, and in part magnetized with the magnetized surface formed on the side of the second surface; an excitation coil mounted on a base and disposed oppositely to the magnetized surface of the turntable; a drive circuit for driving a focus actuator: and a detector for detecting the focusing error of an optical pickup; and a control circuit for controlling the energization of the excitation coil in accordance with the output of the detector and moving the turntable in the axial direction by means of the magnetic force between the excitation coil coil and the magnetized turntable.

According to another aspect of the invention, there is provided a disc apparatus for recording and reproducing signals using light or magnetism, comprising: a turntable supported rotatably with respect to a base, having a first surface holding the disc and a second surface on the opposite side; a magnetic material forming a part of the turntable; an excitation coil mounted on a base; a first magnet forming part of the turntable with one magnetized surface positioned on tile side of the first surface of the turntable and the other magnetized surface coupled to the magnetic material; and a second magnet with one magnetized surface coupled with the magnetic material and the other magnetized surface disposed oppositely to the excitation coil; wherein the first magnet attracts a clamping plate provided on the disc; the second magnet forms part of constitutes of a motor that rotationally drives the turntable along with the coil; and the turntable is formed by outset molding a centering portion and a flange that position the disc on the magnet material.

According to another aspect of the invention, there is provided a disc-chucking apparatus for a disc apparatus for recording and reproducing signals using light or magnetism, for holding a disc to a rotatable turntable, comprising screw threads formed in a disc-clamping magnet clamping a disc-clamping plate and the turntable, thereby causing height of the disc-clamping magnet with respect to the turntable to be changed.

According to another aspect of the invention, there is provided a disc apparatus for recording and reproducing signals using light or magnetism, comprising: a chassis; a base for holding a disc to a rotatable turntable and supporting the turntable; and a plurality of suspension means for suspending the base to the chassis; wherein each of the suspension means consists of a combination of a magnet and a coil which are mounted at one end to the base and at the other end to the chassis, each being capable of supporting a load in a different direction.

According to another aspect of the invention, there is provided a disc apparatus for recording and reproducing signals using light or magnetism, comprising: a disc-chucking mechanism for holding a disc having a clamping plate to a rotatable turntable by magnetic attractive force; a release coil that is mounted on a holder for recording and reproducing heads mounted on a chassis, that generates a magnetic flux at a position oppositely disposed to the disc clamping plate, and that cancels or weakens the magnetic attractive force of the disc-chucking apparatus.

According to another aspect of the invention, there is provided a disc apparatus for recording and reproducing signals using light or magnetism, comprising: a disc-chucking mechanism for holding a disc having a clamping plate to a rotatable turntable by magnetic attractive force; a holder mounted rotatably around an axis parallel to the recording surface of the disc; a recording head that is mounted to one end of the holder and, as the holder rotates, approaches toward or recedes from the recording surface of the disc; and a release magnet that is mounted on the other end of the holder and, as the recording head approaches toward or recedes from the recording surface of the disc, recedes from or approaches toward the disc clamping plate.

According to another aspect of the invention, there is provided a disc apparatus for recording and reproducing signals using light or magnetism, comprising: a disc-chucking mechanism that holds a disc having a clamping plate to a rotatable turntable by magnetic attractive force: a transfer member having a magnet or a coil, which causes the magnet or coil to approach toward or recede from the clamping plate; and a drive mechanism that, by means of the rotation of the holder on which the recording head is mounted, causes the recording head to approach toward or recede from the recording surface of the disc, while at the same time causing the magnet or coil to approach toward or recede from the clamping plate.

According to another aspect of the invention, there is provided a position-detecting apparatus for detecting the operational mode of a drive transmitting mechanism that performs prescribed operations driven by a motor or other drive source, comprising: a moving member forming a part of the drive transmitting mechanism arid moving together with the motion of the drive transmitting mechanism: a light-reflecting portion disposed along the direction of movement of the moving member; a light-transmitting portion disposed along the direction of movement of the moving member; a photoemitter disposed in such a way that when, due to the movement of the moving portion, the reflecting and transmitting portions come to a position facing it, irradiates them with light; a first photodetector disposed in such a way that it receives that part of the light emitted by the photoemitter that is reflected by the light-reflecting portion; a second photodetector disposed in such a way that it receives that part of the light emitted by the photoemitter that is transmitted by the light-transmitting portion; and means for detecting the position of the moving member on the basis of the output of the photodetector.

According to another aspect of the invention, there is provided a position-detecting apparatus for detecting the operational mode of a drive transmitting mechanism that performs prescribed operations driven by a motor or other drive source, comprising: a moving member that forms part of the drive transmitting mechanism arid moves together with the motion of the drive transmitting mechanism; a first light-reflecting portion having a first polarizing sheet which is disposed along the direction of movement of the moving member; a second light-reflecting portion having a second polarizing sheet which is disposed along the direction of movement of the moving member; a photoemitter disposed in such a way that when, due to the movement of the moving portion, the first and second reflecting portions come to a position facing it, irradiates them with light; a first photo-detector having on its photodetecting portion a third polarizing sheet and disposed in such a way that it receives that part of the light emitted by the photoemitter that is reflected by the first and second light-reflecting portion; a second photodetector having on its photodetecting portion a fourth polarizing sheet and disposed in such a way that it receives that part of the light emitted by the photoemitter that is reflected by the first and second light-reflecting portion; means by which the direction of polarization of the first polarizing sheet and the second polarizing sheet differ by approximately 90°, the direction of polarization of the third polarizing sheet and the fourth polarizing sheet differ by approximately 90° and the direction of polarization of the first polarizing sheet and the third polarizing sheet are approximately the same; and means that detects the position of the moving member on the basis of the output of the first and second photodetectors.

According to another aspect of the invention, there is provided a position-detecting apparatus for detecting the operational mode of a drive transmitting mechanism that performs prescribed operations driven by a motor or other drive source, comprising: a moving member that forms part of the drive transmitting mechanism and moves together with the motion of the drive transmitting mechanism; a light-reflecting portion disposed along the direction of movement of the moving member; a photoemitter disposed in such a way that when, due to the movement of the moving portion, the reflecting portion comes to a position facing it, irradiates it with light; a magnetic portion disposed on the moving member; a photodetector disposed in such a way that it receives that part of the light emitted by the photoemitter that is reflected by the light-reflecting portion; a magnetic detection element disposed so as to detect the position of the magnetic portion; and means for detecting the position of the moving member on the basis of the output of the photodetector and magnetic detection element.

According to another aspect of the invention, there is provided a position-detecting apparatus for detecting the operational mode of a drive transmission mechanism that performs prescribed operations driven by a motor or other drive source, comprising: a moving member that forms part of the drive transmitting mechanism and moves together with the motion of the drive transmitting mechanism; a first light-transmitting portion passing light through a first polarizing sheet and a second light-transmitting portion passing light through a second polarizing sheet that are disposed along the direction of movement of the moving member: a photoemitter disposed in such a way that when, due to the movement of the moving portion, the first and second light-transmitting portions come to a position facing it, irradiates them with light; a first photodetector having on its photodetecting portion a third polarizing sheet and disposed in such a way that it receives that part of the light emitted by the photoemitter that is transmitted through the first and second light-transmitting portions; a second photodetector having on its photodetecting portion a fourth polarizing sheet and (disposed in such a way that it receives that part of the light emitted by the photoemitter that is transmitted through the first and second light-transmitting portions; means by which the direction of polarization of the first polarizing sheet and the second polarizing sheet differ by approximately 90°, the direction of polarization of the third polarizing sheet and the fourth polarizing sheet differ by approximately 90° and the direction of polarization of the first polarizing sheet and the third polarizing sheet are approximately the same; and means for detecting the position of the moving member on the basis of the output of the first and second photodetectors.

BRIEF DESCRIPTION OF THE DRAWINGS

FIG. 13 is a conceptual diagram for the purpose of describing the operation of the clamping mechanism shown in FIG. 10.

Part 2

Figure 89:
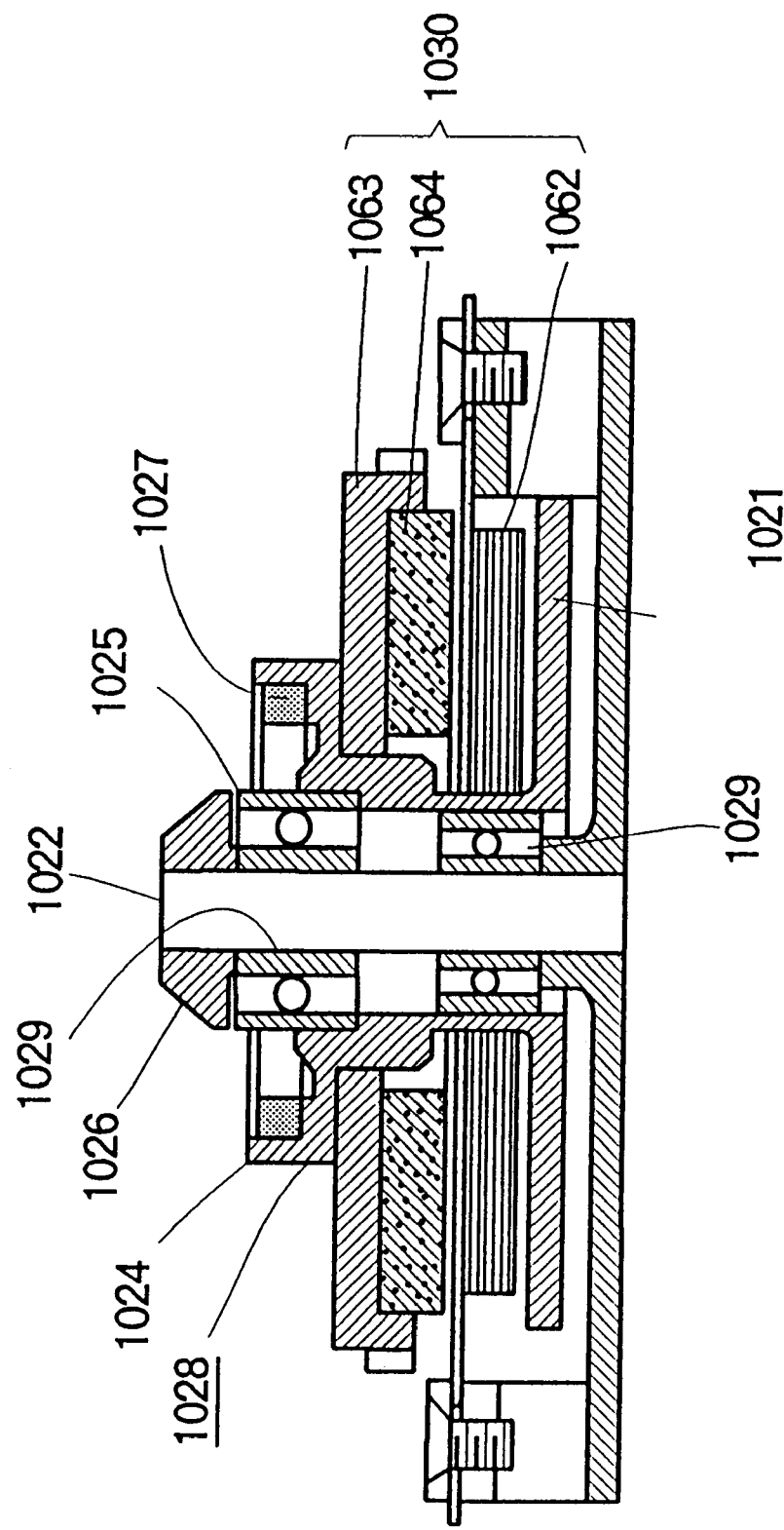

FIG. 89 is a vertical cross-sectional view showing a conventional disc-chucking apparatus.

Figure 90:
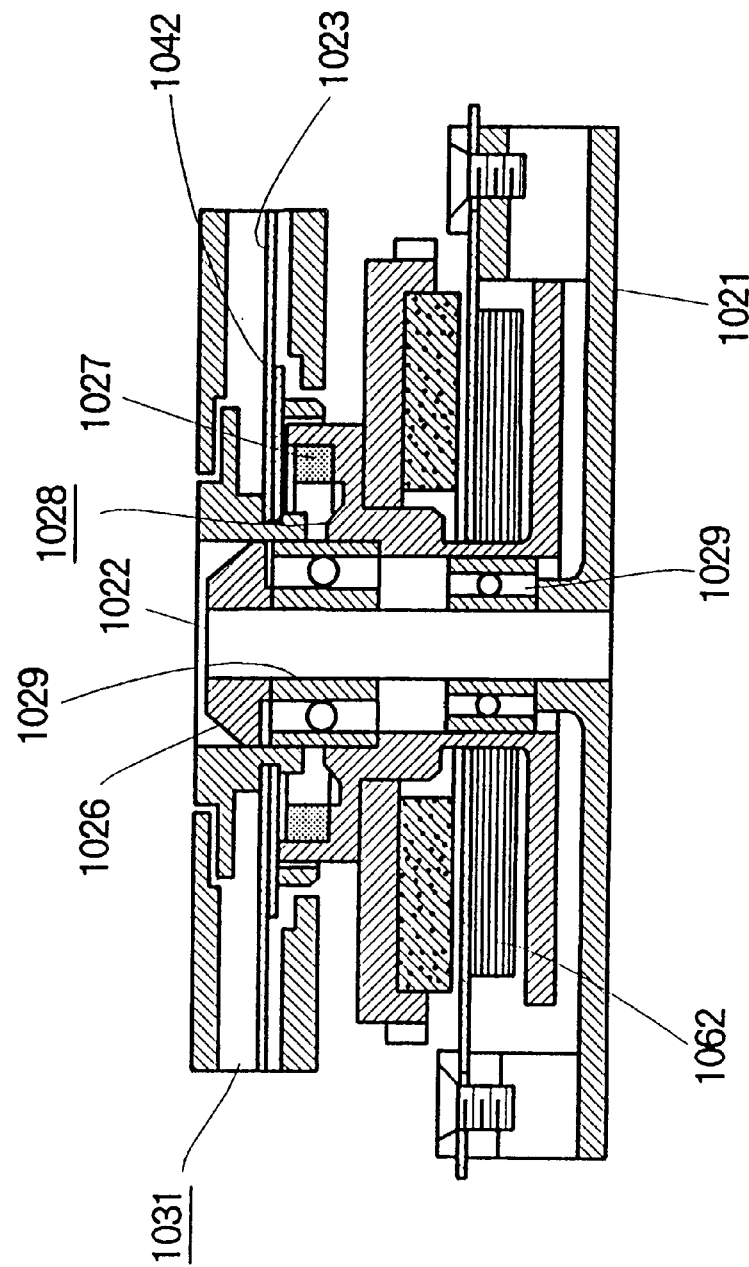

FIG. 90 is a vertical cross-sectional view showing a conventional disc chucking apparatus with a disc resting thereon.

Figure 91:
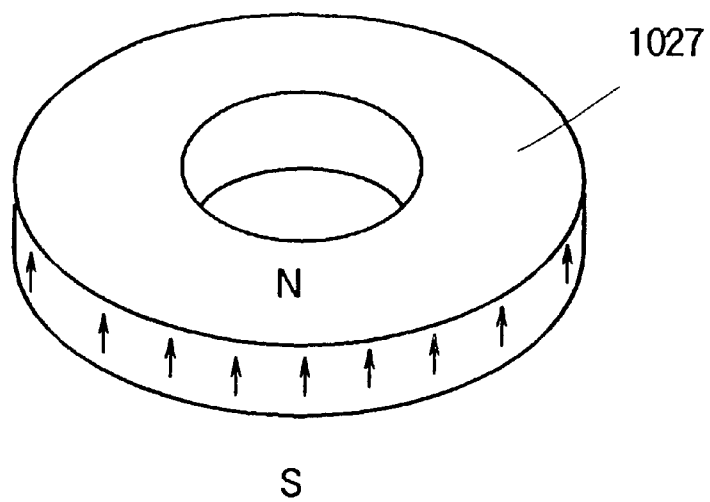

FIG. 91 is a perspective view showing a chucking magnet having a single magnetic domain structure magnetized in one direction.

Figure 92:
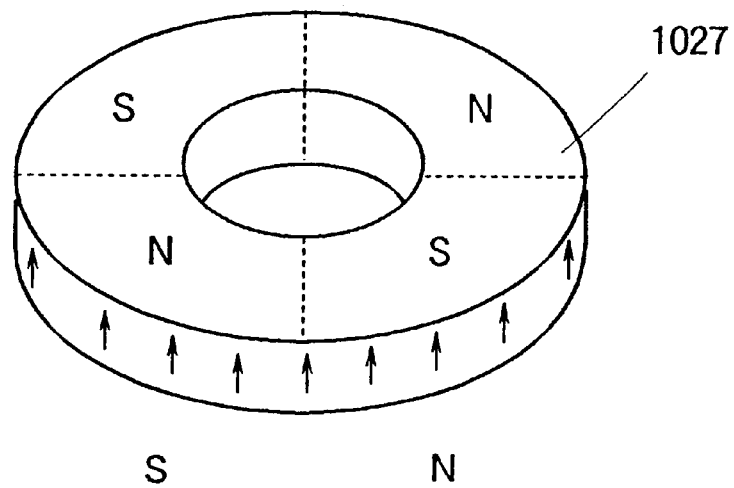

FIG. 92 is a perspective view showing a chucking magnet having a striped magnetic domain structure magnetized in both directions.

Figure 93:
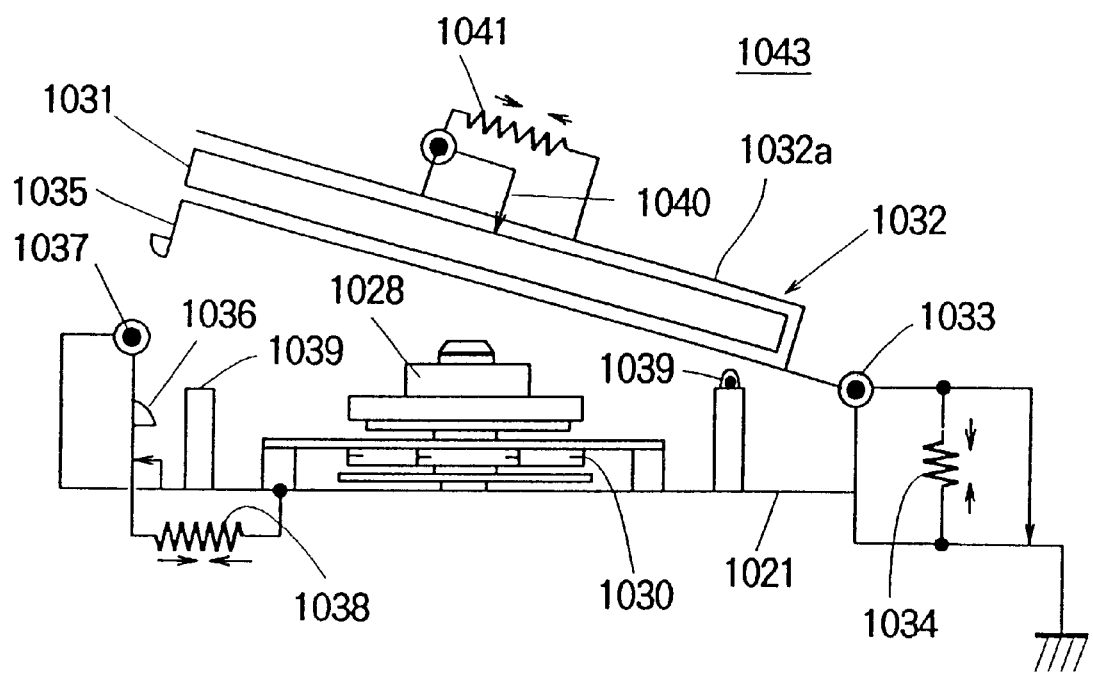

FIG. 93 is a conceptual diagram showing one example of a disc loading and unloading apparatus for a recording and reproducing apparatus using a disc-chucking apparatus.

Figure 94:
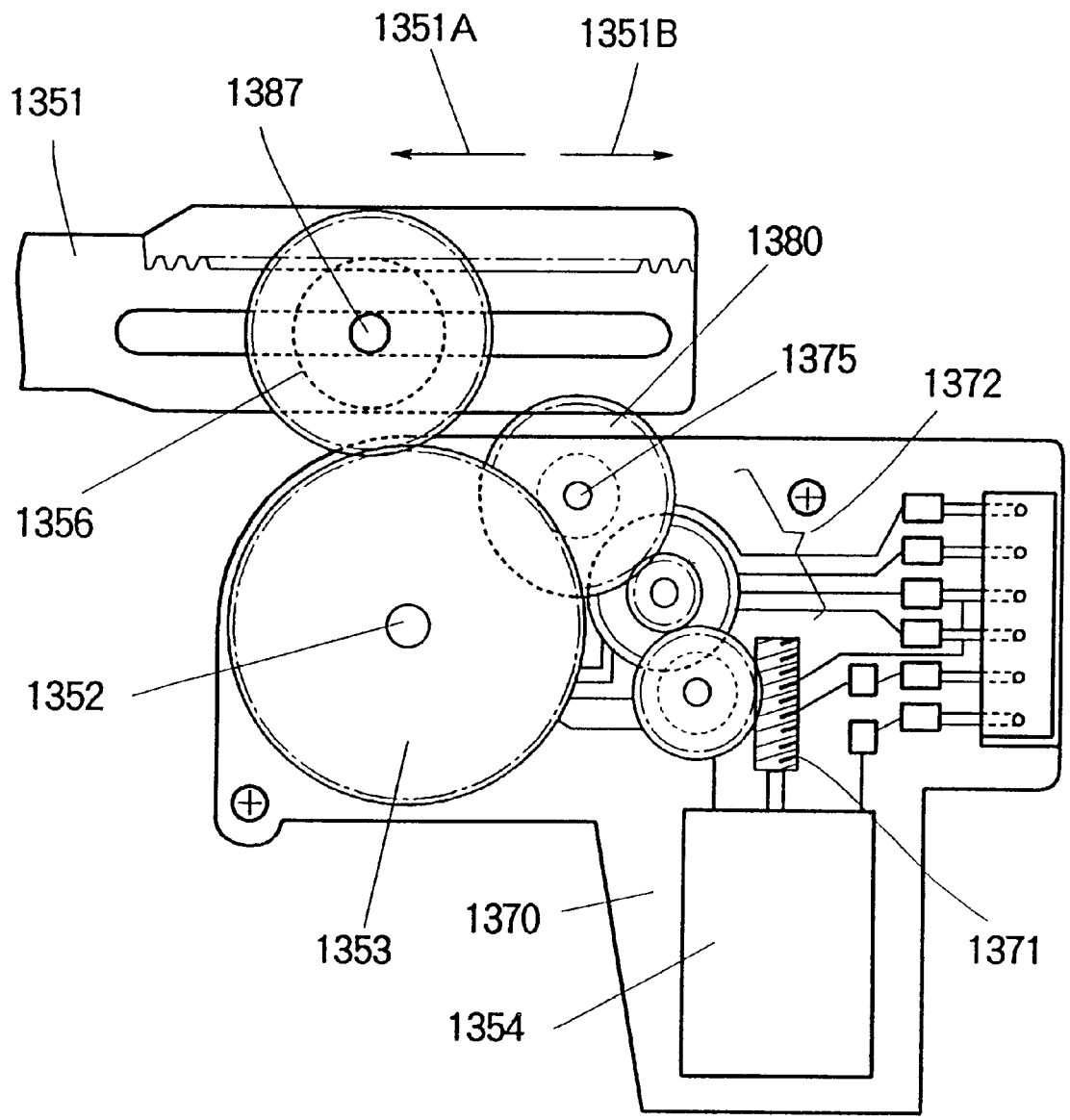

FIG. 94 is a plan view showing the structure of a conventional position-detecting apparatus.

Figure 95:
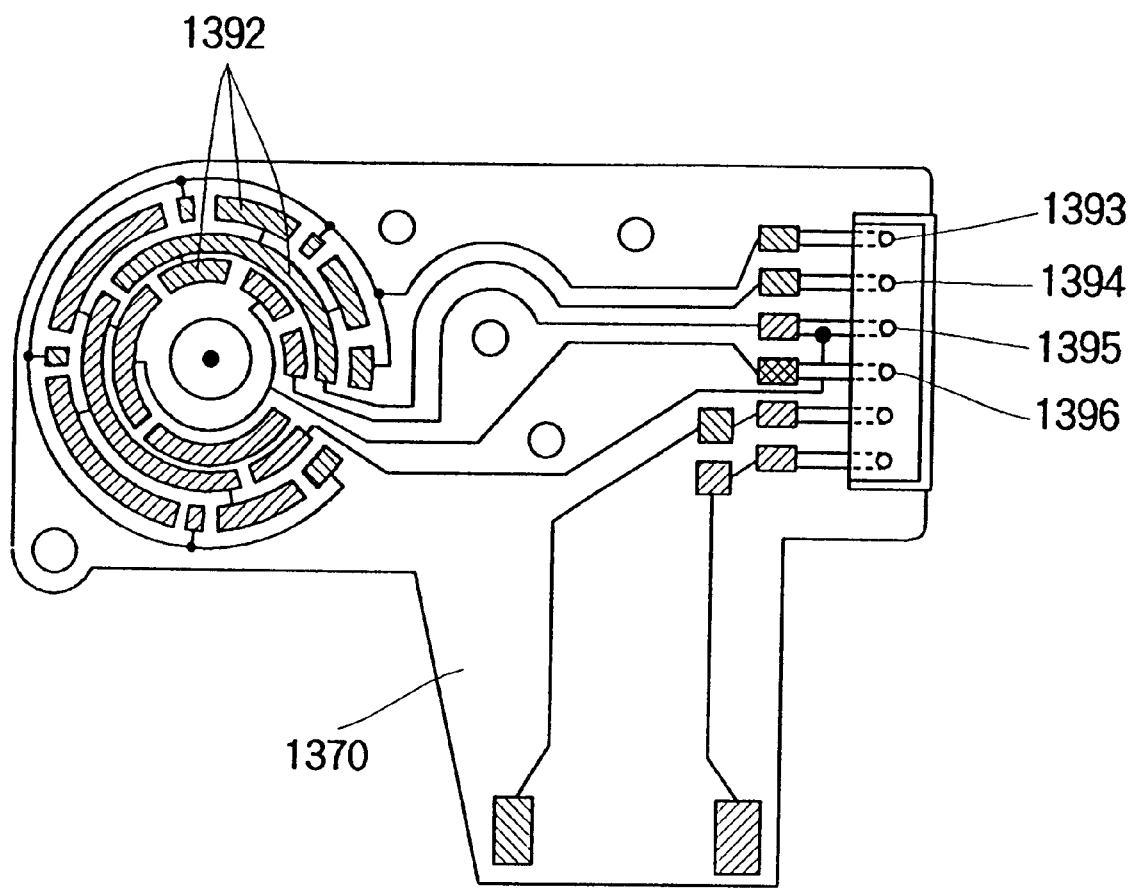

FIG. 95 is a plan view showing the arcuate pattern on the position-detecting circuit board of a conventional position-detecting apparatus.

Figure 96:
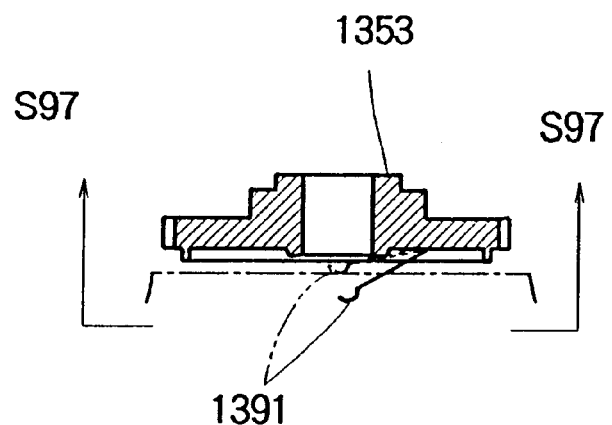

FIG. 96 is a vertical cross-sectional view of the contact gear of the conventional position-detecting apparatus.

Figure 97:
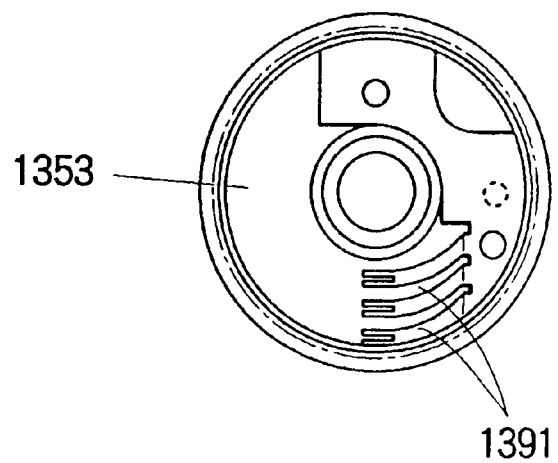

FIG. 97 is a view taken along a line S97—S97 in FIG. 96.

FIG. 98 is a descriptive diagram showing the significances of the symbols used in the conceptual diagrams.

DETAILED DESCRIPTION OF THE PREFERRED EMBODIMENTS

Detailed description of the embodiments of the present invention will be described with reference to the attached drawings.

First Embodiment

FIG. 1 through FIG. 9 relate to a first embodiment of an automatic disc-changing apparatus in accordance with the present invention, and show a mechanism for transporting, from a standby position 200a at the front of the apparatus to a recording and reproducing position 200b above the player 1, or alternatively from the recording and reproducing position 200b to the standby position 200a, cartridges 91, 92, 93 or 94 accommodating within them optomagnetic discs or other disk-type information recording medium (not shown in the figure, and referred to in the first through fourth embodiments hereinbelow simply as "discs").

Figure 1:
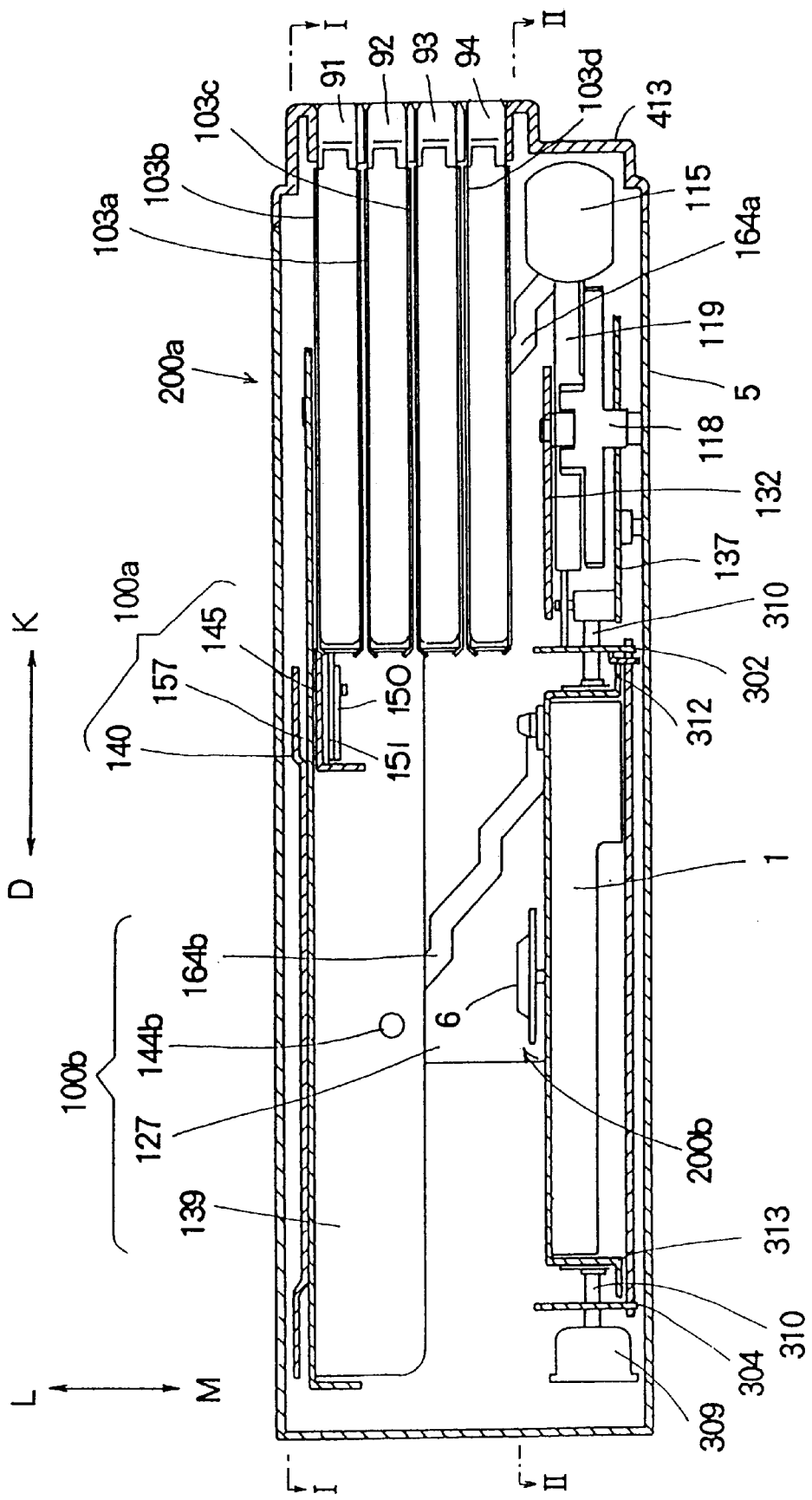
FIG. 1 is a vertical cross-sectional view showing the automatic disc-changing apparatus of a first embodiment of the present invention, taken along a line IV—IV in FIG. 2 and FIG. 3.
Figure 2:
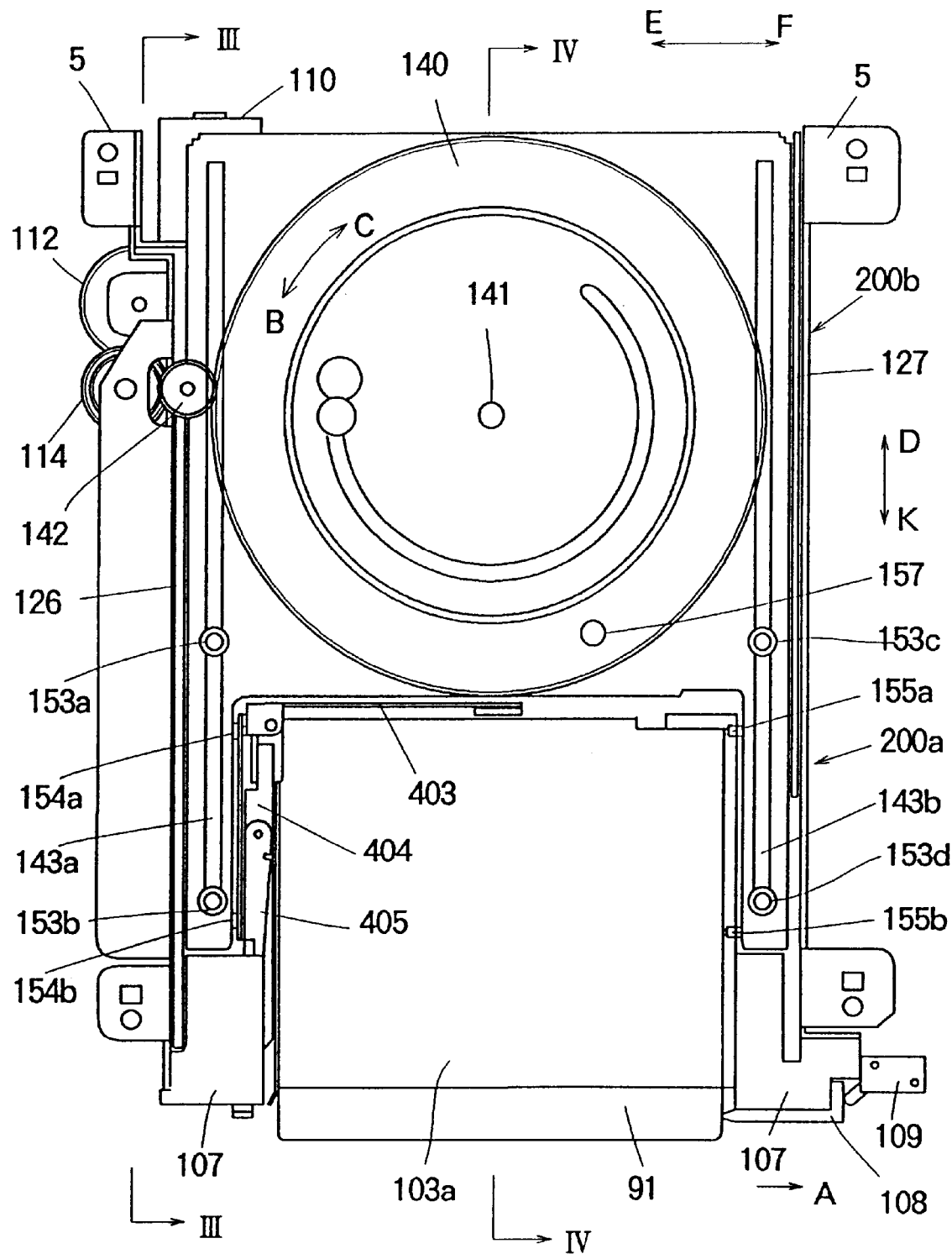
FIG. 2 is a plan view of the apparatus taken along a line I—I in FIG. 1.
Figure 3:
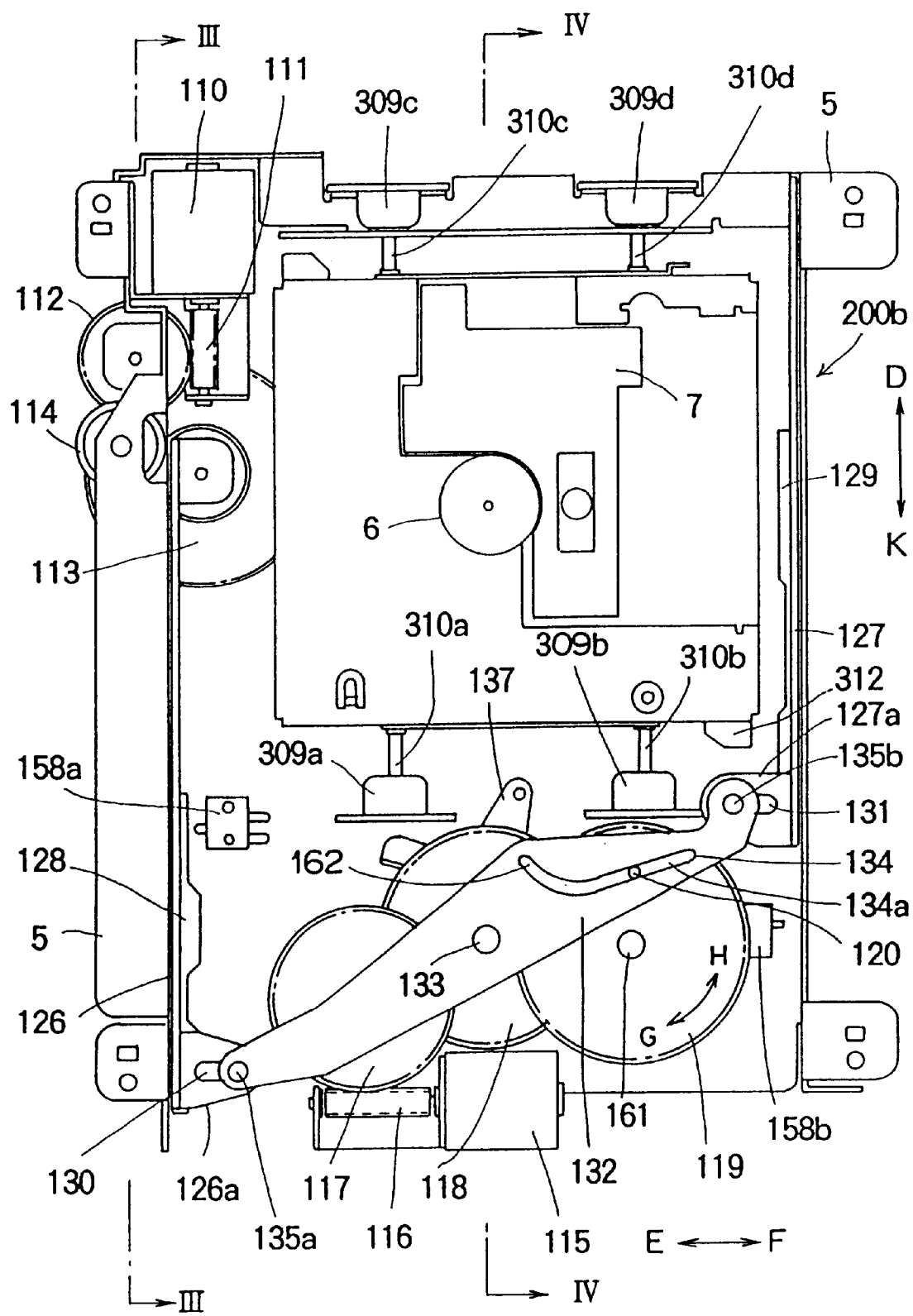
FIG. 3 is a plan view of the apparatus taken along a line II—II in FIG. 1.
Figure 4:
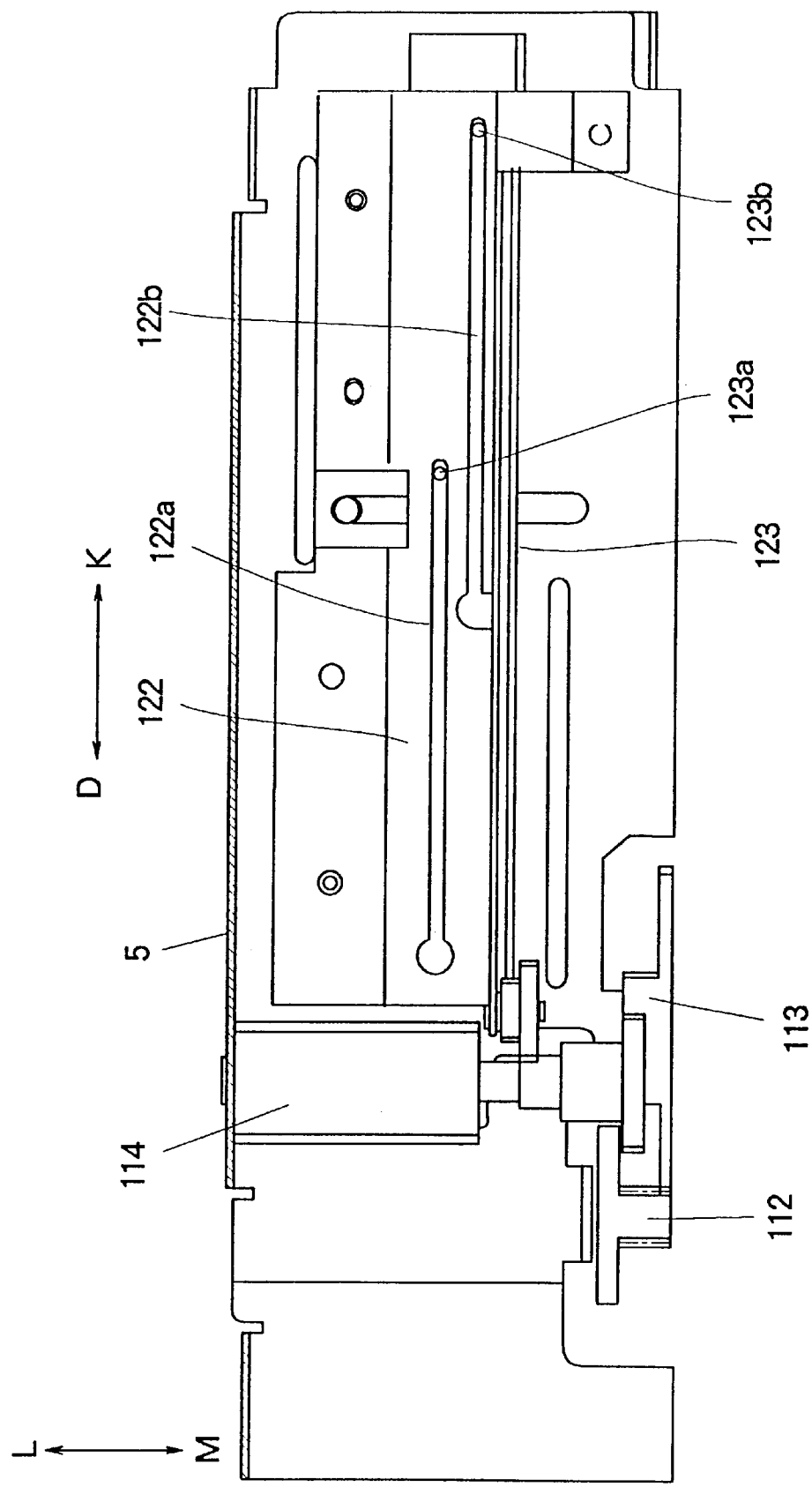
FIG. 4 is a vertical cross-sectional view of the apparatus taken along a line III–III in FIG. 2 and FIG. 3.

FIG. 1 is a vertical cross-sectional diagram taken along a line IV—IV in FIG. 2 and FIG. 3, in which the right side of the drawing is the front of the apparatus. FIG. 2 is a plan view of the apparatus of the first embodiment taken along a line I—I in FIG. 1, and FIG. 3 is a plan view of the apparatus of the first embodiment taken along a line II—II in FIG. 1. FIG. 4 is a vertical cross-sectional diagram of the apparatus of the first embodiment taken along a line III—III in FIG. 2 and FIG. 3.

Figure 5:
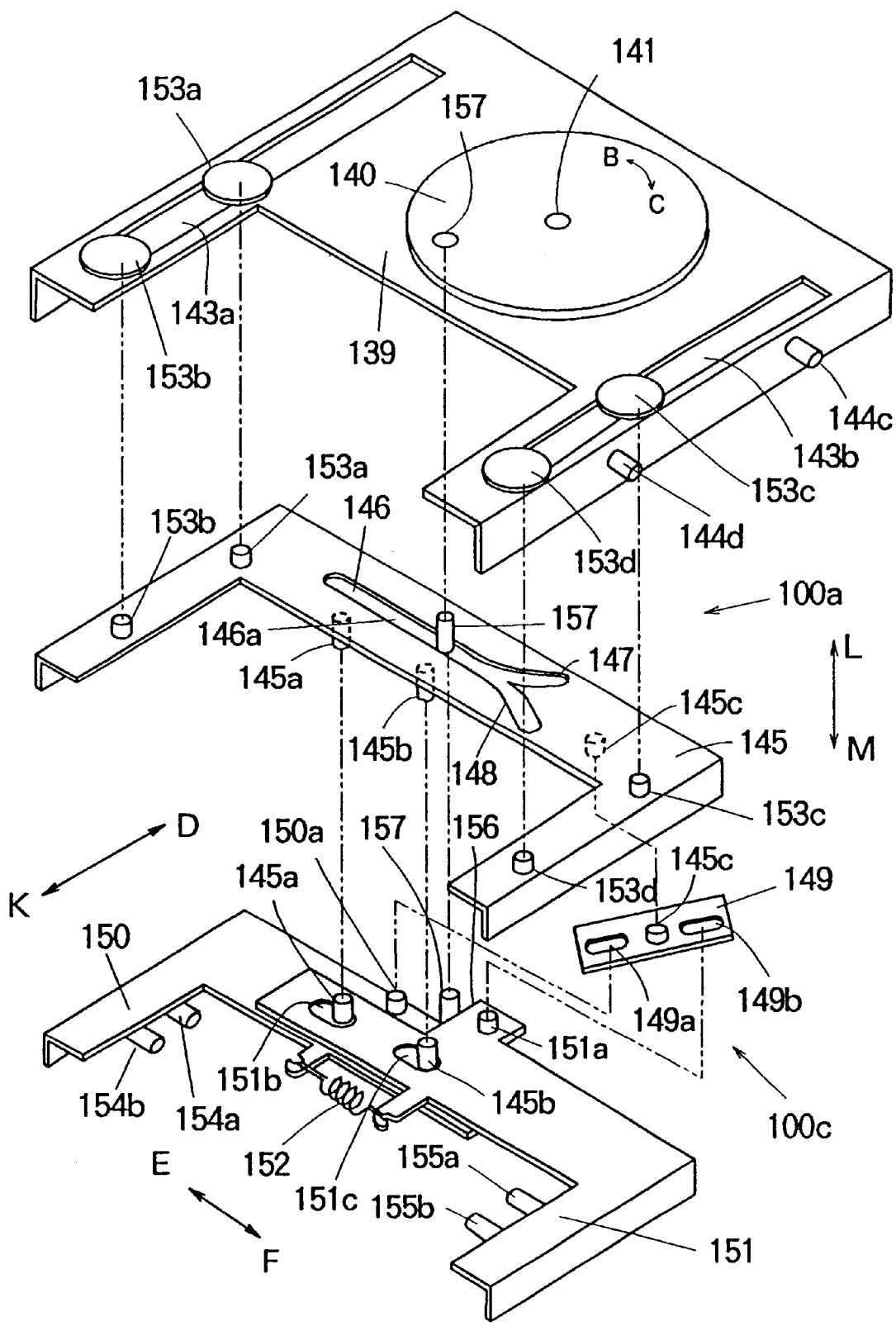
FIG. 5 is a schematic exploded perspective view showing the transfer mechanism of FIG. 1
Figure 6A:
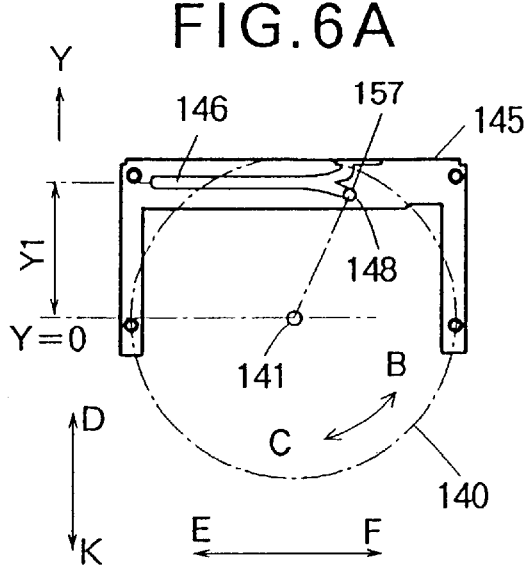
FIGS. 6A to 6E are descriptive diagrams for the purpose of describing the operation of the transfer mechanism of FIG. 5.

FIG. 5 is a schematic exploded perspective view showing a transfer mechanism 100a, which imparts motion to a cartridge holder in the horizontal direction; FIG. 6A through 6E are descriptive diagrams for the purpose of describing the operation of transfer mechanism 100a, and FIG. 7 is a descriptive diagram for the purpose of describing the mechanism for detecting the angle of rotation of loading gear 140 that forms a part of constitutes of the transfer mechanism 100a.

Figure 8:
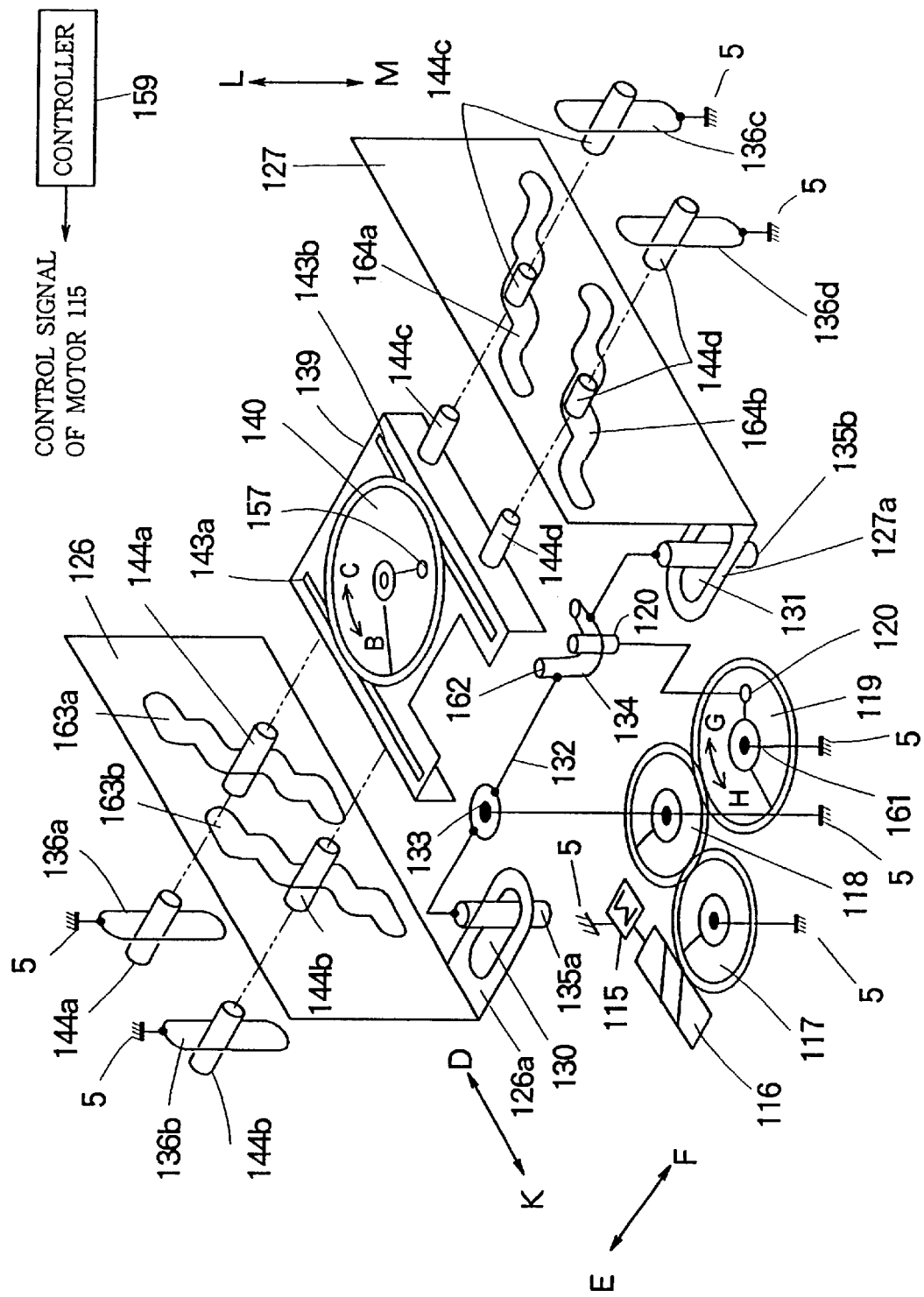
FIG. 8 is a conceptual diagram for the purpose of describing the operation of the elevating mechanism of the first embodiment.
Figure 9:
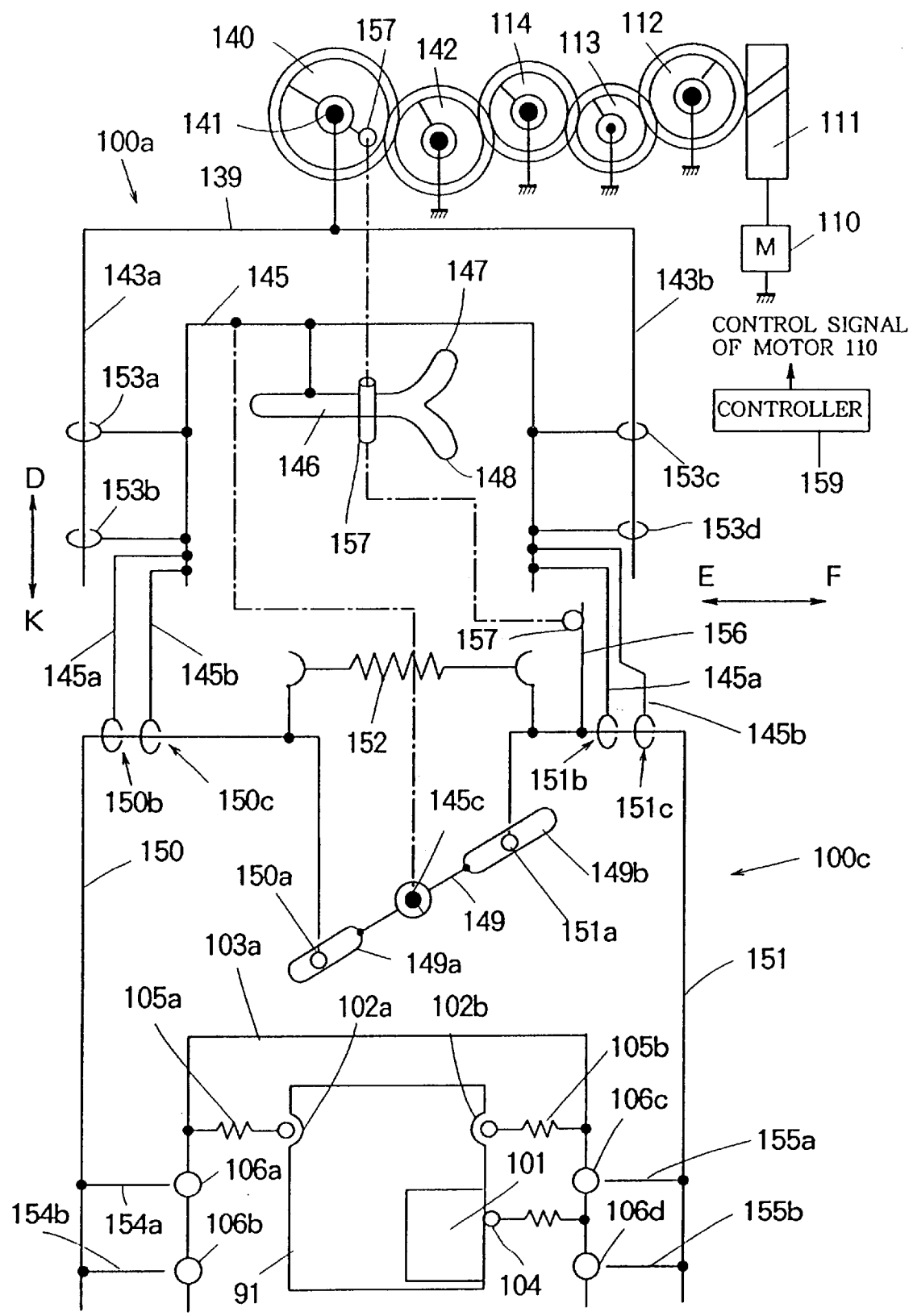
FIG. 9 is a conceptual diagrram for the purpose of describing the operation of the transfer mechanism and the holding mechanism for transport, which holds one of cartridge holders.

Further, FIG. 8 is a conceptual diagram for the purpose of describing the operation of the elevating mechanism 100b of the first embodiment, and FIG. 9 is a conceptual diagram for the purpose of describing the operation of the transfer mechanism 100a and the holding mechanism for transport 100c, which holds one of the cartridge holders 103a, 103b, 103c or 103d. The significance of the symbols used in FIG. 8 and FIG. 9 is as given in FIG. 98.

As is shown in FIG. 1 through FIG. 5, an automatic disc-changing apparatus in accordance with the present invention comprises cartridge holders 103a, 103b, 103c and 103d, which hold, respectively, cartridges 91, 92, 93 and 94; a holder 107 (shown only in FIG. 2) which holds the cartridge holders 103a, 103b, 103c and 103d in standby position 200a; a holding mechanism for transport 100c, which selectively holds one of the cartridge holders 103a, 103b, 103c and 103d: a transfer mechanism 100a, which moves the holding mechanism for transport 100c horizontally to the front and rear (direction DK); and an elevating mechanism 100b, which causes the cartridge holders 103a, 103b, 103c and 103d to ascend or descend vertically (direction LM). As is shown in FIG. 1, a block guide 413 is fixed to chassis 5 on the front panel of the apparatus, and a plurality of cartridge insertion ports corresponding, respectively, to the cartridge holders 103a, 103b, 103c and 103d are provided in the block guide.

As is shown in FIG. 9, each of the cartridges 91, 92, 93 and 94 is equipped with a shutter 101, which is capable of sliding motion. The shutter 101 is open when any of cartridges 91, 92, 93 or 94 is in the recording and reproducing position 200b, and is capable of reading the information recorded on the disc that is accommodated within the cartridge by means of the pickup 7 shown in FIG. 3. Further, as shown in FIG. 9, the bottom surface of cartridges 91, 92, 93 and 94 are provided with engagement grooves 102a and 102b, which engages with the cartridge holders 103a, 103b, 103c and 103d.

When the cartridge holders 103a, 103b, 103c and 103d are loaded in the standby position 200a, they are held, as shown in FIG. 1 and FIG. 2, by the holder 107 fixed to the chassis 5. At appropriate places on each of cartridge holders 103a, 103b, 103c and 103d are provided, as shown in FIG. 9, an opener 104 for the cartridge shutter 101; positioning springs 105a and 105b, which engage with the engagement grooves 102a and 102b to position the cartridge; and engagement holes 106a, 106b, 106c and 106b, which engage with chucking pins 154a, 154b, 155a and 155b on chucking arms 150 and 151.

As shown in FIG. 2, the apparatus of the first embodiment is further equipped with detecting rod; 108, which are mounted on the holder 107, which are mounted on either side of the standby position 200a on the chassis 5 (i.e., on the left and right sides of FIG. 2). The detecting rods 108 slides in direction A when a corresponding cartridge is inserted. The apparatus is further equipped with cartridge detecting switches 109, which are in butt contact with the corresponding detecting rods 108 moving in direction A and detect whether the cartridge has been loaded or not.

As shown in FIG. 1, FIG. 3 or FIG. 8, the elevating mechanism 100b comprises a motor 115 which is mounted on the chassis 5 at the front of the apparatus; a worm 116 which is fixed on an rotating shaft of the motor 115; a gear 117 which is supported on the chassis 5 in such a way that it can rotate freely and engages with the worm 116; a gear 118 which is supported on the chassis 5 in such a way that it can rotate freely and engraves with the gear 117; and a cam gear 119 which is centered on a rotation shaft 161 and supported with respect to the chassis 5 in such a way that it can rotate freely and engages with the gear 118. A drive pin 120 is implanted into the cam gear 119 so as to face it perpendicularly.

Further, as shown in FIG. 1., FIG. 2, FIG. 3 or FIG. 8, the elevating mechanism 100b also comprises on either side of chassis 5 (i.e., on both the left and right of FIG. 2 and FIG. 3) slide cams 126 and 127, which are slidable horizontally to the front and rear (direction DK). Each of slide cams 126 and 127 is equipped with protruding members 128 and 129, which protrude inward in the horizontal direction. Each of the slide cams 126 and 127 also has flanges 126a and 127a directed horizontally inward. In the flange 126a is formed an elongated cam hole 130 horizontally to the left and right (direction EF) so as to be at right-angles to the motion of the slide cam 126, and in the flange 127a is formed an elongated cam hole 131 horizontally to the left and right (direction EF). Again, as shown in FIG. 1 or FIG. 8, there is formed in the vertical surface of the slide cam 126, two stepped cam holes 163a and 163b of identical configuration, and in the vertical surface of the slide cam 127, two stepped cam holes 164a and 164b of identical configuration.

As shown in FIG. 1, FIG. 3 and FIG. 8, the elevating mechanism 100b further comprises a loading lever 132, which has a perpendicular rotating shaft 133 that is fixed to the chassis 5. There is formed in the loading lever 132 a cam hole 134, which engages with the drive pin 120 implanted into cam gear 119. As shown in FIG. 3, the cam hole 134 has a linear portion 134a and an arcuate portion 162. On either end of the loading lever 132, there is implanted an engaging pin 135a, which engages with the cam hole 130 in the flange 126a of the slide cam 126, and an engaging pin 135b, which engages with the cam hole 131. In the flange 127a of the slide cam 127.

The elevating mechanism 100b further comprises an elevator (or elevator base) 139, which is engaged with the slide cams 126 and 127. The side surfaces of the elevator 139 are equipped with engaging pins 144a, 144b, 144c and 144d, which are engaged with the stepped cam holes 163a, 163b, 164a and 164b formed in the slide cams 326 and 127, and are engaged with the vertical cam holes 136a, 136b, 136c and 136d formed in the chassis 5 and extending in the vertical direction.

Further, as shown in FIG. 2, FIG. 3, FIG. 4 and FIG. 9, the transfer mechanism 100a comprises a motor 110 mounted on the rear of the chassis 5; a worm 111 which is fitted to the rotating shaft of the motor 110; a gear 112 which is supported on the chassis 5 in such a way that it can rotate freely and engages with the worm 111; a gear 113 which is supported on chassis 5 in such a way that it can rotate freely and engages with the gear 112; and a cylindrical gear 114 which is supported on the chassis 5 in such a way that it can rotate freely and engages with the gear 113.

Further, as shown in FIG. 1, FIG. 2 or FIG. 5, the transfer mechanism 100a comprises a loading gear 140 which is supported by a rotating shaft 141 on the elevator 139, and a gear 142 which is supported on the elevator 139 such a way that it can rotate freely and engaged with the loading gear 140 and the cylindrical gear 114. On either side of the elevator 139 (i.e., on both the left and right in FIG. 2) there are formed long, narrow guide slots 143a and 143b oriented horizontally to the front and rear in the direction of movement of the slide cams 126 and 127 (direction DK).

Further, the transfer mechanism 100a comprising a transporter 145 supported on the elevator 139 in such a way as to be capable of sliding motion. The transporter 145 is equipped with rollers 153a and 153b which are supported so as to rotate freely and engaged with the guide slot 143a of the elevator 139, and rollers 153c and 153d which are supported so as to rotate freely and engaged with the guide slot 143b. As shown in FIG. 5, the transporter 145 further comprises a horizontally configured Y-shaped cam hole 146 having a linear portion 146a that extends horizontally to the left and right (direction EF), which is perpendicular to the horizontal to the front and rear direction in which the transporter moves (direction DK), and two arcuate portions 147 and 148 which fork from one end of linear portion 146a. As shown in FIG. 6E, the arcuate portion 147 has as its radius of the distance from the rotating shaft 141 of the loading gear 140 to the engaging pin 157, and as shown in FIG. 6A, the arcuate portion 148 has as its radius of arc the same distance from the rotating shaft 141 of the loading gear 140 to the engaging pin 157.

Further, an apparatus of the first embodiment is equipped with a detecting mechanism for detecting the angle of rotation of the loading gear 140. As shown in FIG. 4 and FIG. 7, the detecting mechanism comprises a sensor holder 122 mounted on the changing 5: cam holes 122a and 122b formed in the sensor holder 122; and a rack 123, which, by means of the engagement of cam holes 122a and 122b with engaging pins 123a and 123b is slidable horizontally to the front and rear (direction DK) and is engaged with the cylindrical gear 114. A film 125 is stretched over the rack 123, and optical sensors 124a and 124b are provided above the sensor holder 122 so as to face the film 125 through the aperture (not shown in the drawings) of the sensor holder 122. The film 125 forms a pattern using colors of high and low optical reflectivity (such as silver and black), and a controller 159 detects the angle of rotation of the loading gear 140 on the basis of information on the pattern of the film 125 as detected by the optical sensors 124a and 124b.

Further, the transfer mechanism 100a is equipped with a holding mechanism for the transport 100c, which holds the cartridge holder for transport. As shown in FIG. 5 and FIG. 9, the holding mechanism for transport 100c comprises chucking arms 150 and 151 which are supported in such a way as to slide freely horizontally to the left and right with respect to the transporter 145 (direction EF); and a spring 152 which engages at either end with chucking arms 150 and 151 and applies a force in a direction to draw the chucking arms 150 and 151 towards each other. Engagement pins 145a and 145b that are implanted into the bottom surface of the transporter 145 are engaged with slots 150b and 150c of the chucking arm 150 and slots 151b and 151c of the chucking arm 151. The slots 350b and 150c are elongated horizontally to the left and right of the chucking arm 150 (direction EF), and slots 151b and 151c, which are elongated horizontally to the left and right of chucking arm 151 (direction EF).

The holding mechanism for transport 100c is equipped with a lever member 149, which i s rotatable around on a center pin 145c of the transporter 145, and two slots 149a and 140b formed on lever member 149 are each engaged with the engaging pin 150a implanted into the chucking arm 150 and the engaging pin 151a implanted into the chucking arm 151.

The chucking arm 150 is equipped with chucking pins 154a and 154b, which are implanted facing inward for the purpose of engaging with the cartridge holder, and the chucking arm 151 is equipped with chucking pins 155a and 155b, which are implanted facing inward for the purpose of engaging with the cartridge holder.

Further, in the chucking arm 151 there is formed an edge portion 156, which receives the chucking arm driving power; and in the loading gear 140 there is implanted into an engaging pin 157, which is inserted through Y-shaped cam hole 146 and establishes butt contact with the edge portion 156 of the chucking arm 151.

The apparatus of the first embodiment is further equipped with detecting switches 158a and 158b for detecting the height of the elevator 139, which are mounted on the chassis 5 in such a way as to be in butt contact with protruding members 128 and 129 mounted on the slide cams 126 and 127; and a controller 159, which provides general control functions for the apparatus as a whole, controlling the motors 110 and 115, receiving signals from the detecting switches and optical sensors, controlling the operation of the player 1, and so on.

A vibration-absorbing damper is inserted between the player 1 and the chassis 5 in order to mitigate the transmission of external vibration to the player 1 and to eliminate the skips that may occur in the reading of signals.

Following is a description of the elevating mechanism 100b with reference to FIG. 8. The elevating mechanism 100b is operated by a drive motor 115 on the basis of an instruction from the controller 159. The rotational driving power of the motor 115 is transmitted through the worm 116, the gear 117 and the gear 118 to the cam gear 119, and is converted into rotation of the loading lever 132 about the rotating shaft 133 by means of the cam hole 134 in the loading lever 132 and the engaging pin 120 of the cam gear 119. When the loading lever 132 rotates clockwise, the slide cam 127, which has cam hole 131 engaging with the engaging pin 135b, moves horizontally forward (direction K) while the slide cam 126, which has cam hole 130 engaging with the engaging pin 135a, moves horizontally backward (direction D). On the other hand, when the loading lever 132 rotates counter clockwise, the slide cam 127 moves horizontally backward (direction D), while the slide cam 126 moves horizontally forward (direction K).

When the slide cams 126 and 127 are moving, the engaging pins 144a, 144b, 144c and 144d of the elevator 139 are engaged respectively with the cam holes 136a, 136b, 136c and 136d, which are formed in the chassis 5 and elongated in the vertical direction, and do not move horizontally to the front and rear (directions DK), so that through the action of the mechanism consisting of the cam holes 163a and 163b of the slide cam 126 and the cam holes 164a and 164b of the slide cam 127, and of the engaging pins 144a, 144b, 144c and 144d that engage with them, the elevator 139 moves vertically (directions LM). In the case shown in FIG. 8, when the slide cam 126 moves horizontally backward (direction D) and the slide cam 127 moves horizontally forward (direction K), the elevator 139 descends, and conversely when the slide cam 126 moves horizontally forward (direction K) and the slide cam 127 moves horizontally backward (direction D), the elevator 139 ascends.

Following is a description of the transfer mechanism 100a with reference to FIG. 6 and FIG. 9. The transfer mechanism 100a is operated by rotation of the drive motor 110 on the basis of an instruction from the controller 159. The rotational driving power of the motor 110 is transmitted through the worm 111, the gear 112, the gear 113, the cylindrical gear 114 and the gear 142 to the loading gear 140. When the loading gear 140 rotates, the transporter 145 moves horizontally to the front and rear (directions DK) along the guide slots 143a and 143b of the elevator 139 by means of the Y-shaped cain hole 146 of the transporter 145 and the engaging pin 157 of the loading gear 140.

Following is a detailed description of the way in which the transporter 145 moves horizontally to the front and rear (directions DK) due to the rotary motion of the loading gear 140, with reference to FIG. 6A through FIG. 6E. In bringing the transporter 145 horizontally forward (direction K) from above the recording and reproducing position 200b to the standby position 200a, the loading gear 140 is rotated counterclockwise (direction 13). As shown in FIG. 6A, when the transporter 145 is above the recording and reproducing position 200b, the engaging pin 157 is in the arcuate portions 148 of the cam hold 146. Through the counterclockwise (direction 13) movement of the loading gear 140, the engaging pin 157 is brought to the position shown in FIG. 6B. In the process from FIG. 6A to FIG. 6B, movement of the engaging pin 157 within the arcuate portion 148 does not move the transporter 145. When the loading gear 140 continues its rotation from FIG. 6B to FIG. 6C, the transporter 145 moves horizontally forward (direction K) for a distance Y1. Then when the loading gear 140 continues its rotation from FIG. 6C to FIG. 6D, the transporter 145 moves horizontally forward (direction K) for a further distance Y1. Thereafter, as shown in FIG. 6E, the engaging pin 157 advances to the other arcuate portion 147 of the cam hole 146 and the rotation of the loading gear 140 ceases. In the process from FIG. 6D to FIG. 6E, the transporter 145 remains in the standby position 200a, without moving horizontally forward or backward (directions DK).

In returning the transporter 145 from the standby position 200a to the recording and reproducing position 200b, the operations from FIG. 6E to FIG. 6A may be followed in the reverse order from that described above.

Following is a description of the holding mechanism for transport 100c with reference to FIG. 5, FIG. 6 and FIG. 9. Operation of the holding mechanism for transport 100c is linked to the rotary motion of the loading gear 140, which moves the transporter 145. When the engaging pin 157 of the loading gear 140 is in butt contact with the edge portion 156 of the chucking arm 151 and is not pushing the chucking arm 151 horizontally to the right (direction F), as shown in FIG. 6A through FIG. 6D, the chucking arms 150 and 151 are drawn toward each other by the spring 152. When the engaging pin 157 of the loading gear 140 is in butt contact with the edge portion 156 of the chucking arm 151 and moves the chucking arm 151 horizontally to the right (direction F) against the compressive force of the spring 152 as shown in FIG. 6A and FIG. 6E, the chucking pins 155a and 155b of the chucking arm 151 become separated from the cartridge holder 103. Simultaneously, the movement of the chucking arm 151 horizontally to the right (direction F) is transmitted to the chucking arm 150 through the lever members 149, which is supported by the transporter 145, centered on the rotating shaft 145c, moving the chucking arm 150 horizontally to the left (direction E) and drawing the chucking pins 154a and 154b away from the cartridge holder 103.

Following is a description of the overall operation of the apparatus of the first embodiment having the structure described above. If a user inserts a cartridge 91 through the insertion port of the front of the cartridge holder 103a as shown in FIG. 1 and and FIG. 2, the opener 104 of the cartridge holder 103a establishes butt contact with the shutter 101 of the cartridge 91 as shown in FIG. 9, and the shutter 101 slides and exposes a portion of the disc accommodated within, so reading or writing of information becomes possible. As a result of this insertion, the leading ends of positioning springs 105a and 105b of the cartridge holder 103a engage with the engagement grooves 102a and 102b of the cartridge, and the cartridge 91 is held in a prescribed position inside cartridge holder 103a. By repeating this operation with the remaining cartridges 92, 93 and 94, the cartridges 91, 92, 93 and 94 can be loaded into all of the cartridge holders 103a, 103b, 103c and 103d.

Detection of whether the cartridges 91, 92, 93 and 94 have been loaded or not is accomplished, as shown in FIG. 2, by the rods 108, which are in butt contact with the side of cartridges 91, 92, 93 and 94 and slides in direction A, and detecting switches 109, which take the on or off state in accordance with the position of rods 108 in direction A. The rods and detecting switches are provided for holders 107.

If the user then operates the control panel (not shown in the drawings) so as to select the cartridge 94 to be reproduced, the elevating mechanism 100b will cause the elevator 139 to move to a prescribed height. As shown in FIG. 3, the height of the elevator 139 is detected by the protruding members 128 and 129 provided respectively on horizontally moving slide cams 126 and 127, and the detecting switches 158a and 158b, which come into contact with them and take on or off state. In changing the height of the elevator 139, the motor 110 is powered on the basis of an instruction from the controller 159. The rotational driving power of the motor 110 is transmitted to the loading gear 140, causing it to rotate either in direction C (loading) or direction B (unloading).

Next, the transfer mechanism 100a and the holding mechanism for transport 100c operate. Initially, in the state shown in FIG. 6A, the chucking pins 155a and 155b of the the chucking arm 151 and the chucking pins 154a and 154b of the chucking arm 150 are separated from the cartridge holder 103a as shown in FIG. 9. When, in the state from FIG. 6A to FIG. 6B, the loading gear 140 rotates in direction B, the engaging pill 157 moves along the arcuate portion 148 of the cam hole 146. Since the arcuate portion 148 forms an arc having as its radius the distance between the rotating graft 141 and the engaging pin 157, the position of the transporter 145 in the Y-axis direction will not change. At this time, however, the chucking arms 151 and 150 are being drawn together horizontally to the left (direction E) and horizontally to the right (direction F) by the action of the spring 152, so that the chucking arm 151 moves horizontally to the left (direction E) with the edge portion 156 in contact with the engaging pin 157, and the chucking arm 150 is moved horizontally to the right (direction F) by the lever member 149. Thus, in the state shown in FIG. 6I3, the chucking pins 154a, 154b, 155a and 155b fit respectively into the engagement holes 106a, 106b, 106c and 106d so that the transporter 145 arid the cartridge holder 103a are unified as an integral unit.

Figure 6D:
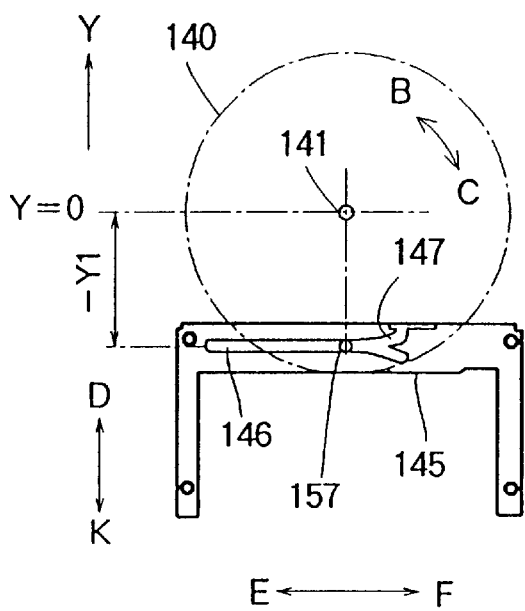
Figure 6B:
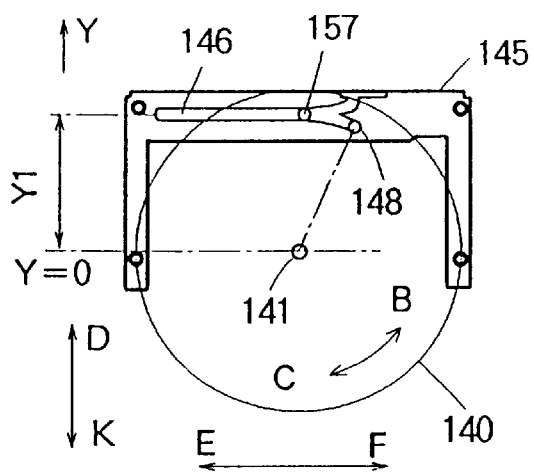
Figure 6E:
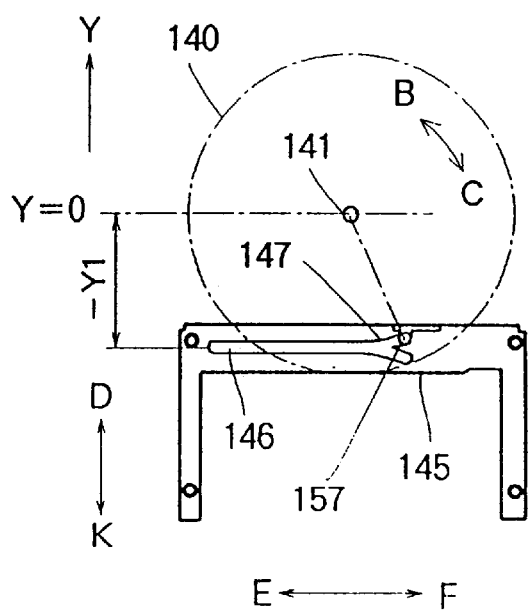
Figure 6C:
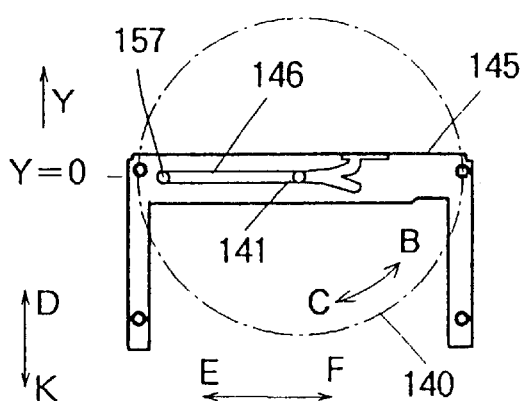
Figure 7:
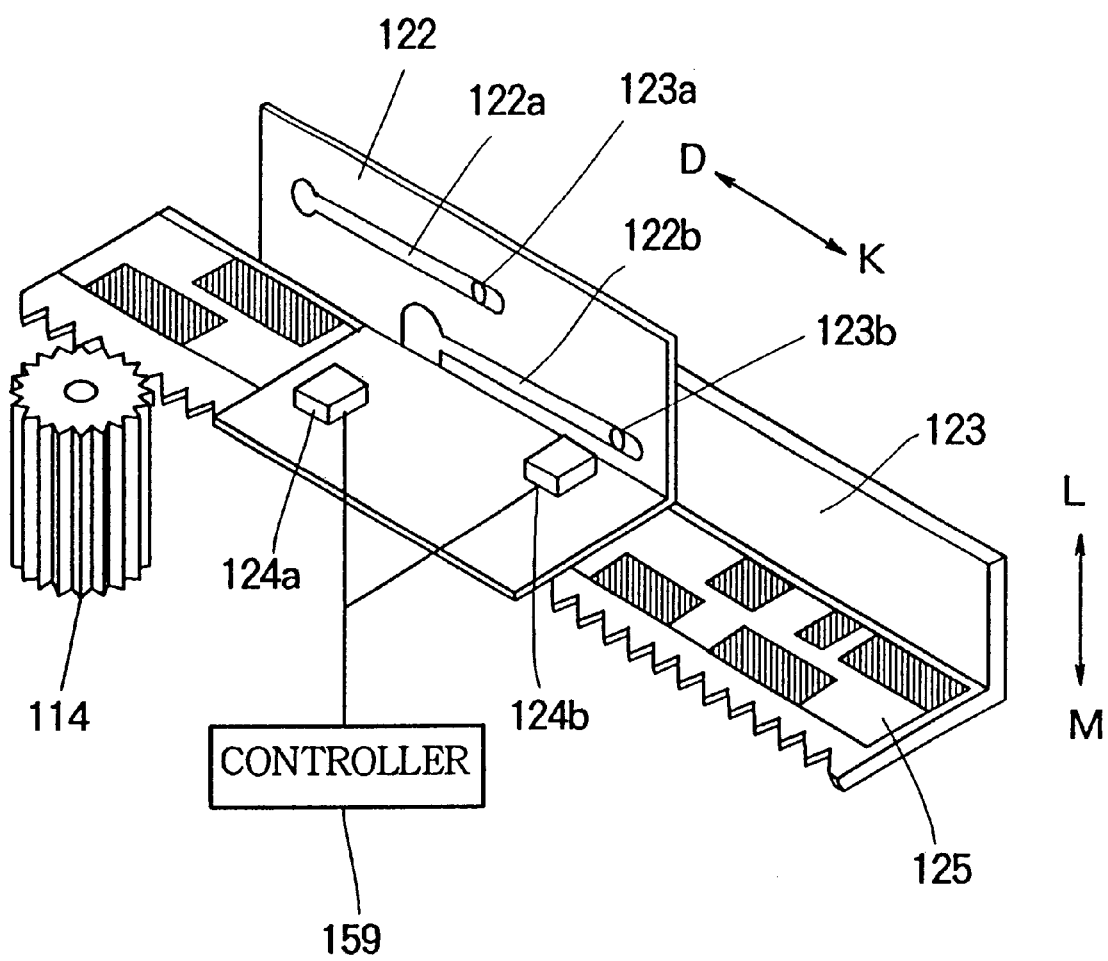
FIG. 7 is a descriptive diagram for the purpose of describing the mechanism for detecting the angle of rotation of the loading gear that forms a part of constitutes of the transfer mechanism.

Next, the loading gear 140 rotates in direction B from the state shown in FIG. 6B through that of FIG. 6C to that of FIG. 6D. During this time, the transporter 145 and the cartridge holder 103a move as an integral unit horizontally forward (direction K) the same distance as the Y-axis component of the movement of the pin 157.

Next, as the loading gear 140 rotates in direction B from the state shown from FIG. 6D to FIG. 6E, the engaging pin 157 moves along the arcuate portion 147. Since the arcuate portion 147 forms an arc having as its radius the distance between the rotating shaft 141 and the engaging pin 157, the position of the transporter 145 in the Y-axis direction will not change. However, as the loading gear 140 rotates from the state shown in FIG. 6D to that of FIG. 6E, the engaging pin 157 presses horizontally to the right (direction F) on the edge portion 156 of the chucking arm 151, so that the chucking arm 151 moves horizontally to the right (direction F) and the chucking pins 155a and 155b become separated from the cartridge holder 103a. Simultaneously the horizontally to the right (direction F) movement of the chucking arm 151 is transmitted through the lever 149 to the chucking arm 150, the chucking arm 150 moves horizontally to the left (direction E) and the chucking pins 155c and 155b become separated from the cartridge holder 103a.

The angle of rotation of the loading gear 140 is sensed by the controller 159 on the basis of the output of the optical sensors 124a and 124b, which read the pattern of the film 125 on the rack 123 engaging with the cylindrical gear 114 and moving horizontally to the front and rear of the apparatus (direction DK).

When the controller 159 senses that the state shown in FIG. 6E has been reached, it emits an instruction for the i motor 115 to rotate, causing the cam gear 119 to rotate either in direction G (loading) or direction H (unloading), and driving the elevating mechanism 100b.

Following is a description of the loading action in which the transporter 145 is moved from the standby position 200a to the position above the recording and reproducing position 200b, on the basis of instructions from the controller 159. When the motor 110 rotates and the loading gear 140 rotates in the loading direction (direction C), the engaging pin 157 moves from tie state shown in FIG. 6E to that in FIG. 6D and the chucking pins 154a, 154b, 155a and 155b fit into holes in the cartridge holder 103a. Since during this time the engaging pin 157 moves along the arcuate portion 147, the Y-axis position of the transporter 145 does not change.

Then, when the loading gear 140 moves from the state shown in FIG. 6D through that of FIG. 6C to that of FIG. 6B, the transporter 145. forming an integral unit with the cartridge holder 103a, moves a distance of 2.(Y1) in the Y-axis direction. When it is detected by the output of the optical sensors 124a and 124b that the state shown in FIG. 6B has been reached, the motion of the motor 110 is stopped on the basis of an instruction from the controller 159.

The motor 115 of the elevating mechanism 100b is now driven in the loading direction, which causes the slide cams 126 and 127 to move and the elevator 139 to descend. The elevator 139 descends to a height at which the turntable 6 comes into contact with the center of the disc in the cartridge 91. In this state, the player 1 is in a locked condition, fixed with respect to the chassis 5. If the motor 115 is then caused to rotate further in the loading direction, the drive pin 120 moves along the arcuate portion 162 of the loading lever 132, with the result that the loading lever 132 does not receive the driving power from the drive pin 120. Thus the slide cams 127 and 126 do not move until the completion of the floating operation described below.

Next the motor 110 of the transport mechanism 100b rotates in the loading direction, the engaging ping 157 moves from the state shown in FIG. 6B to that of FIG. 6A, and the chucking pins 154a, 154b, 155a and 155b are in a state of separation from the cartridge holder. At this point the rotation of the motor 115 in the unloading direction causes the elevator 139 to ascend, but the cartridge holder and cartridge 91 continue to be held in an integral state with the player 1 by means of a cartridge clamping mechanism 300, which will be described below. As a result of the ascent of the elevator 139, a clearance permitting a certain stroke appears between the player 1 and the elevator 139. At this time, the player 1 and the (cartridge 91 held by the player 1 are floated from the chassis 5 within the range or a certain stroke. Accordingly vibration from the outside will be absorbed and will not be readily transmitted to the player 1.

Figure 63:
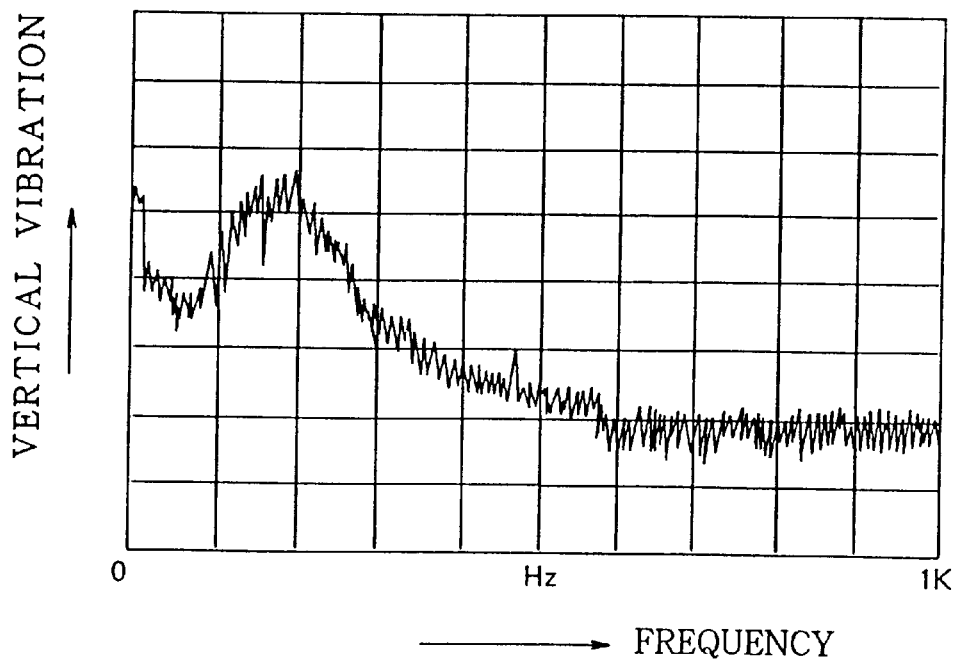
FIG. 63 is a graph plotting data measured for a disc apparatus of the tenth embodiment, when the base was vibrated with the compressive force of the leaf spring set to 130 [g].

Following is a description of the operation by which the cartridge being played is replaced by another cartridge. When the user specifies on the control panel (not shown in the drawing) the number of the cartridge to be played next, for example, number 2 (the second cartridge from the top), reproduction on the player 1. Ceases on the basis of an instruction from the controller 159. The motor 115 is then rotated in the loading director, causing the elevator 139 to descend, and when the center of the disc in the cartridge 91 reaches the height of the turntable 6, the motion of the motor 115 ceases. Next, the motor 110 is driven, Which causes the loading gear 140 to rotate in direction B and to move from the state shown in FIG. 6A to that of FIG. 63B. The chucking pins 154a, 154b, 155a and 155b therefore lit into holes in the cartridge holder, and the motor 110 is stopped at the position shown in FIG. 6B. Next the motor 115 of the elevating mechanism 100b rotates in the unloading direction, which causes the player 1 to move from the floating condition to the locked condition. The motor 115 rotates in the unloading direction, causing the cartridge clamping mechanism. Which will be described below, to operate, and the cartridge 91 is released from its integral unity with) the player 1 and forms an integral unity with the elevator 139.

Until the completion of the operation of the cartridge clamping mechanism, the drive pin 120 moves along the arcuate portion 162, with the result that the loading lever 132 does not rotate. Even after the motor 115 causes the operation of the cartridge clamping mechanism below described, rotation continuing in the unloading direction causes the loading lever 132 to rotate, the slide cams 126 and 127 to move, and elevator 139 to ascend until it reaches the prescribed height.

Next, the transporter 145 moves from the state shown in FIG. 6B through that of FIG. 6C to that of FIG. 6D, at which point the cartridge holder is returned to the holding mechanism for standby. When it further moves from the state shown in FIG. 6D to that of FIG. 61, the chucking pins 154a, 154b, 155a and 155b are separated from the cartridge holder, and the motor 110 stops.

Next the motor 115 operates and the elevator 139 moves to the height at which cartridge 92 is kept. The decision as to whether at this time the elevator 139 should ascend or descend is made on the basis of a detection signal from the detecting switches 158a and 158b.

Next transporter 145 moves from the position of FIG. 6E to the position of FIG. 6D, and in the process, the cartridge holder 103b of the cartridge 92 forms an integral unit with the transporter 145. The transporter 145 moves from the position of FIG. 6D through that of FIG. 6C to that of FIG. 6B, and the cartridge 92 is loaded to the player 1

Following is a description of the clamping mechanism 100d which clamps the cartridge onto the player 1.

Figure 10:
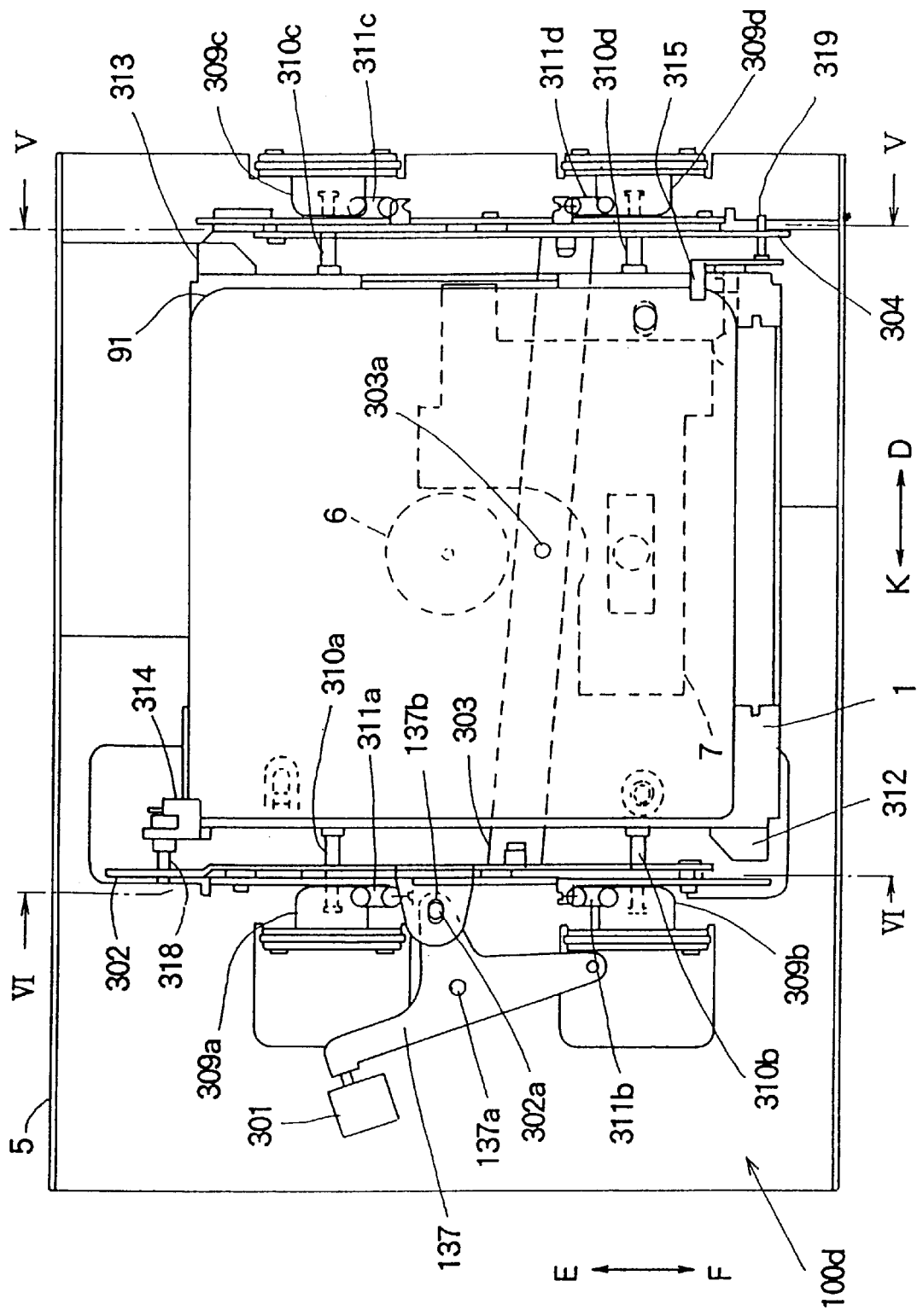
FIG. 10 is a schematic plan view showing the structure of the cartridge clamping mechanism of the automatic disc-changing apparatus of the first embodiment.
Figure 11:
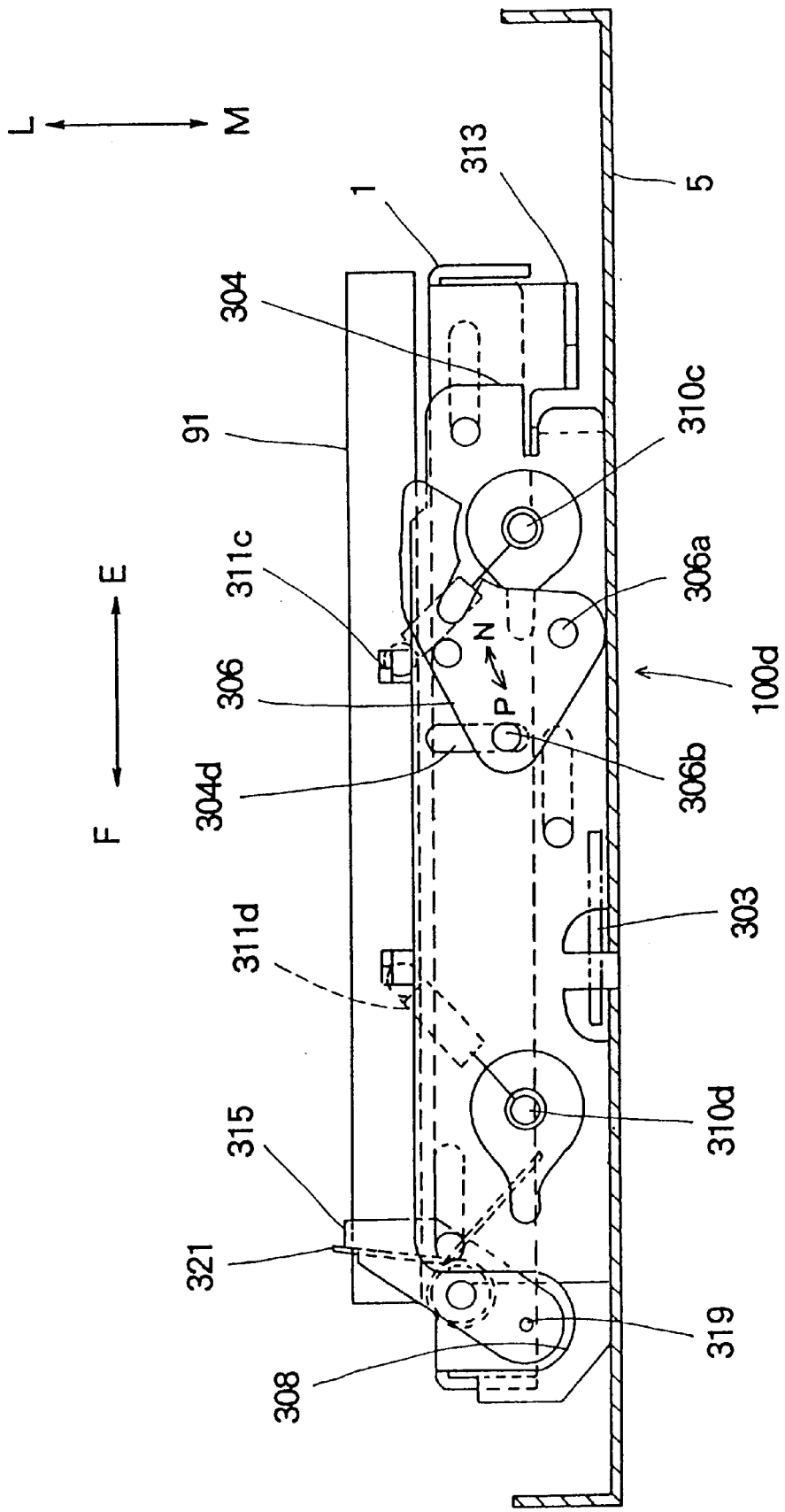
FIG. 11 is a vertical cross-sectional view taken along a line V—V in FIG. 10.
Figure 12:
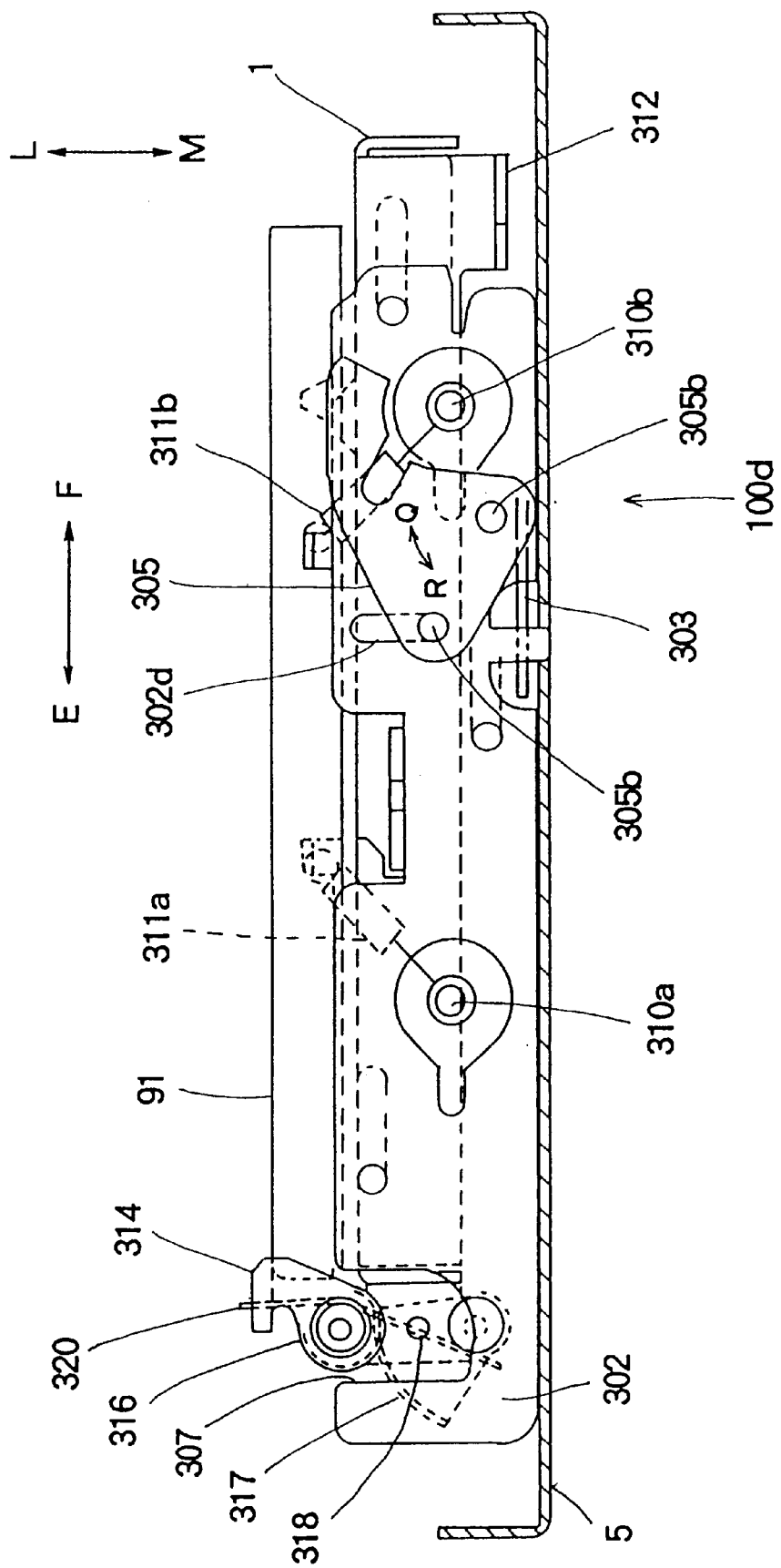
FIG. 12 is a vertical cross-sectional view taken along a line VI—VI in FIG. 10.
Figure 14:
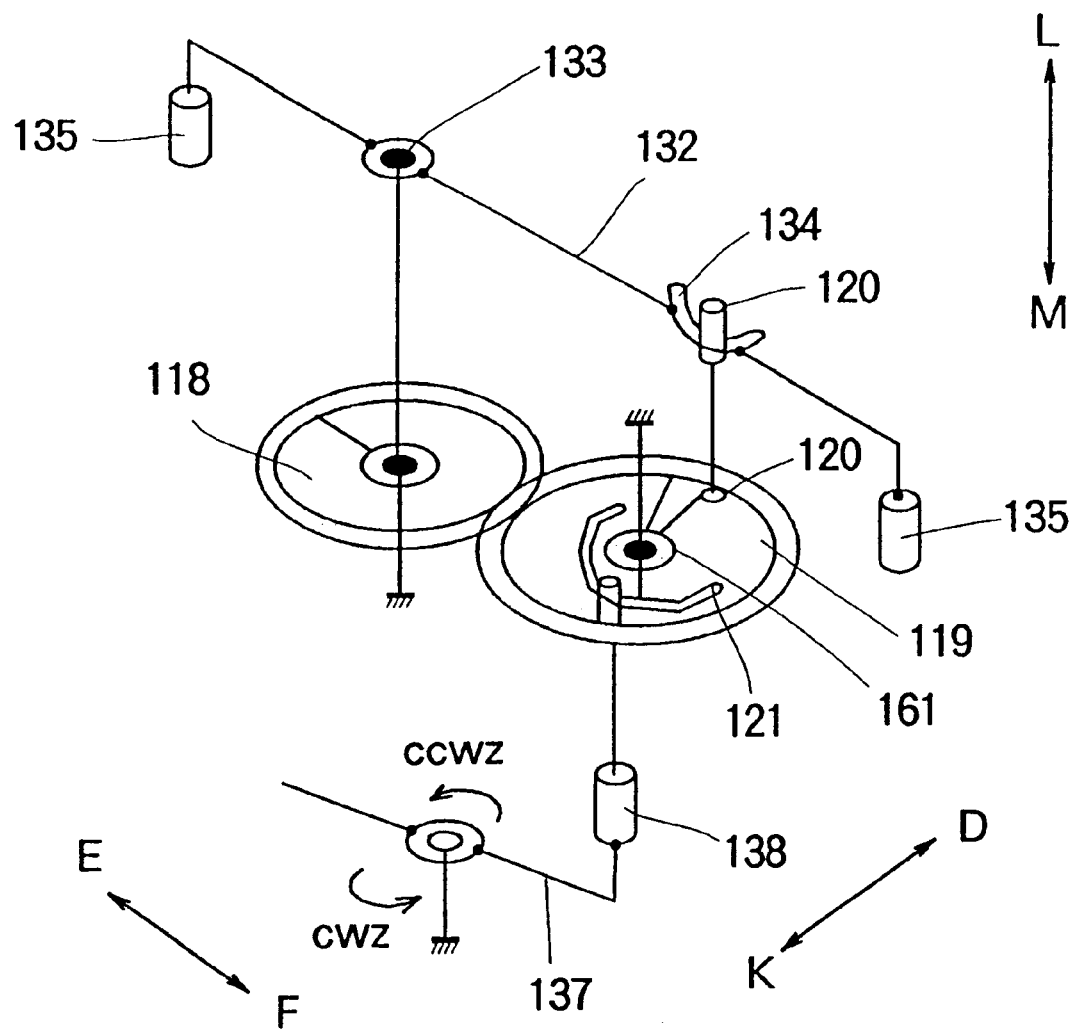
FIG. 14 is a conceptual diagram for the purpose of describing the mechanism that drives the floating arm shown in FIG. 13.
Figure 15:
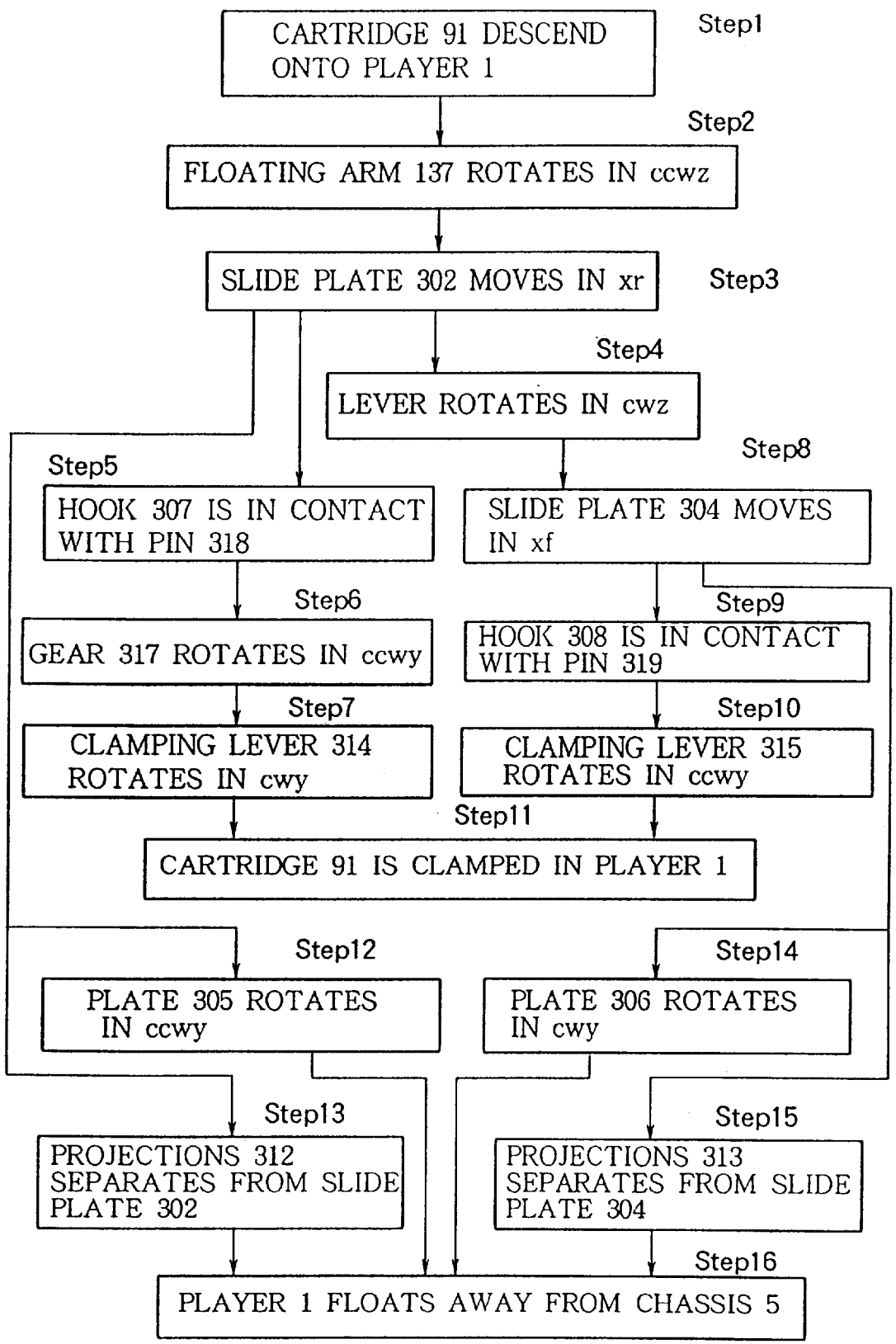
FIG. 15 is a flowchart showing the operation of a player from the fixed condition until it reaches the floating condition.

FIG. 10 is a schematic plan view showing the structure of the cartridge clamping mechanism mood of the automatic disc-changing apparatus of tile first embodiment; FIG. 11 is a vertical cross-section view taken along a line V—V in FIG. 10; FIG. 12 is a vertical cross-section view taken along a line VI—VI in FIG. 10; FIG. 13 is a conceptual drawing for the purpose of describing the operation of the cartridge clamping mechanism 100d of FIG. 10; FIG. 14 is a conceptual drawing for the purpose of describing the mechanism that drives the floating arm 137 Shown in FIG. 13; and FIG. 15 is a flowchart showing the operation of the cartridge clamping mechanism 100d from when the player 1 is in a fixed condition to when it reaches the floating condition. The significance of the symbols shown in the conceptual drawings in FIG. 13 and FIG. 14 is as given in FIG. 98.

As shown in FIG. 10 and FIG. 13, the cartridge clamping mechanism 100d comprises the floating arm 137 supported so as to rotatable around the rotating shaft 137a on the chassis 5; and a detecting switch 301, which is in butt contact with the floating arm 137 and detects its position. The cartridge clamping mechanism hood further comprises a slide plate 302, which is mounted in such a way as to engage a pin 302a in the cain hole 137b formed in the floating arm 137 and to be slidable horizontally to the left and right (directions EF); a lever member 303 linked to the slide plate 302 and axially supported so as to be rotatable around a rotating shaft 303a; and a slide plate 304 linked to the lever member 303 and mounted on chassis 5 in such a way as to be slidable horizontally to the left and right of the apparatus (directions EF).

The cartridge clamping mechanism 100d further comprises clamping plates 305 and 306 which are supported axially on the chassis 5 so as to rotatable around shafts 305a and 306a. The clamping plates 305 and 306 are provided respectively with engaging pins 305b and 306b, and the engaging pins 305b and 306b engage respectively with cam holes 305a and 306a formed in the slide plates 302 and 304.

The cartridge clamping mechanism 100d further comprises rubber vibration-damping pads 309a, 309b, 309c and 309d; pins 310a, 310b, 310c and 310d for supporting the player 1, which are inserted respectively into the rubber vibration-damping pads 309a, 309b, 309c and 309d; tension springs 311a, 311b, 311c and 311d which are respectively fixed at one end to the pins 310a, 310b, 310c and 310d and at the other end to the chassis 5; and projections 312 and 313 which are provided at appropriate places on the player 1.

The cartridge clamping mechanism 100d further comprises hooks 307 and 308 provided respectively on the slide plates 302 and 304; clamping levers 314 and 315 axially supported so as to rotate on the player 1; gear 316 provided on the clamping lever 314; gear 317 axially supported so as to rotate on the player 1 and engage with the gear 316: pin 318 implanted in gear 317; pin 319 implanted in the clamping lever 315; a spring 320 which is engaged at one end to the clamping lever 314 and at the other end to the player 1; and a spring 321 which is engaged at one end to the clamping lever 315 and at the other end to the player 1.

Following is a description of the operation of the cartridge clamping mechanism 100c with reference to FIG. 10 through FIG. 15.

To load the cartridge 91 to the player 1, the elevating mechanism 100a causes the cartridge 91 to descend onto the upper surface of the player 1, and at the same time the floating arm 137 is caused to rotate counterclockwise (direction ccwz) (Steps 1 and 2 in FIG. 15). At this point the slide plate 302 linked to the floating arm 137 slides horizontally to the left (direction xr or direction E) (Step 3 in FIG. 15), and the lever 303, being linked to the slide plate 302, rotates clockwise (direction cwz), causing the slide plate 304 to slide horizontally to the right (direction xf or direction F) (Steps 4 and 8 in FIG. 15).

At this point the hook 307 establishes butt contact with the pin 318 which is fixed to the gear 317, is pushing the pins 318 horizontally to the left (direction xr or direction E) and is causing the gear 217 to rotate counterclockwise (direction ccwy) (Step 6 in FIG. 15). The gear 317 engages with the gear 316 and causes the clamping lever 314 fixed t6 the gear 316 to rotate clockwise (direction cwy) (Step 7 in FIG. 15) until the cartridge 91 is clamped in the player 1 (Step 11 in FIG. 15). Simultaneously, the slide plate 304 moves horizontally to the right direction xf or direction F) (Step 8 in FIG. 15), the hook 308 establishes butt contact with the pin 319 (Step 9 in FIG. 15), pushes the pin 319 horizontally to the right (direction xf or direction F), and causes the clamping lever 314 to rotate counterclockwise (direction ccwy) (Step 10 in FIG. 15) until the cartridge 91. is clamped in the player 1 (Step 11 in FIG. 15).

Further, when the slide plate 302 slides horizontally to the left (direction xr, direction E) and the slide plate 304 slides horizontally to the right (direction xf, direction F), the clamping plates 305 and 306, which clamps the pins 310b and 310c of the player 1, become linked respectively with the slide plates 302 and 304 and rotate respectively counterclockwise (direction ccwy) and clockwise (direction cwy), separating from pins 310b and 310c (Steps 12 and 14 in FIG. 15). At the same time the projections 312 and 313 of the player 1 separate respectively from the slide plates 302 and 304 (Steps 13 and 15 in FIG. 15), and the player 1 is supported on the chassis 5 only by the rubber vibration-damping pads 309a, 300b, 309c and 309d and the tension springs 311a, 311b, 311c and 311d (Step 16 in FIG. 15).

Once one end of the floating arm 137 establishes butt contact with the detecting switch 301, the controller 159 receives a detection signal) from the detecting switch 301, on the basis of which the rotary motion of the floating arm 137 is arrested. Even if vibration is imparted to the chassis 5 at this time, the cartridge 91 remains clamped to the player 1 by levers 314 and 315, flexibly supported by the rubber vibration-damping pads 309a, 309b, 309c and 309d and the tension springs 311a, 311b, 311c and 311d.

To eject the cartridge 91 that has been loaded in the player 1, the motor 115 of the elevating mechanism 100b is driven, causing the floating arm 137 to rotate clockwise (direction cwz) and the slide plates 302 and 304 to slide respectively horizontally to the right (direction xf) and horizontally to the left (direction xr). At this point the projections 312 and 313 establish butt contact with the slide plate 302 and 304 arid the clamping plates 305 and 306 rotate respectively clockwise (direction cwy) and counterclockwise (direction ccwy) to the pins 310b and 310c. Then the player 1 has been fixed on the chassis 5 and the holding mechanism for transport 100c engages with the cartridge 91.

Following is a description of an insertion and ejection mechanism 100e of the automatic disc-changing apparatus of the first embodiment.

Figure 16:
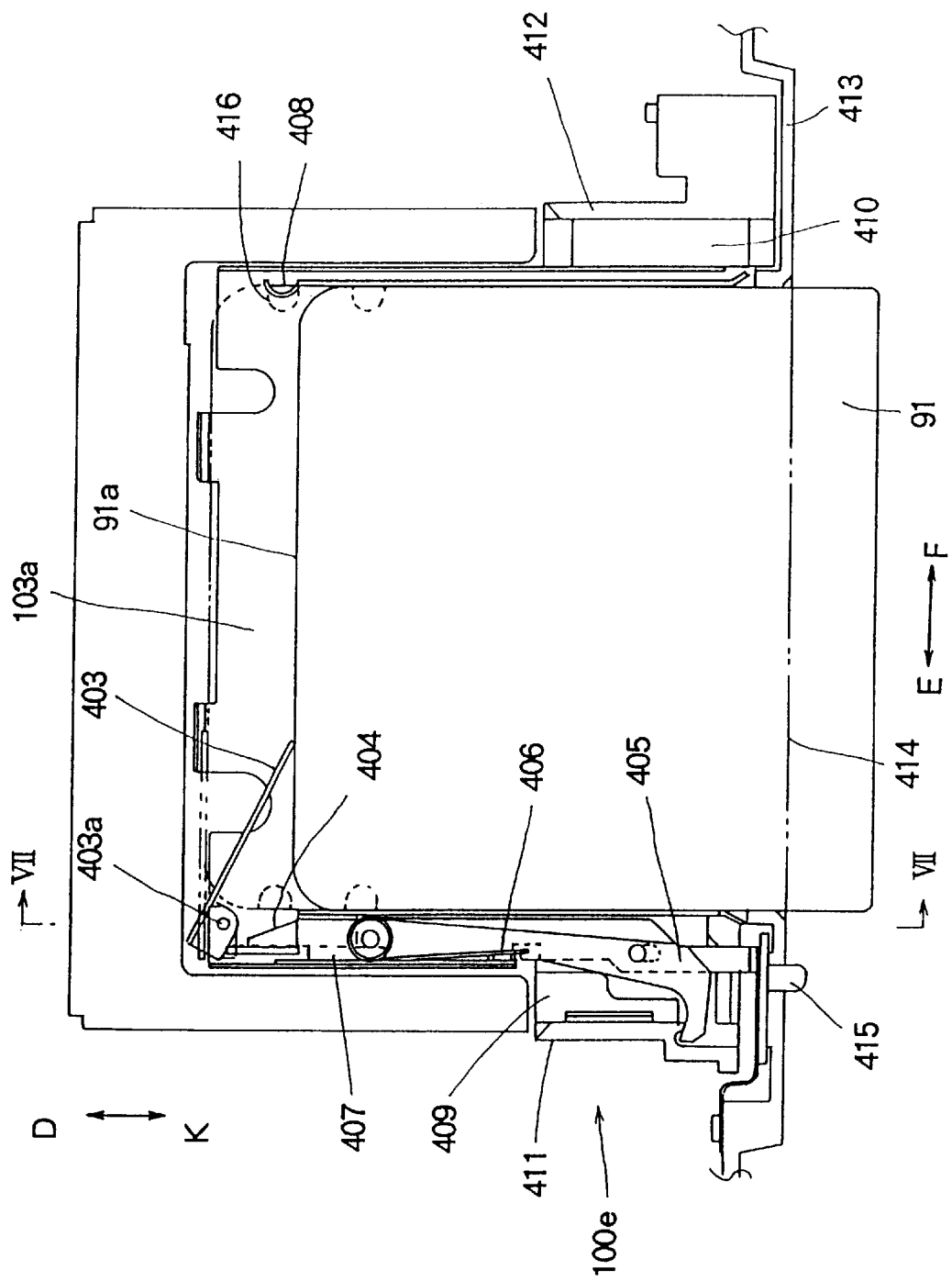
FIG. 16 is a plan view of the insertion and ejection mechanism for the cartridge.
Figure 17:
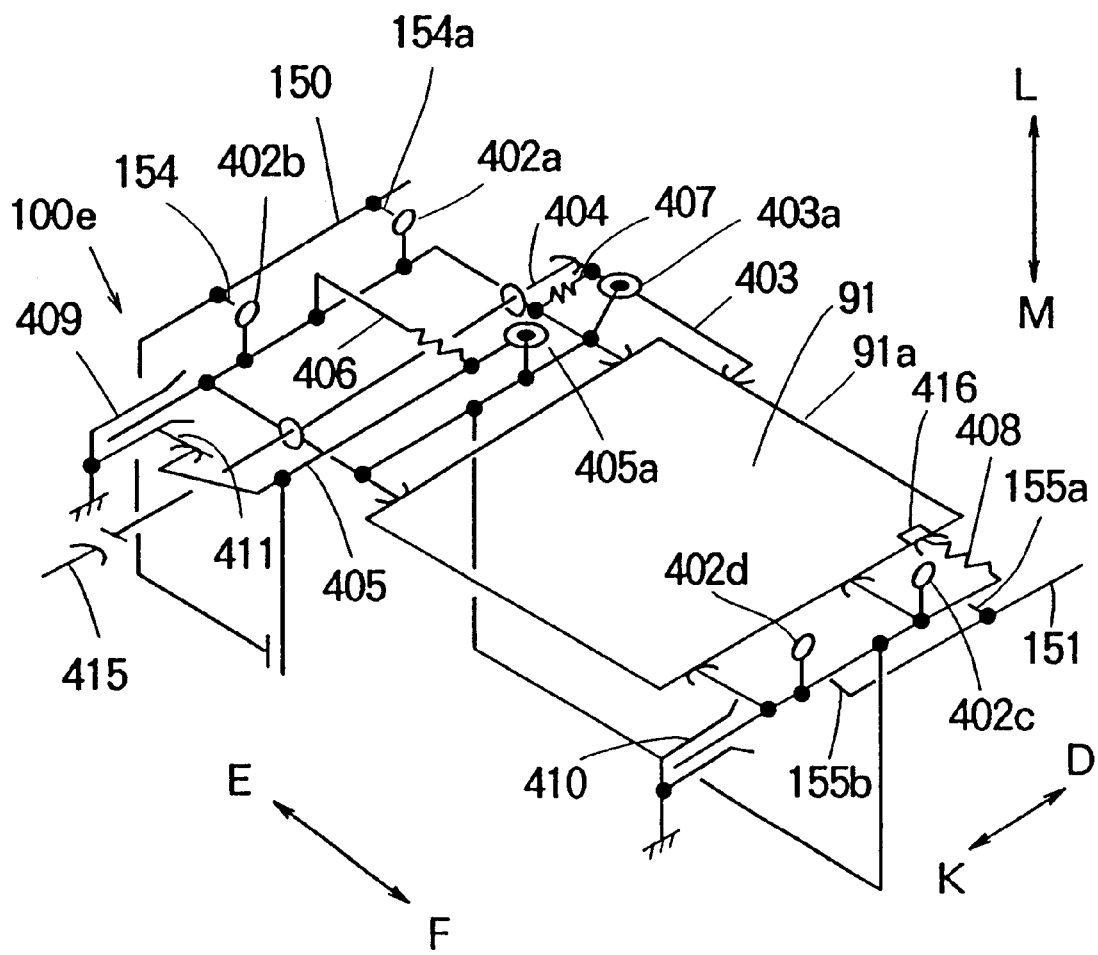
FIG. 17 is a conceptual diagram of the insertion and ejection mechanism of FIG. 16.
Figure 18:
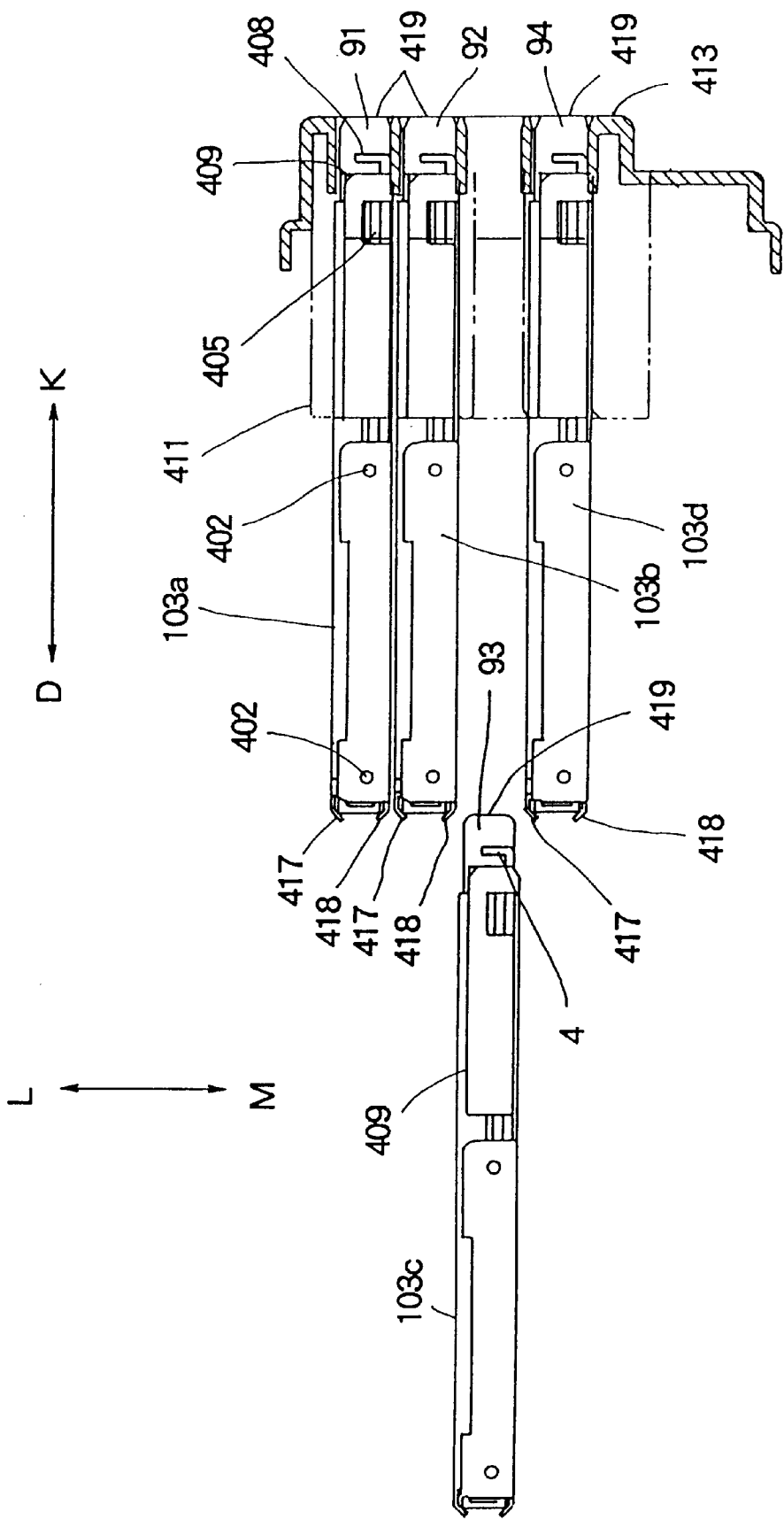
FIG. 18 is a simplified vertical cross-sectional view as seen from the direction cut by line VII—VII in FIG. 16.
Figure 19:
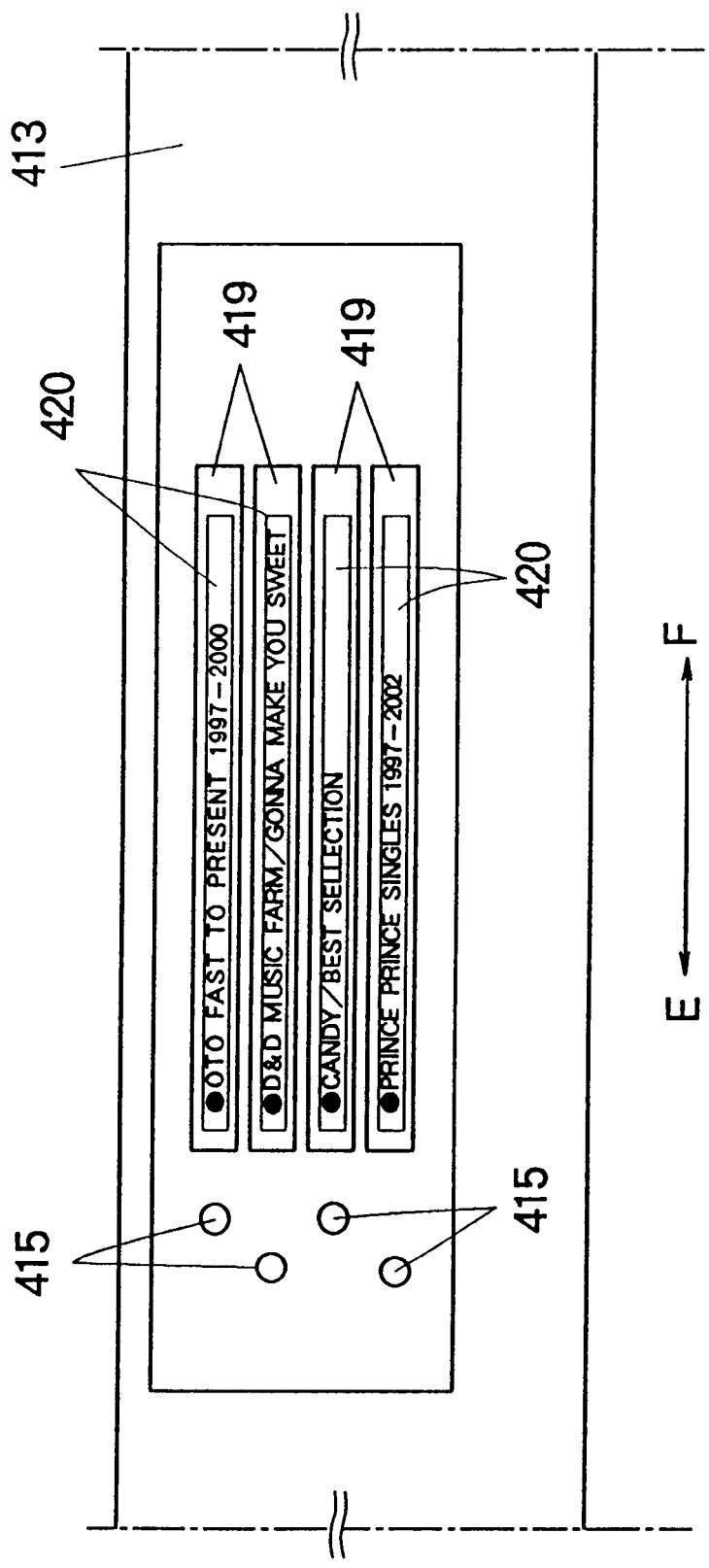
FIG. 19 is a front view of the apparatus with a cartridge inserted.

FIG. 16 is a plan view of the insertion and ejection mechanism 100e for the cartridge. FIG. 17 is a conceptual drawing of the insertion and ejection mechanism 103a of FIG. 16, wherein the significance of the symbols used is as given in FIG. 98. FIG. 18 is a schematic vertical cross-sectional diagram showing taken along the line VII—VII in FIG. 16. FIG. 19 is a front view of the apparatus with the cartridges inserted.

The cartridge insertion and ejection mechanism 100e of the first embodiment is provided for each of the cartridge holders in which a cartridge is loaded. The insertion and ejection mechanism 100e comprises a cartridge holder 103a (the description of the cartridge holders 103b, 103c and 103d are omitted because of the same structure); the engagement holes 402a, 402b, 402c and 402d, which are formed on the side surfaces of the cartridge holder 103a and engage with the chucking pins 154a, 154b, 154c and 154d provided on the chucking arms 150 and 151 of the holding mechanism for transport 100c; and an eject lever axially supported on the cartridge holder 103a so as to be rotatable around a shaft 403a. The insertion and ejection mechanism 100e further comprises a slide plate 404 mounted on the cartridge holder 103a so as to be slidable horizontally to the front and rear (directions DK) and establishes butt contact with the eject lever 403; an engagement arm 405 supported so as to be rotatable around a shaft 405a; a spring 406, of which one end is fixed to the engagement arm 405 and the other end is fixed to a portion of the cartridge holder 103a; a tension spring 407, of which one end is fixed to the eject lever 403 and the other end is fixed to a portion of the cartridge holder 103a; and a compressive spring 408 that engages with a dent 416 in the cartridge 91. The insertion and ejection mechanism 100e further comprises block members 409 and 410 mounted on the left and right of each of the the cartridge holders, and blockguides 409 and 410 mounted at appropriate places on the chassis 5.

Further, as shown in FIG. 18, tapered portions 417 and 418 are formed above and below the rear of each of the cartridge holder 103a, 103b, 103c and 103d, and the cartridges 91, 92, 93 and 94 have on their front surfaces label surfaces 419 on which titles 420 are inscribed.

The front surface of the apparatus is further provided with a control panel 413 mounted on the chassis 5; a window 414 (cartridge insertion port) formed in control panel 413; and knobs 415 mounted on the control panel 413.

Following is a description of the operation of the insertion and ejection mechanism 100e. To remove from the apparatus a cartridge 91 that has been transported to the standby position 200a by the transport mechanism 100a, the user presses a knob 415 with a finger. The slide plate 404 slides horizontally backward (direction yf, direction D) against the compressive force of the compressive spring 408, and the eject lever 403, which is in butt contact with the slide plate 404, rotates clockwise (direction cwz) around the shaft 403. This brings the ejector lever 403 into butt contact with the rear edge 91a of the cartridge 91 and the cartridge 91 is pushed out horizontally forward (direction yr, direction K) against the compressive force of compressive spring 408. When finger pressure is applied to the knob 415, the compressive force also acts horizontally backward (direction yf, direction D) on the cartridge holder 103a but the engagement arm 405 of the cartridge holder 103a is engaged with the block guide 411, so that the cartridge holder 103a cannot move in horizontally backward (direction yf, direction D) during the ejection of the cartridge 91.

After the cartridge 91 is withdrawn from the cartridge holder 103a and the user releases the knob 415, the eject lever 403 is rotated counterclockwise (direction ccwz) by the compressive force of the tension spring 407 until it reaches its original position.

Following is an description of a case in which a different cartridge 91 is inserted in cartridge holder 103a. The user inserts the cartridge 91 horizontally backward (direction D) through the window 413. The compressive spring 408 then engages with the dent 416 of the cartridge 91, the holding cartridge 91 in the cartridge holder 103a. At this time, as can be seen in fig. 19, the label surface 419 of cartridge 91 is positioned in virtually the game plane as the surface of the control panel 413, allowing the user to check what is written on cartridge 91 from the front of control panel 413.

Further, since the tapered portions 417 and 418 are provided above and below the rear edge of the cartridge holder 103a, 103b, 103c and 103d, in transporting the cartridge holder (here 103c) to standby position 200a by means of the transporter mechanism, even if, due to the effects of apparatus assembly error or vibration during the transporting of the apparatus, there were to occur a height error producing interference from the adjacent cartridge holder 103b or 103d, which are loaded in standby position 200a, the label surface 419 of the cartridge 91 being transported will be led to the correct position along the tapered portions 418 and 417 of adjacent cartridge holders 103b and 103d.

In the automatic disc-changing apparatus of the first embodiment, as above described, a plurality of the cartridge holders for holding the cartridges are provided on the holding mechanism for standby, so that any one of this plurality of cartridge holders can, by means of the holding mechanism for transport 100c, the transfer mechanism 100b which moves this holding mechanism for the transport 100c in the horizontal direction, and the elevating mechanism 100b, which causes the holding mechanism for transport 100c to ascend and descend and to transfer it either from the standby position 200a to the recording and reproducing position 200b, or from recording and reproducing position 200b to standby position 200a.

Further the holding mechanism for standby is provided with a plurality of cartridge insertion ports corresponding, respectively, to a plurality of cartridge holders, so that cartridges can be loaded in the respective cartridge holders by inserting the cartridges in the cartridge insertion ports, providing an operating procedure that is simpler than the conventional one in which the magazine rack must be withdrawn before discs are replaced.

Further, the loading gear 140, which is supported so that it rotates freely in the elevator 139 which moves vertically with respect to the chassis 5, is caused to engage with the cylindrical gear 114, to which driving power is transmitted from a drive motor 115 mounted on chassis 5, with the result that loading gear 140, which is supported on elevator 139 and changes height in the vertical direction, because of its engagement with cylindrical gear 114, can transmit driving power continuously to drive motor 115, no matter what the height of the elevator 139 may be, achieving a simple mechanism for transmitting motive power to the moving parts, and resulting in an apparatus that has fewer components and is less costly.

Further, the engaging pin 157 implanted in the loading gear 140, which is supported so as to rotate freely on the elevator 139 is caused to engage With Y-shaped cam hole 146, which is formed in transporter 145, which is so supported as to slide on elevator 139, with the result that the structure of transporter 145 is simplified, due to the rotary motion of the loading gear 140, it becomes slidable horizontally to the front and rear (direction DK), resulting in an apparatus that has fewer components and is less costly.

Further, the engaging pin 157, which is implanted in the loading gear 140, is inserted through the Y-shaped cam hole 146 formed in the transporter 145 and is brought into butt contact with the chucking arm 151 of the holding mechanism for transport 100c, which is supported so as to slide freely on the transporter 145, with the result that the horizontal movement forward and backward of the transporter 145 and the cartridge holder hold and release actions of the holding mechanism for transport 100c can be carried out with a simple structure, resulting in an apparatus that has fewer components and is less costly.

Further, the cam gear 119 having cam hole 121 is enacted with the drive motor via the reduction gearing and the floating arm 137 is engaged to the cam hole 121, so that the loading lever and floating arm have their motion controlled simultaneously by the rotation of the cam gear, thereby resulting in an apparatus that has fewer components.

Further, the rack 123 is engaged to the cylindrical gear 114, which transmits power to the transporter 145, and the detecting switches 124a and 124b are provided to detect the pattern 125 on the rack 123 in accordance with the sliding motion of the rack 123, making it possible to detect the angle of rotation of the loading gear 140, which is supported on the elevator, a sliding component, with the result that there is no need to provide electrical wiring on the moving portion giving an apparatus in which open circuits occur less readily and reliability is increased.

Further, the movement of the cartridge in horizontal directions and the cartridge hold and release actions are driven by a single motor 110, and the movement of the cartridge in the vertical direction and the clamping of the cartridge to the player are driven by a single motor 115, resulting in an apparatus that is lest costly and smaller.

Further the mechanism for the horizontal transport of the cartridge moves vertically, so the requisite height of the apparatus can be made equal to the sum of the height of the portion housing the cartridges and the height of the player, resulting in a reduction in the cubic volume of the apparatus.

Further, the cartridges can be loaded so that the label. surface of the loaded cartridge is at approximately the same height as the surface of the control panel, so that the titles inscribed on the label surface can be seen directly from the control panel, making the apparatus more convenient to use.

Further, the tapered portions are provided above and below the rear edge of the cartridge holder, so that even if the cartridge that has been transported from the player to the standby position may have, in the course of its horizontal motion, been displaced upward or downward from its intended height, it will be guided by butt contact established with the tapered portion of the other cartridge holders being held in the standby position, and will be held accurately in the standby position, thereby assuring the accurate operation of the apparatus.

Further, the eject lever allowing cartridges in any of a plurality of cartridge holders to be ejected, so that any cartridge loaded in standby position 200a can be ejected and replaced even while another disc is being played, making the apparatus more convenient to use.

Second Embodiment

Figure 20:
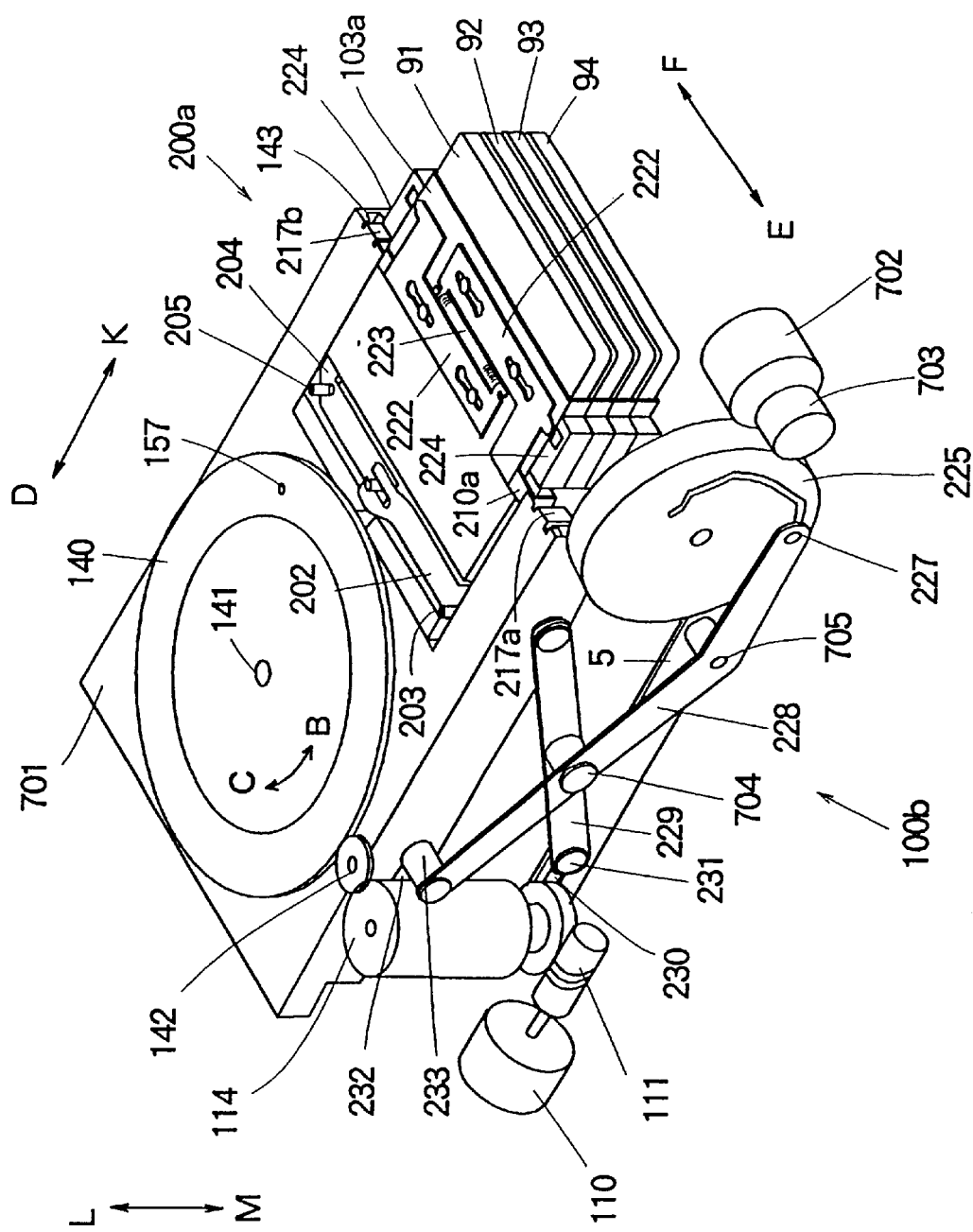
FIG. 20 is a schematic perspective view showing the structure of an automatic disc-charnginrg apparatus of the second embodiment of the present invention.
Figure 21:
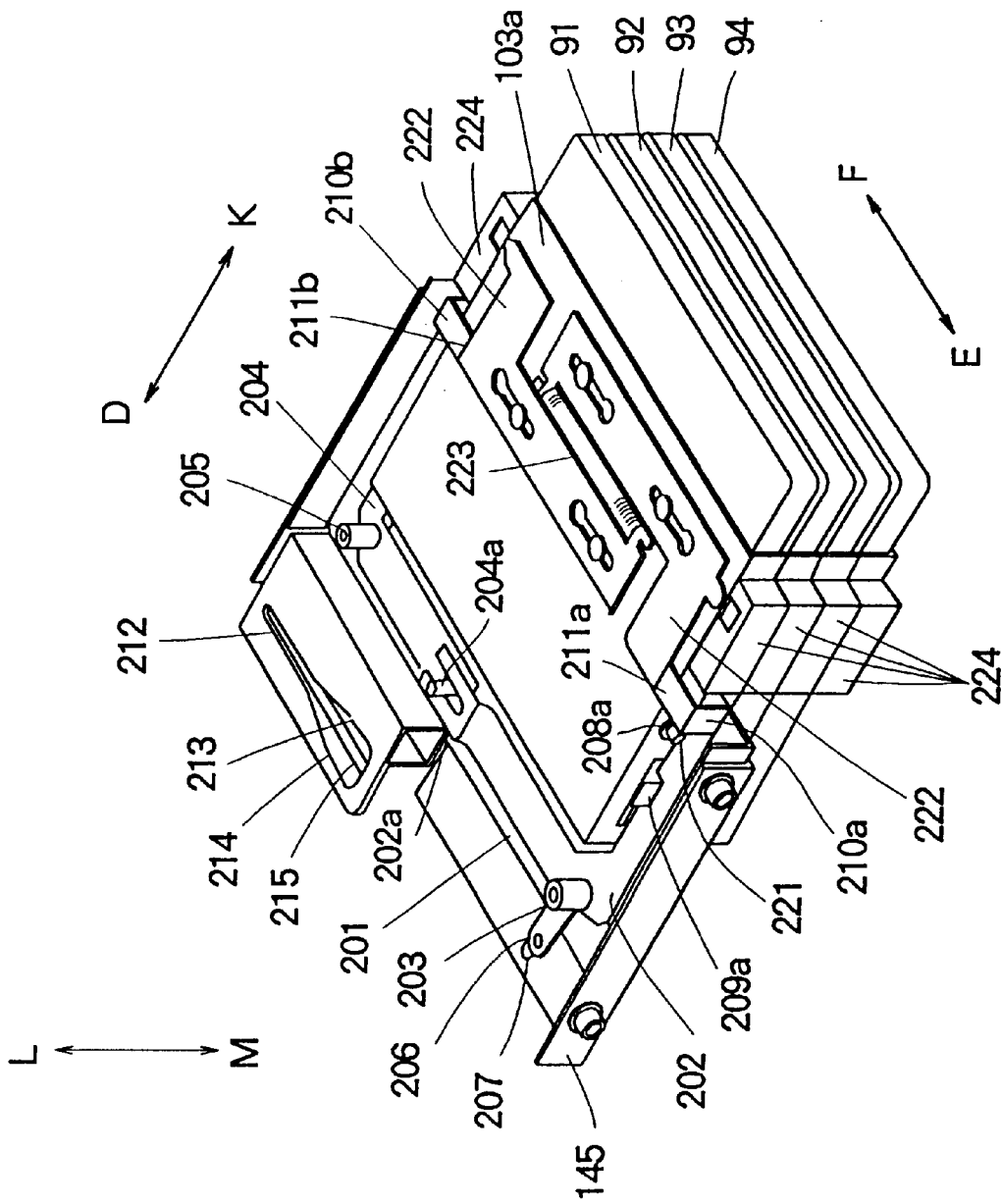
FIG. 21 is a schematic perspective view showing the mechanism that holds the cartridge holder of the apparatus shown in FIG. 20.
Figure 22:
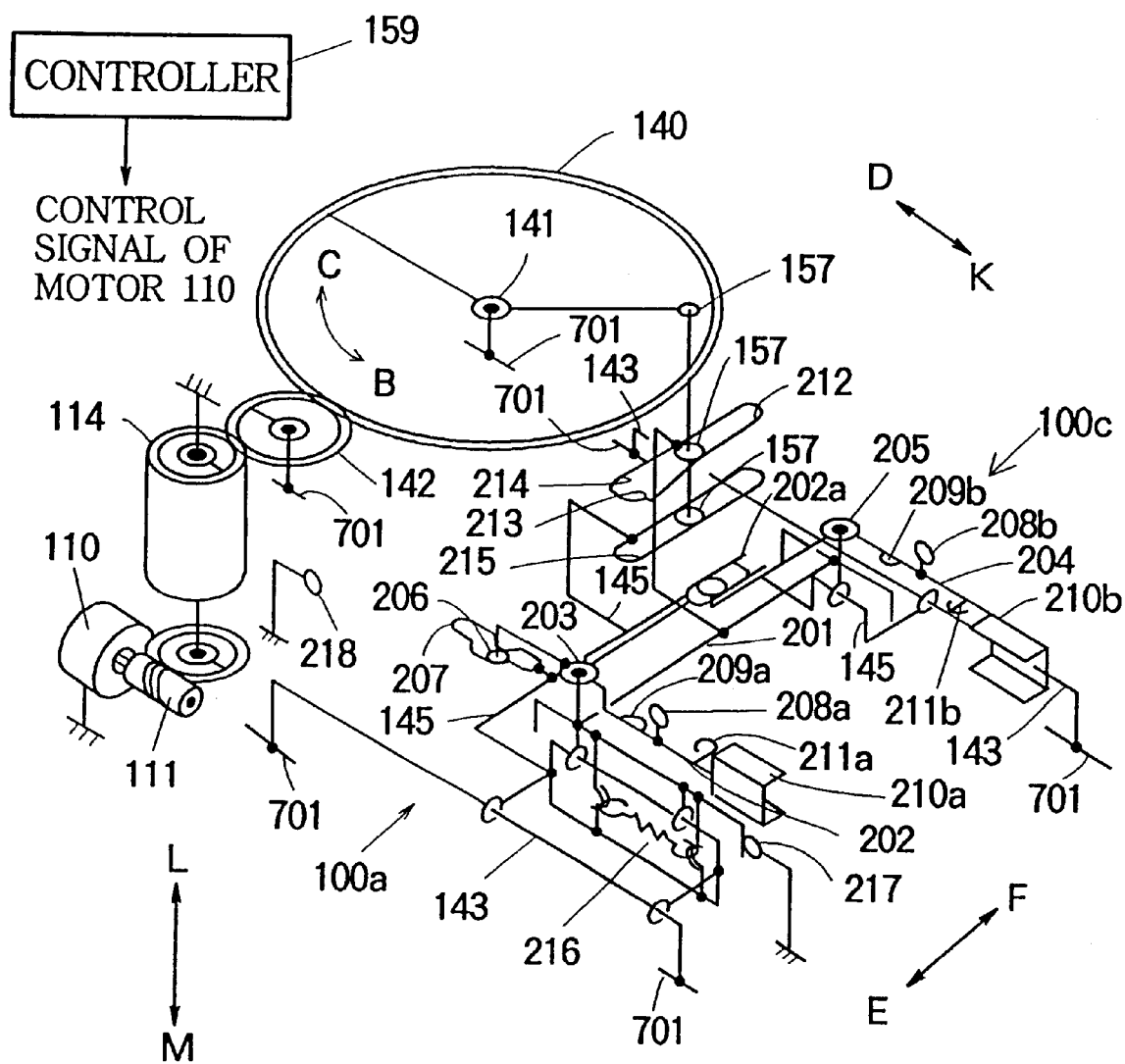
FIG. 22 is a conceptual diagram for the purpose of describing the structure and operation of the apparatus shown in FIG. 20.

FIG. 20 is a schematic perspective view showing the structure of the automatic disc-changing apparatus of a second embodiment of the present invention; FIG. 21 is a schematic perspective view showing the mechanism that holds the cartridge holder of the apparatus of FIG. 20; FIG. 22 is a conceptual diagram for the purpose of describing the structure and operation of the apparatus of FIG. 20; and FIG. 23 through FIG. 26 are conceptual diagrams for the purpose of describing the operation of tile apparatus of FIG. 20.

Figure 27:
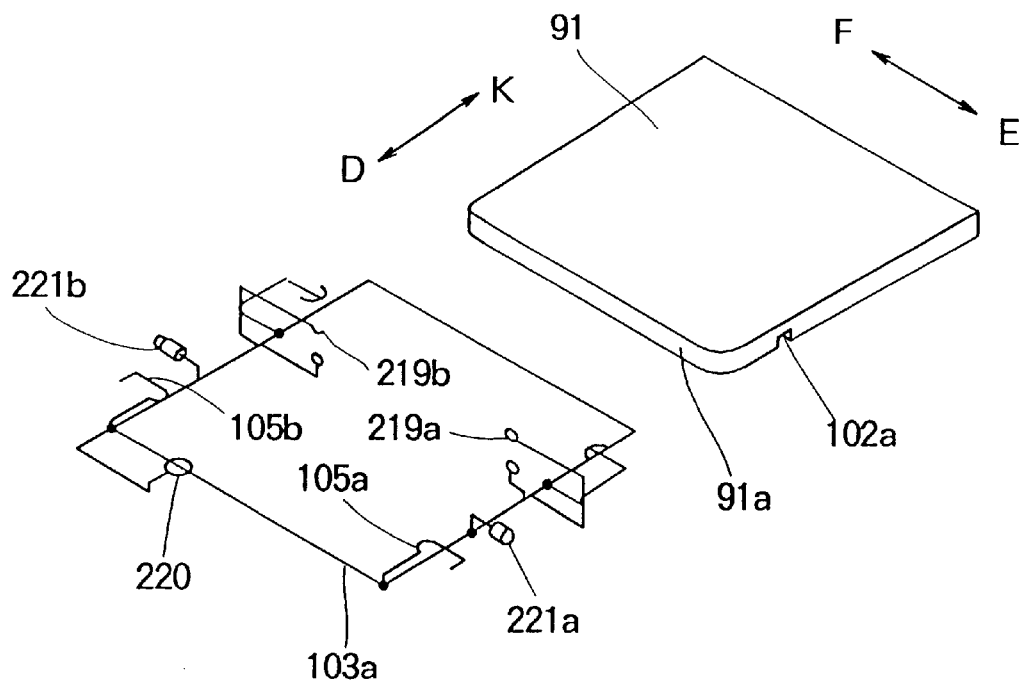
FIG. 27 is a conceptual diagram showing the structure and operation of the cartridge holder.
Figure 28:
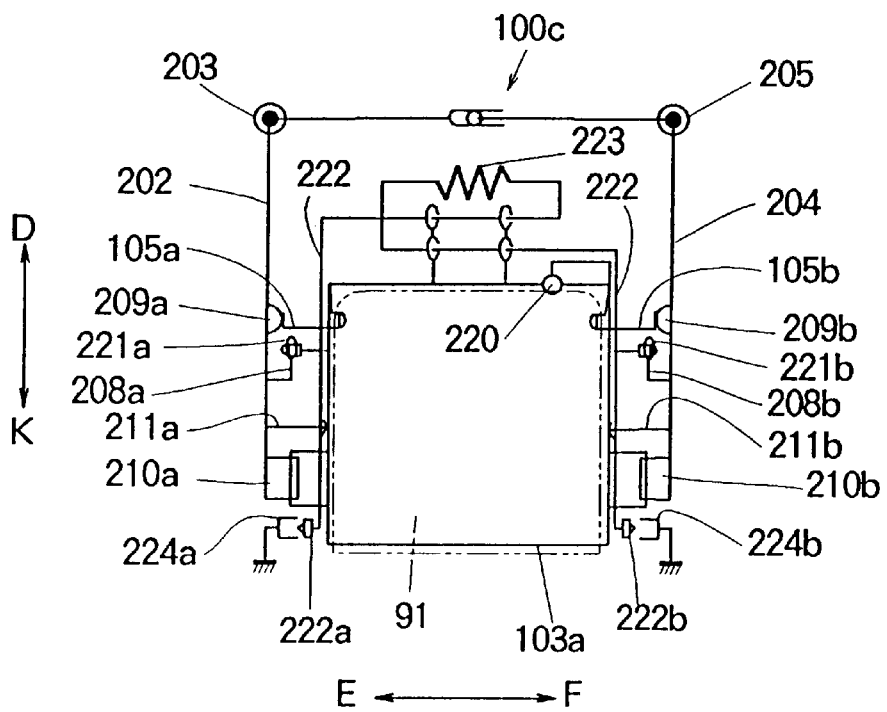
FIGS. 28 and 29 are conceptual diagrams for the purpose of describing the structure and operation of the holding mechanism for transport used to transport and hold the cartridge holder.
Figure 29:
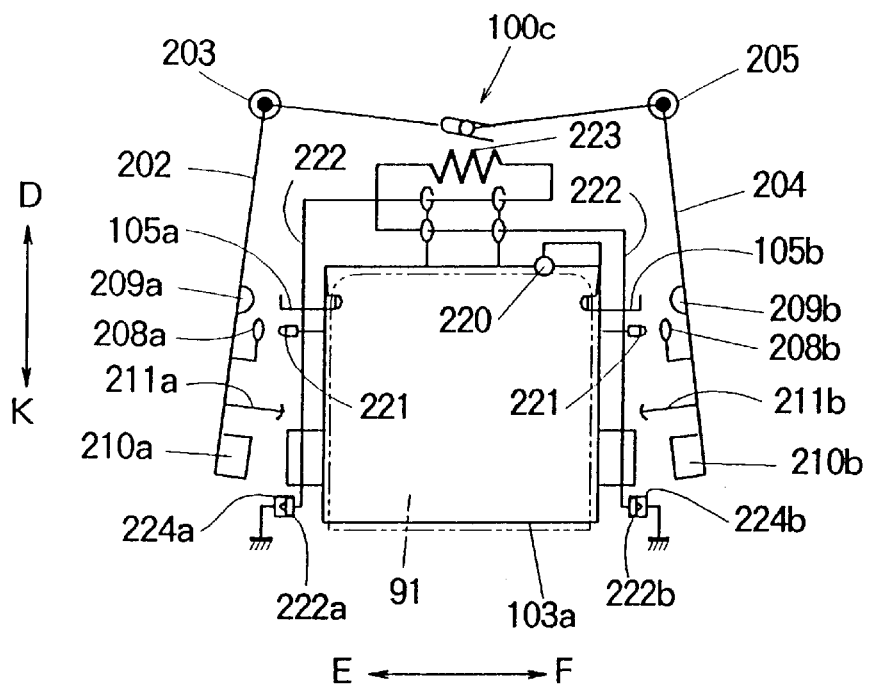
Figure 30:
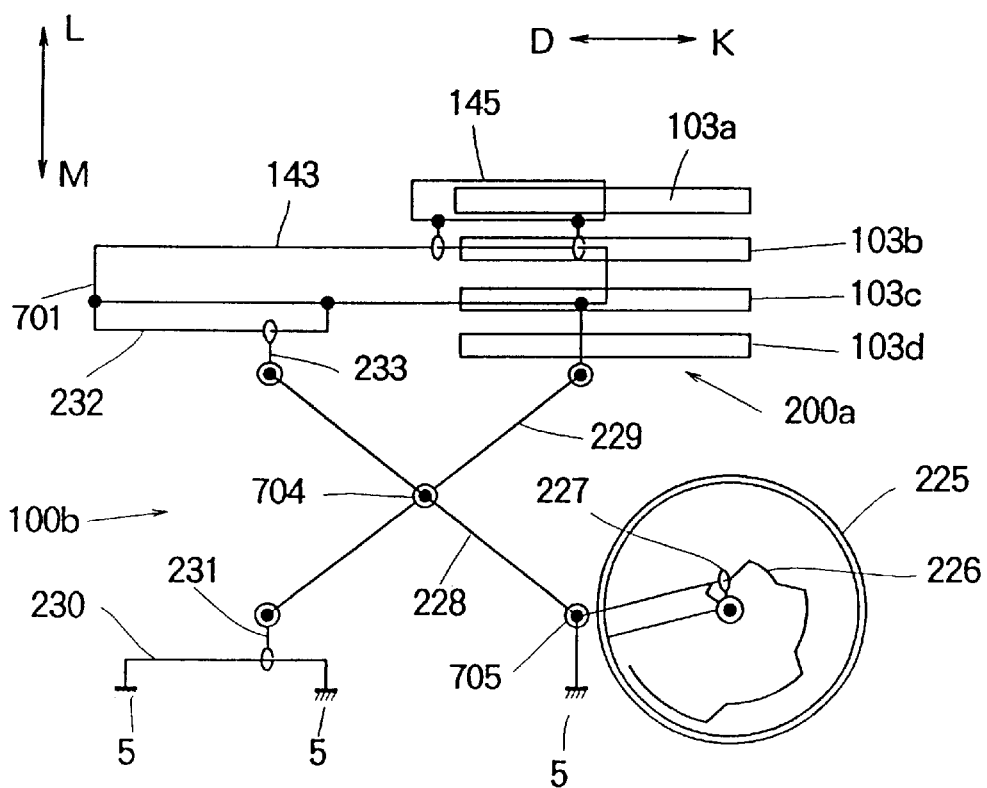
FIGS. 30 to 33 are conceptual diagrams for the purpose of describing the operation of an elevating mechanism of this second embodiment.

FIG. 27 is a conceptual diagram for the purpose of describing the structure and operation of the cartridge holder; FIG. 28 and FIG. 29 are conceptual diagrams for the purpose of describing the structure and operation of a holding mechanism for transport 100c used to the transport and hold the cartridge holder.

Figure 32:
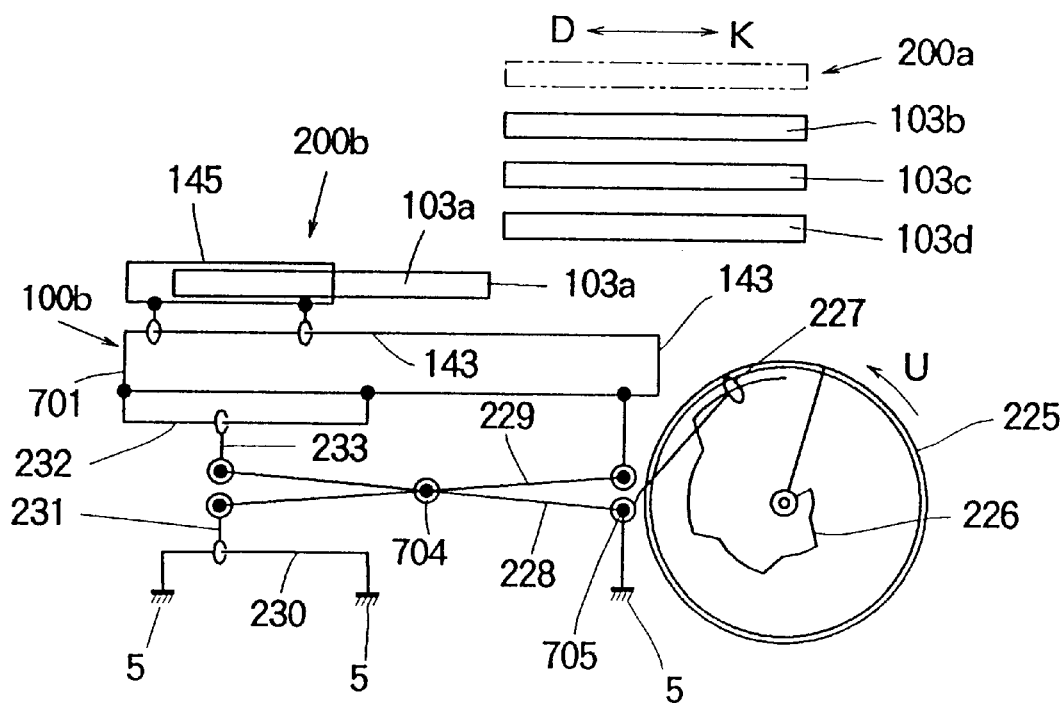
Figure 33:
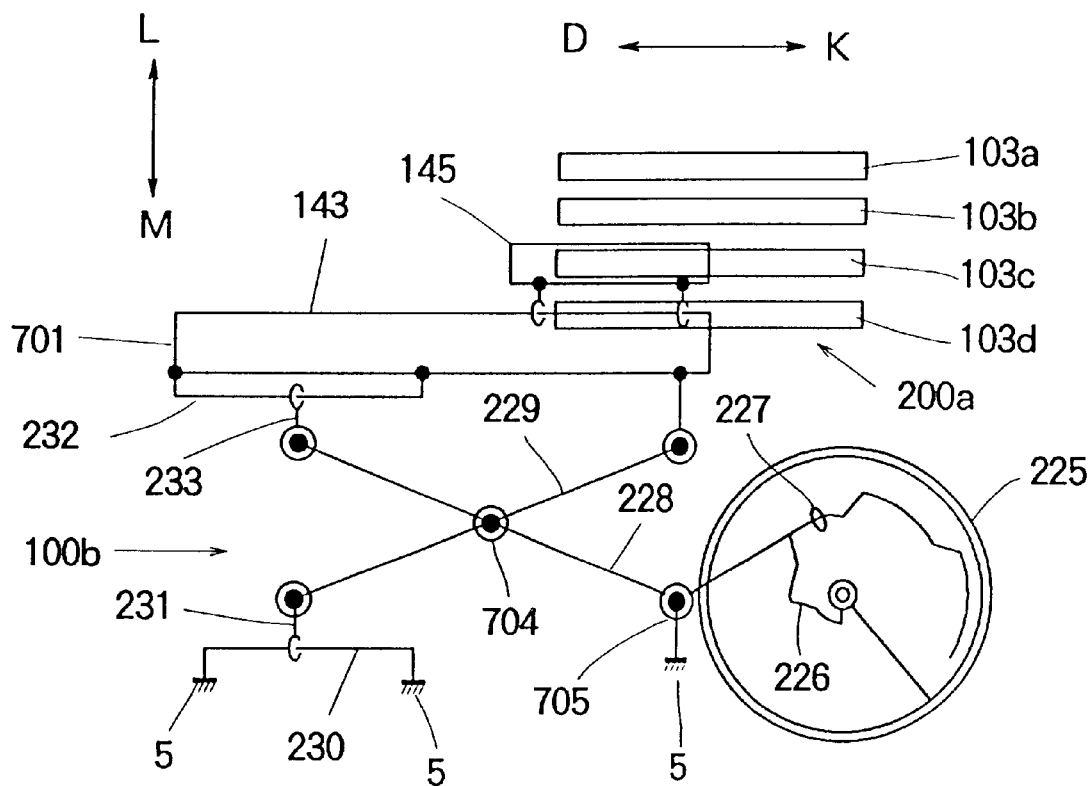
Figure 34:
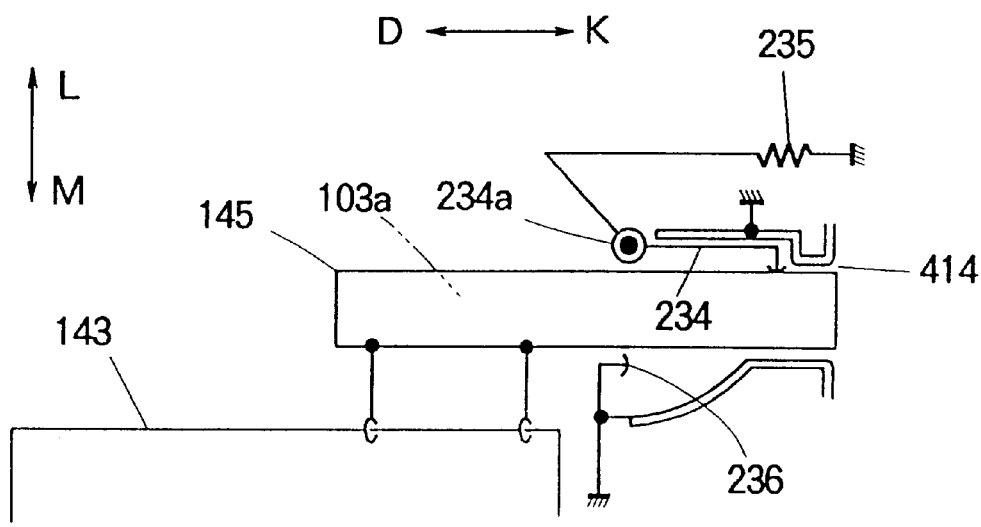
FIGS. 34 and 35 are conceptual diagrams for the purpose of describing the operation of an example of a mechanism to prevent double insertion of cartridges.
Figure 35:
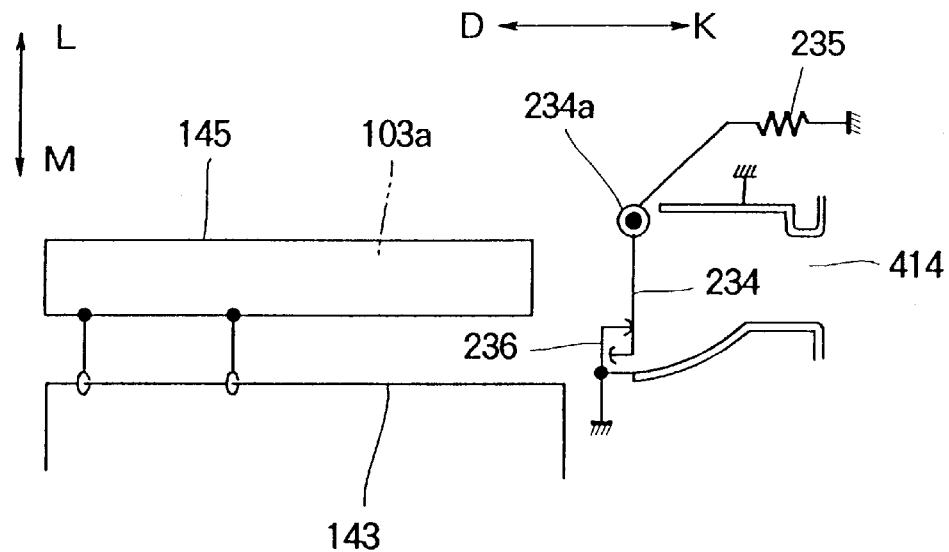
Figure 36:
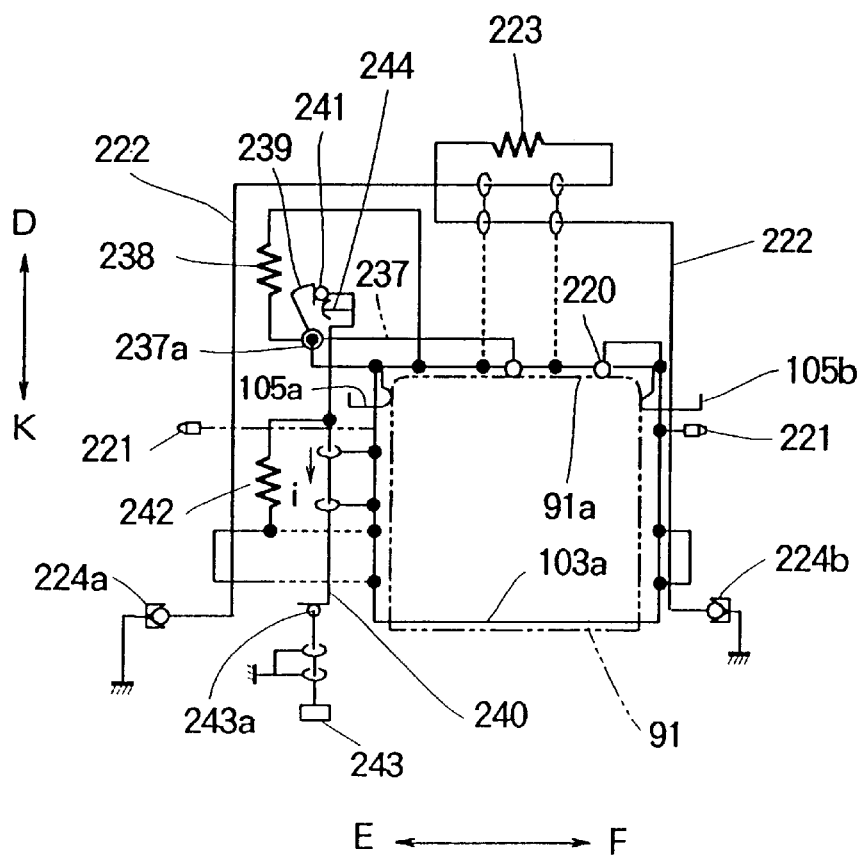
FIGS. 36 and 37 are conceptual diagrams for the purpose of describing the structure and operation of a cartridge ejection mechanism.
Figure 37:
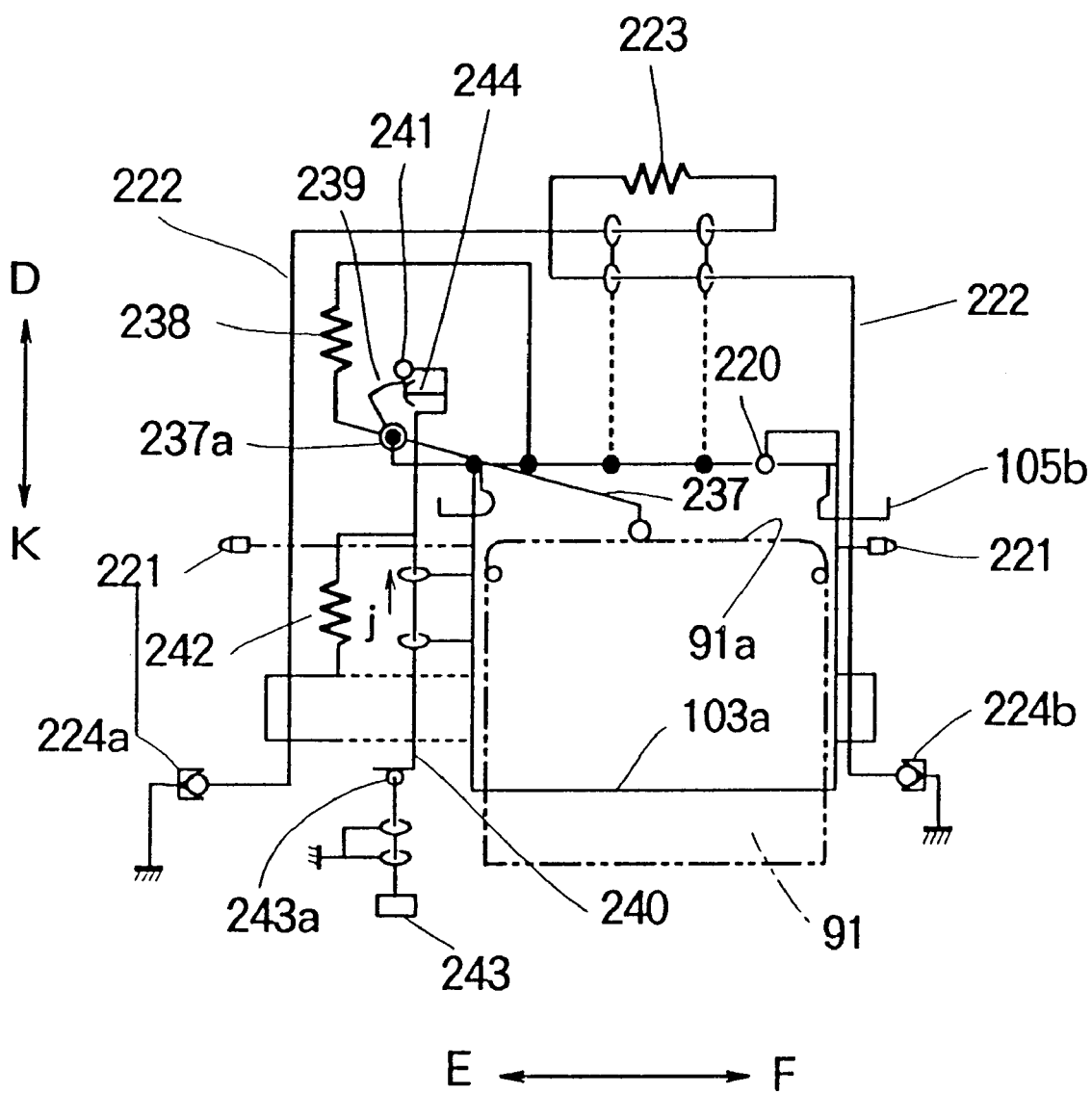

Further, FIG. 30 through FIG. 33 are conceptual diagrams for the purpose of describing the operation of the elevating mechanism 100b in accordance with the third embodiment; FIG. 34 and FIG. 35 are conceptual diagrams for the purpose of describing the structure and operation of an example of a duplicate insertion prevention mechanism; and FIG. 36 and FIG. 37 are conceptual diagrams for the purpose of describing the structure and operation of a cartridge ejection mechanism.

The significance of the symbols used in the conceptual diagrams in FIG. 22 through FIG. 37 is as given in FIG. 98. The mechanisms in the second embodiment that are identical or equivalent to those in the first embodiment are assigned the same symbols.

As shown in FIG. 20 through FIG. 33, the automatic disc-changing apparatus of the second embodiment comprises cartridge holders 103a, 103b, 103c and 103d (103b to 103d are shown only in FIG. 30 through FIG. 33) which hold respectively cartridges 91, 92, 93, and 94; a holding mechanism for standby which holds cartridge holders 103a, 103b, 103c and 103d in a standby position 200a (identical with that shown, for example, in the first embodiment); a holding mechanism for transport lock which hold selectively any one of the cartridge holders 103a, 103b, 103c and 103d for the purpose of transporting it; a transfer mechanism 100a which moves the holding mechanism for transport 100c horizontally to the front and rear of the apparatus (directions DK): and an elevating mechanism 100b which causes the cartridge holder 100a, 100b, 100c and 103d to move vertically (directions LM).

As shown in FIG. 27. The cartridge holder 103a comprises butt contacting portions 219a and 219b which establish butt contact with the upper surface of the cartridge 91; a butt contacting portion 220 which establishes butt contact with the rear edge of the cartridge 91; engaging pins 221a and 221b which engage with engagement portions 208a and 208b of chucking arms 202 and 204 to be described below; and engagement springs 105a and 105b which engage engagement holes on either side of the cartridge 91 (of which only the hole 102a is shown in FIG. 27).

Further, as shown in FIG. 28 and FIG. 29, the cartridge holder 103a is provided with a lock arm 222 supported so as to be capable of sliding horizontally to the left and right (directions EF); and a spring 223 that exerts a force outwardly unto the lock arm 222. As shown in FIG. 29, when the chucking arms 202 and 204 cause the cartridge holder 103a to release, the tips 222a and 222b of the lock arm 22 engage respectively with the lock portions 224a and 224b provided on the chassis 5. The other cartridge holders 103b, 103c and 103d respectively have a similar structure.

Further, as shown in in FIG. 36 and FIG. 37, the cartridge holder 103a, which is provided with an ejection mechanism, comprises an ejection lever 237 being in butt contact with rear edge 91a of the cartridge 91; a spring 238 which applies a force causing the ejection lever 237 to rotate clockwise around a shaft 237 provided on the cartridge holder 103a: and a butt contact portion 239 which rotates with the ejection lever 237 and regulates the rotary motion of the ejection lever 237. This ejection mechanism further comprises a slider member 240 which is pressed by a press switch 243 provided on the chassis 5 so as to slide freely horizontally to the front and rear (directions DK); an spring 242 that draws the slider member 240 horizontally to the front (direction K); a butt contact portion 241 which establishes butt contact with the butt contact portion 239 of the ejection lever 237 and brings the ejection lever 237 to the initial position shown in FIG. 36; and a butt contact portion 244 which establishes butt contact with the butt contact portion 239 of the ejection lever 237 and brings the ejection lever 237 to the ejected position shown in FIG. 37. The other cartridge holders 103b, 103c and load have an identical structure.

Further, as shown in FIG. 20, and in FIG. 30 through FIG. 33, the elevating mechanism 100b of the second embodiment comprises an elevator (elevator platform) 701 capable of moving vertically (directions LM) along an elevating guide member (not shown) which is fixed to the chassis 5; a motor 702 for making the elevator 701 ascend or descend; and a movement-transmitting mechanism that uses the rotational driving power of the motor 702 to cause the elevator 701 to ascend or descend.

This movement-transmitting mechanism comprises a gear 703 fitted to a rotating shaft of the motor 702; a gear 22S which meshes with the gear 703; and elevating arms 228 and 229 which form a pantograph mechanism. The elevating arm 228 and 229 are linked to each other by means of the rotating shaft 704. The elevating arm 228 freely rotates around a shaft 705 which is fixed to the chassis 5. The elevating arm 228 is provided at one end with an engaging pin 227 engaging with a cam groove 226 formed in the gear 225, and at the other end with a rotatable engaging pin 223 which engages slidably in a cam hole 232 which is elongated horizontally to the front and rear (directions DK) in the elevator 701. On the other hand, the elevating arm 229 is provided at one end with a rotatable engaging pin 221 which engages slidably in cam hole 230 which is elongated horizontally to the front and rear (directions DK) in the chassis 5, and the other end of the elevating arm 229 is linked rotatably with the elevator 701. Thus the rotational driving power of the motor 702 is converted into the vertical motion of the pantograph mechanism through an engagement groove 226 of a rotating gear 225 and an engaging pin 227 of the elevating arm 228, thereby causing the elevator 701 to ascend and descend.

Further, as shown in FIG. 20 through Fig. 26, the transfer mechanism 100a of the second embodiment comprises a horizontal guide 143 formed on the elevator 701; a transporter 145 supported so as. to be capable of sliding horizontally to the front and rear (direction DK) along the horizontal guide 143; a loading gear 140 provided with an engaging pin 157 which engages with a cam hole 215 formed in the transporter 145 and elongated horizontally to the left and right (directions EF); and a gear 142, a cylindrical gear 114, a gear 112, a worm 11 and a motor 110, which impart rotary motion to the loading gear 140. Although the apparatus of the second embodiment is different from that of the first embodiment in that the cam hole 215 does not have a Y-shaped configuration, the transfer mechanism 100a of the second embodiment is identical with the mechanism of the first embodiment in terms of the motion imparted.

Further, as shown in FIG. 20 through FIG. 26, the holding mechanism for transport 100c of the second embodiment comprises a chucking base 201 supported so as to be capable of sliding horizontally on the transporter 145 to the front and rear (directions DK); a chucking arm 202 axially supported so as to rotate freely around a pivot 203 provided on the chucking base 201; and a chucking arm 204 axially supported so as to rotate freely around a pivot 205 provided on the chucking base 201. On one end of the chucking arm 202 is formed a earn groove 202a the which the engaging pin 204a of the chucking arm 204 is engaged.

Further, the holding mechanism for transport 100c comprises an engaging pin 206 implanted in the chucking arm 202 and engaging with a cam hole 207 provided on the transporter 145: an engagement portions 208a and 208b provided respectively on the chucking arms 202 and 204; press portions 209a and 209b formed respectively on the chucking arms 202 and 204; holding portions 210a and 210b formed respectively on the chucking arms 202 and 204; and butt contact portions 211a and 211b formed respectively on chucking arms 202 and 204. As shown in FIG. 22, the cam hole 207 extends; horizontally to the front and rear (directions DK), and consists of two linear portions aligned on the same line and a curvilinear portion joined to the two linear portions.

The chucking base 201 is further provided with a cam hole 212 which engages with the engaging pin 157 implanted in the loading gear 140 and is arranged so as to overlap the cam hole 215 of the transporter 145. The cam hole 212 comprises a linear portion 245; an arcuate portion 213 which, when the chucking base 201 is in the standby position 200a, forms a part of a concentric circle with center 141 of the loading gear 140 (having as its radius the distance between the center 141 and the engaging pin 157); and an arcuate portion 214 which, when the chucking base 201 is in the recording and reproducing position 200b, forms a part of a concentric circle with the center 141 of the loading gear 140 (having as its radius the distance between center 141 and the engaging pin 157). In FIG. 23 through FIG. 26, the curvature of the arcuate portions 213 and 214 of the cam hole 212 is drawn in an exaggerated manner The holding mechanism for transport 100c further comprises a spring 216 engaging with the transporter 145 and the chucking arm 201; a butt contact portion 217 provided on the chassis 5; and a butt contact portion 218 provided on the chassis 5.

Further, the automatic disc-changing apparatus of the second embodiment is provided with a duplicate insertion prevention mechanism for cartridges, as shown in FIG. 34 and FIG. 35. The duplicate insertion prevention mechanism for cartridges comprises a duplicate insertion prevention plate 234 rotatable around a horizontal shaft 234a at the top of each of the cartridge insertion ports 414. When, as shown in FIG. 34, the cartridge holder 103a is in the standby position, the duplicate insertion prevention plate 234 is in a horizontal attitude with its end in butt contact with the upper portion of the cartridge holder 103a, and when as shown in FIG. 35, the cartridge holder 103a has been caused by the transfer mechanism 100c to separate from the standby position, spring 235 or gravitational action causes the duplicate insertion prevention plate 234 to assume a vertical attitude. The duplicate insertion prevention mechanism further comprises a regulating member 236, which is fixed deeper within the apparatus than the duplicate insertion prevention plate 234 and by establishing butt contact with the duplicate insertion prevention plate 234, regulates the range of its rotation.

Following is a description of the operation of the second embodiment on the basis of FIG. 22 through FIG. 26 and FIG. 30 through FIG. 33.

Figure 23:
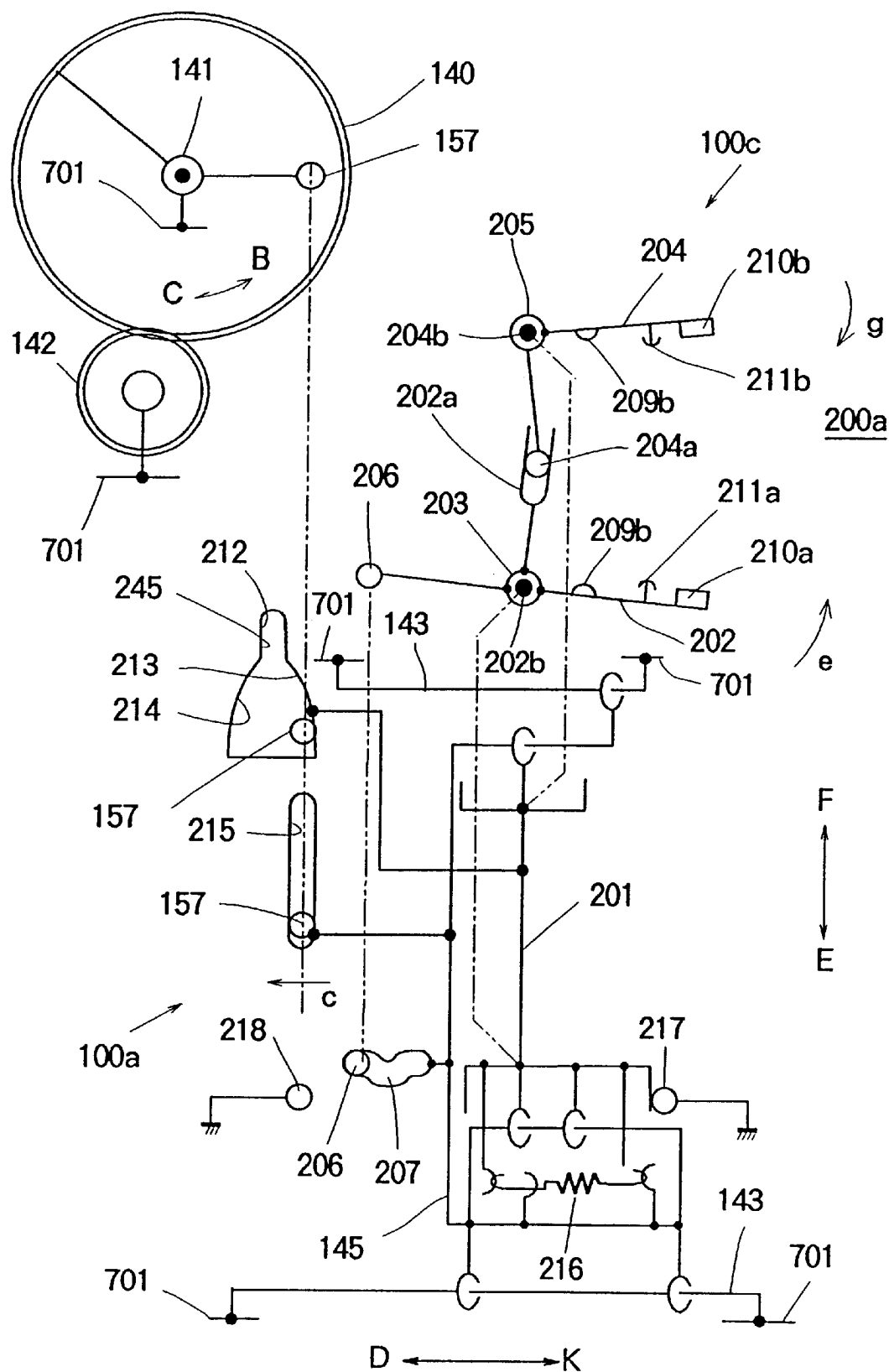
FIGS. 23 to 26 are conceptual diagrams for the purpose of describing the operation of the apparatus shown in FIG. 20.

First of all, the cartridges are loaded into the cartridge holder in standby position 200a. At this point the holding mechanism for transport 100c is in the standby position as shown in FIG. 23, and the chucking arms 202 and 204 are open. The height of the elevator 701 at this point is as shown pin FIG. 30.

Figure 24:
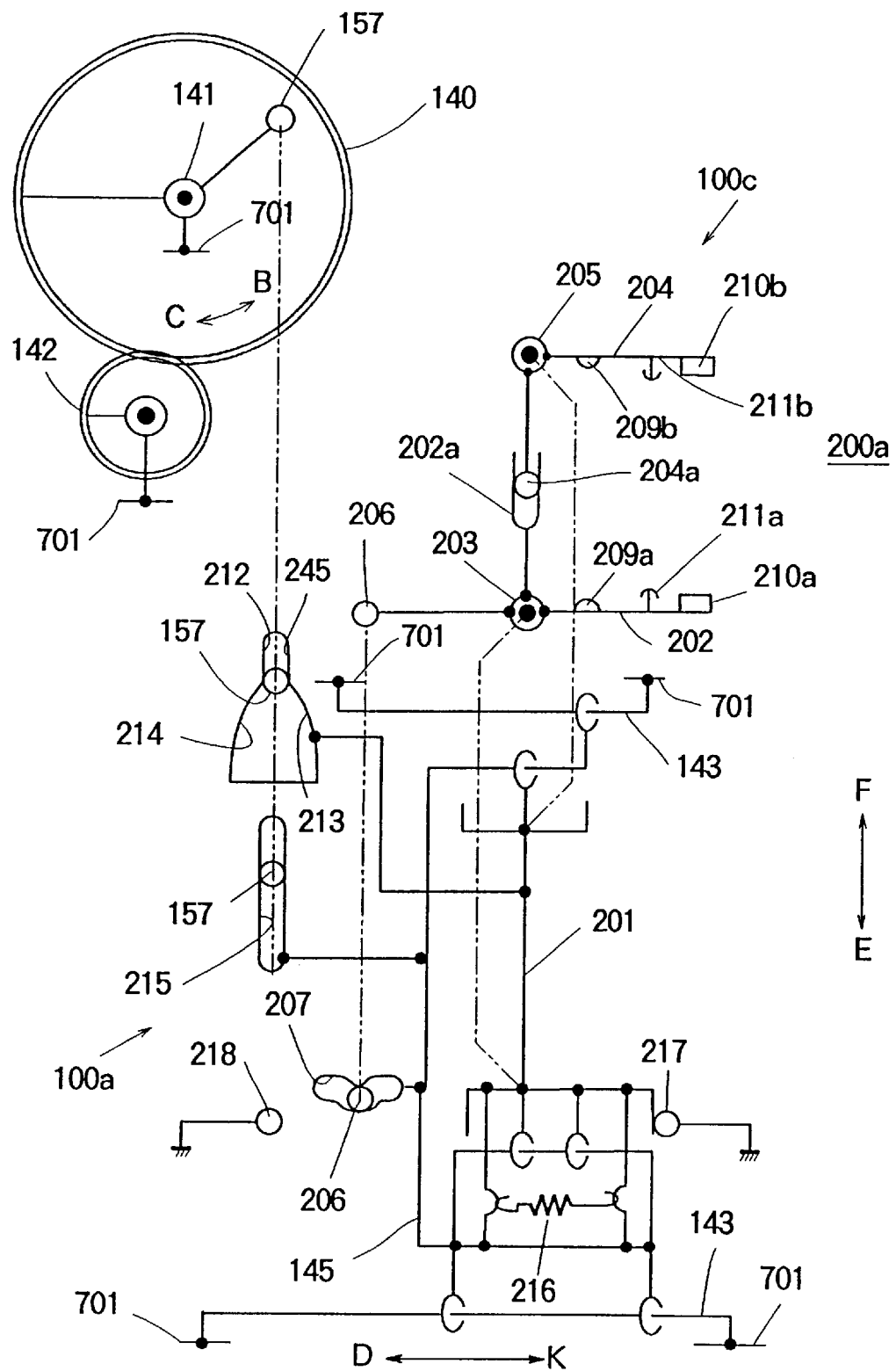

Next, when the user turns a reproduction switch (not shown) to the ON position, the motor 110 is started by an instruction from the controller 159; its rotational driving power is transmitted via the worm 111, the cylindrical gear 114 and the gear 142 provided on the elevator 701 to the loading gear 140. Thus the loading gear 140 rotates counterclockwise (direction B); transporter 145 which engages the cam hole 215 in the engaging pin 157, moves along the horizontal guide 143 to the rear of the apparatus (direction D); and, as shown in FIG. 24, the transporter 145 and the chucking base 201 are brought by the compressive force of the spring 216 to a positional relationship in which the linear portion 245 of the cam hole 212 and the cam hole 215 of the transporter 145 overlap. At this time the cam hole 207 provided on the transporter 145 and the engaging pin 206 of the chucking arm 202 which engages therewith, cause the chucking arm 202 and the chucking arm 204 to rotate inward (direction e and direction g respectively) around pivots 202b and 204b respectively, until, as shown in FIG. 24, the cartridge holder 103a which is in standby position 200a (not shown in FIG. 24) is in the holding state.

Figure 25:
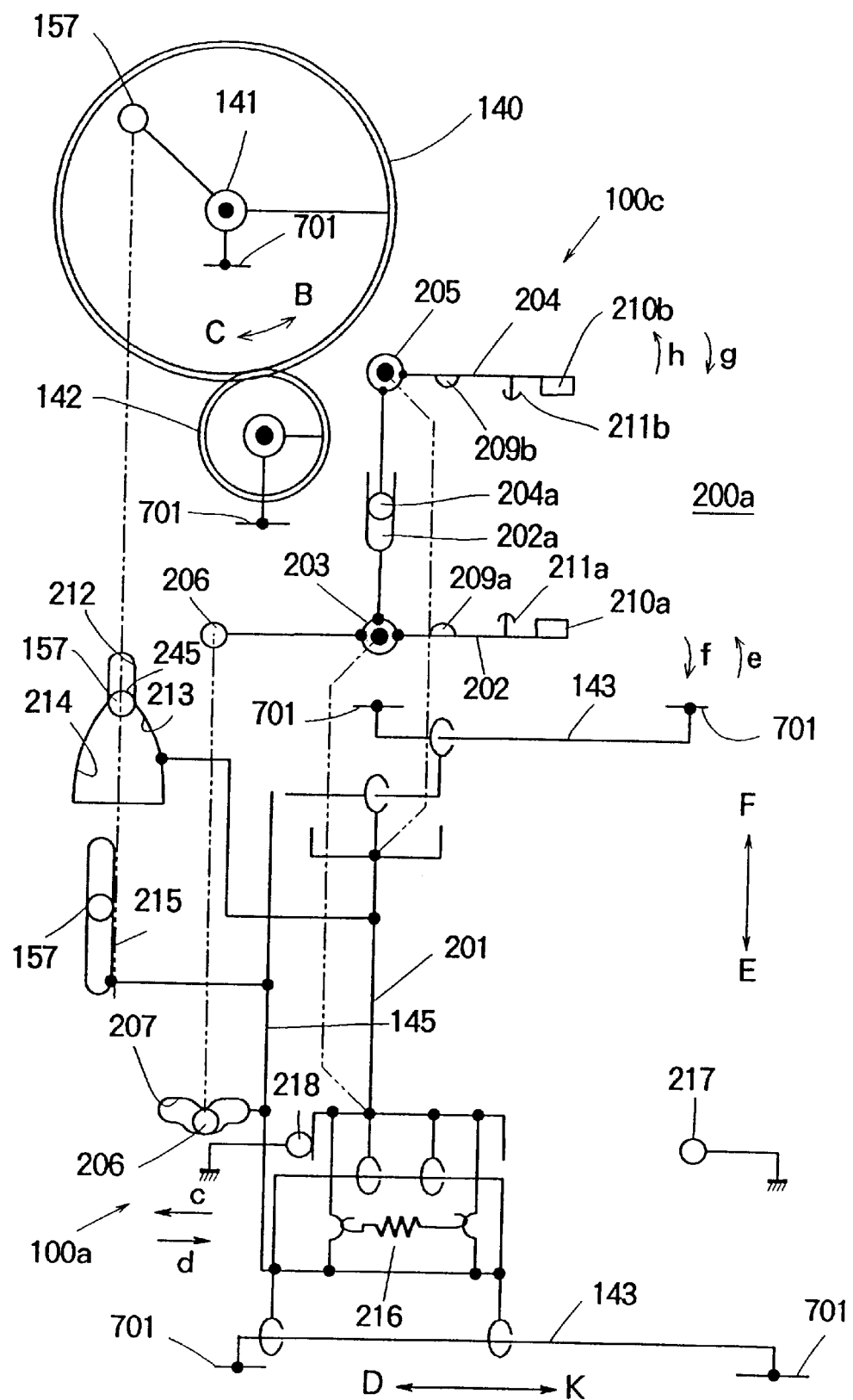
Figure 26:
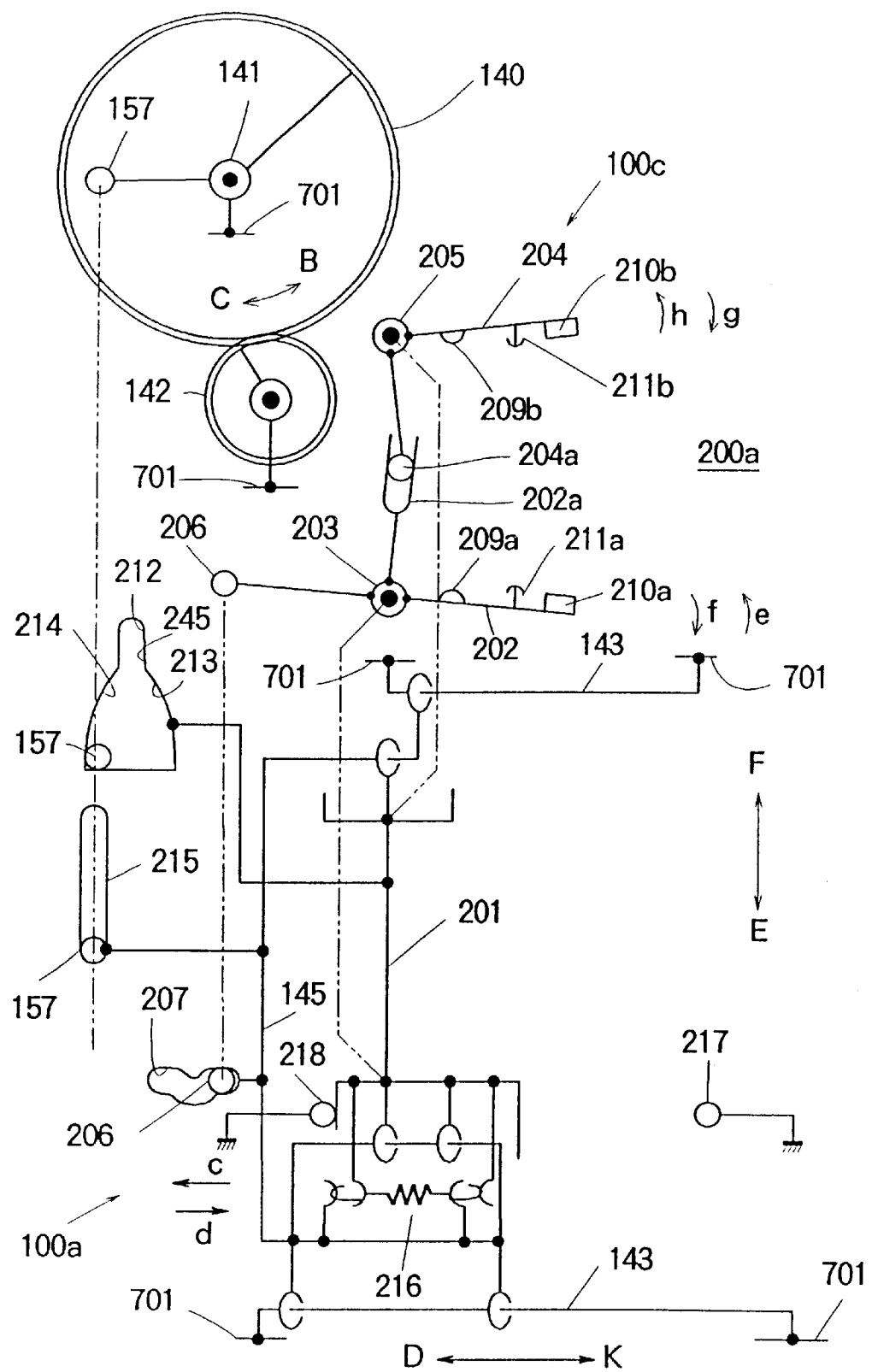
Figure 31:
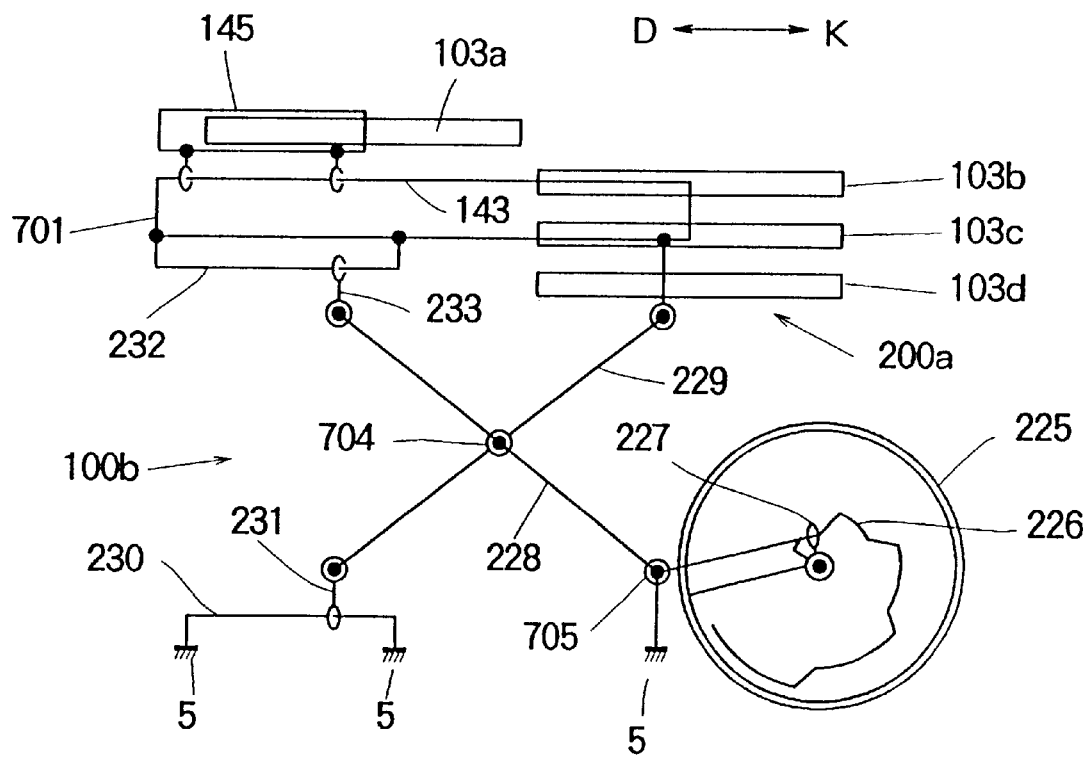

If the loading gear 140 is then rotated further counterclockwise (direction B), the engaging pin 157 of the loading gear 140, which is engaged with the cam hole 212 of the chucking base 201 and the cam hole 215 of the transporter 145. guides the transporter 145 along the horizontal guide slot 143 until it reaches above the recording and reproducing position 200b on the player 1. When the transporter 145 has moved to above the player 1, it establishes butt contact with the butt contact portion 218 of the chucking base 201. Then, as shown in FIG. 25, the engaging pin 157 reaches the end of the arcuate portion 214 of the cam hole 212 (termination of direction F in the drawing), and the spring 216 holds the transporter 145 and the chucking base 201 at an intermediate point. When the transporter 145 reaches this position, it is detected by the position detecting switch (not shown) and the motor 110 stops. At this time the positions of the elevator 701 and the transporter 145 are as shown in FIG. 31.

Next, as shown in FIG. 32, the motor 702 (shown only in FIG. 20) rotates the cam gear 225 counterclockwise in direction U, and the pantograph mechanism, which is provided with the elevating arm 228 having an engaging pin engaged with the cam groove 226 and the elevating arm 229, causes the elevator 701 having the horizontal slot 143 to descend along with transporter 145 and the cartridge holder 103a to the loaded position of the player (not shown), then causing the cartridge 91 to rest on the player 1 along with the cartridge holder 103a. Thereafter, a cartridge clamping mechanism similar to the one described in the first embodiment presses and holds the cartridge to the player 1 and the motor 702 is stopped. During the vertical motion of the cartridge holder 103a, the gear 142 slides in the axial direction of the cylindrical gear 114, while remaining enmeshed therewith.

Next, the motor 110 is restarted at the state shown in FIG. 25, and causes the loading gear 140 to rotate in direction B so that the engaging pin 157, which acts through the cam hole 215 of the transporter 145, moves the transporter 145 horizontally to the rear (direction D). But since the chucking base 201 is in butt contact with the butt contact portion 218 regulating its motion horizontally to the rear (direction D), the engaging pin 157 moves along the arcuate portion 214 of the cam hole 212 in the chucking base 201, and the transporter 145 and the chucking base 201 move horizontally to the front and rear (directions DK). At this time the cam hole 207 of the transporter 145 and the engaging pin 206 provided on the end of the chucking arm 202 cause the chucking arms 202 and 204 to rotate outward (direction f and direction h respectively), releasing engagement with the cartridge holder 103a. The angle of rotation of the loading gear 140 is detected by the detecting switch (not shown) and the motor 110 is stopped.

Following is a description of the cartridge-changing operation by which the cartridge 91 is replaced by the cartridge 93.

When the user presses the cartridge change switch (not shown), an operation reverse of that above described in which the cartridge is loaded to the player is carried out. First, the loading gear 140 is driven clockwise (direction C); the transporter 145 is driven horizontally to the front (direction K) by the spring 216; the chucking arms 202 and 204 rotate inward (direction e and direction g respectively), causing the transporter 145 to be linked with the cartridge holder 103a; the cartridge holder 103a, after moving vertically to the prescribed height, moves horizontally to the front (direction K); and the cartridge duplicate insertion prevention member 234 is flipped up by the cartridge holder 103a, and the cartridge holder 103a returns to its original standby position.

Then the chucking arms 202 and 204 are released, separating the transporter 145 and the cartridge holder 103a. As shown in FIG. 29, the lock arm 222 are released, causing the pins 222a and 222b to engage with the lock portions 224a and 224b fixed on the chassis 5.

Then, with the chucking arms 202 and 204 in the released state, the motor 702 is started and the cam gear 225 is driven. The pantograph mechanism causes the elevator 701, which has horizontal slot 143, to ascend and causes the transporter 145 to move to the position of the cartridge holder 103c on which cartridge 93 is resting. The achievement of this position is detected by the position detecting switch (not shown), and motor 702 is stopped. This state is shown in FIG. 33. The cartridge 93 is then loaded into the player 1 in a manner similar to that used in the case of the cartridge 91.

Following is a description of changing cartridges in the standby position 200a with reference to FIG. 36 and FIG. 37.

In FIG. 36, an ejection lever 237 is forced by the spring 238 to rotate clockwise. The butt contact portion 241 of the slider 240 establishes butt contact with butt portion 239 of the ejection over 237, regulating the rotary motion of the ejection lever 237. The slider 240 is forced by the spring 242 to move horizontally to the front (direction i), but the slider 240 establishes butt contact with the eject button 243 and is regulated in position thereof.

If at this point the user presses the eject button 243, the motion of the eject button is transmitted by the butt contact portion 243a of the eject button 243 to the slider 240 and the slider 240 moves horizontally to the rear (direction J) as shown in FIG. 37. The butt contact portion 241 of the slider 240 separates from the butt contact portion 239 of the ejection lever 237, and the ejection lever 237 is caused by the spring 238 to rotate clockwise. The ejection lever 237 then presses against the rear edge 91a of the cartridge 91 and the cartridge 91 is ejected. Thereafter, the ejection lever 237 establishes butt contact with the butt contact portion 244 of the slider 240, regulating its rotation. Further, as a result of the rotation of the ejection lever 237, the butt contact portion 241 of the slider 240 establishes butt contact with the ejection lever 237, regulating its motion horizontally to the front (direction i).

If the user then withdraws the ejected cartridge 91 from the apparatus and inserts into the apparatus another replacement cartridge 95, the ejection lever 237 establishes butt contact with the rear edge of the cartridge 95. The action of pressing it inward causes the ejection lever 237 to rotate counterclockwise, separating the butt contact portion 239 from the butt contact portion 244 so that the slider 240 is moved by the spring 242 horizontally to the front (direction i). The butt contact portion 239 then establishes butt contact with the butt contact portion 241, regulating the rotary motion of the ejection lever 237 that was imparted by the spring 238 and returning to the initial state.

Third Embodiment

Figure 38:
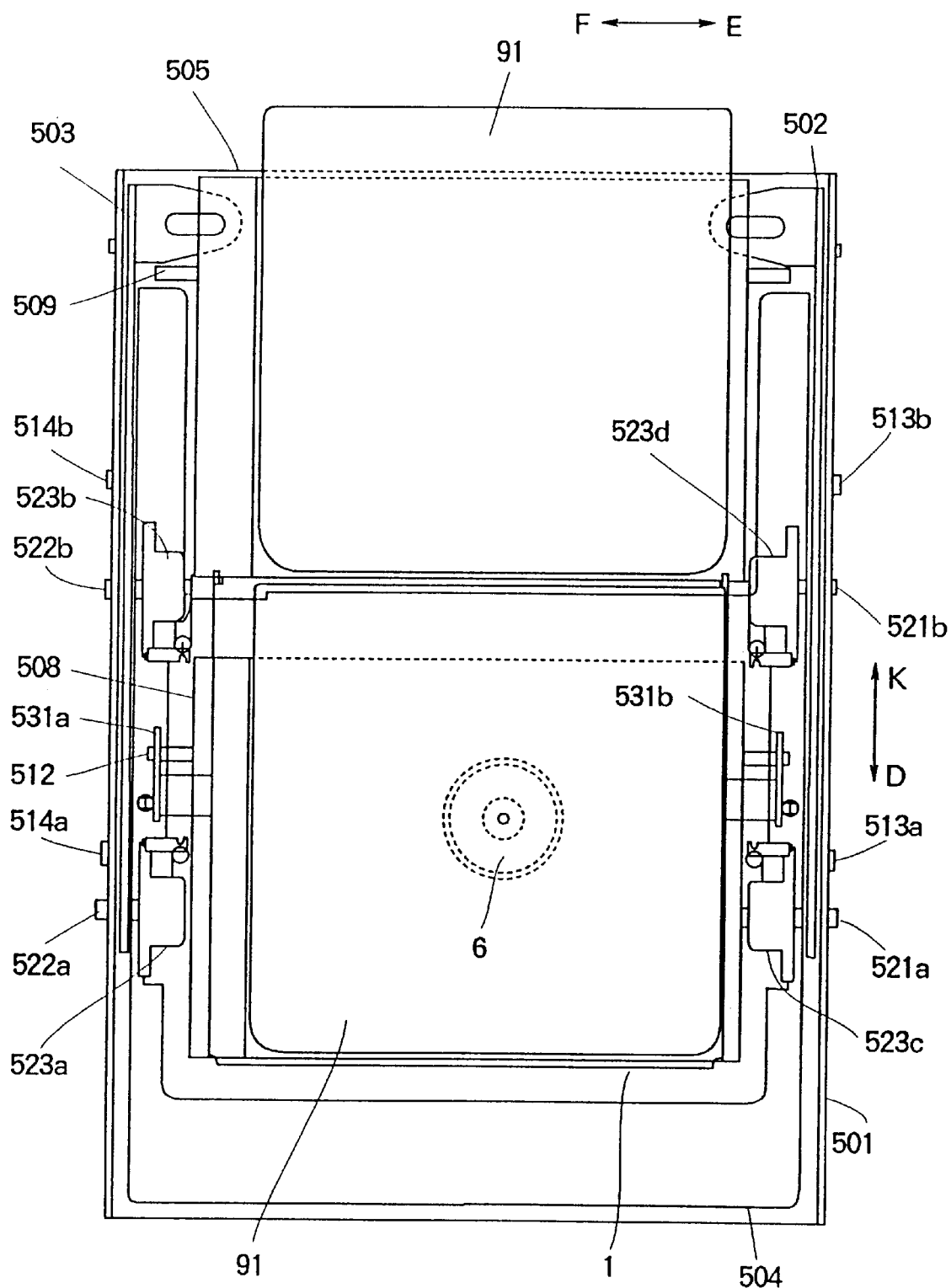
FIG. 38 is a schematic plan view showing the structure of the automatic disc-changing apparatus of a third embodiment of the present invention.
Figure 39:
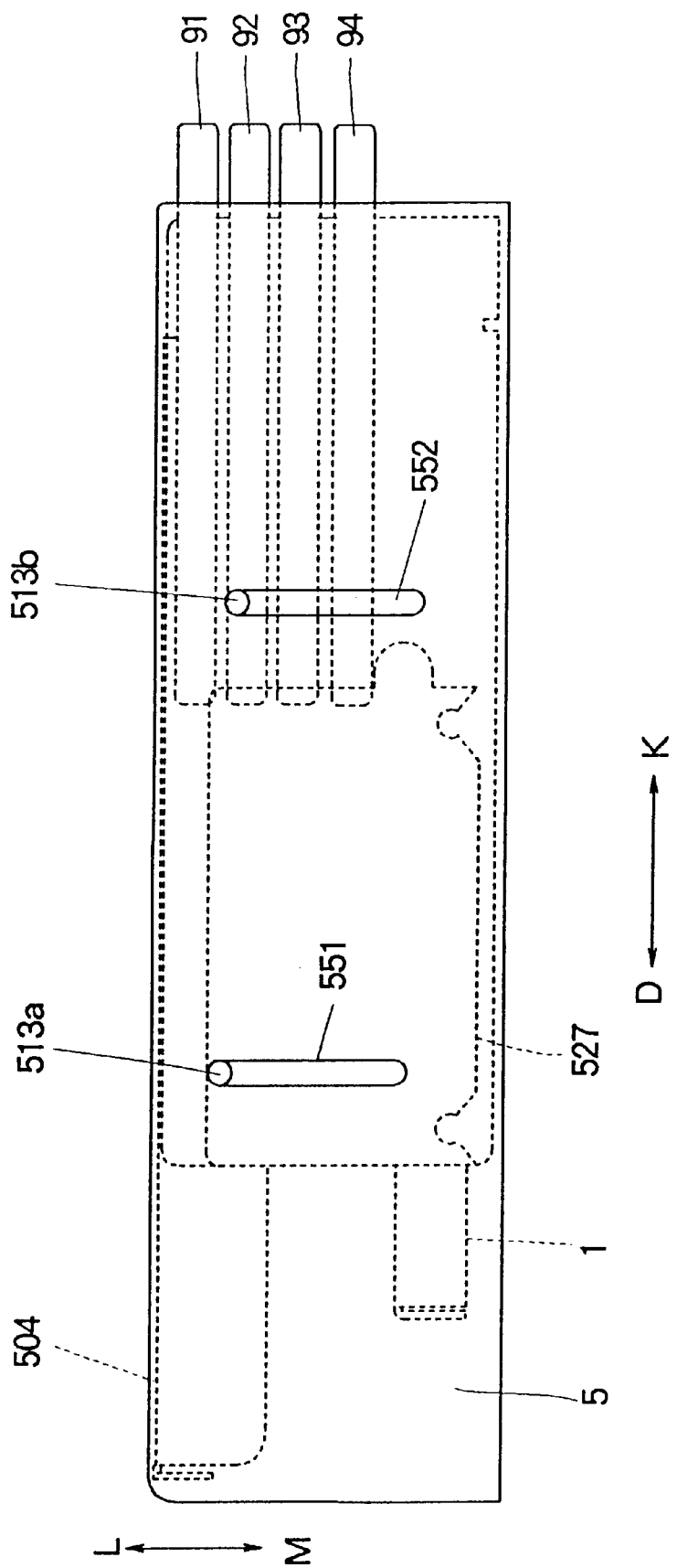
FIG. 39 is a side view of the apparatus shown in FIG. 38 as seen from outside chassis.
Figure 40:
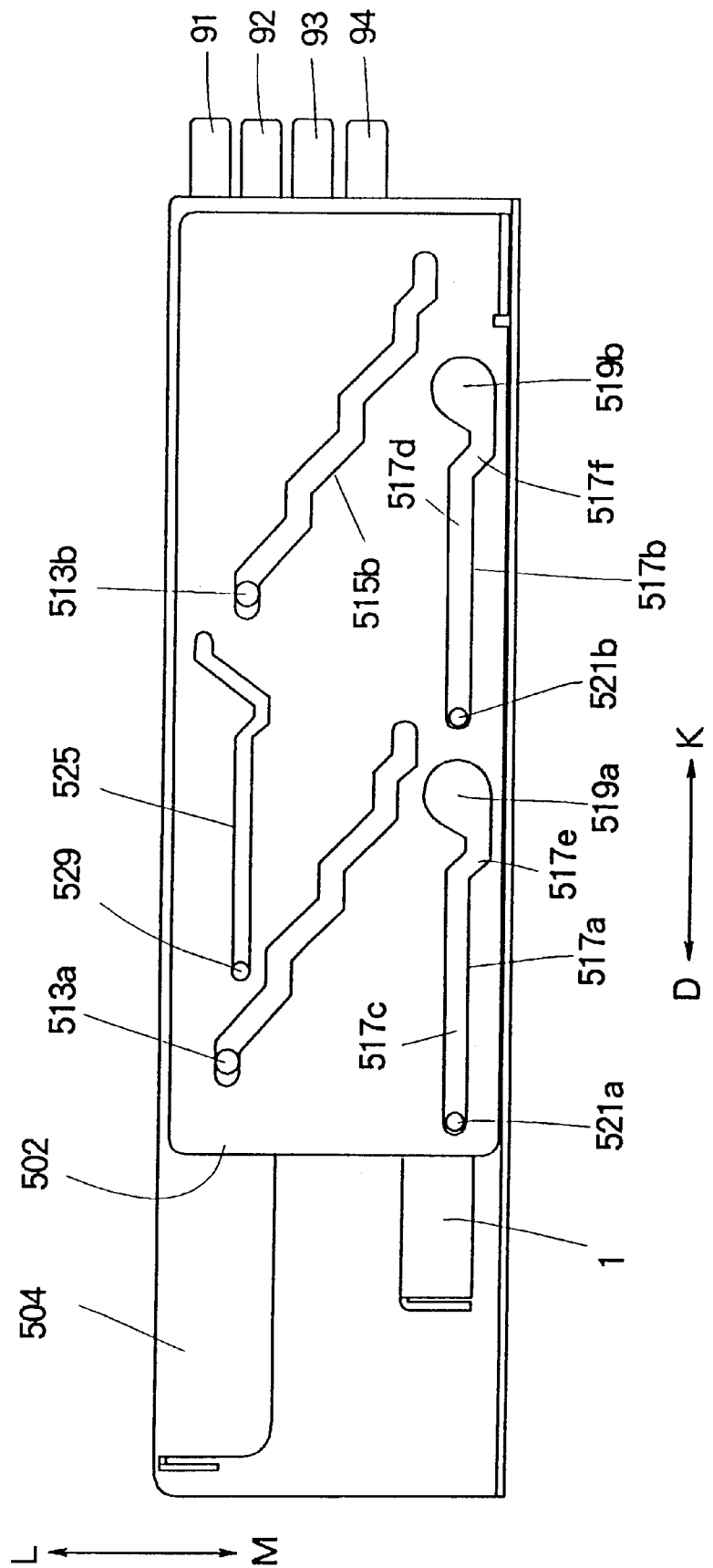
FIG. 40 is a side view of the apparatus shown in FIG. 38 with chassis removed.
Figure 41:
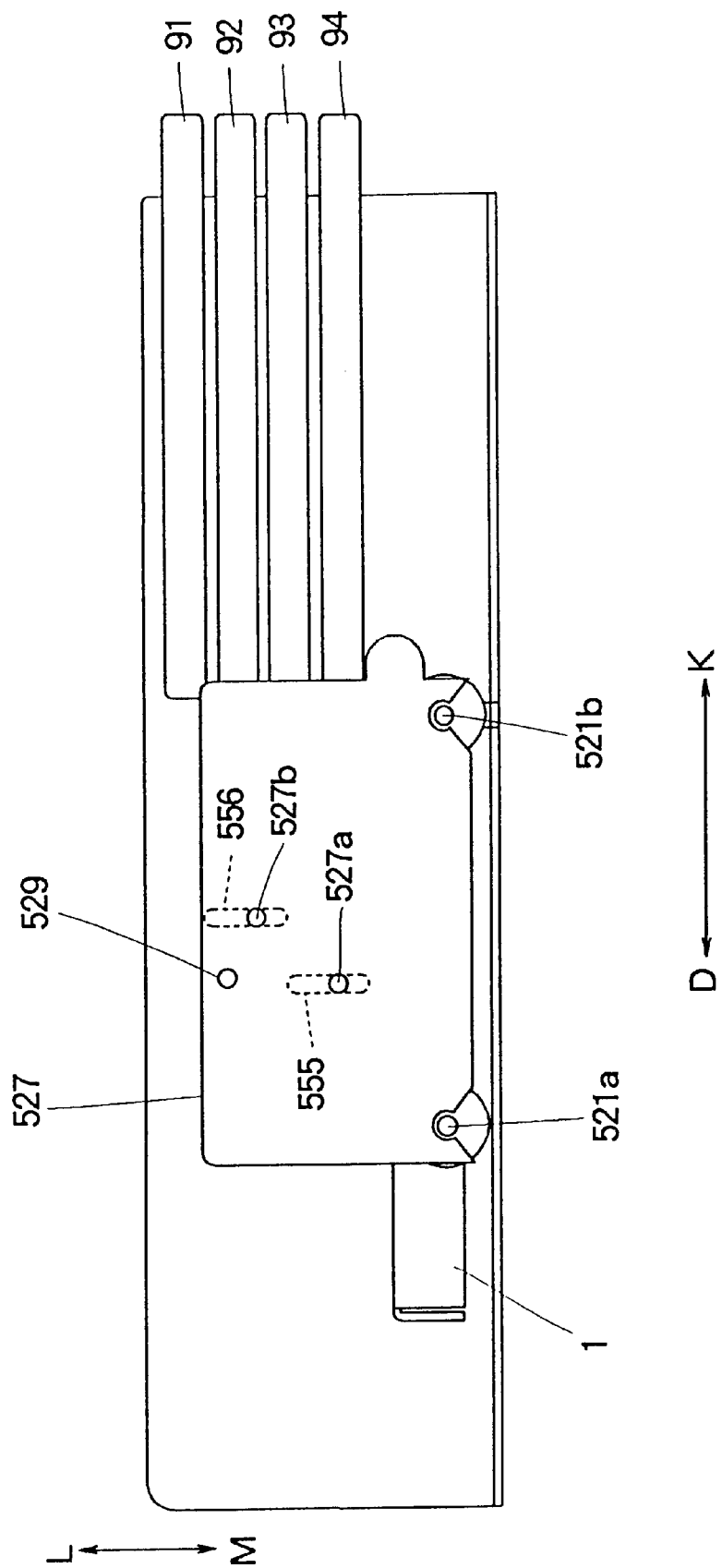
FIG. 41 is a side view of the apparatus shown in FIG. 38 with chassis and the slide cam removed.
Figure 46:
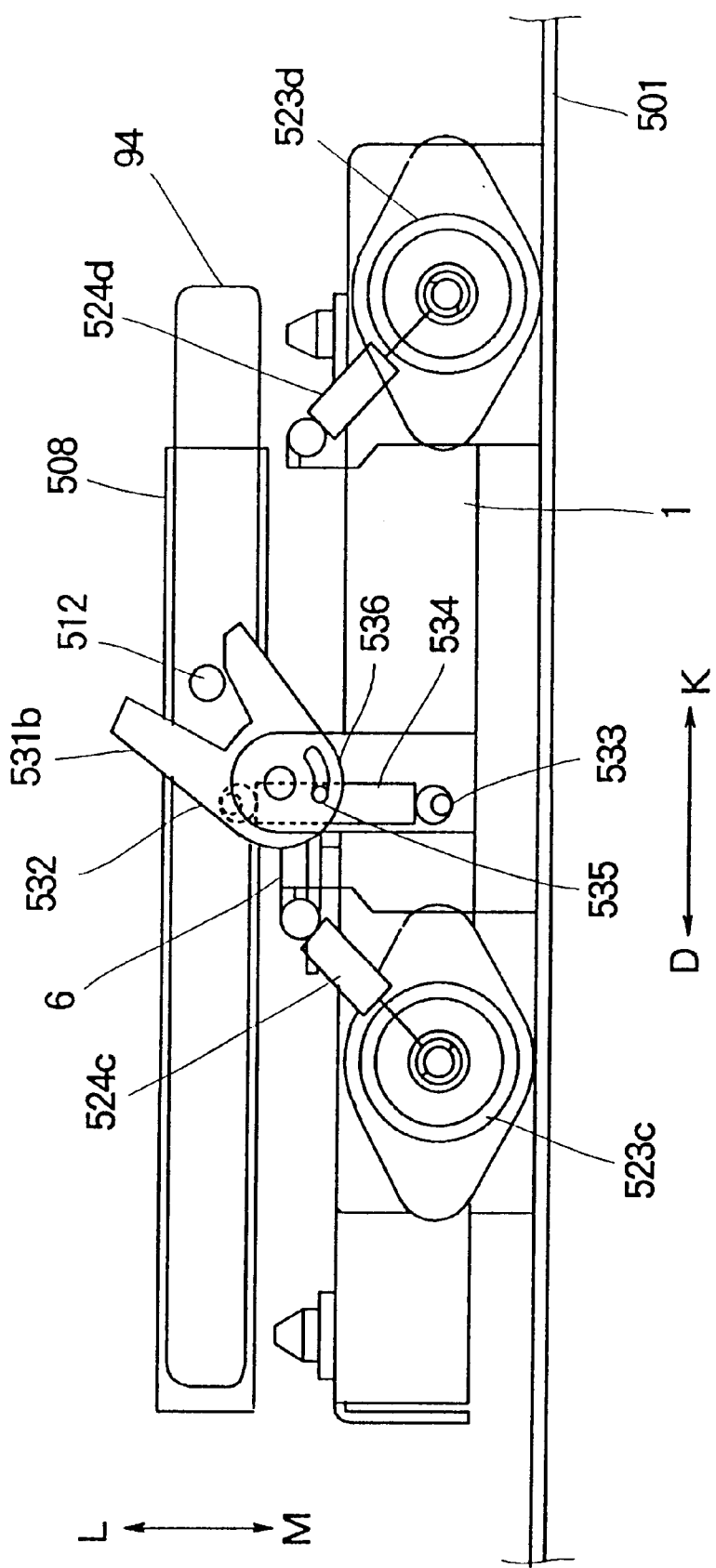
FIGS. 46 and 47 are side views of the clamping mechanism that forms a part of the third embodiment.
Figure 47:
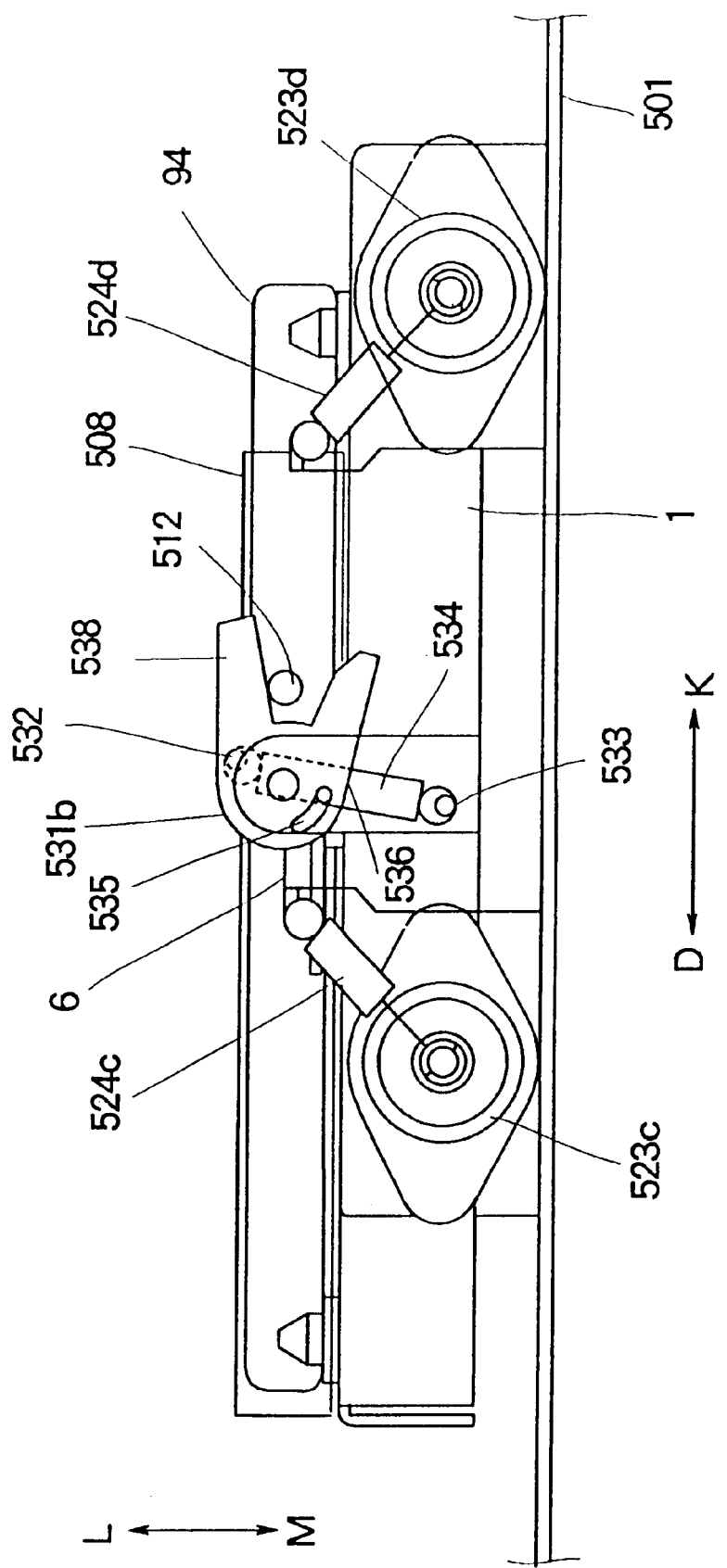
Figure 48:
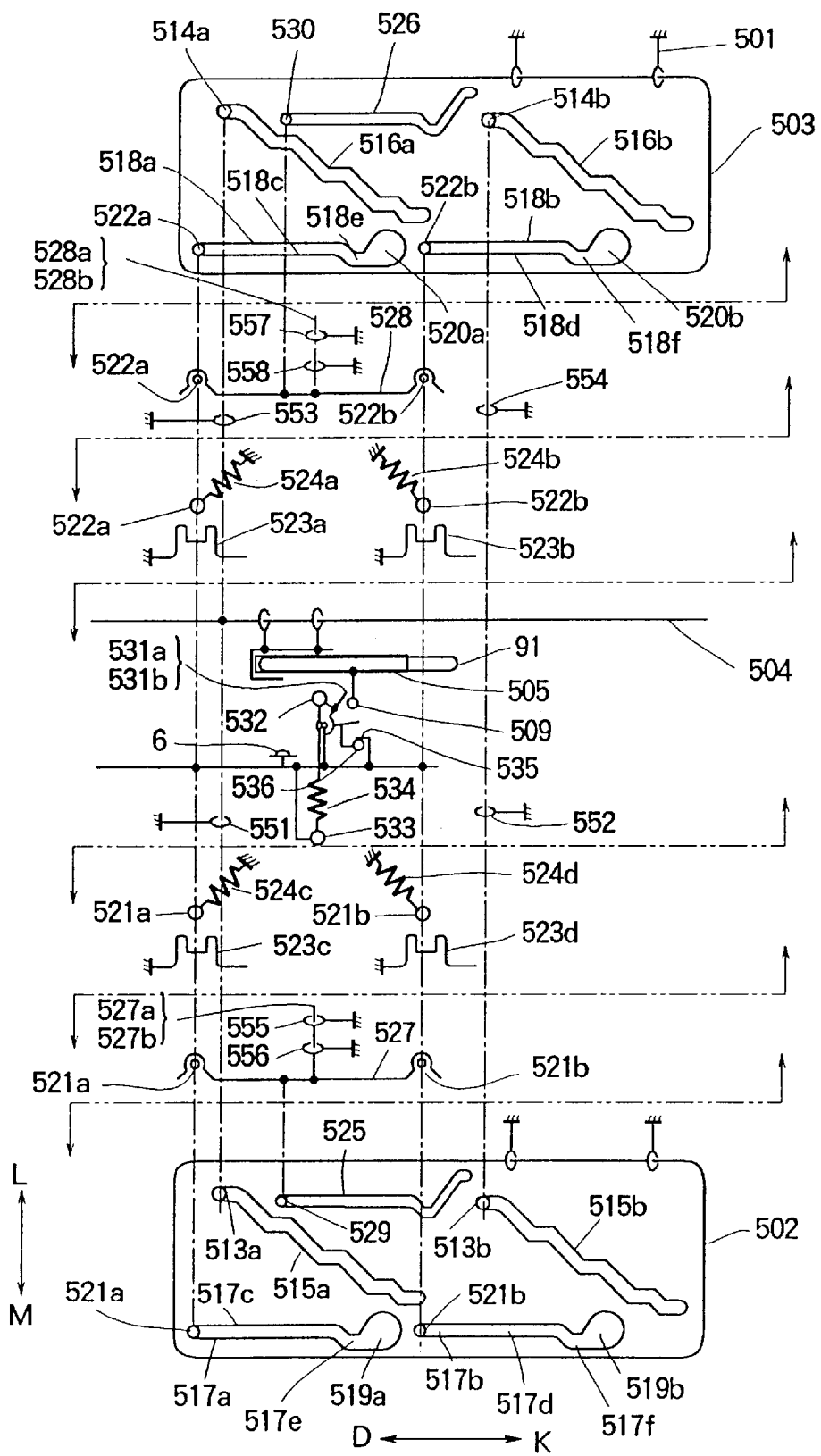
FIG. 48 is a conceptual diagram for the purpose of describing the operation of the third embodiment.

FIG. 38 through FIG. 48 show yet another example of an automatic disc-changing apparatus in accordance with the present invention, which can be applied, for example in the first embodiment above described. FIG. 38 is a schematic plan view showing the structure of the third embodiment, in which the upper part of the drawing is the front surface of the apparatus. FIG. 39 through FIG. 41 are side views of 1the apparatus shown in FIG. 38; FIG. 39 is a side view from outside the chassis 5, FIG. 40 is a side view with the chassis 5 removed, and FIG. 41 is a side view with the chassis 5 and the slide cam removed. FIG. 42 through FIG. 45 are descriptive diagrams for the purpose of describing the operation of the apparatus shown in FIG. 38. FIG. 46 and FIG. 47 are side views of the clamping mechanism that forms a part of the apparatus of the third embodiment; and FIG. 48 is a conceptual diagram for the purpose of describing the operation of the third embodiment, and in which the significance of the symbols used is as given in FIG. 98.

As shown in FIG. 38 through FIG. 41 and FIG. 48, the apparatus of the third embodiment comprises a chassis 501; slide cams 502 and 503 mounted slidably on the chassis 501; an elevator 504 engaged with the slide cams 502 and 503; and cartridge holders 505, 506, 507 and 508 capable of being loaded into and unloaded from the elevator 504 and each capable of accepting the loading of the cartridges 91, 92, 93 and 94.

As shown in FIG. 42 through FIG. 45, there are implanted in each of the cartridge holders 505, 506, 507 and 508, the on gazing ping 509, 510, 511 and 512 respectively for the purpose of pressing downward on the cartridge holder.

In the elevator 504 are implanted the engaging pins 513a, 513b, 514a and 514b, and the slide cams 502 and 503 are provided with the stepwise cam holes 515a, 515b, 516a and 516b which are inserted through the engaging pins 513a, 513b, 514a and 514b. The engaging pins 513a and 513b of the elevator 504 also engage respectively with elongated cam holes 551 and 552, which are formed in the vertical direction in the chassis 501; and the engaging pins 514a and 514b of the elevator 504 engage respectively with elongated cam holes 553 and 554, which are formed in the vertical direction in the chassis 501 (shown only in FIG. 48).

Further, the slide cam 502 is provided with cam holes 517a and 517b, and the slide cam 503 is provided with cam holes 518a and 518b. Each of the cam holes 517a, 517b, 518a and 518b comprise respectively a horizontal. portion 517c, 517d, 518c and 558d, which is narrow and elongated in the horizontal direction; an inclined portion 517e, 517f, 518e and 518f that inclines downward from one end of the horizontal portion; and a circular recessed portion 519a, 519b, 520a and 520b connected to this inclined portion.

Further, there are implanted on the side surface of the player 1 engaging pins 521a, 521b, 522a and 522b, each of which are inserted through the cam holes 517a, 517b, 518a and 518b for the purpose of flexibly supporting the player 1 on the chassis 501. The engaging pins 521a, 521b, 522a and 522b inserted respectively through the cam holes 517a, 517b, 518a and 518b are also inserted respectively through vibration-absorbing dampers 523a, 523b, 523c and 523d. Further, the engaging pins 521a, 521b, 522a and 522b are respectively connected to one end of springs 524a, 524b, 524c and 524d, the other end of which is connected to the chassis 501.

Further, the cam holes 525 and 520 are formed in the upper portions of the slide cams 502 and 503 respectively.

The apparatus of the third embodiment further comprises clamping plates 527 and 528 (528 being shown only in FIG. 48), which are mounted on chassis 501 so as to be capable of sliding vertically (direction LM). There are implanted in clamping plates 527 and 528, engaging pins 529 and 530 (530 being shown only in FIG. 48), which engage respectively in the cam holes 525 and 526 of the slide cams 502 and 503. There is further implanted in clamping plate 527, engaging pins 527a and 527b, which engage with the cam holes 555 and 556 elongated in the vertical direction on the chassis 501, and there is implanted in clamping plate 528, engaging pins 528a and 528b, which engage with the cam holes 557 and 558 elongated in the vertical direction on the chassis 501.

Further, as shown in FIG. 38, FIG. 46 and FIG. 48, the player 1 is provided with rotatably supported stoppers 531a and 531b; pins 532 implanted in stoppers 531a and 531b respectively; pins 533 implanted at appropriate places on the player 1 (only the one engaging with the stopper 531b being shown in the drawings); springs 534, of which one end is connected to the pin 532 and the other end is connected to the pin 533; a butt contact portion 535 formed in the stoppers 531a and 531b (only the one relating to the stopper 531b being shown in the drawings); and pins 536 implanted at appropriate places on the player 1 (only the one engaging with stopper 531b being shown in the drawings).

Following is a description of the operation of the apparatus of the third embodiment.

Figure 42:
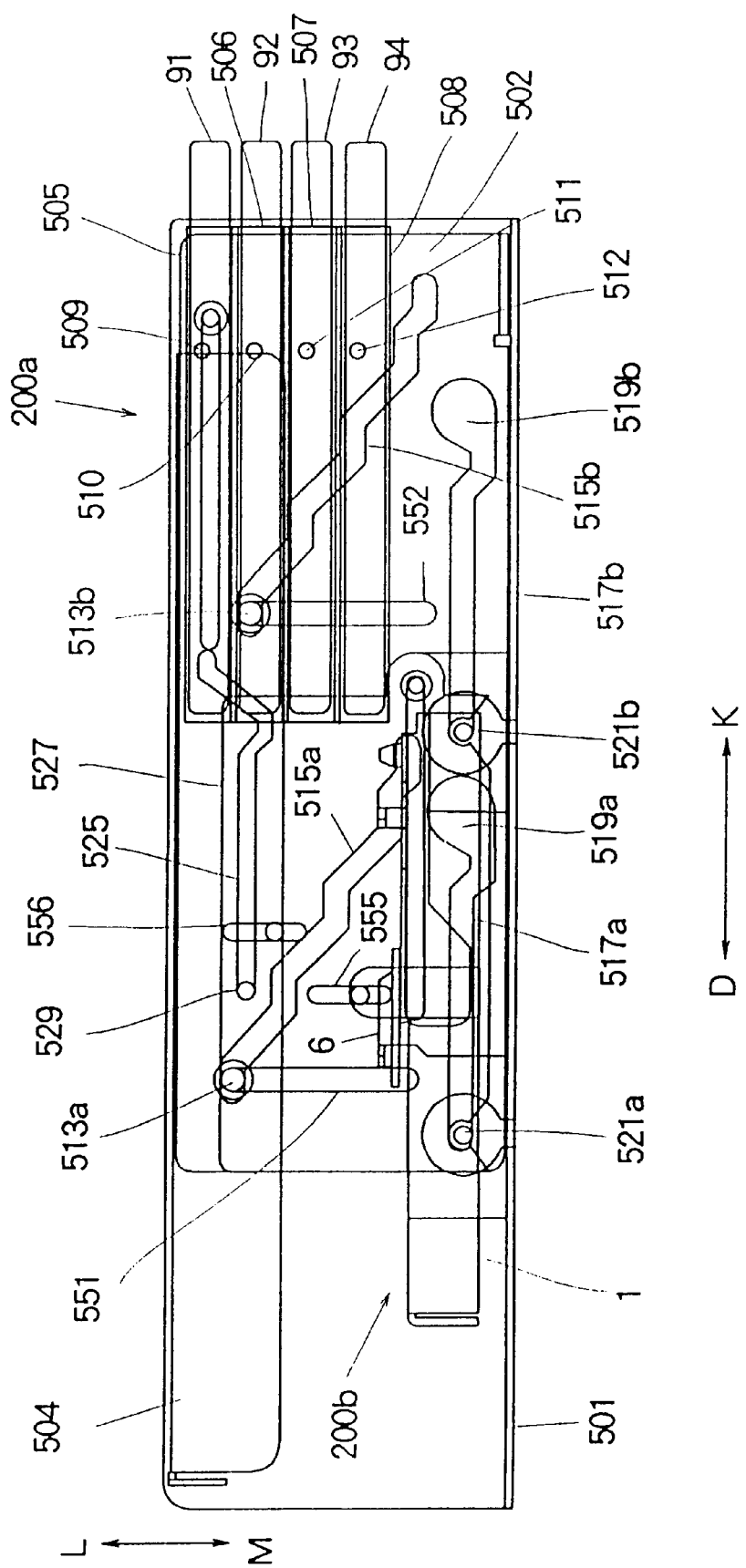
FIGS. 42 to 45 are descriptive diagrams for the purpose of describing the operation of the apparatus shown in FIG. 38.

FIG. 42 shows the state immediately after the cartridge holder 505 has been returned from the recording and reproducing position 200b on the player 1 to the uppermost portion of the standby position 200a. At this time, the slide cams 502 and 503 are at the front of the apparatus (right side of the drawing); the engaging pins 513a, 513b, 514a and 514b implanted in the elevator 504 are in the uppermost portion of the cam holes 515a, 515b, 516a and 516b of the slide cams 502 and 503. At the same time, the engaging pins 521a, 521b, 522a and 522b of the player 1 are sandwiched respectively with the cam holes 517a, 517b, 518a and 518b of the slide cams 502 and 503 and the lower edges of the clamping plates 527 and 528.

Figure 43:
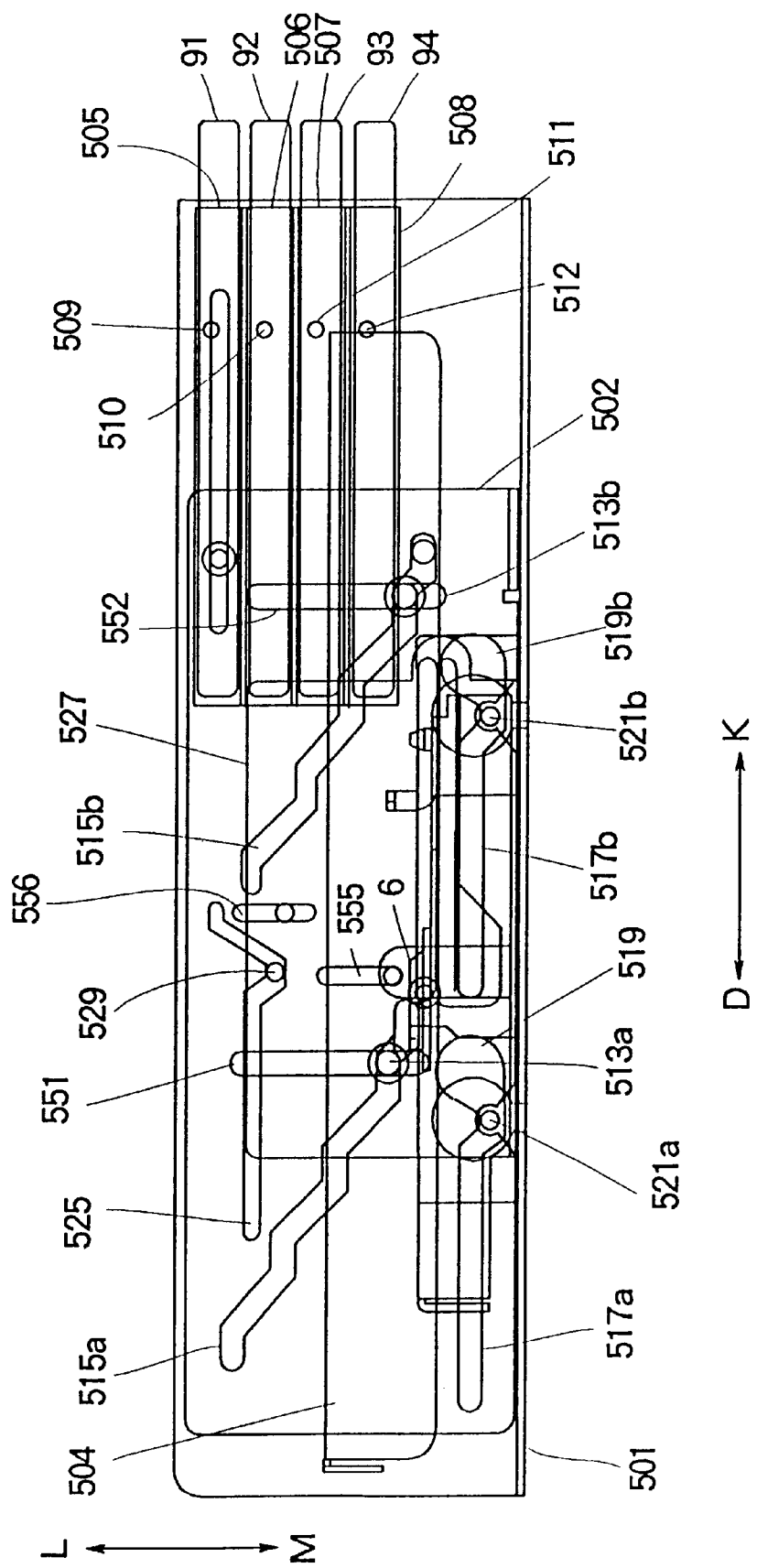
Figure 44:
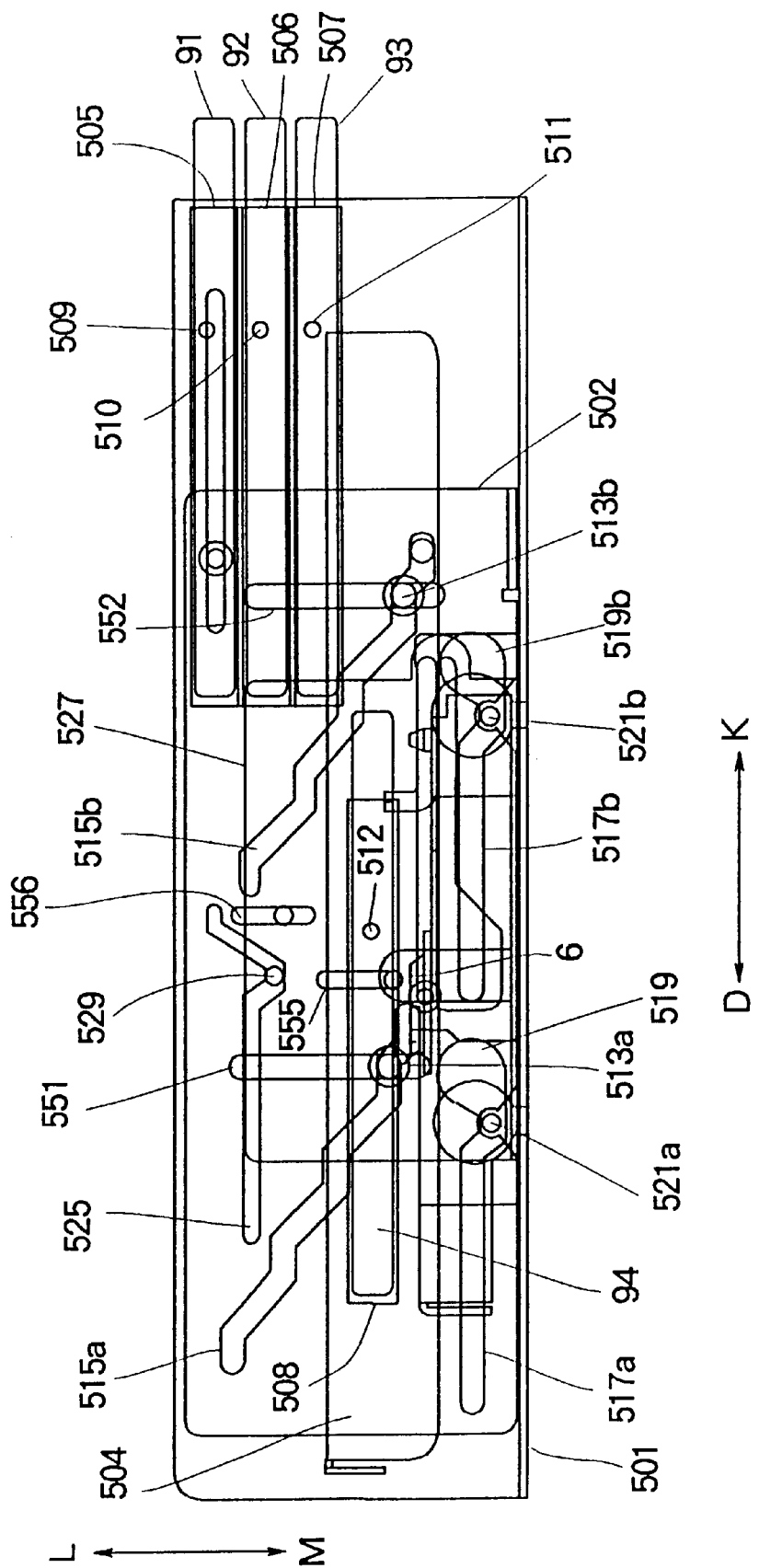
Figure 45:
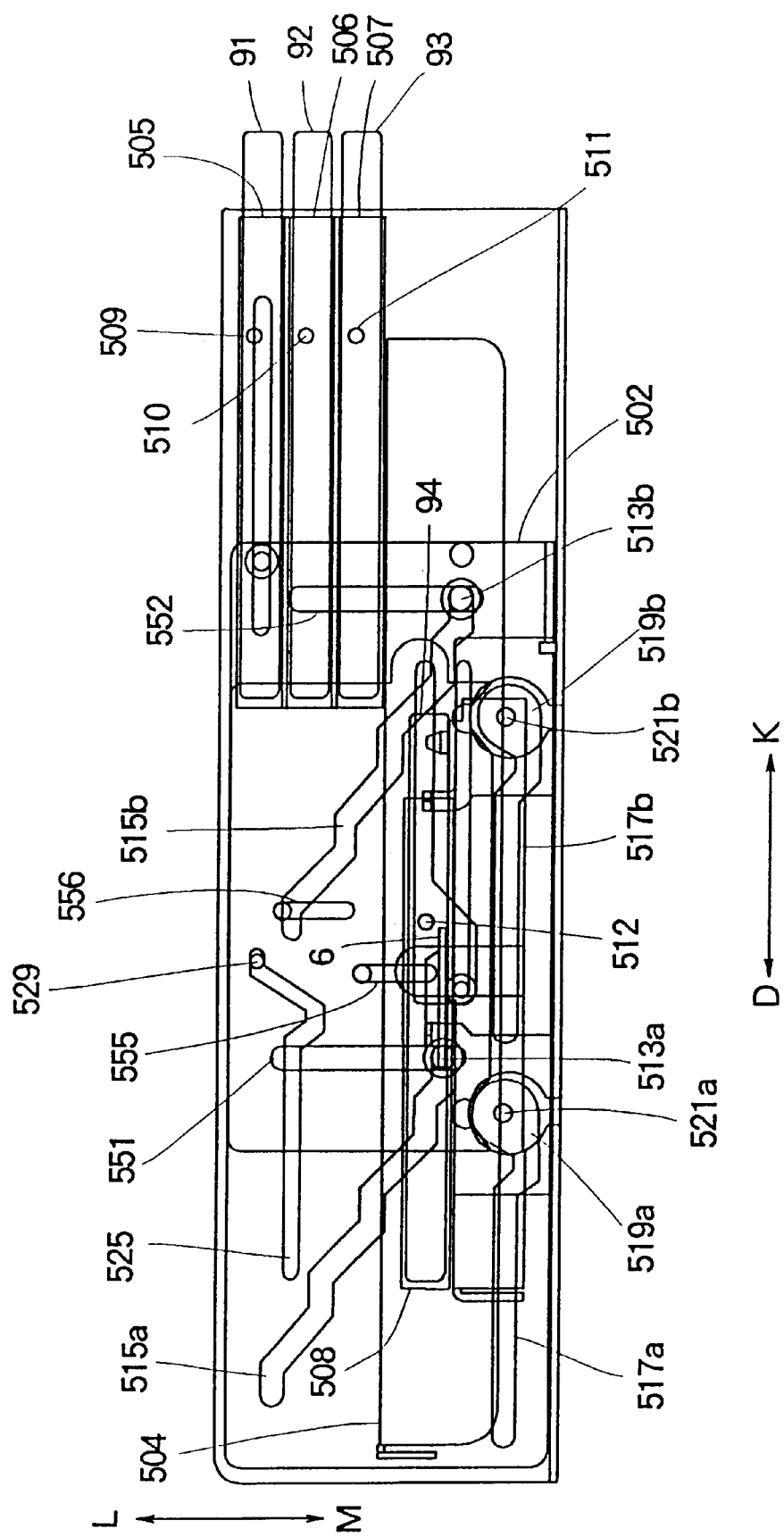

Following is a description of the operation when the cartridge holder 508, which is loaded in the lowest position in the apparatus, is loaded into the player 508. As shown in FIG. 43, the slide cams 502 and 503 are driven to the left (direction D) by a drive mechanism comprising a motor, a gear mechanism, a cam mechanism and so on. This results in the engagement of the cam holes 515a, 515b, 516a and 516b with the engaging pins 513a, 513b, 514a and 514b and the engagement of the cam holes 551, 552, 553 and 554, which are elongated in the vertical direction on the chassis 501 with the engaging pins 513a, 513b, 514a and 514b, and the elevator 504 descends from the position shown in FIG. 42 to that shown in FIG. 43. In the third embodiment, however, because the height (thickness) of the apparatus has been kept as small as possible, the height of the lower surface of the cartridge holder 508 when in the standby position 200a will be slightly below that of the upper surface of the turntable 6, even in the state shown in FIG. 43, so that the cartridge holder 508 and the turntable 6 will be superimposed in the horizontal plane. At this point, the engagement of the engaging pins 520 and 530 with the cain holes 525 and 526 respectively causes the clamping plate 527 and 528 to descend, pressing the engaging pins 521 and 522 downward against the compressive force of the spring 524, so that the transport mechanism (which can be moved due to the transport mechanism as described, for example, in the first and second embodiments) transports the cartridge holder 508 to the position of the player 1 shown in FIG. 44. Since, due to the clamping plate 527, the player 1 is in a position below the positioned for recording and reproducing, the cartridge holder 508 does not interfere with the turntable 6 even if it is transported horizontally.

If the slide cams 502 and 503 are then caused to move further horizontally to the rear (direction D), the engagement of the engaging pins 513a, 513b, 514a and 514b with the cam holes 515a, 515b, 516a and 516b, respectively, causes the elevator 504 to further descend. At the same time the engagement of the engaging pins 529 and 530 with the cam holes 525 and 526, respectively, causes the clamping plates 527 and 929 to move upward.

As the cartridge holder 508 descends, the engaging pin 512 establishes butt contact with the lower edge 597 of the stopper 531, causing the stopper 531 to rotate clockwise. This causes the direction of force exerted by the spring 534 and the direction of rotation of the stopper 531 to coincide from some intermediate point, and the stopper 531 clamps the cartridge holder 508 to the player 1. Again, to eject the cartridge holder 508, the slide cams 502 and 503 are caused to move horizontally to the front (direction K), the engagement of the engaging pins 513a, 513b, 514a and 514b with the cam holes 515a, 515b, 516a and 516b, respectively, causes the elevator 504 to move upward (direction L), and, as shown in FIG. 47, the engaging pin 512 establishes butt contact with the upper edge 538 of the stopper 531, causing the stopper 531 to rotate counterclockwise. This causes the direction of rotation of the stopper 531 and the direction of force exerted by the spring 534 to coincide from some intermediate point, after which the rotation of the stopper 531 is stopped by the butt contact between the butt contact portion 535 and the pin 536, and the stopper 531 is positioned and fixed on the player 1.

Fourth Embodiment

Figure 49:
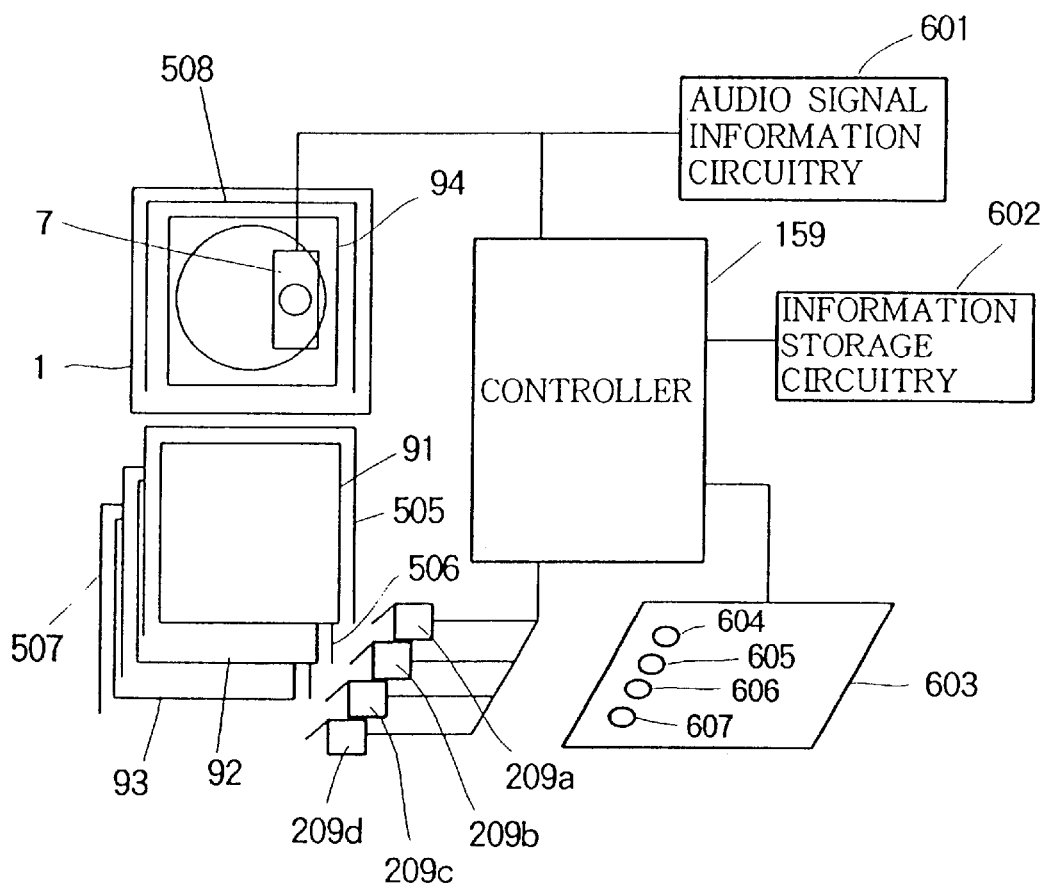
FIG. 49 is a block diagram showing the structure of the automatic disc-changing apparatus of a fourth embodiment of the present invention.
Figure 50:
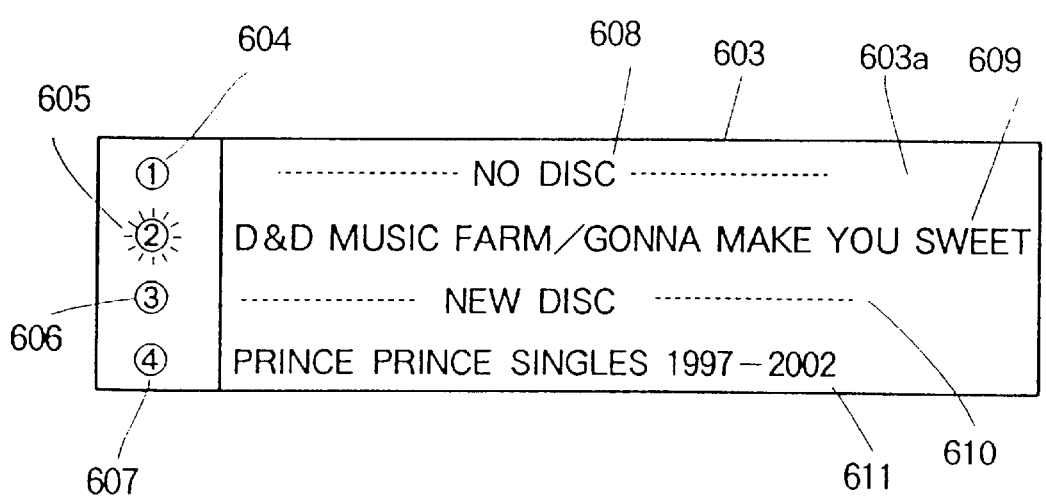
FIG. 50 is a front view an example of a display on the display panel of the apparatus shown in FIG. 49.
Figure 51:
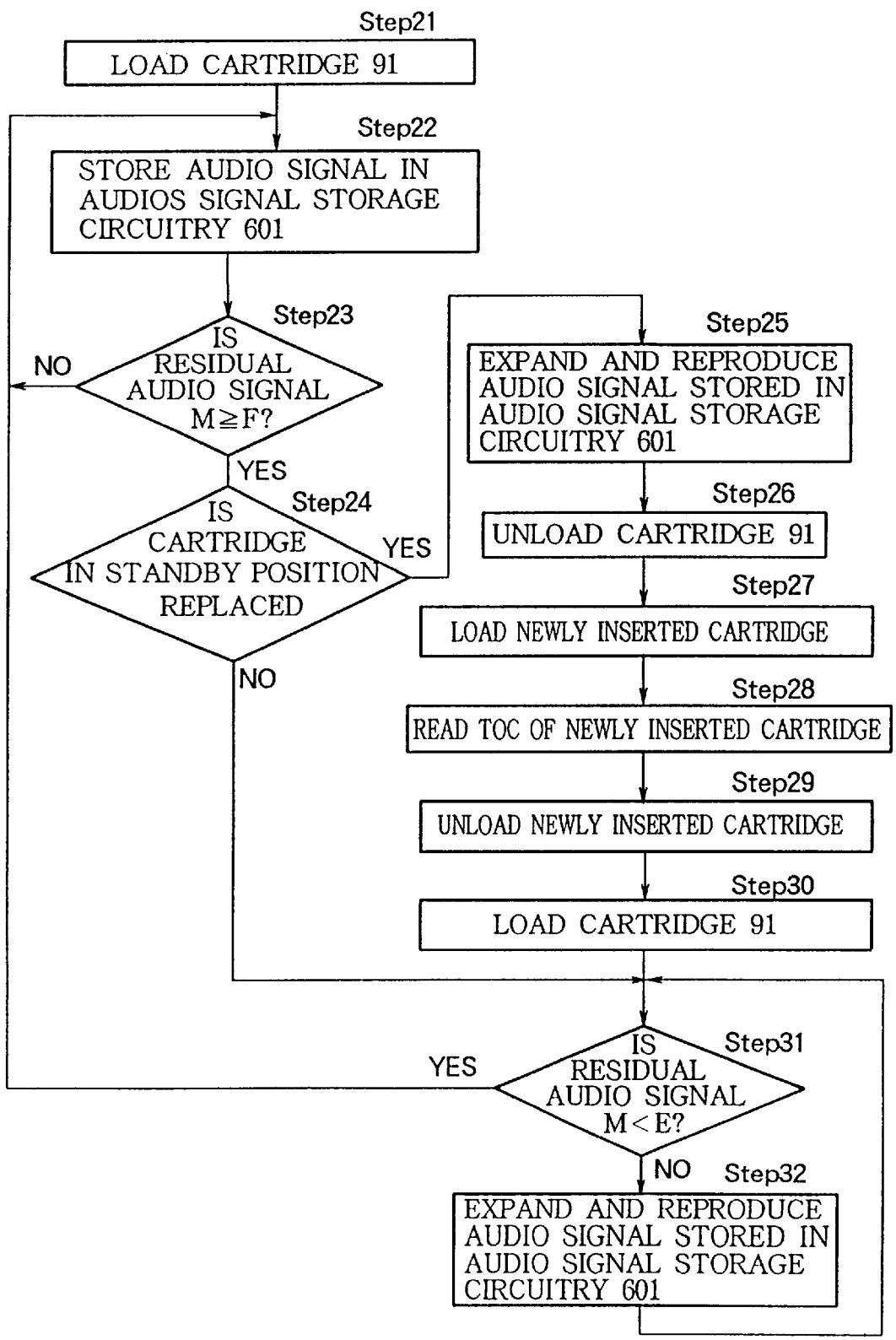
FIG. 51 is a flow chart for the purpose of describing the operation of the apparatus shown in FIG. 49.

FIG. 49 is a block diagram showing the structure of the automatic disc-changing apparatus of a fourth embodiment of the present invention; FIG. 50 is a front view showing an example of a display on a display panel 603 of the apparatus shown in FIG. 49; and FIG. 51 is a flow chart for the purpose of describing the operation of the apparatus shown in FIG. 49.

The structure of the apparatus of the fourth embodiment, like that of the first and third embodiments above described, forms a part of an apparatus capable of selectively transporting cartridges from the standby position to the recording and reproducing position, or from the recording and reproducing position to the standby position.

As shown in FIG. 49, the apparatus of the fourth embodiment is provided with an audio signal storage circuitry 601 for recording audio signal information read from a disc (such as is accommodated, for example, in the cartridge 91) by means of a pickup 7 of the player 1; an information storage circuitry 602 for recording information on the contents of the disc, such as titles of works, names of performers, duration of performance, etc. (hereinafter referred to as the TOC); and the display panel 603 comprising a liquid crystal display 603a capable of displaying cartridge loading status and disc TOC for each of the cartridge holders 505, 506, 507 and 508. The apparatus of the fourth embodiment is further provided with detecting switches 209a, 209b, 209c and 209d for detecting the presence or absence of, respectively, the cartridges 91, 92, 93 and 94 loaded in the cartridge holders 505, 506, 507 and 508; an indicator lamps 604, 605, 606 and 607 capable of changing the color emitted or the method of lighting in accordance with cartridge status; and a controller 159 controlling the operation of the various mechanism of the apparatus.

Following is a description of the operation of the apparatus. First, if the cartridges 91, 92, 93 and 94 are loaded, respectively, into each of the cartridge holders 505, 506, 507 and 508, the loaded cartridges 91, 92, 93 and 94 are loaded sequentially into the player 1, the pickup 7 reads the TOC recorded on the disc in each of the cartridges and stores this TOC in the information storage circuitry 602. A portion of this TOC is displayed in the display panel 603, either automatically or as designated by the user.

Next, the cartridge designated for reproduction is placed on the player 1, and the audio signal compressively recorded on the disc is read by the pickup 7. The audio signal information that has been read is stored in the audio signal storage circuitry 601 and the audio signal information in audio signal storage circuitry 601 is expanded and converted into an audio signal and output to for example an audio output means (not shown in the drawing).

FIG. 50 shows the display status of information on the titles of works on each cartridge when a sequential playing of the cartridges 91. through 93 is complete and the cartridge 94 is being played. The controller 159 senses that the cartridge 94 is being played by the on or off status of the switches 209a, 209b, 209c and 209d, and causes the indicator lamp 607 at the bottom of the display panel 603 to light with a color different from that of the other indicator lamps 604, 605 and 606. For example, the color omitted by the indicator lamps 604, 605 and 606 corresponding to the cartridges 91, 92 and 93, which are not being played, could be green, while the color emitted by the indicator lamp 607, corresponding to the cartridge 94, which is being played, could be red.

Next, when the cartridge 91 is ejected, the status of the switch 209a changes, the controller 159 senses the absence of a cartridge in the cartridge holder 505, the TOC of the cartridge 91 is erased from the information storage circuitry 602, and character information 608 on the panel display 603 changes to "NO DISC" or other message to the effect that no cartridge is loaded. The user can determine by looking at the display panel 603 that the cartridge 91, which had been loaded in the cartridge holder 505 has been ejected, and is not currently loaded in the cartridge holder 505.

When the cartridge 92, which was loaded in the cartridge holder 506, is ejected and a new cartridge 95 is loaded in the cartridge holder 506, the controller 159 senses from the change in current-carrying status of the switch 209b that a new cartridge 95 has been loaded in the cartridge holder 506. The TOC recorded on the cartridge 95 is then read and displayed on the display panel 603, while reproduction of the audio signal of the cartridge 92 continues without interruption.

This display operation is carried out in the sequence shown in FIG. 51. First, when the cartridge 91 is loaded on the player 1 (step 21), the audio signal that is recorded on the disc in cartridge 91 is stored in audio signal storage circuitry 601 (step 22), and the amount of stored residual audio signal M is increased to equal to or greater than a previously established first reference amount F (step 23).

At this point, provided there has been no replacement of cartridges loaded in the standby position (step 24), it is determined whether the amount of stored residual audio signal M is less than a previously established second reference amount E (step 31). If M is less than E, the operation returns to step 22 and the storing of the audio signal continues, while if M is equal to or greater than E, the audio signal is expanded and the sound is reproduced (step 32).

If, on the other hand, there has been a replacement of the cartridges loaded in the standby position (step 24), the audio signal from the cartridge 91. In the audio signal storage circuitry 601 continues to be expanded and reproduced (step 25) while the cartridge being played is returned to the standby position (step 26), newly inserted cartridge 95 is placed in the loading position on player 1 (step 27), its TOC is read (step 28), the newly inserted cartridge is returned to the standby position (step 29), and the cartridge 91, which was being played, is again transported to the player 1 (step 30). Then, based on a Judgment the residual amount M of the audio signal stored in audio signal storage circuitry 601 is less than reference value E (step 31.), reproduction is continued.

The first reference amount F is a value corresponding to the time during which the cartridge 91 being played is transported to the standby position, new cartridge 95 is transported to the player 1, the pickup 7 reads the TOC of the new cartridge 95, the new cartridge 95 is transported to the standby position, and the cartridge 91 previously being played is transported to the player 1 and the audio signal from the disc in the cartridge 91 is read by the pickup 7. Residual amount M is an amount corresponding to the length of the sound time when the signal stored in audio signal storage circuitry 601 is expanded and converted to sound. The second reference amount E is an amount corresponding to the time required for the pickup 7, which has been inactive during the interval when the signal stored in audio signal storage circuitry 601 is being expanded and reproduced, to be reactivated and read the information on the disc. During normal reproduction, the pickup 7 reads the signal periodically, comparing the residual amount M stored in audio signal storage circuitry 601 with standard amounts F and E.

During the period from the time at which the new cartridge 95 has been inserted into the cartridge holder 506 until storage of the TOC of the cartridge 95 in the information storage circuitry 602 has been completed, a message to the effect that a new cartridge is loaded, such as "NEW DISC" shown for the display 610 in FIG. 50, appears. The user can determine by looking at the display panel 603 that a new disc has been loaded.

The display panel 603 need riot be limited to an apparatus for. The display of character information, and may be a television monitor or similar apparatus for image display. In such cases, in the event that a cartridge in which recorded maps or other image information is loaded while the audio signal from any desired cartridge is being reproduced, the image information on the new cartridge can be displayed on the display panel without interrupting the reproduction of the audio signal, in a similar manner to that described above.

As described above, it is possible, by means of the apparatus of the fourth embodiment, when a new cartridge is loaded into a cartridge holder, to return the cartridge being played to the standby position while continuing the reproduction of the audio signal from it, and display on the display panel the TOG from the newly inserted cartridge without interrupting the sound input, thereby achieving an apparatus that is more convenient to use.

Further, a "NO DISC" message or similar character information appears on the display panel corresponding to the cartridge holder from which a cartridge has been ejected, and when a new cartridge is loaded, a "NEW DISC" message or similar character information appears on the display panel corresponding to the cartridge holder into which a cartridge has been loaded, resulting in an apparatus that is more convenient to use. Further, once cartridges are loaded into the cartridge holder and transported to the player, the indicator lamps corresponding to cartridges from which the audio signal is not being reproduced blink on and off, allowing the user to determine by the blinking of the indicator lamps that the cartridge in the corresponding cartridge holder has not yet been played, and when it is proposed select a new cartridge to be played next, selection of the new cartridge is facilitated, and an apparatus that is more convenient to use is achieved.

Fifth Embodiment

Figure 52:
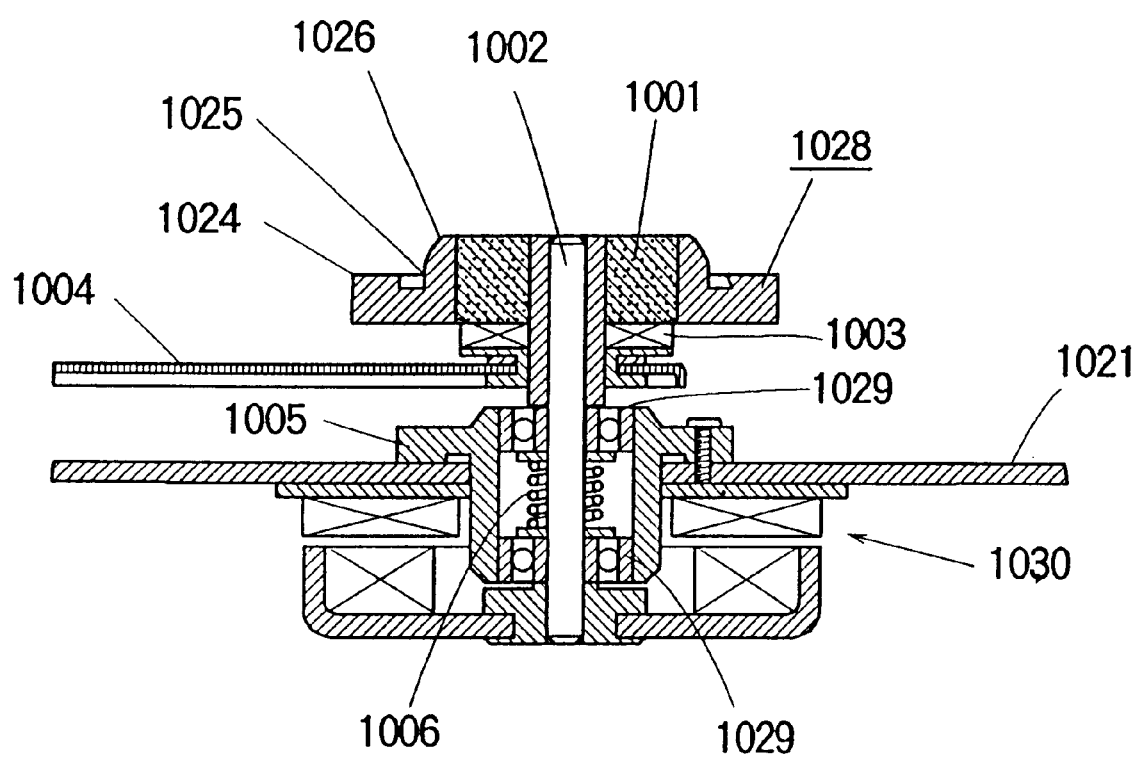
FIG. 52 is a vertical cross-sectional view showing the structure of a disc-chucking apparatus of a fifth embodiment of the present invention.
Figure 53:
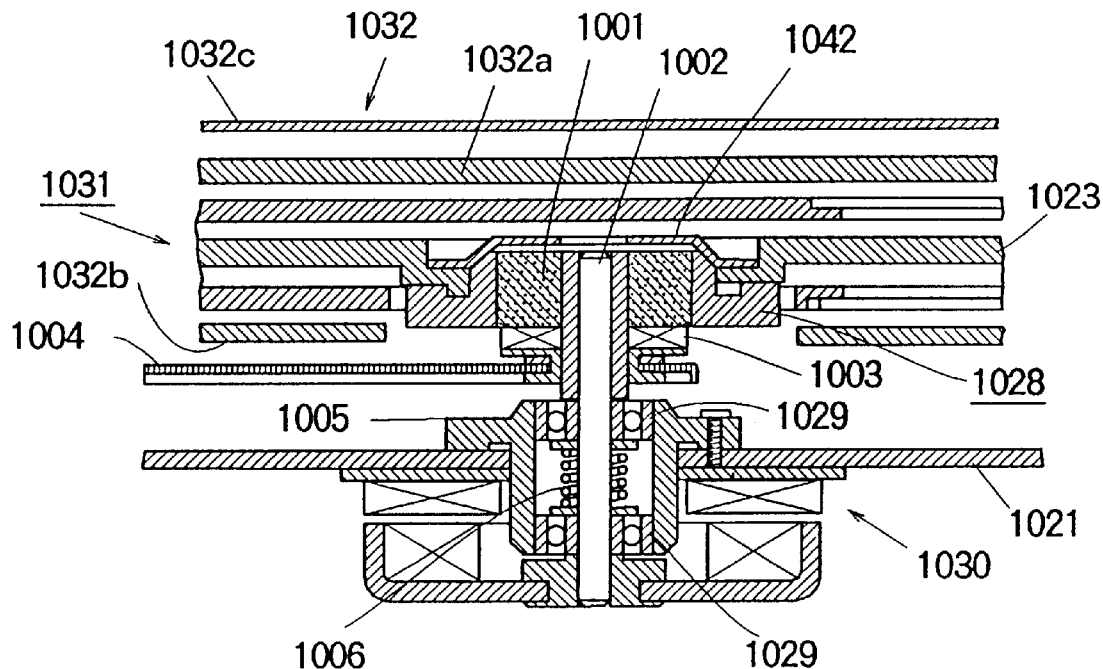
FIG. 53 is a vertical cross-sectional view showing a disc-chucking apparatus of the fifth embodiment when a disc, which is the signal recording medium, is chucked in it.
Figure 54:
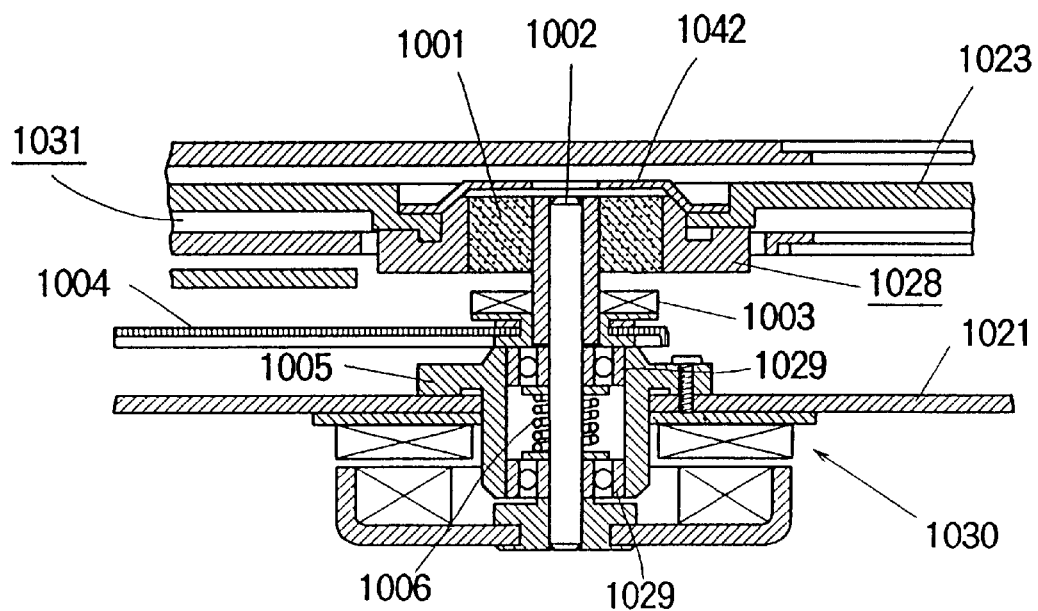
FIG. 54 is a vertical cross-sectional view showing the disc-chucking apparatus of the fifth embodiment when a disc has been released from it.

FIG. 52 is a vertical cross-sectional view showing the structure of the disc-chucking apparatus of a fifth embodiment of the present invention; FIG. 53 is a vertical cross-sectional view showing a disc-chucking apparatus of the fifth embodiment when a disc is chucked; and FIG. 54 is a vertical cross-sectional view showing the disc-chucking apparatus of the fifth embodiment just before a disc is released from it. Those portions that are the same as or equivalent to those shown in the conventional apparatus shown in FIG. 89 through FIG. 93 are assigned the same symbols and their description is omitted.

In the drawings, a reference numeral 1001 designates a core of a soft magnetic material that forms a part of turntable 1028; 1002 a rotary spindle driven by a motor 1030 and rotating integrally with the turntable 1028; 1003 a chucking magnet of single magnetic domain structure, capable of movement in the axial direction of the rotary spindle 1002 and magnetized in the axial direction of the rotary spindle 1002; 1004 a transfer member which is engaged with the chucking magnet 1003 and which 15 driven manually or by a motor, solenoid or other actuator in the vertical direction in the drawing to assume the state shown in FIG. 52 and, FIG. 53 or FIG. 54; 1005 a bearing holder securing a bearing 1029 which supports the turntable 1028; and 1006 a compressed spring that removes axial and radial play from the bearing 1029. The turntable 1028 itself may be of soft magnetic material.

The cartridge 1031 is held in a holder similar to that shown in FIG. 93, FIG. 53 shows an upper plate 1032a, a lower plate 1032b and a cover 1032c of the holder 1032, however the holder 1032 is not shown in FIG. 54 and many of the subsequent drawings.

In a disc-chucking apparatus such as that described above, the loading of the disc to the recording and reproducing apparatus and the recording and reproducing process are effected in the same way as conventional apparatus.

Following is a description of the process by which the disc 1023 is withdrawn from the recording and reproducing apparatus. In FIG. 53, the magnetic flux of the chucking magnet 1003 permeates the core 1001 to reach the clamping plate 1042, attracting the disc 1023 and holding it against the turntable 1028. Next, by operating the eject switch, the transfer member 1004 is driven, either manually or by a motor or other actuator, moving downward in the drawing, that is to say in a direction such that the chucking magnet 1003 is distanced from the turntable 1028, to reach the state shown in FIG. 54. This leaves a gap between the chucking magnet 1003 and the core 1001 producing an increase in magnetic resistance, and the magnetic flux passing the core 1001 is reduced. As a result the attractive force of the disc 1023 is reduced. If, in this state, the hook 1036 in FIG. 93 is rotated clockwise, releasing the engagement piece 1035, the holder 1032 will thereafter be flipped upward in the same way as in conventional apparatus.

Sixth Embodiment

The fifth embodiment above shows a case in which the turntable 1028 is formed of a soft magnetic material, or in which the turntable 1629 is formed integrally with the core 1001 made of soft magnetic material, along with the adjacent movable chucking magnet 1003 and the transfer member 1004 which causes it to move. However, the disc chucking apparatus of the sixth embodiment comprises a coil of electrically conductive material, which is provided around a turntable formed of a soft magnetic material or a turntable formed integrally with a core made of soft magnetic material; a power supply circuit thereto; and a switch thereof. Following is a description of the sixth embodiment with reference to FIG. 55, which is a vertical cross-sectional view showing the structure of the disc-chucking apparatus of the sixth embodiment, wherein those portions that are the same as or equivalent to those shown in the fifth embodiment are assigned the same symbols and their description is omitted.

In the figure, reference numeral 1007 designates a coil. of electrically conductive material provided around the periphery of the turntable 1028; 1008 a power supply circuit for supplying the electrical power to the coil 1007; and 1009 a switch for switching on and off the coil 1007.

Following is a description of the operation thereof. The disc 1023 is loaded to the recording and reproducing apparatus by means of the disc-loading apparatus shown in FIG. 93. At this time the switch 1009 is turned on, allowing current to flow from the power supply circuit 1008 to the coil 1007 and producing a magnetic flux around the coil 1007. This magnetic flux passes through the core 1001, attracting the clamping plate 1042 of the disc 1023 and holding the disc 1023 to the turntable 1028. Thereafter, recording and reproducing of signals is effected in the same way as in conventional apparatus.

Figure 55:
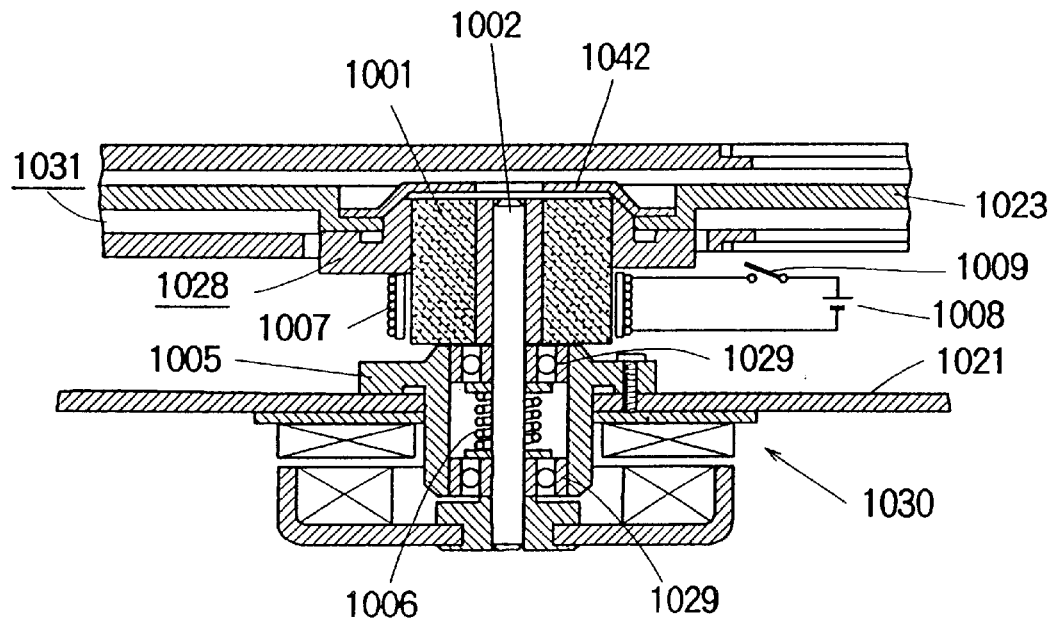
FIG. 55 is a vertical cross-sectional view showing the structure of the disc-chucking apparatus of a sixth embodiment of the present invention.

Following is a description of the process by which the disc 1023 is withdrawn from the recording and reproducing apparatus. In FIG. 55, the user switched off the switch 1009 by operating the eject switch (not shown), and the current to the coil 1007 is interrupted. The magnetic flux is reduced and the attractive force to the disc 1023 is also reduced. If in this state the hook 1036 in FIG. 93 rotates clockwise and release the piece 1035, the holder 1032 will thereafter be flipped upward in the same way as in conventional apparatus.

Seventh Embodiment

Figure 56:
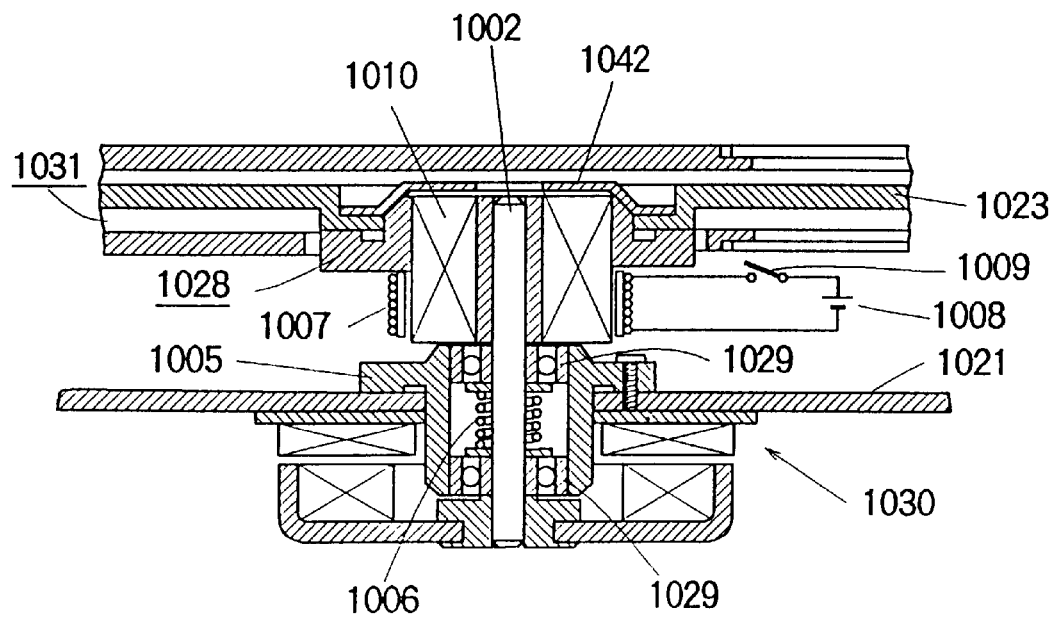
FIG. 56 is a vertical cross-sectional view showing the structure of a disc-chucking apparatus of a seventh embodiment of the present invention.
Figure 57:
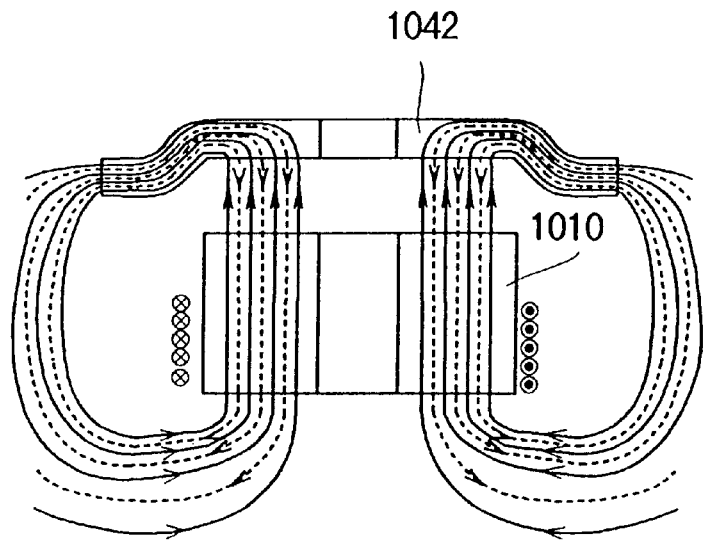
FIG. 57 is a descriptive diagram showing the magnetic flux in a disc-chucking apparatus of the seventh embodiment.

The sixth embodiment described above shows a case in which the disc chucking apparatus comprises a coil 1007, which is provided around a turntable formed of a soft magnetic material or a turntable formed integrally with a core made of soft magnetic material, and disposed coaxially with turntable 1028; a power supply circuit 1008 thereto; and a switch 1009 thereof. However, in the seventh embodiment the disc chucking apparatus comprises a turntable formed of a permanent magnet of single magnetic domain structure or a turntable formed integrally from a permanent magnet of single magnetic domain, by press fitting, adhesion, insert molding or the like; a coil of electrically conductive material around the periphery of the turntable; a power supply circuit; and a switch. Following is a description of the seventh embodiment with reference to FIG. 56, which is a vertical cross-sectional view showing the structure of the disc-chucking apparatus of the seventh embodiment, and wherein those portions that are the same as or equivalent to those shown in the fifth and sixth embodiments are assigned the same symbols and their description is omitted. FIG. 57 is a descriptive diagram showing the magnetic flux in a disc-chucking apparatus of the seventh embodiment.

In the figures, a reference numeral 1010 designates a chucking magnet which replaces the core 1001 in the fifth embodiment.

In the disc-chucking apparatus such as that described above, the loading of the disc to the recording and reproducing apparatus and the recording and reproducing process are effected in the same way as in the conventional apparatus.

Following is a description of the process by which the disc 1023 is withdrawn from the recording and reproducing apparatus. When the user turns on the switch 1009 by operating the eject switch as shown in FIG. 56, current is passed through the coil 1007 in the direction of generation of magnetic flux (dotted lines), opposite to the direction of magnetization of the chucking magnet 1010 as shown in FIG. 57. Thin reduces the magnetic flux density in the chucking magnet 1010 and also reduces the attractive force to the disc 1023. If, in this state, the hook 1036 in FIG. 93 is rotated clockwise, releasing the piece 1035, the holder 1032 will thereafter be flipped upward in the same way as in conventional apparatus.

Eighth Embodiment

Figure 58:
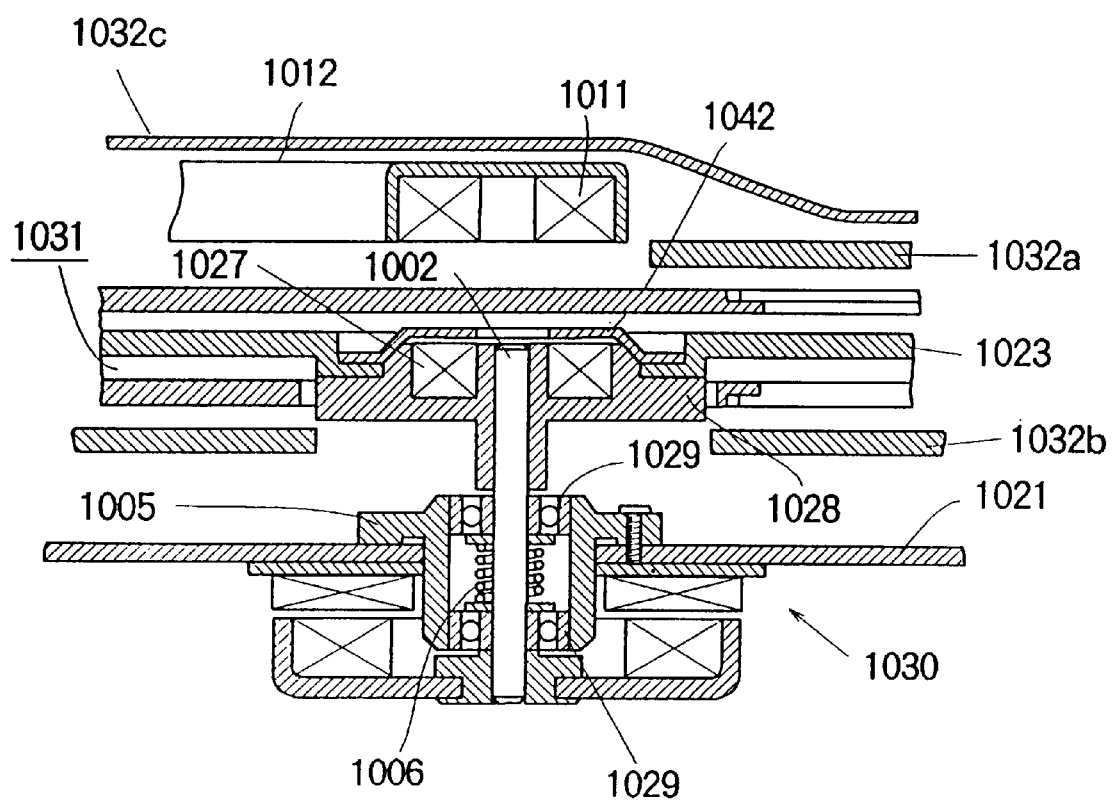
FIG. 58 is a vertical cross-sectional view showing the disc-chucking apparatus of an eighth embodiment when a disc is chucked in it.

The seventh embodiment described above shows a case in which the disc-chucking apparatus comprises a coil 1007, which is provided around a turntable formed of a soft magnetic material or a turntable formed integrally with a core made of soft magnetic material, and disposed coaxially with turntable 1028; a power supply circuit 1008 thereto; and a switch 1009 thereof. However, in the eighth embodiment, the disc-chucking apparatus comprises a turntable formed from a permanent magnet or a turntable formed integrally from a permanent magnetic material, by press fitting, adhesion, insert molding or the like; a permanent magnet disposed in a position opposite to the turntable in such a manner as to sandwich a disc; and a transfer member to move it. Following is a description of the eighth embodiment with reference to FIG. 58, which is a vertical cross-sectional view showing the structure of the disc-chucking apparatus of the eighth embodiment when a digs is chucked in it. Those portions that are the same as or equivalent to those shown in the fifth through seventh embodiments are assigned the same symbols with their description omitted.

In the figure, reference numeral 1011 designates a disc-releasing magnet magnetized in the same manner as the chucking magnet 1027 and having the same magnetic pole as that of the chucking magnet 1027 disposed oppositely; and 1012 a transfer member that moves the disc releasing magnet 1011.

These members are disposed within a partial cutout made in the upper plate 1032a of the holder 1032 in FIG. 93. The cover 1032c is formed so as to cover the upper plate 1032a and the magnet 1011, as well as the transfer member 1012.

In a disc-chucking apparatus of the structure described above, the loading of the disc to the recording and reproducing apparatus and recording and reproducing process are effected in the same way as in conventional apparatus.

Figure 59:
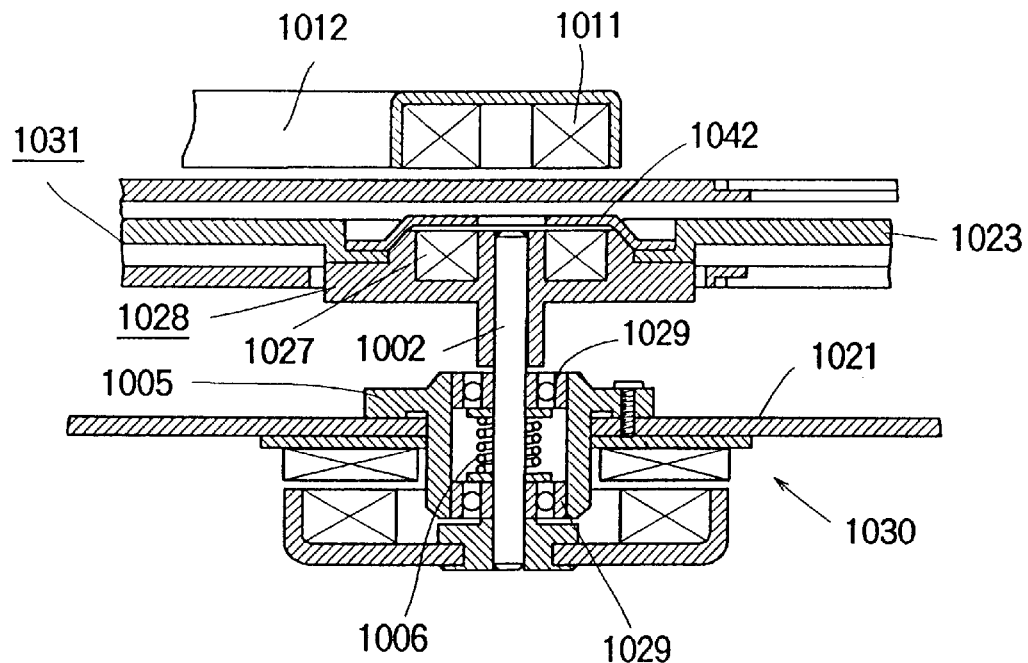
FIG. 59 is a vertical cross-sectional view showing the disc-chucking apparatus of a ninth embodiment when a disc has been released from it.

Following is a description of the process by which disc 1023 is withdrawn from the recording and reproducing apparatus. Operating the eject switch causes the transfer member 1012 to be driven, either manually or by a motor or other actuator, so that it moves toward the bottom of the drawing, that it, in the direction approaching closer to the disc, as shown in FIG. 59. This causes the magnetic flux of disc-releasing magnet 1011 and the magnetic flux of the chucking magnet 1027 cancel out each other within and in the periphery of the clamping plate 1042, reducing the attractive force to the clamping plate 1042 by the chucking magnet 1027. If in this state the hook 1036 in FIG. 93 rotates clockwise and releases the piece 1035, the holder 1032 will thereafter be flipped upward in the same way as in conventional apparatus.

Ninth Embodiment

The eighth embodiment described above shows a turntable 1028 formed from a permanent magnet or a turntable formed integrally from a permanent magnet 1027, by press fitting, adhesion, insert molding or the like; ti disc-releasing magnet 1011 magnetized in the same way as a permanent magnet 1027 disposed in a position opposite to the turntable 1028 is such a manner as to sandwich a disc and having a magnetic pole facing the chucking magnet 1027, in which the magnetic pole of the disc-releasing magnet 1011 and a magnetic pole of the chucking magnet 1027 facing each other are the same pole; and a transfer member to move it. However, in the ninth embodiment the disc-chucking apparatus comprises a turntable formed from a permanent magnet of single magnetic domain structure or a turntable formed integrally from a permanent magnet of single magnetic domain structure, by press fitting, adhesion, insert molding or the like; a coil consisting of an electrically conductive material disposed in a position opposite to the turntable in such a manner as to sandwich a disc; an electrical. power supply circuit; and a switch.

Figure 60:
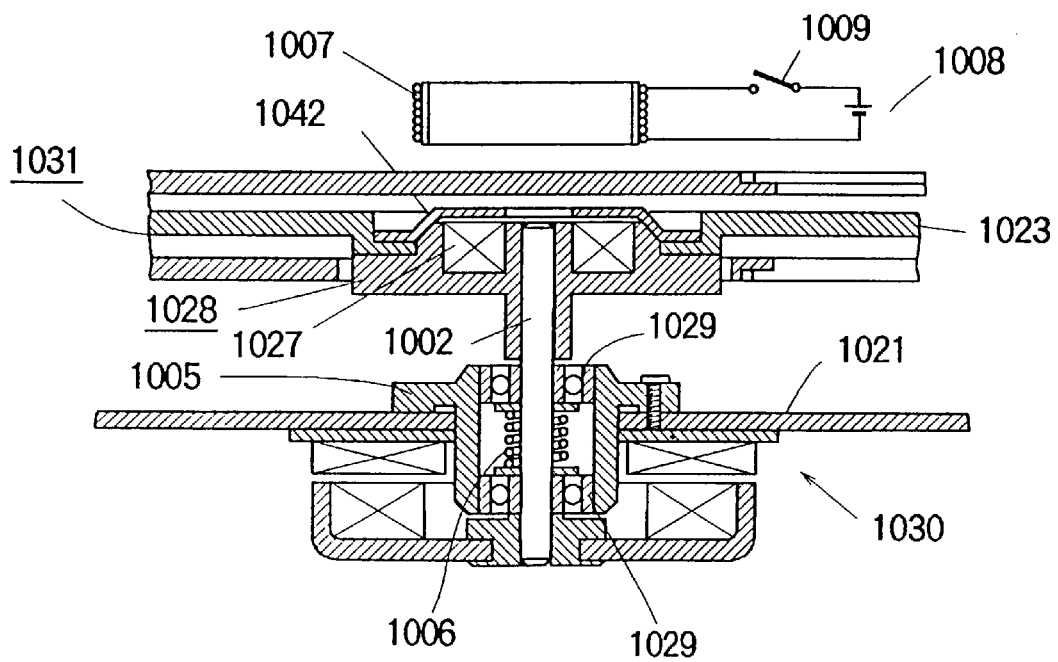
FIG. 60 is a vertical cross-sectional view showing the structure of the disc-chucking apparatus of the ninth embodiment.

Following is a description of the ninth embodiment with reference to FIG. 60, which is a vertical cross-sectional view showing the structure of the disc-chucking apparatus of the ninth embodiment, and wherein those portions that are the same as or equivalent to those shown in the fifth through eighth embodiments are assigned the same symbols and their descriptions omitted.

In a disc-chucking apparatus of the structure described above, the loading of the disc to the recording and reproducing apparatus and recording and reproducing process are effected in the same way as in conventional apparatus.

Following is a description of the process by which the disc 1023 is withdrawn from the recording and reproducing apparatus. In FIG. 60, operating the eject switch turns switch 1009 on, and as shown in FIG. 57 generates a magnetic flux in the coil 1007 in the direction opposite to the direction of magnetization of the disc release magnet 1003. This causes the magnetic flux of coil 1007 and magnetic flux of chucking magnet 1027 to cancel out each other within and in the periphery of the clamping plate 1042, reducing the attractive force to the clamping plate 1042 by the chucking magnet 1027. If in this state the hook 1036 in FIG. 93 rotates clockwise and releases the piece 1035, the holder 1032 will thereafter be flipped upward in the same way as in conventional apparatus.

Tenth Embodiment

Figure 61:
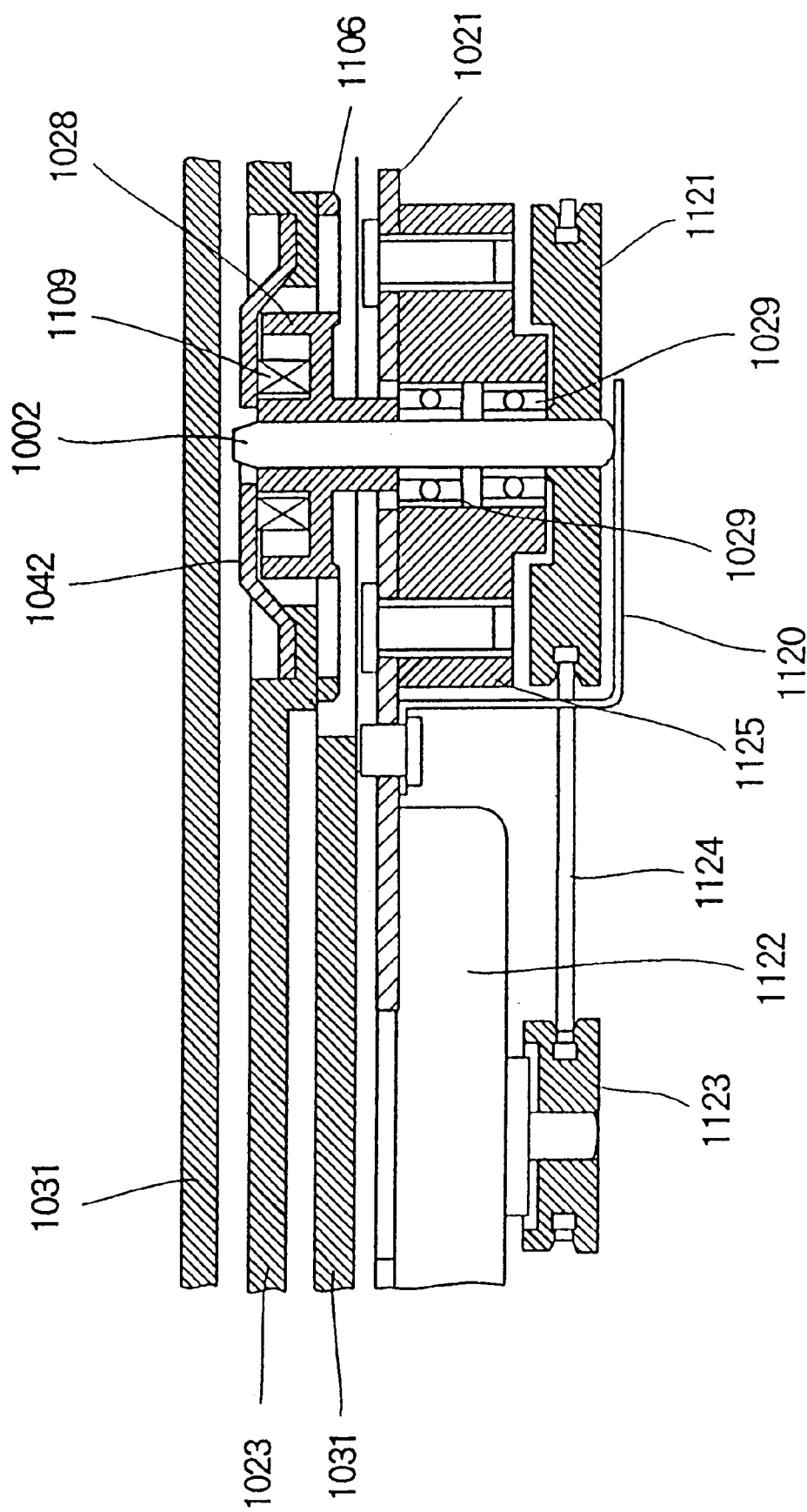
FIG. 61 is a vertical cross-sectional view of the disc apparatus of a tenth embodiment of the present invention.

FIG. 61 is a vertical cross-sectional view of the disc apparatus of a tenth embodiment of the present invention, wherein those portions that are the same as or equivalent to those of the conventional apparatus described with reference to FIG. 89 through FIG. 93 are assigned the same symbols with their descriptions omitted.

In the figure, a reference numeral 1020 designates a leaf spring formed of resilient material and secured to a base 1021; 1121 a pulley fixed by press fitting to a spindle 1002; 1122 a motor fixed to the base 1021; 1123 a pulley fixed by press fitting to the shaft of the motor 1122; 1124 a belt suspended over pulleys 1121 and 1123; and 1125 a holder that if fixed by press fitting to a bearing 1029 and supports the spindle 1002.

Following is a description of the operation thereof in FIG. 61, the leaf spring 1020 applies pushing force by one end thereof to push upward the spindle 1002. As a result of this pushing force, the upper face 1126 of the pulley 1121 establishes butt contact with the inner race of the bearing 1029, determining the height position of the turntable 1028 under normal conditions. Next, to rotate disc 1023, the rotary driving power of the motor 1122 is transmitted from the pulley 1123 by the belt 1124 to the pulley 1121, and, by means of the chucking magnet 1109, rotates the turntable 1028 to which the disc 1023 is attracted and held. If the vibration in the vertical direction is imparted to the base 1021, the motor 1022 and the holder, which are rigidly secured to the base 1021, receive vibration of virtually the same phase and amplitude, but in the tenth embodiment, since the vibration of the spindle 1002 is attenuated by the leaf spring, which constitutes a resilient material, the amplitude of the vibration is reduced.

It has been found that when the weight of the disc 1023 is 5 [g] and the sum of the weights of the turntable 1028 and the magnet 1109 are 13 [g], it is desirable that the pushing force described above be set at approximately 60 [g] to 100 [g].

Figure 62:
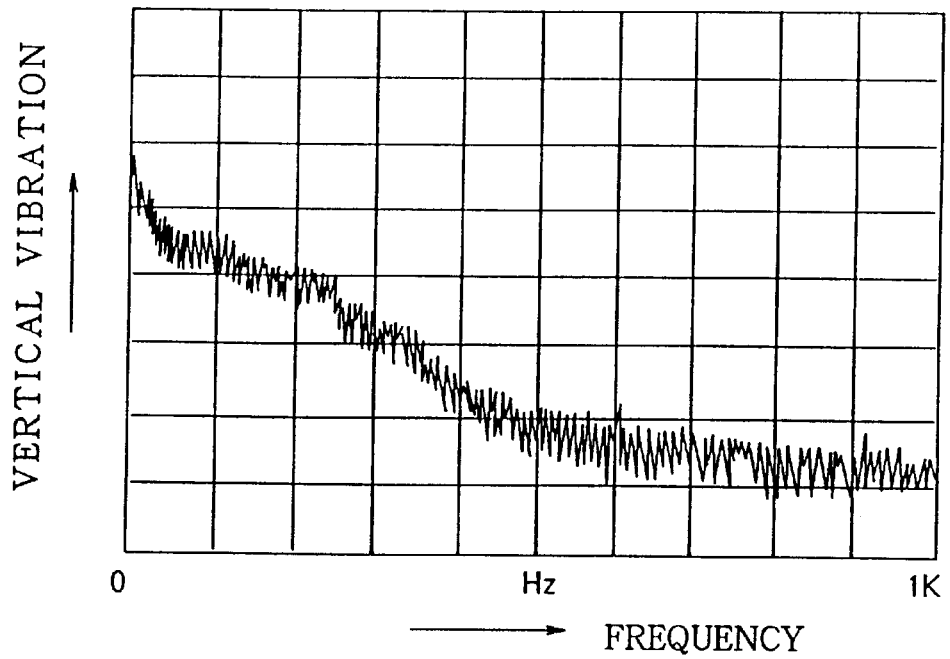
FIG. 62 is a graph plotting data measured for a disc apparatus of the tenth embodiment, when the base was vibrated with the compressive force of the leaf spring set to 80 [g].

FIG. 62 is a graph plotting the vertical vibration of the disc 1023 measured when the base 1021 was vibrated with the pushing force of the leaf spring 1020 set to 80 [g]; and FIG. 62 is a graph plotting the vertical vibration of the disc 1023 measured when the base 1021 was vibrated with the pushing force of the leaf spring 1020 set to 130 [g]. From a comparison of FIG. 62 and FIG. 63, it can be seen that even if account is taken of the characteristic frequency (180–200 [Hz]) when the disc 1023 and the turntable 1028 are clamped to the vibration source, the resonance of the disc 1023 is suppressed in FIG. 62.

Eleventh Embodiment

Figure 64:
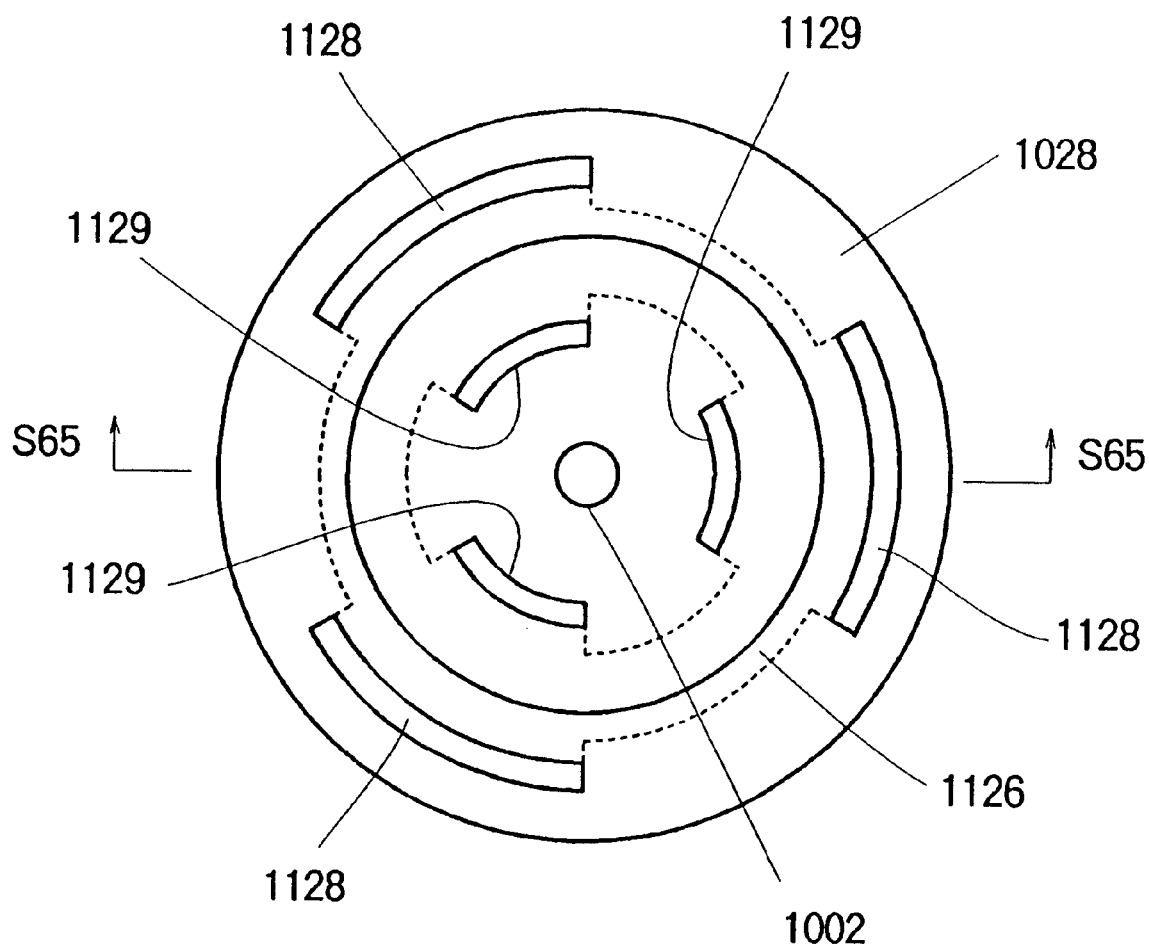
FIG. 64 is a plan view showing the turntable of the disc apparatus of an eleventh embodiment of the present invention.
Figure 65:
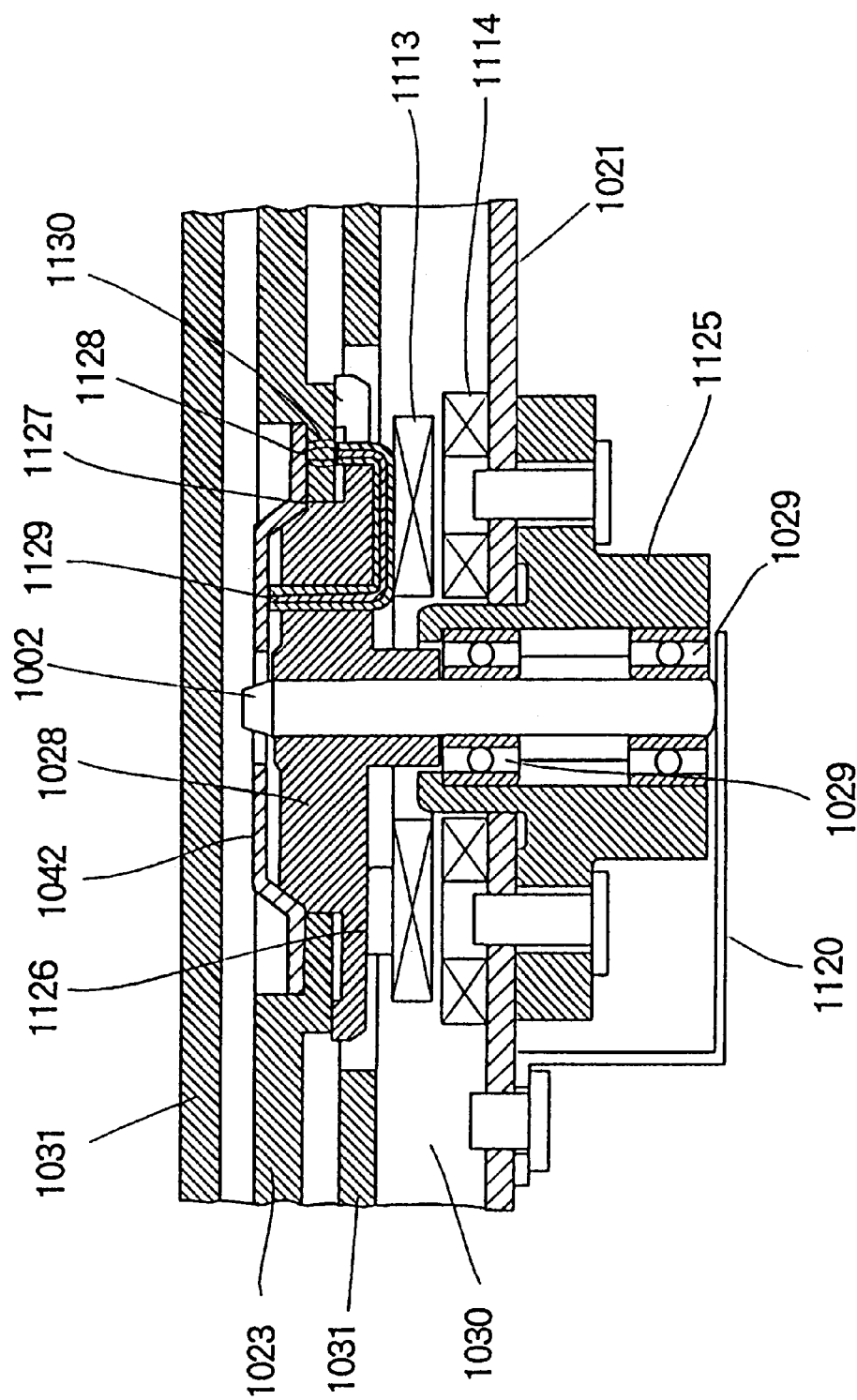
FIG. 65 is a vertical cross-sectional view taken along a line S65—S65 in FIG. 64.

FIG. 64 is a plan view showing the turntable of the disc apparatus of an eleventh embodiment according to the present invention; and FIG. 65 is a vertical cross-sectional view taken along a line S65—S65 in FIG. 64. In the figures, a reference numeral 1126 designates a yoke consisting of a magnetic material and clamped to the turntable 1028 by insert molding or the like. The yoke 1126 comprises a flat portion 1127 disposed on the lower surface of the turntable 1028, and an end portion 1128, and a projecting portion 1129. To the lower surface of the flat portion 1127 is bonded a motor magnet 1113. Both the end portion 1128 and the projecting portion 1129 extend upward through turntable 1028, at the outer and inner edges respectively of the flat portion 1127, reaching the upper surface of the turntable 1028. The projecting portion 1129 projects beyond turntable 1028. In this way, in the apparatus of the eleventh embodiment, the yoke 1126 extends from the lower surface of the turntable 1028 (the surface opposite to the surface holding the disc) to the upper surface (the surface holding the disc).

A coil 1114 of the motor 1030 is disposed oppositely to the magnet 1113, which is bonded to the turntable 1028 and is clamped to the base 1021. The magnet 1113 forms a part of the motor 1030, and at the same time generates the magnetic flux required to attract and hold the disc. Thus the magnetic flux 1130 shown in FIG. 65 is generated from the end portion 1128 and the projecting portion 1129 of the yoke 1126. The clamping plate 1042, which consists of magnetic material, is thus attracted and held by means of the magnetic flux 1130, securing the disc 1023 to the turntable 1028.

Since the base 1021 consists of magnetic material, it generates, by means of the magnetic flux of the magnet 1113, the force by which the turntable 1028 is attracted toward the base 1021, but the spring 1020 pushes spindle 1002 upward against the attractive force, thereby maintaining a gap between the magnet 111S and the coil 1114.

Twelfth Embodiment

Figure 66:
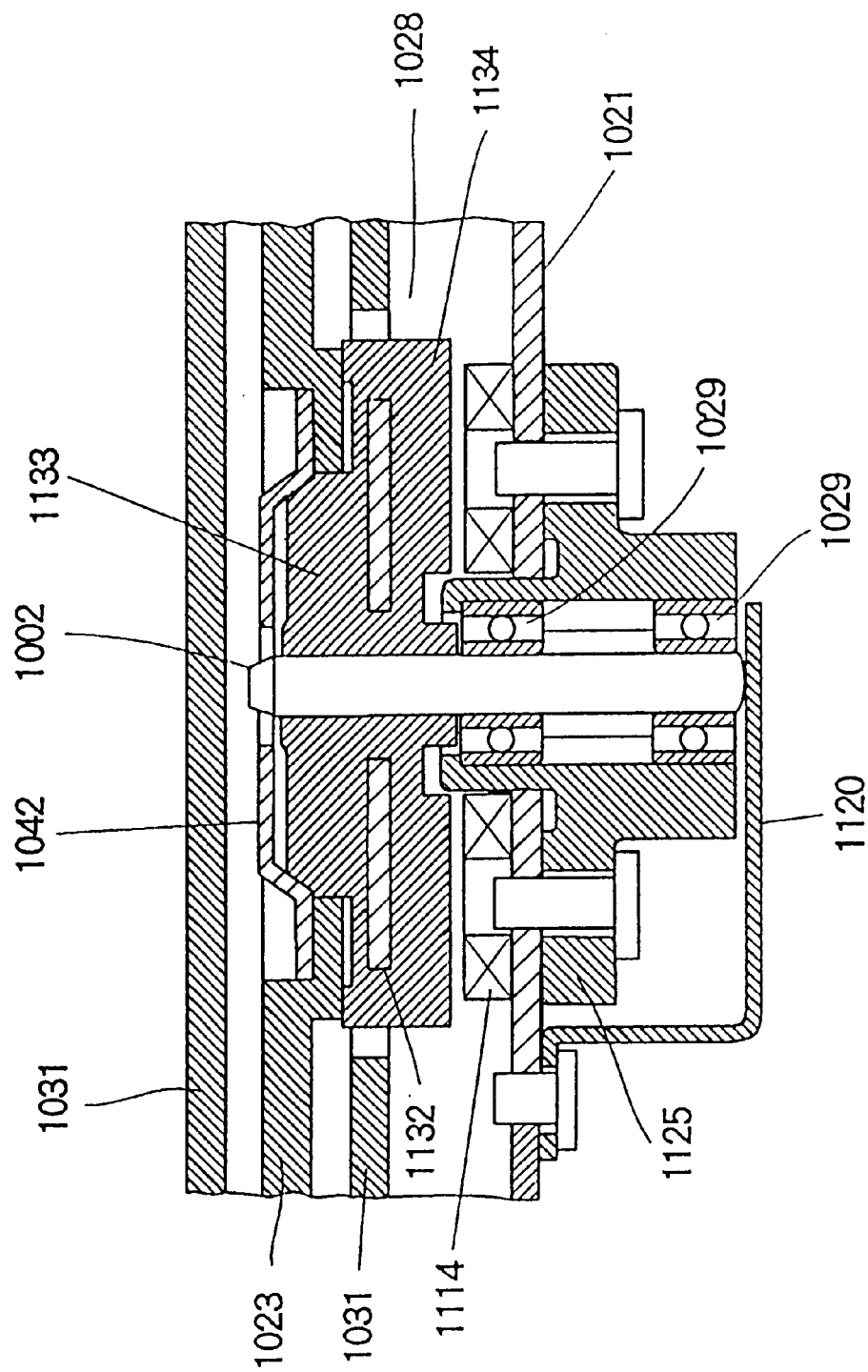
FIG. 66 is a vertical cross-sectional view showing the disc apparatus of a twelfth embodiment.

FIG. 66 is a vertical cross-sectional view showing the disc apparatus of a twelfth embodiment of the present invention, wherein reference numeral 1028 designates a turntable formed from magnetic material and magnetized; 1132 a yoke secured to the interior of the turntable 1028 by insert molding or the like; 1133 an upper magnet of the turntable 1028 magnetized above yoke 1132; and 1134 a lower magnet of turntable 1028 magnetized below yoke 1132. The upper magnet 1133 is formed with its magnetized surface on the upper surface of the turntable 1028, and the lower magnet 1133 is formed with its magnetized surface on the lower surface of the turntable 1028.

Following is a description of the operation the disc apparatus. The turntable 1028 is magnetized with any desired number of magnetic poles, for example, four as shown in FIG. 92, and since it is disposed oppositely to excitation coil 1114, which is bonded to base 1021 made of a magnetic material, the action of the excitation of the excitation coil 1114 and the magnetic flux of lower magnet 1134 causes the turntable 1028 to rotate. At this time the yoke 1132 acts as a back yoke, preventing the demagnetization of magnetized turntable 1028. Thus the end portions on the opposite side to the magnetized surfaces formed on the upper and lower surfaces of the turntable 1028 (positioned at the center of the turntable 1028) are both magnetically coupled. The yoke 1132 also increases the force by which the upper magnet 1333 attracts the clamping plate 1042.

Since the base 1021 consists of magnetic material, it generates a force that by means of the magnetic flux of the lower magnet 1134, attracts the turntable 1028 toward the base 1021, but the spring 1020 pushes upward on the spindle 1002 against this attractive force.

Thirteenth Embodiment

Figure 67:
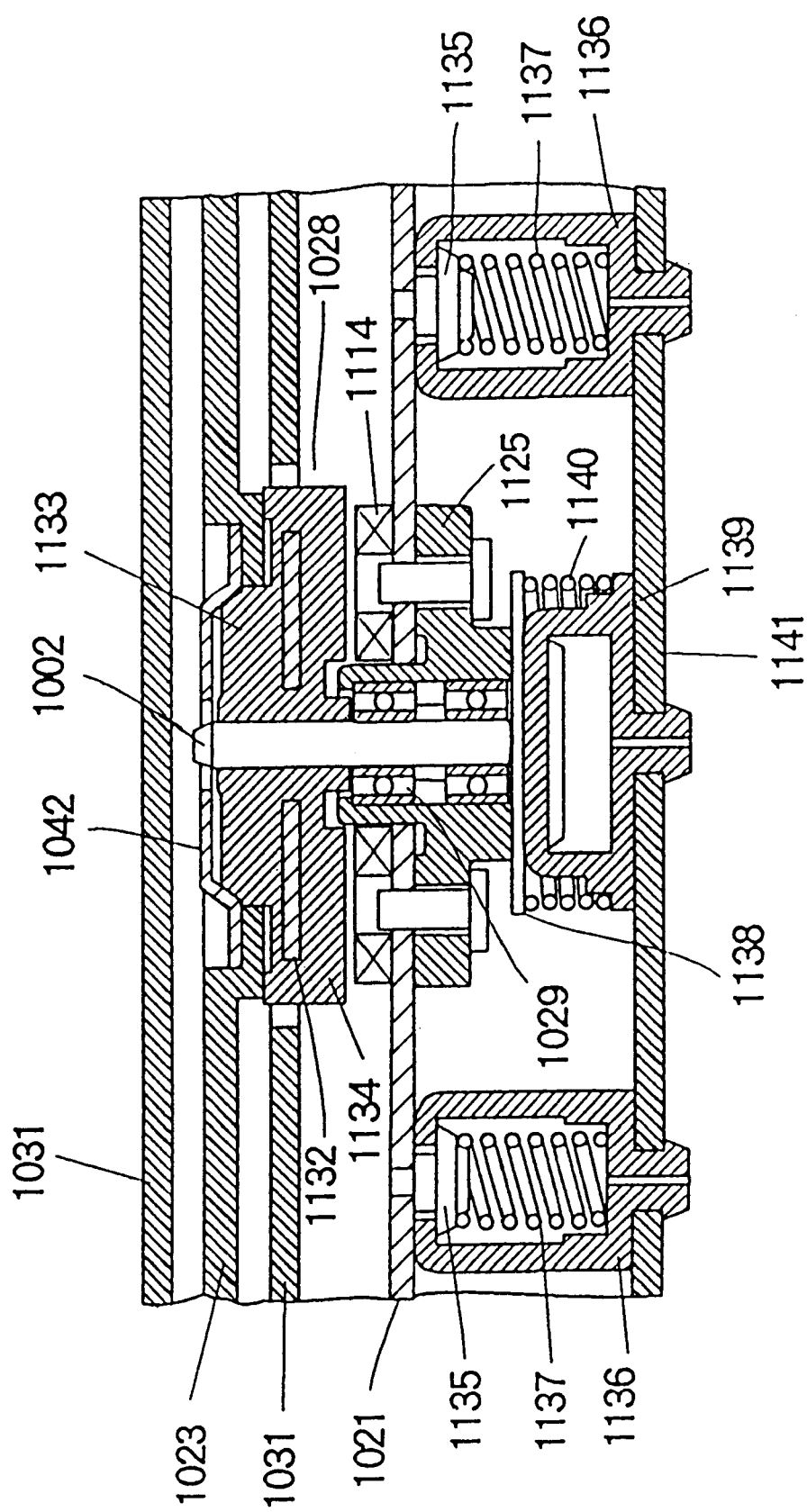
FIG. 67 is a vertical cross-sectional view showing the disc apparatus of a thirteenth embodiment of the present invention.
Figure 68:
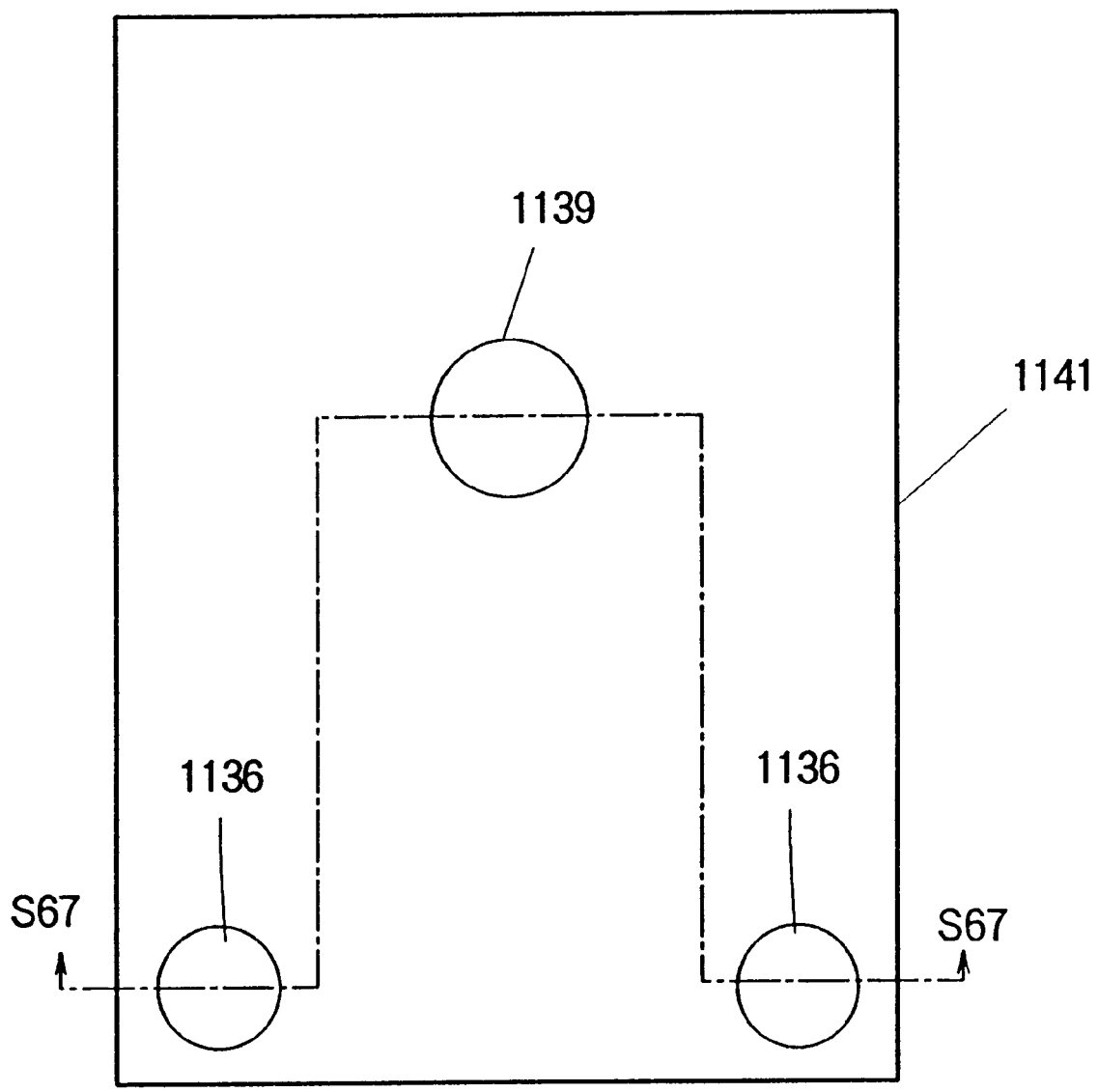
FIG. 68 is a schematic plan view of the disc apparatus of the thirteenth embodiment.

FIG. 67 is a vertical cross-sectional view showing the disc apparatus of a thirteenth embodiment of the present invention; and FIG. 68 is a schematic plan view of the disc apparatus showing an arrangement of the vibration-damping rubber pads on the chassis. The cross section in FIG. 67 is along a chain line S67—S67 in FIG. 68. In the figures, there are implanted in the base 1021 a pair of pins 1135 into which are fitted a pair of vibration-damping rubber pads 1136 of abbreviated cylindrical shape. A compressed springs 1137 are disposed inside the vibration-damping rubber pads 1136. At the lower end of the spindle 1002 is disposed a thrust bearing 1138, and one end of the vibration-damping rubber pad 1139 having abbreviated cylindrical shape establishes butt contact with the lower surface of the thrust bearing 1138. A compressed spring 1140 is disposed on the outer periphery of the vibration-damping rubber pad 1139. The other ends of the vibration damping rubber pads 1136 and 1139 are secured to the chassis 1141.

As shown in FIG. 68, the chassis 1141 when viewed from above is of abbreviated rectangular shape, and the vibration-damping rubber pads 1139, 1136, and 1136, as shown in the figure, are disposed at the vertices of a triangle, supporting the base 1021 at three points.

Following is a description of the operation the disc apparatus. The compressed spring 1137 and the compressed spring 1140 maintain equilibrium with the total weight of the base 1021 and the components mounted thereon. The vibration-damping rubber pads 1136 and vibration-damping rubber pad 1139 absorb vibration transmitted from the chassis 1141 to the base 1021. The compressed spring 1140 pushes upward the turntable 1028 via the thrust bearing 1129, against the weight of turntable 1028 and the attractive force of lower magnet 1134. Further, since the vibration-damping rubber pad 1139 is disposed under the spindle 1002 and supports the Spindle 1002, the vibration transmitted the base 1021 from the chassis 1141 is decreased.

Fourteenth Embodiment

Figure 69:
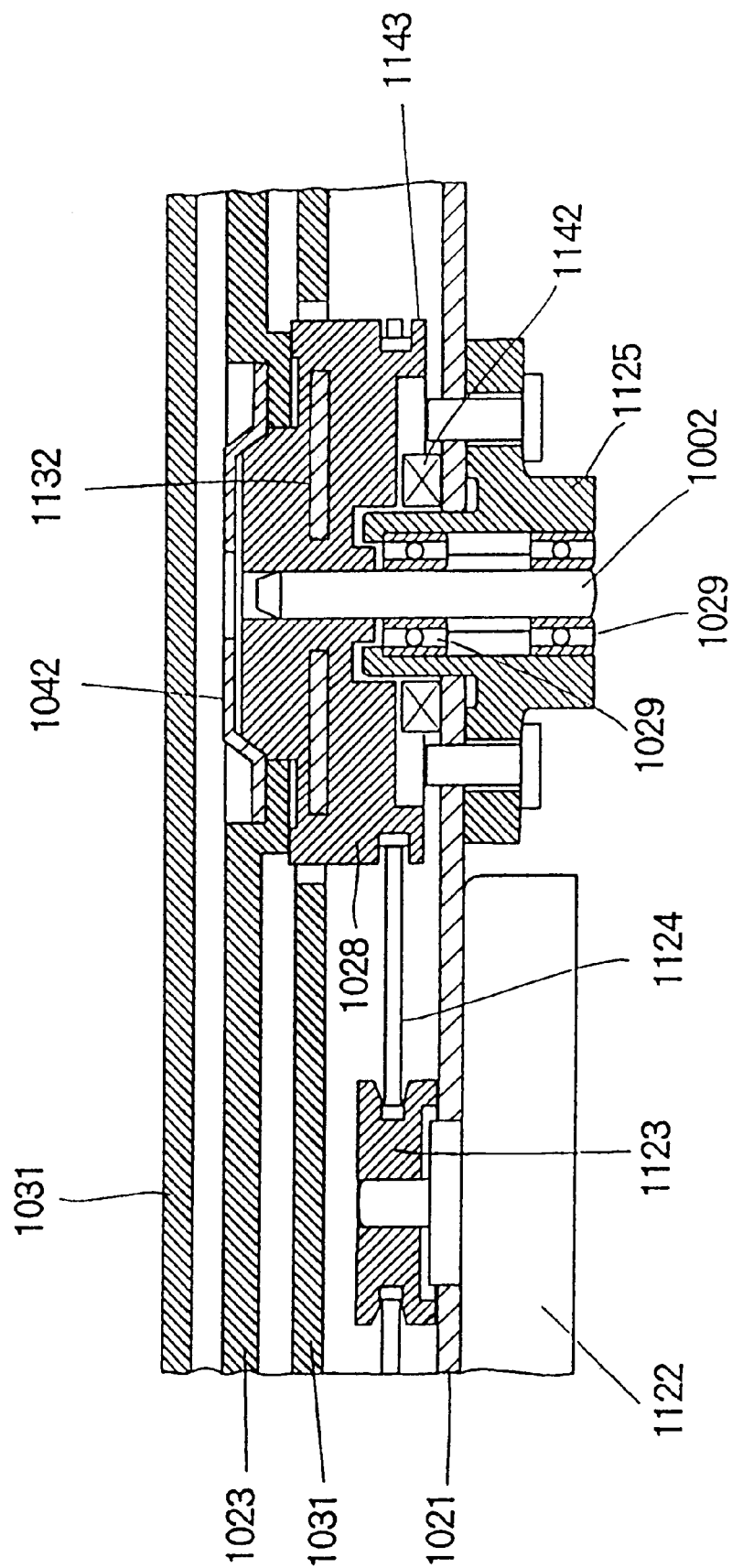
FIG. 69 is a vertical cross-sectional view showing the disc apparatus of a fourteenth embodiment of the present invention.

FIG. 69 is a vertical cross-sectional view showing the disc apparatus of a fourteenth embodiment of the present invention. In the figure, a reference numeral 1142 designates an excitation coil secured to the base 1021 and disposed oppositely to the turntable 1028, which is magnetized so that its upper portion is a north magnetic pole and its lower portion is a south magnetic pole; 1143 a pulley formed on the turntable 1028; and 1124 a carries belt, which is wounded around the pulley 1143 and a pulley 1123 fixed to a motor 1122.

Following is a description of the operation of the fourteenth embodiment. In the space between the magnetized turntable 1028 and the base 1021. consisting of magnetic material, there is generated a force that draws the turntable 1028 toward the base 1021. Further the force gravity acts downward unto the turntable 1028. To oppose these forces, a current is applied to the excitation coil 1142, and the turntable 1028 and the excitation coil 1142 are placed in opposite positions, thereby generating a magnetic field in a direction that repels the south magnetic pole in the lower portion of turntable 1028. This results in the positioning of the turntable 1028 at a height at which the attractive force and gravitational force acting downward on the turntable 1028 are in equilibrium with the repulsive force of the excitation coil 1142. Further, the components that determine the vertical positioning of the turntable 1028 and the spindle 1002 are not in butt contact in the vertical direction, so that little up-and-down motion is imparted to the turntable 1028 as a result of vibration of the base 1021.

Fifteenth Embodiment

Figure 70:
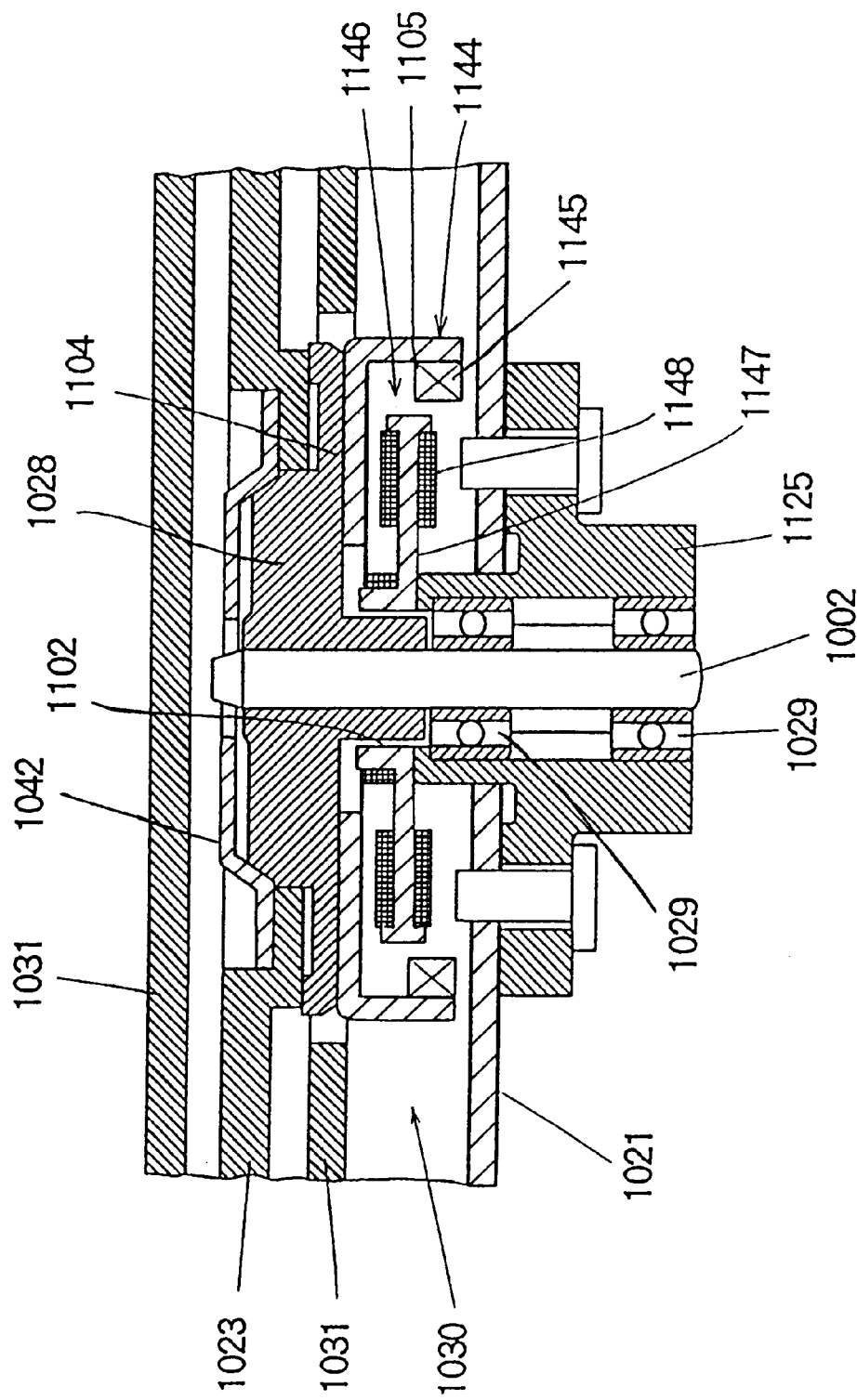
FIG. 70 is a vertical cross-sectional view showing the disc apparatus of a fifteenth embodiment of the present invention.

FIG. 70 is a vertical cross-sectional view showing the disc apparatus of a fifteenth embodiment of the present invention, wherein the turntable 1028 is magnetized so that its upper portion is a north magnetic pole and its lower portion is a south magnetic pole. The yoke 1144 comprises an annular portion 1104 secured to the lower surface of the turntable 1028 and a cylindrical portion 1105 that extends downward from the periphery of the annular portion. At the inner surface near the bottom edge of cylindrical portion 1105 is secured a magnet 1145 magnetized with any desired number of magnetic poles. A core 1146 has a cylindrical portion 1102 secured to the holder 1125 and a plurality of the projecting portions 1147 extending radially outward from the cylindrical. portion 1102. On projecting portion 1147 is wound a coil 1148, and on the cylindrical portion 1102 is wound an excitation coil. Thus the yoke 1144, the magnet 1145, the core 1146 and the coil 1148 form a motor which drives the turntable 1028. There is a magnetic gap between the magnet 1145 and the core 1146 near periphery of the motor.

Following is a description of the operation the fifteenth embodiment. The magnet 1145 and the projecting portion 1147 are disposed at an offset in the vertical direction, so that the attractive force acting on the magnet 1145 and the projecting portion 1147 exerts an upward force on the turntable 1028. Meanwhile, current is applied to the excitation coil 1149 generating a magnetic field that attracts the south magnetic Pole on the lower portion f the turntable 1028. This results in an equilibrium between the attractive force of the magnet 1145 and the projecting portion 1147 on the one hand, and the attractive force of the turntable 1028 and the excitation coil 1149 on the other, determining the vertical positioning of the turntable 1028. At this point the turntable 1028 is in a floating state. Accordingly, the components that determine the vertical positioning of the turntable 1028 and the spindle 1002 are not in butt contact in the vertical direction, so that little up-and-down motion is imparted to the turntable 1028 as a result of vibration of the base 1021.

Sixteenth Embodiment

Figure 71:
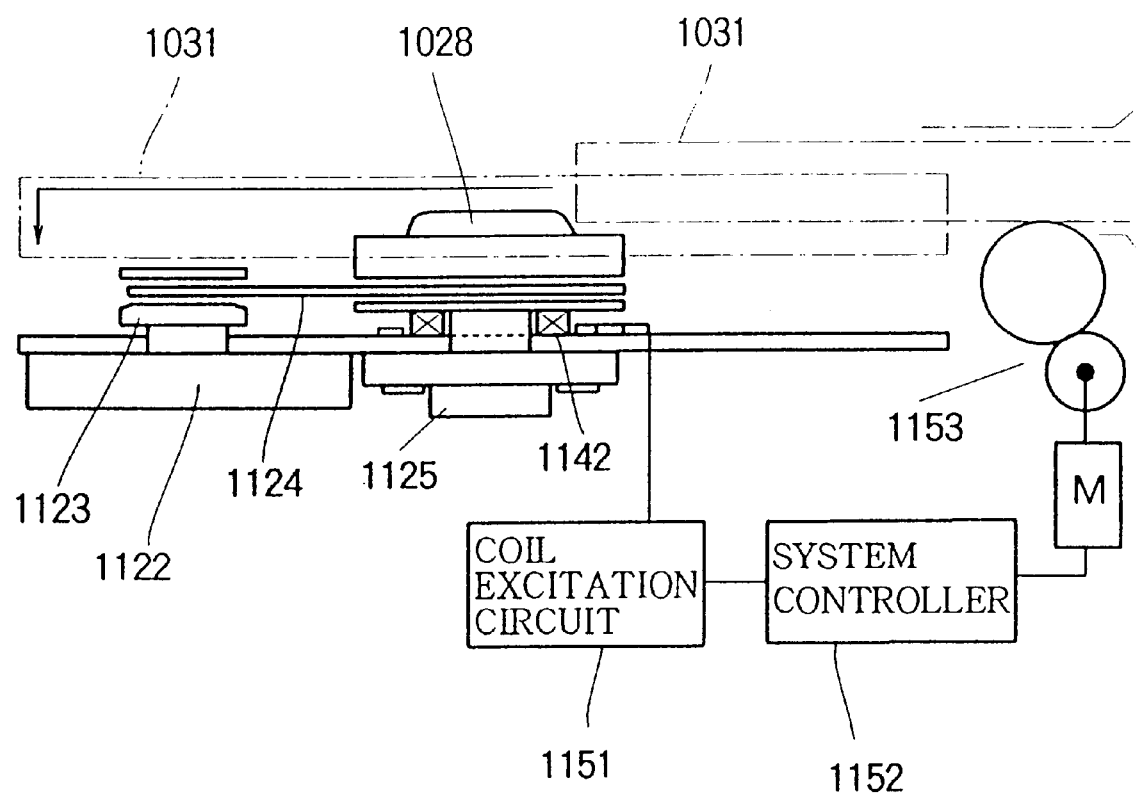
FIG. 71 is a block diagram showing the disc apparatus of a sixteenth embodiment of the present invention.

FIG. 71 is a block diagram showing the disc apparatus of a sixteenth embodiment of the present invention, which is similar to the disc apparatus of the fourteenth embodiment, being further provided with a coil excitation circuit 1151 connected to excitation coil 1142 of the disc-chucking apparatus; a system controller 1152 connected to the coil excitation circuit 1151; and a cartridge transport mechanism 1153 in which a cartridge 1031 is loaded, whose operation is controlled by the system controller 1152

Following is a description of the operation the sixteenth embodiment. To load the cartridge 1031 in the disc-chucking apparatus, a signal from the system controller 1152 causes the cartridge transporter mechanism 1153 to operate. The cartridge 1031 then moves horizontally in the direction of the turntable 1028. At this time the bottom surface of the cartridge 1031 limits the height of the apparatus, so that it is set at a position lower than that of the upper surface of the turntable 1028. But at the same time as the system controller 1152 issues instructions for the operation of the cartridge transport mechanism 1153, a signal for the application of current to the coil excitation circuit in such a direction as to draw the turntable 1028 downward. The current to the coil excitation circuit flows in the counter direction to the current of the excitation coil 1149 in the fourteenth embodiment. This brings the upper surface of the turntable 1028 below the lower surface of the cartridge 1031, so that there is no interference between the turntable 1028 and the cartridge 1031.

When the transport operation has been completed, the system controller 1152 senses a signal indicating that the operation of the cartridge transport mechanism has reached the final stage, sends a signal to apply current to the coil excitation circuit in such a direction as to cause the turntable 1028 to float, the current having the same polarity as the one as was applied to the excitation coil 1149 in the fourteenth embodiment. The magnetized turntable 1028 then attracts and holds the clamping plate 1042, positioning the disc 1023 at the prescribed height so that it can be played.

Seventeenth Embodiment

Figure 72:
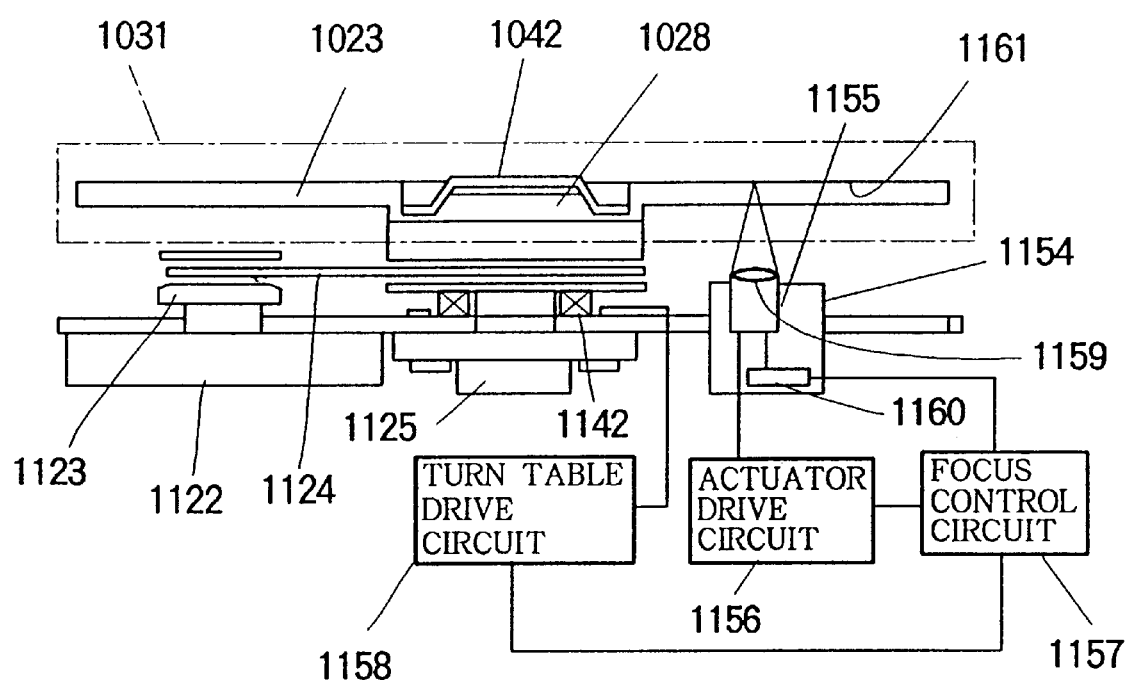
FIG. 72 is a block diagram showing the disc apparatus of a seventeenth embodiment of the present invention.

FIG. 72 is a block diagram showing the disc apparatus of a seventeenth embodiment of the present invention, which is similar to the disc apparatus of the fifteenth embodiment, being further provided an optical pickup 1154 that reproduces or records information on the disc 1023; a focus actuator 1155 that forms part of optical pickup 1154; an actuator drive circuit 1156 that drives focus actuator 1155; a focus control circuit 1157 that controls the focus of optical pickup 1154; a turntable drive circuit 1158 that is connected to control circuit 1157 and excitation coil 1142; an optical lens 1159 that is mounted to the focus actuator 1154; and a detector 3154 that is built into the optical pickup 1154.

Following is a description of the operation of the seventeenth embodiment. When the magnetized turntable 1028 is rotated, the attraction between the clamping plate 1042 and the turntable 1028 causes the disc 1023, which is held securely to the turntable 1028 to rotate therewith. At this time, the optical pickup 1154 reads the signals recorded on the disc 1023, but the height of the disc 1023 varies due to wobbling of the turntable 1028 and waviness of the disc 1022. When the distance between signal recording surface 1161 and optical lens 1159 deviates from the focal distance, the detector 1160 outputs to the control circuit 1157 a potential of a level corresponding to the error. The potential of a level corresponding to the error is positive when the distance is greater than the focal distance, and negative when when the distance is close to the focal distance. Then, based on information from the detector 1160, which detects variations in the distance between the optical lens 1159 and the signal recording surface 1161, the drive circuit 1156 drives the focus actuator 1155 and, by means of the control circuit 1157, maintains the distance between the optical lens 1159 and the signal recording surface 1161 constant.

However in the event that, due to disc production variation or errors in the assembly of the disc apparatus, the variations in distance between the optical lens 1159 and the signal recording surface 1161 are extreme, that is to say, when the focal point of the optical lens cannot form an image on the signal recording surface 1161 within the range of movement of the focus actuator 3155, the control circuit 1157 activates the turntable drive circuit 1158, which, on the basis of information from the control circuit 1157, applies current to the excitation coil 1142, and by means of the excited excitation coil 1142, changes the height of the magnetized turntable 1028. When, for example, the voltage of the detector 1160 is positive, even when the focus actuator has moved the optical lens 1159 nearly to the topmost portion of the range of movement, control circuit 1157 sends a negative voltage to turntable drive circuit 1158. At this point the turntable drive circuit 1158 applies current to the excitation coil 1142 in a direction such as to cause the turntable 1028 to descend so that the turntable 1028 descends slightly and the focal point of the optical lens 1159 comes within the range of movement of the focus actuator 1155, enabling the optical pickup 1154 to read the information on the disc 1023.

Eighteenth Embodiment

Figure 73:
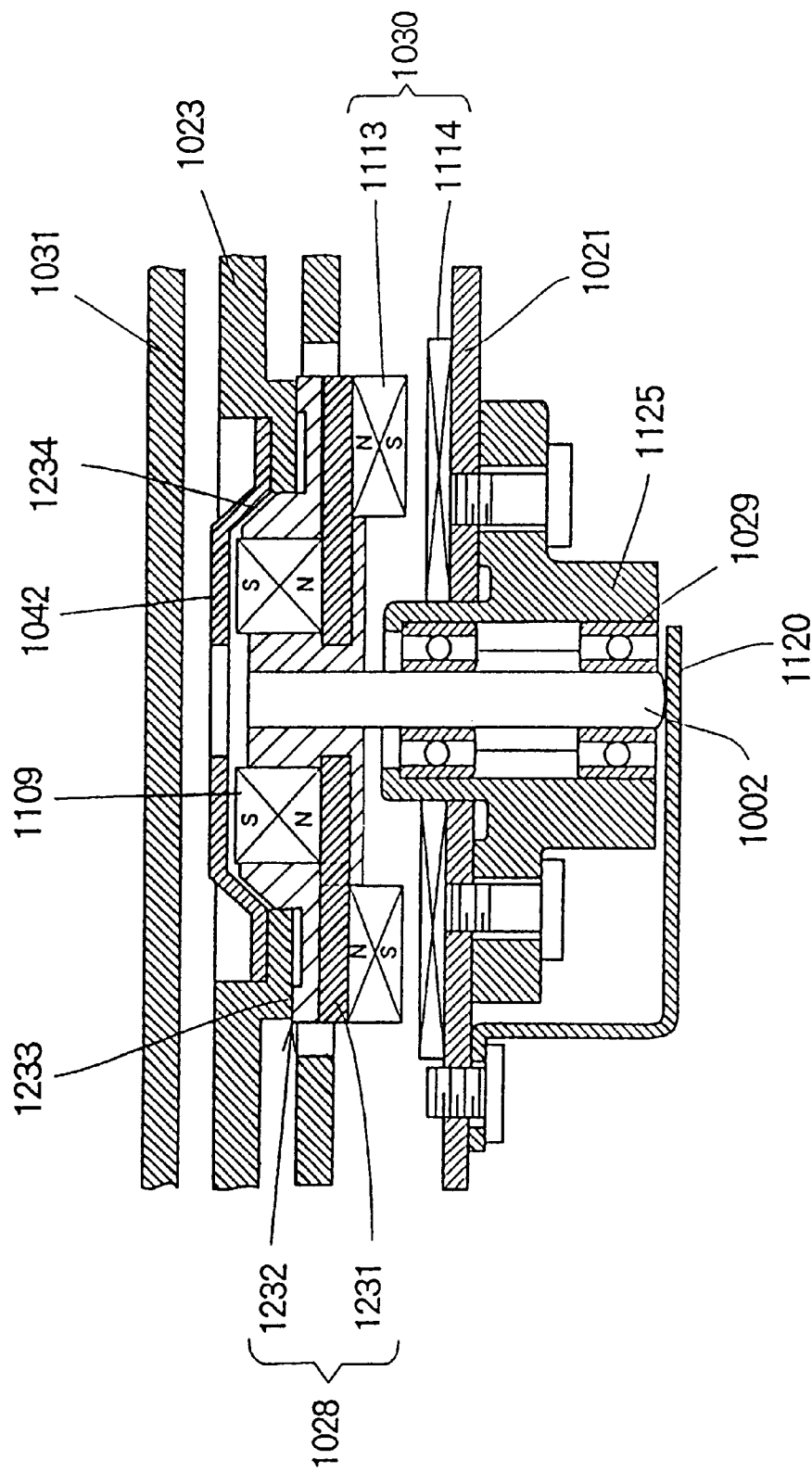
FIG. 73 is a vertical cross-sectional view showing the structure of the disc apparatus of an eighteenth embodiment of the present invention.
Figure 74:
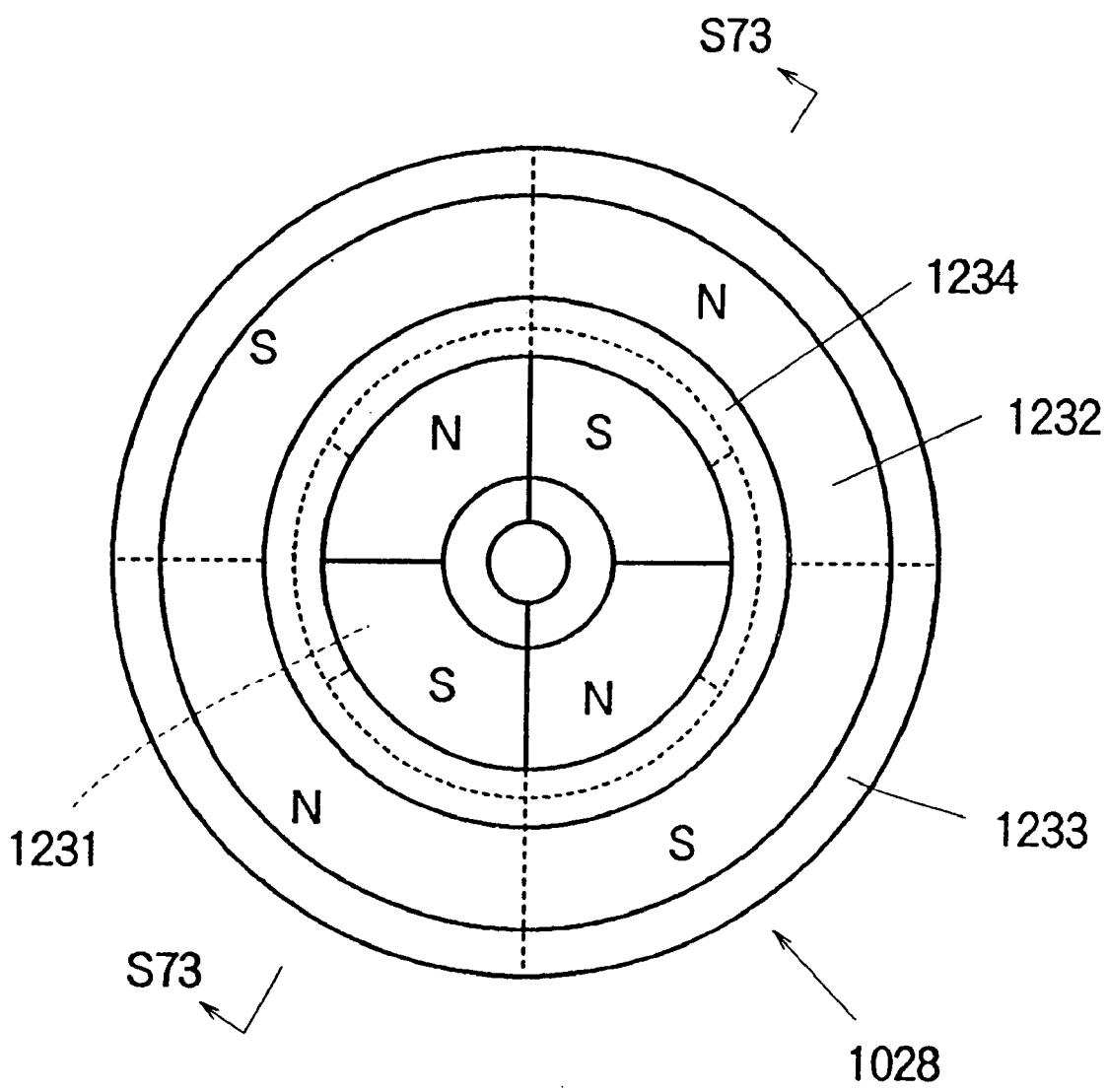
FIG. 74 is a plan view showing the turntable of the disc apparatus of this eighteenth embodiment.

FIG. 73 is a vertical cross-sectional view showing the structure of the disc apparatus of an eighteenth embodiment of the present invention; and FIG. 74 is a plan view showing the turntable of the disc apparatus of the eighteenth embodiment. The cross section in FIG. 73 is along line S73—S73 in FIG. 74. Those portions that are the same as or equivalent to those in the drawings showing conventional apparatus or the drawings showing embodiments described above are assigned the same symbols and their description is omitted.

In the figures, a reference numeral 1120 designates a leaf spring secured to a base 1021 made of a resilient material. and supporting the lower end of spindle 1002. A reference numeral 1125 designates a holder supporting spindle 1002 via bearing 1029; 1231 a magnetic material forming a portion of the turntable 1028; 1232 a hub that is molded of plastic on the magnetic material 1231; 1233 a flange formed on hub 1233; 1234 a centering portion formed on hub 1234, In which the chucking magnet 1109 is bonded to the upper surface of the magnetic material 1231 and the motor magnet 1113 is bonded to the lower surface of the magnetic material 1231.

That is to say, the magnetic material 1231 is of abbreviated annular shape centered around the spindle 1002, with the lower magnetized surface of the upper magnet 1109 coupled to the inner side of its upper surface, and the upper magnetized surface of the lower magnet 1113 coupled to the outer side of its lower surface. The upper magnetized surface of the upper magnet 1109 is formed on the upper surface of the turntable 1028 (the surface on which the disc is held) and generates the magnetic flux to attract the clamping plate of the disc. The magnetized surface on the lower side of the lower magnet 1113 is opposed to the coil 1114 mounted to the base 1021, and together with the coil 1114 forms the motor that causes the turntable 1028 to rotate.

Both the lower magnetized surface of the upper magnet 1109 and the upper magnetized surface of the lower magnet 1113 are north poles, and the magnetic material 1221 acts as a back yoke, Joining them and preventing demagnetization of the magnets.

Because of the need to keep the disc 1023 at the prescribed position, a flange 1233 and a centering piece 1234 are molded of plastic, by sandwiching plastic between extrusion molding dies and the magnetic material 1231 which is press-molded from sheet material.

Nineteenth Embodiment

Figure 75:
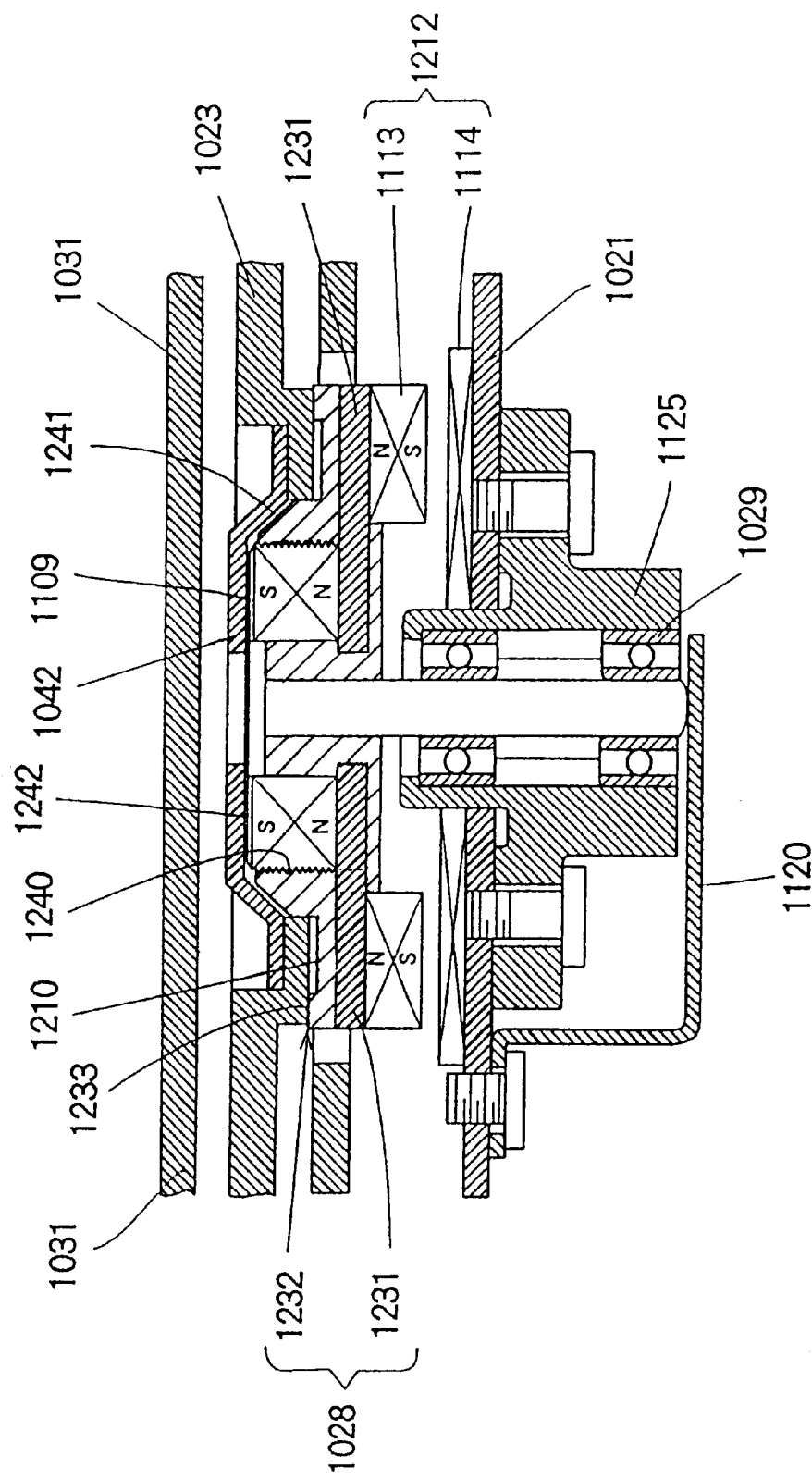
FIG. 75 is a vertical cross-sectional view showing the structure of the disc-chucking apparatus of a nineteenth embodiment of the present invention.

FIG. 75 is a vertical cross-sectional view showing the structure of the disc-chucking apparatus of a nineteenth embodiment of the present invention, in which reference numeral 1240 designates a female-threaded portion formed on the turntable 1028 and extending in the direction of the spindle 1002; 1241 a female-threaded portion formed on the chucking magnet 1109 and extending in the direction of the spindle 1002; and 1242 a slit formed in chucking magnet 1109.

Following is a description of the operation of the nineteenth embodiment. Generally, because speaking magnets formed by sintering of the rare earth elements and the like are of poor dimensional accuracy, such variations must be taken into account when determining the distance of separation from the clamping plate 1042. As the distance between the magnet and the magnetic material increases, however, there is a dramatic drop in attractive force. Accordingly, in order that the upper surface of the chucking magnet 1109 coincide with the reference height during assembly of the apparatus, a tool (such as, for example, a flat-head screwdriver) is inserted into the slit 1242 and turned to adjust the height.

Twentieth Embodiment

Figure 76:
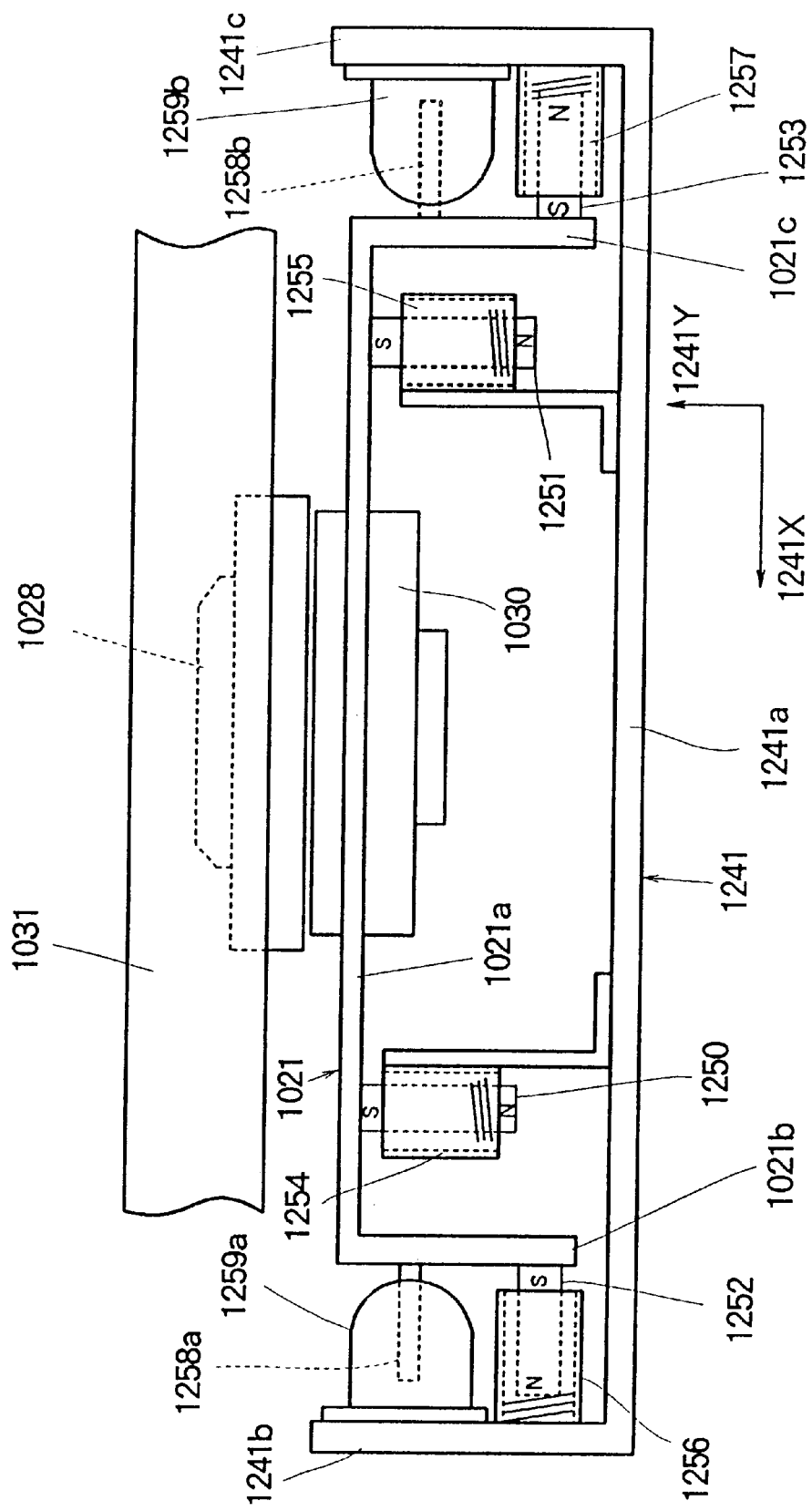
FIG. 76 is a side view of the structure of the disc apparatus of a twentieth embodiment of the present invention.

FIG. 76 is a side view of the structure of the disc apparatus of a twentieth embodiment of the present invention, which is provided with a suspension apparatus which suspends the base 1021. In a free or floating state with respect to the chassis 1241. In addition, this suspension may be effected both in cases where the disc apparatus is disposed as shown in the figure (with the lower portion in the figure being arranged at the bottom) and in case the portion at the left or right side in the drawing is arranged at the bottom. As has been previously described, on the base 1021 is held the turntable 1028, on top of which the cartridge is placed. On the base 1021 is additionally held a motor, and the suspension apparatus suspends the base 1021 holding the components.

As shown in the figure, the suspension apparatus is provided with first through fourth suspension magnets 1250–1253; first through fourth suspension coils 1254–1257; first and second pins 1258a and 1258b; and vibration-damping rubber pads 1259a and 1259b.

The first and second suspension magnets 1250 and 1251 are of abbreviated rod shape, and each has one end secured to the lower surface of a main flat portion 1021a of the base 1021. extending downward 1from the lower surface perpendicular to the lower surface, and magnetized in that direction. Third and fourth suspension magnets 1252 and 1253 each has one end secured to the outer surface of side surface portions 1021b and 1021c of base 1021, extending outward from the outer and magnetized in that direction.

The first and second suspension coils 1254 and 1255 each has one end secured to the upper surface of the lower plate 1241s of the chassis 1241, extending upward from the upper surface perpendicular to the upper surface, and in that direction passing through the first and second suspension magnets 1250 and 1251, so that, when an electrical current flows, a magnetic field is generated in the direction of magnetization of the magnets 1250 and 1251. The third and fourth suspension coils 1256 and 1257 each has one end secured to the inside surface of the side plates 124b and 1241c of the chassis 1241, extending inward from the inner surface perpendicular to the inner surface, and in that direction passing through the third and fourth suspension magnets 1252 and 1253, so that, when an electrical current flows, a magnetic field is generated in the direction of magnetization of the magnets 1252 and 1253.

The pins 1258a and 1258b are implanted (generally secured) to the side surfaces 1023b and 1021c of the base 1021, extending outward from the side surfaces. The vibration-damping rubber pads 1259a and 3259b are secured to the side plates 1141b and 1341c of the chassis 1141 and engaged with the pins 1258a and 1258b.

Following is a description of the operation the twentieth embodiment. When a disc apparatus is to be installed in the passenger compartment or trunk of a motor car, the apparatus may be arranged, depending on the space available, either with the part shown at the bottom of FIG. 76 at the bottom, or with the part shown at the left side or right side of FIG. 76 at the bottom. In order that disc reproduction be free of interference no matter which arrangement is adopted, the base 1021 is kept free of the chassis 1141 by means of the vibration-damping rubber pads 1258a and 1258b formed of an elastic material.

When installing the apparatus with the part shown at the bottom of FIG. 76 at the bottom, that is to say, so that arrow 1241Y points upward, a force due to the weight of the base 1021 and the components mounted thereon acts in a direction opposite to that of arrow 1241Y. At that point a voltage is applied to the first suspension coil 1254 and the second suspension coil 1255 generating a magnetic field, and as a result of the action of the magnet flux produced by the first suspension magnet 1250 arid the second suspension magnet 1251, the base 1021. is pushed upward in the direction of arrow 1241Y maintaining it in a position of equilibrium with the force exerted by the weight.

Again, when installing the apparatus with the part shown at the right side of FIG. 76 at the bottom, that is to say, so that arrow 1241X points upward, a force due to the weight of the base 1021 and the components mounted thereon acts in a direction opposite to that of arrow 1241X. At that point a voltage is applied to the third suspension coil 1256 and the fourth suspension coil 1257 generating a magnetic field, and as a result of the action of the magnet flux produced by the third suspension magnet 1252 and the fourth suspension magnet 1253, the base 1021 is pushed upward in the direction of arrow 1241X maintaining it in a position of equilibrium with the force exerted by the weight.

Similarly, when installing the apparatus with the part shown at the left side of FIG. 76 at the bottom, that is to, so that the direction opposite to arrow 1241X is upward, a force due to the weight of the base 1021 and the components mounted thereon acts in the direction of arrow 1241X. At that point a voltage opposite to that described above is applied to the third suspension coil 1256 and the fourth suspension coil 1257 generating a magnetic field, and as a result of the action of the magnet flux produced by the third suspension magnet 1252 and the fourth suspension magnet 1253, the base 1021 is pushed upward in a direction opposite to that of arrow 1241X maintaining it in a position of equilibrium with the force exerted by the weight.

In the twentieth embodiment described above, the suspension coils 1254–1257 are mounted to the chassis 1241 and the suspension magnets 1250–1253 are mounted to the base 1021, but it is equally possible, on the contrary, to mount the suspension magnets 1250–1253 on the chassis 1241 and the suspension coils 1254–1257 on the base 1021.

Twenty-first Embodiment

Figure 77:
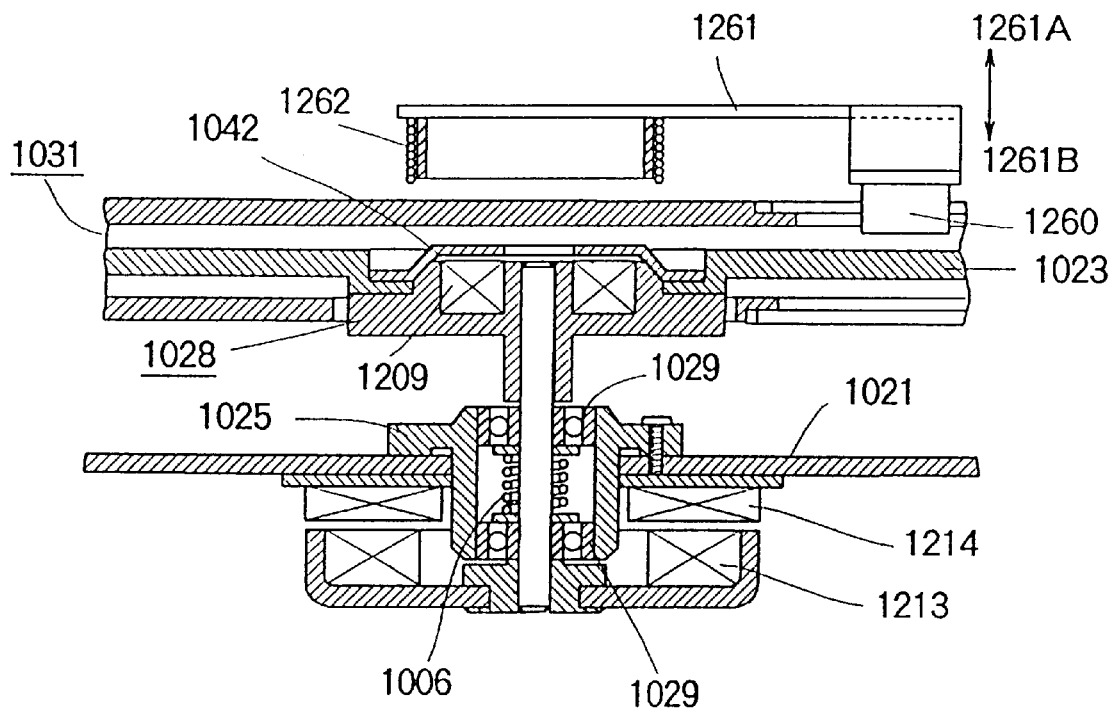
FIG. 77 is a vertical crosssectional view showing the structure of the disc apparatus of a twenty-first embodiment of the present invention.

FIG. 77 is a vertical cross-sectional view showing the structure of the disc apparatus of a twenty-first embodiment of the present invention, wherein a reference numeral 1260 designates a magnetic recording head that generates a magnetic flux for recording onto the disc 1023; 1261 a holder securing the magnetic recording head 1260; and 1262 a coil secured in the holder 1261.

Following is a description of the operation the twenty-first embodiment. When the cartridge 1031 is loaded into the apparatus, the holder 1261 is separated from the recording surface of the disc as indicated by arrow 1261A. When loading is completed, the holder 1261 moves in the direction of arrow 1261B bringing the magnetic recording head 1260 into proximity with the disc 1023. Recording is accomplished in this state by generating a magnetic field in the magnetic recording head 1260.

To eject the cartridge 1031, the holder 1261 is moved in the direction of arrow 1261A, the magnetic recording head 1260 is separated from the cartridge 1031. If a voltage is applied to the coil 1262 at this time, a magnetic field is generated canceling or weakening the magnetic field of the chucking magnet and facilitating the ejection of the cartridge 1031.

Twenty-second Embodiment

Figure 78:
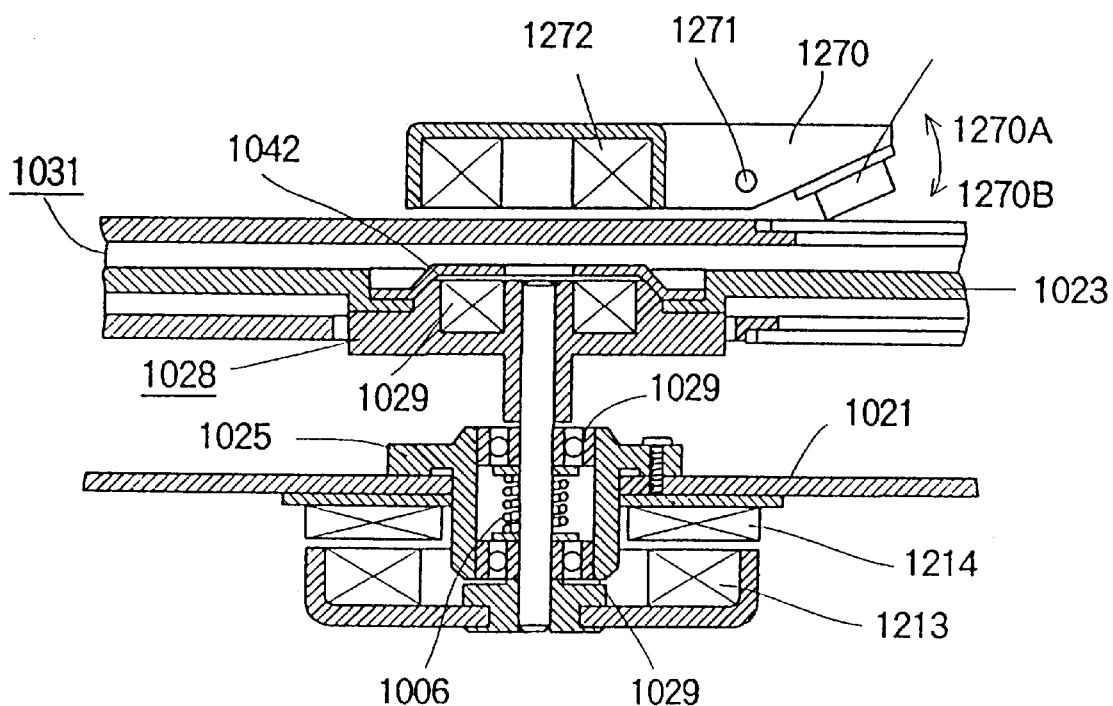
FIG. 78 is a vertical cross-sectional view showing the structure of the disc apparatus of a twenty-second embodiment of the present invention.

FIG. 78 is a vertical cross-sectional view showing the structure of the disc apparatus of a twenty-second embodiment of the present invention, wherein a reference numeral 1270 designates a holder provided rotatably on the base 1021 and clamping a magnetic recording head 1260; 1271 a rotating spindle for the holder 1272; and 1272 a disk-release magnet clamped to the holder 1270.

Following is a description of the operation the twenty-second embodiment. When the cartridge 1031 is loaded into the apparatus, the holder 1270 is positioned at the angle shown in FIG. 78, and when loading is completed, the holder 1270 rotates in the direction of arrow 1270B, bringing the magnetic recording head 1260 into proximity with the disc 1023. Recording is accomplished in this state by generating a magnetic field in the magnetic recording head 1260.

To eject the cartridge 1031, the holder 1270 is rotated in the direction of arrow 1270A, and the magnetic recording head 1260 is separated from the cartridge 1031. At this time, a dine release magnet 172 is in proximity to the clamping plate 1042, canceling or weakening the magnetic field of the chucking magnet and facilitating the ejection of the cartridge 1031.

Twenty-third Embodiment

Figure 79:
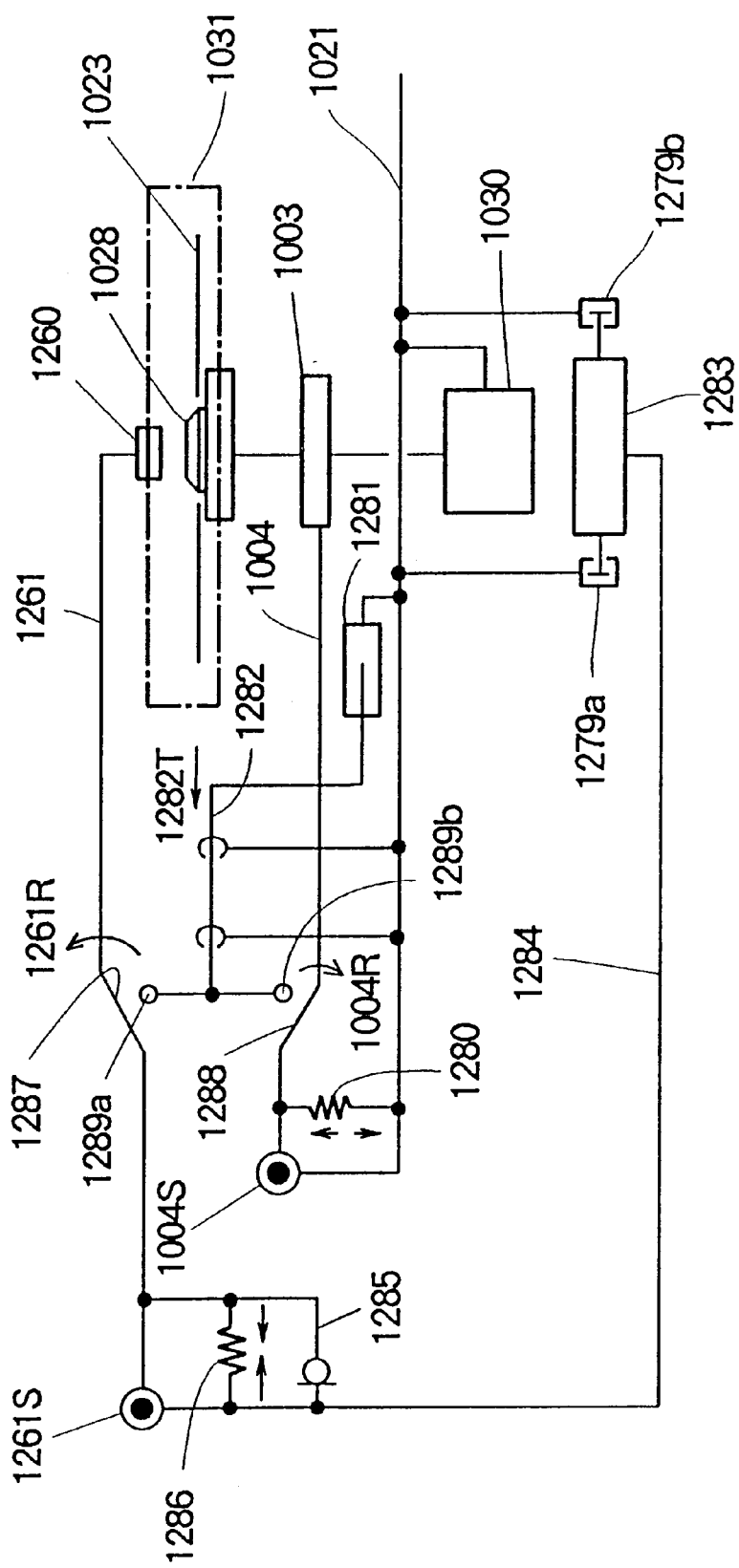
FIG. 79 is a conceptual diagram showing the structure of the disc apparatus of a twenty-third embodiment of the present invention.

FIG. 79 is a conceptual diagram showing the structure of the disc apparatus of a twenty-third embodiment of the present invention. The structure shown in this figure may be used in moving the transfer member in the embodiment shown in FIG. 52.

As shown in the figure, the disc chucking magnet 1003 is mounted in a transfer member 1004. The transfer member 1004 is held rotatably with respect to the base 1021 around center of rotation 1004R, and fores in a direction opposite to that of arrow 1004R is applied to the disc chucking member 1004 by the compressed spring 1280.

The optical pickup 1283 is provided slidably in a direction perpendicular to the paper surface of FIG. 79 by means of the sliding members 1279a and 1279b with respect to the base 1021. The arm 1284 is fixed to the optical pickup 1283. The holder 1261 is mounted to the arm 1284 rotatably around rotating shaft 1261S. To the holder 1261 the magnetic recording head 1260 is mounted. The tension spring 1286 applies force to the holder 1261 in a direction opposite to that of arrow 1261R, while the rotary motion of the holder 1261 due to the spring 1286 is limited by the stopper 1285.

The plunger 1281 is mounted to the base 1021. The rod 1282 is driven by the plunger 1281. At the ends of the rod 1282 are formed butt contact portions 1289a and 1289b. These butt contact members 1289a and 1289b are slidable so as to establish butt contact with, respectively, a tapered portion 1287 of the holder 1261 and a tapered portion 1288 of the transfer member 1004. When, driven by the plunger 1281, the rod 1004 moves to the left in the drawing, the butt contact and sliding motion of butt contact portions 1289a and 1289b of tapered portions 1187 and 1288 cause holder 1261 to rotate in the direction of arrow 1261R, while transfer member 1004 rotates in the direction of arrow 1004R.

In the figure, the chucking magnet 1003 and the motor 1030 are shown as if interposed between the optical pickup 1283 and the disc 1023, but this is for drafting convenience only, and the chucking magnet 1003 and the motor 1030 are, in fact, disposed proximately.

Following is a description of the operation of the twenty-third embodiment. To eject the cartridge 1031, application of voltage to the plunger 1281 drives the rod 1282 in the direction of arrow 1282T so that the butt contact portions 1289a and 1289b establish butt contact with the tapered portions 1287 and 1288, causing the transfer member 1004 and the holder 1261. to rotate in the directions of arrows 1004R and 1261R respectively. As a result the magnetic recording head 1260 is distanced from the recording surface of the disc while at the same time, the chucking magnet 1003, which was held by transfer member 1004, is distanced from the clamping plate of the disc.

When the turntable 1028 is formed from a magnetic material and the chucking magnet 1003 is in close proximity to the turntable 1028, the magnetic flux of the chucking magnet 1003 permeates the turntable 1028 to attract and hold the disc 1023, but when the transfer member 1004 rotates in the direction of arrow 1004R and the chucking magnet 1003 is separated from the turntable 1028, the attractive force is weakened and it becomes possible to withdraw the cartridge 1031 from the apparatus with ease.

Twenty-fourth Embodiment

Figure 80:
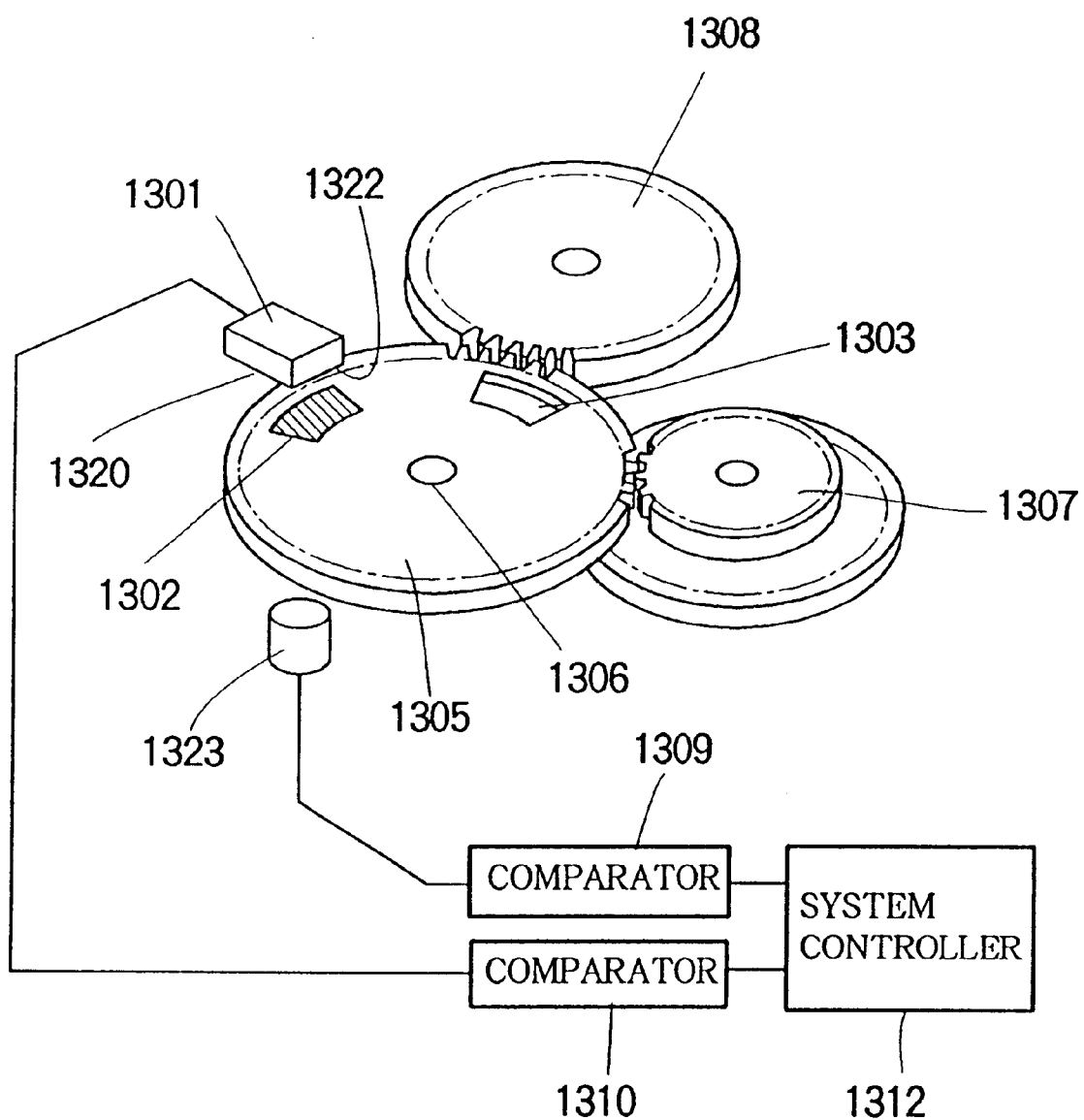
FIG. 80 is a perspective diagram showing the structure of a position-detecting apparatus of a twenty-fourth embodiment of the present invention.

FIG. 80 is a perspective view showing the structure of a position-detecting apparatus of a twenty-fourth embodiment of the present invention. Those portions that are the same as or equivalent to those described with reference to FIG. 94 through FIG. 97 are assigned the same symbols and their description is omitted.

The position-detecting apparatus of the twenty-fourth embodiment (and of the twenty-fifth through twenty-eighth embodiments described below) are for the purpose of detecting the operational mode of the drive-transmitting mechanism performing the prescribed operation due to a motor or other drive source, and uses the fact that the position of a moving member that forms part of the drive-transmitting mechanism differs depending on the operational mode to detect operational mode by detecting the position of the moving member.

In the figure, the position-detecting gear 1305 is used as the moving member described above, and forms part of a drive-transmitting mechanism driven by a motor or the like (not shown). In the example shown in the figure, the position-detecting gear 1305 meshes with a driver gear 1307 (driven directly or indirectly by a motor or the like) and a driven gear (which drives, directly or indirectly, a slider, cam gear or the like), and rotates around the spindle 1306. The position-detecting gear 1305 comprises, on the same circular path, along the direction of rotary motion, a light-reflecting portion 1302, a light-transmitting portion 1303, and a light-absorbing portion (that portion exclusive of the the light-reflecting and light-transmitting portions). The light-reflecting portion 1302. is made by applying metal foil or plating having a high reflectance to the surface of gear 1305. The light-transmitting portion 1303 is a hole or transparent material for the purpose of allowing the passage of light. The light-absorbing portion consists of those parts of the surface of the gear 1305 that lie on the same circular path as light-reflecting portion 1302 and light-transmitting portion 1303, but not including the light-reflecting portion 1302 and light-transmitting portion 1303. In cases where the surface of gear 1305 has a light reflectance, it may be treated with a seal or coating of low reflectance.

A photoreflector 1301 is provided in a position such that the light-reflecting portion 1302 and the light-transmitting portion 1303 face the photoreflector as the gear 1305 rotates. The photoreflector 1301 comprises a photoemitter 1320 and a photodetector 1322 (shown in FIG. 81) arranged in parallel and molded into a unit with plastic, so that when the light-reflecting portion 1302 and the light-transmitting portion 1303 reach the facing position they are irradiated with light from the photoemitter 1320. The photodetector 1322 receives only that part of the light emitted by the photoemitter 1320 that is reflected by the light-reflecting portion 1302.

The photodetector 1323, which is disposed on the opposite side to the photoreflector 1301 across the gear 1305 receives that part of the light from the photoemitter 1320 that is transmitted by the light-transmitting portion 1303.

The comparator 1309 receives and amplifies the light from the photodetector 1322, compares it with the prescribed reference voltage and generates a rectangular-wave signal showing the result of the comparison. The comparator 1310 receives and amplifies the light from the photodetector 1323, compares it with the prescribed reference voltage and generates a rectangular-wave signal showing the result of the comparison. Based on the rectangular wave signals from the comparators 1309 and 1310, a system controller 1312 detects the operational mode of the drive-transmitting mechanism in accordance with the rotational position of the gear 1305, and applies the detected result to the control of the motor.

Figure 81:
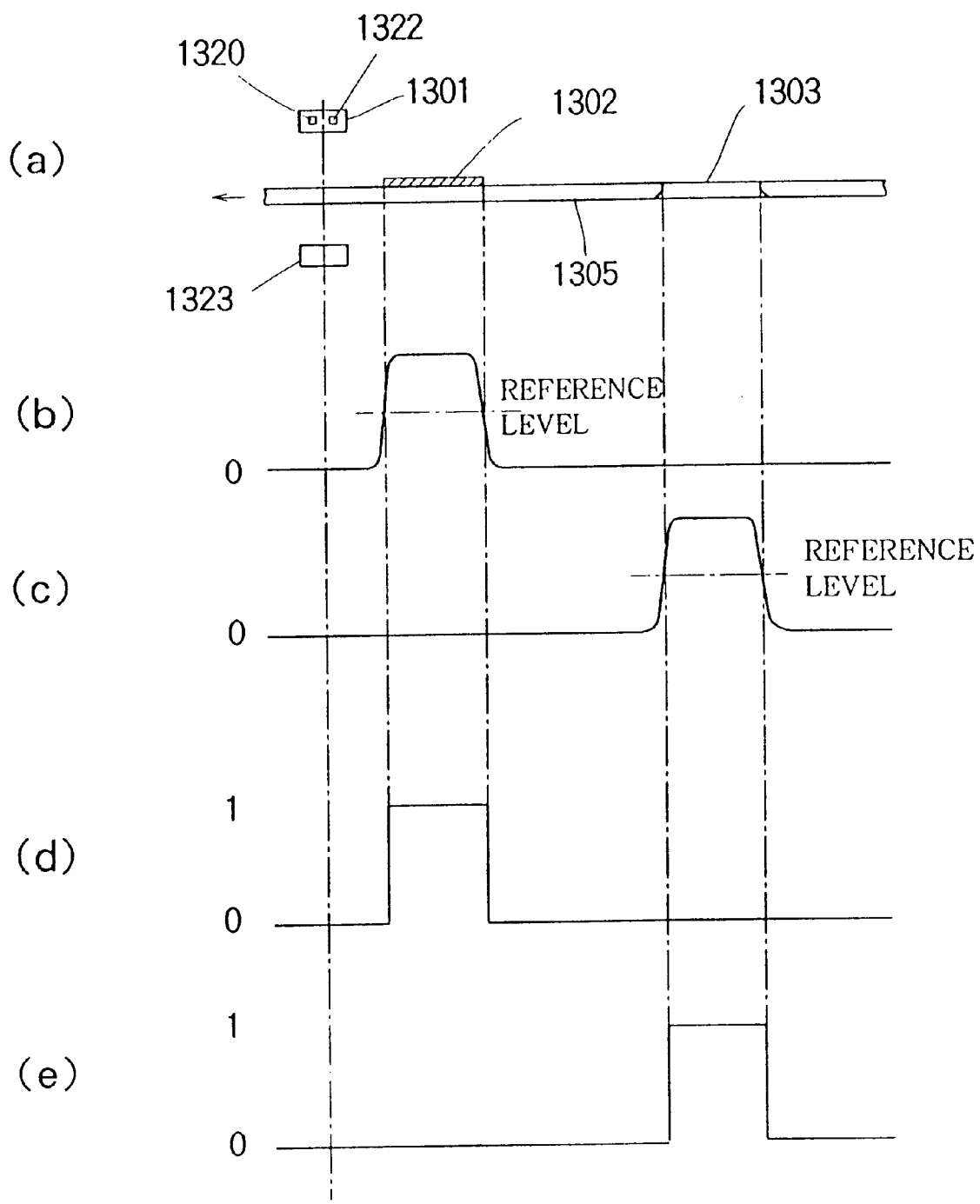
FIG. 81 is a diagram showing the position-detecting operation of the twenty-fourth embodiment.

FIG. 81 is a drawing showing the operation of the position-detecting apparatus of the twenty-fourth embodiment, where the rotary motion of the position-detecting gear 1305 is represented as motion to the left (direction of the arrow) in part (a). Part (b) represents the output signal obtained from the photodetector 1322 within the photoreflector 1301, and part (c) represents the output signal of photodetector 1323. Part (d) shows the rectangular wave obtained when the output signal obtained from the photodetector 1322 within the photoreflector 1301 is passed through the comparator 1309, and part (e) shows the rectangular wave obtained when the output signal obtained from the photodetector 1323 passed through the comparator 1310. In FIG. 81, the signals are obtained as a function of time and for the sake of convenience time has been made to correspond to the movement of the gear.

Initially, when that portion other than the light-reflecting portion 1302 and the light-transmitting portion 1303, that is to say, tile light-absorbing portion, is facing the photodetectors 1322 and 1323, neither the photodetector 1322 or the photodetector 1323 can receive light from the photoemitter 1320, so that each output)t is at zero level.

Next, as the position-detecting gear 1305 moves in the direction of the arrow and light-reflecting portion 1302 comes to a position facing photoreflector 1301, the light from the photoemitter 1320 is reflected by the light-reflecting portion 1302, and this is received by the photodetector 1322. At this point, as shown the part (b) of FIG. 81, the prescribed output voltage is obtained from the photodetector 1322, and this output signal is amplified and compared at the comparator 1309 with a reference signal to obtain the rectangular wave signal shown in the part (d) of FIG. 81.

As the position-detecting gear 1305 moves further in the direction of the arrow and the light-reflecting portion 1302 once again is removed from the position facing the photoreflector 1301, light to the photodetector 1323 is once more interrupted, and the signal output returns to zero level.

As the position-detecting gear 1305 moves yet further in the direction of the arrow and the light-transmitting portion 1303 now comes to a position facing photoemitter 1320 and the photodetector 1323 and the light from photoemitter 1320 is received by the photodetector 1323. At this point, as shown in part (c) of FIG. 81, the prescribed output voltage is received from photodetector 1323, and this output signal is amplified and compared at the comparator 1310 with a reference signal in the same way as in the case of the photodetector 1322 described above, to obtain the rectangular wave signal shown in part (e) of FIG. 81.

By inputting the rectangular wave signals thus obtained into the system controller 1312, the position of the gear 1305 is detected. In the event that it is desired, for example, to stop the movement of the drive-transmitting mechanism at that position, the motor (not shown) is stopped.

Twenty-fifth Embodiment

The twenty-fourth embodiment described above shows a case in which the light-reflecting portion 1302, the light-transmitting portion 1303 and the light-absorbing portion are provided at different angular positions on the same circular path on a position-detecting gear 1305; the photoemitter 1320 is provided facing the position-detecting gear 1305; the photodetector 1322 is adjacent to the photoemitter 1320 and receiving reflected light; and a photodetector 1323 is provided, which is disposed on the opposite side to the photoemitter 1320 across the position-detecting gear 1305 arid received transmitted light. However, the twenty-fifth embodiment of the present invention comprises a light a position-detecting gear provided with a light-reflecting portion on which is mounted a polarizing sheet; at least one photoemitter; a plurality of photodetectors facing the position-detecting gear; and polarizing sheets mounted on the front surface of each of these photodetectors.

Figure 82:
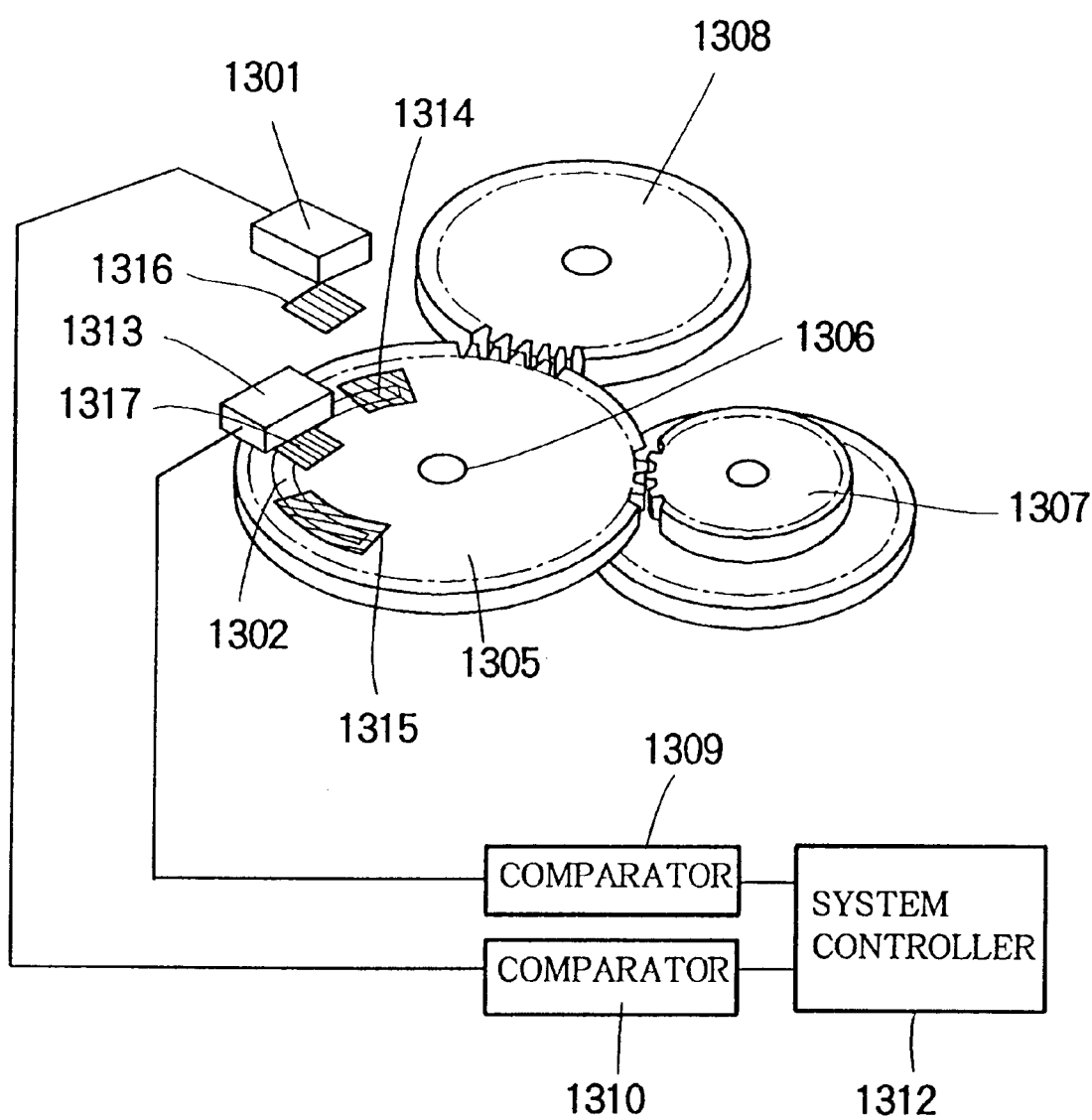
FIG. 82 is a perspective diagram showing the structure of the position-detecting apparatus of a twenty-fifth embodiment of the present invention.

Following is a description of the twenty-fifth embodiment with reference to FIG. 82, which is a perspective view showing the structure of the position-detecting apparatus of the twenty-fifth embodiment. Those portions that are the same as or equivalent to those shown in the twenty-fourth embodiment fire assigned the same symbols and their description is omitted.

In the figure, a first photoreflector 1301 comprises a photoemitter 1320 and a photodetector 1322. A second photoreflector 1313 comprises a photoemitter 1330 and a photodetector 1323. The photoreflectors 1301 and 1313 are of the same structure as the photoreflector of FIG. 81, and are provided at different angular position on a similar circular path on the position-detecting gear 1305.

The gear 1305 is similar to the gear 1305 in FIG. 81, except that it has no light-transmitting portion 1303 and is provided with a first light-reflecting portion 1334, a second light-reflecting portion 1335 and a third light-reflecting portion 1336. The first light-reflecting portion 1334 is formed by applying a first polarizing sheet (film) 1314 over a reflective metal foil 1302. The second light-reflecting portion 1335 is formed by applying a second polarizing sheet (film) 1315 over the reflective metal foil 1302. The third light-reflecting portion 1336 consist only of the reflective metal foil 1302 (that is to say, no polarizing sheet (film) is applied). Further, parts other than the light-reflecting portions 1334, 1335 and 1336, or at least those parts in the same circular path as the light-reflecting portions, consist of non-reflecting parts (the same as the light-absorbing portion in the twenty-fourth embodiment, having a lower reflectance than the reflecting portions).

A third polarizing sheet 1316 is provided on the front face of the photodetector 1322 of the photoreflector 1301, and the light entering photodetector 1322 passes through the third polarizing sheet 1316. A fourth polarizing sheet 1317 is provided on the front face of the photodetector 1323, and the light entering photodetector 1323 passes through the fourth polarizing sheet.

The direction of polarization of the first polarizing sheet 1314 and second polarizing sheet 1315 differ by 90°. The direction of polarization of the third polarizing sheet 1316 and the fourth polarizing sheet 1317 differ by 90°. The direction of polarization of the first polarizing sheet 1314 and the third polarizing sheet 1316 are the same. The direction of polarization of the second polarizing sheet 1315 and the fourth polarizing sheet 1317 are the same.

Figure 83:
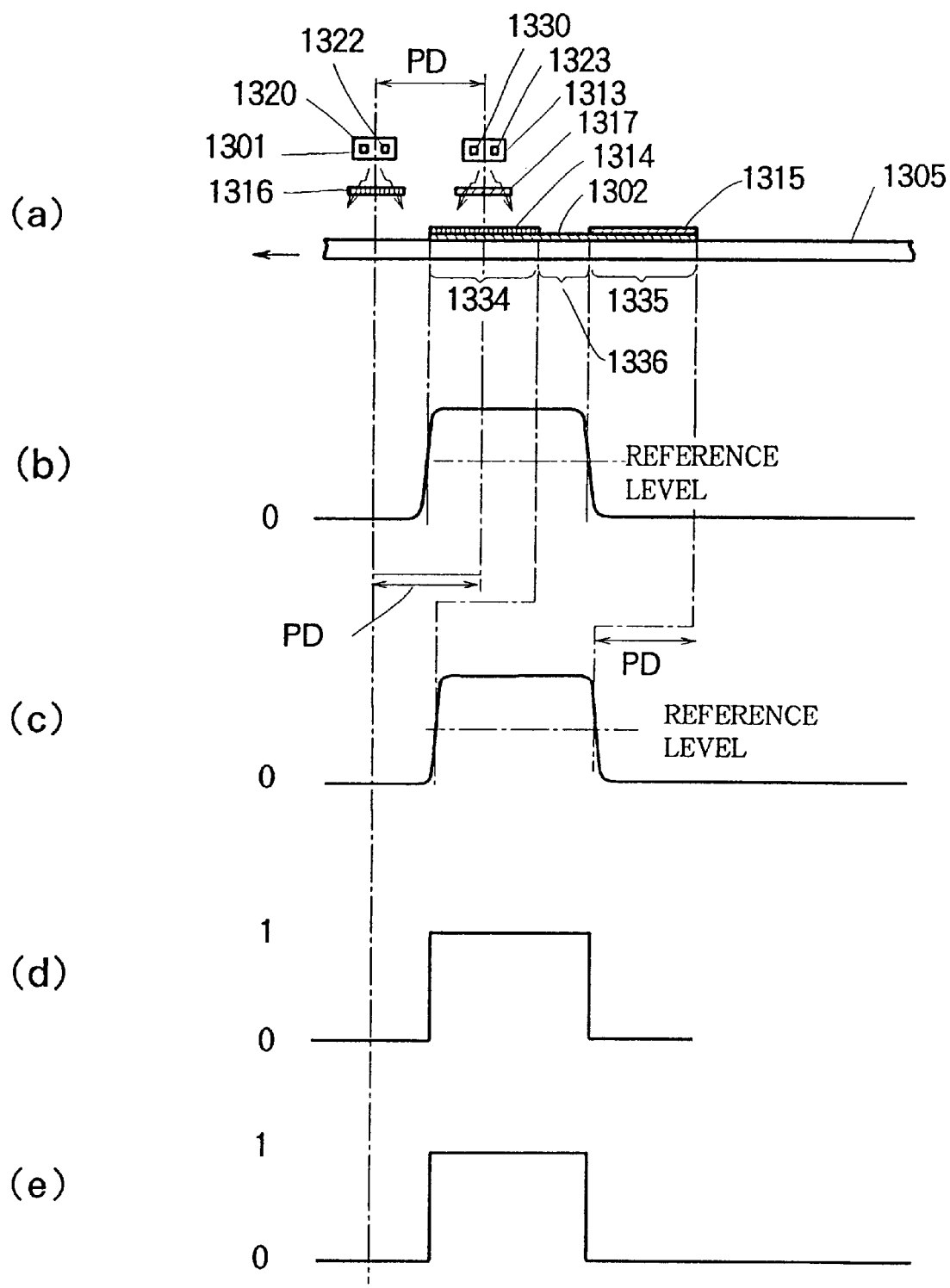
FIG. 83 is a diagram showing the position-detecting operation of the twenty-fifth embodiment.

FIG. 83 is a drawing showing the operation of the position-detecting apparatus of this twenty-fifth embodiment. Part (b) of FIG. 83 represents the output signal obtained from photodetector 1322 within photoreflector 1301, and part (c) of FIG. 83 represents the output signal of the photodetector 1323 within the photoreflector 1313. Part (d) of FIG. 83 shows the rectangular Wave obtained when the output signal obtained from the photodetector 1322 within the photoreflector 1301 is passed through the comparator 1309, and part (e) of FIG. 83 shows the rectangular wave obtained when the output signal obtained from the photodetector 1323 within the photoreflector 1313 is passed through the comparator 1310. In FIG. 83, as in the case of FIG. 81, time has been made to correspond to the movement of the gear 1305, but in consideration of the phase difference between the photoreflector 1301 and the photoreflector 1313, the waveforms shown in parts (c) and (e) of FIG. 83 have been shifted by a time corresponding to the phase difference (and equally represented by the phase difference).

In the same way as in the twenty-fourth embodiment, the comparator 1309 receives and amplifies the light from the photodetector 1322, compares it with the prescribed reference voltage and generates a rectangular-wave signal showing the result of the comparison. The comparator 1310 receives and amplifies the light from the photodetector 1323, compares it with the prescribed reference voltage and generates a rectangular-wave signal showing the result of the comparison. Based on the rectangular wave signals from the comparators 1309 and 1310, the system controller 1312 detects the operational mode of the drive-transmitting mechanism in accordance with the rotational position of the gear 1805, and applies the detected result to the control of the motor.

First is a description of the output of first photoreflector 1301. When the light-absorbing portion is facing first photoreflector 1301, the photodetector 1322 cannot receive light from the photoemitter 1320, so that its output is at zero level.

Next, as the position-detecting gear 1305 moves in the direction of the arrow and the first light-reflecting portion 1334 comes to a position facing the photoreflector 1301, the light from the photoemitter 1320 passes through the third polarizing sheet 1316 and is reflected by the first light-reflecting portion 1334, passes through the third polarizing sheet 1316, and this is received by the photodetector 1322. Since the first light-reflecting portion 1334 is provided with a first polarizing sheet 1314, light is reflected, but since the direction of polarization of the first polarizing sheet 1314 and the third polarizing sheet 1316 are the same, the photo(detector 1322 does not receive any reflected light input, and as shown in part (b) of FIG. 83, the prescribed output voltage is obtained from the photodetector 1322, and this output signal. is amplified and compared at the comparator 1309 with a reference signal to obtain the rectangular wave signal shown in (d) of FIG. 83.

As the position-detecting gear 1305 moves further in the direction of the arrow and the third light-reflecting portion 1336 comes to the position facing photoreflector 1301, light from photoemitter 1320 is reflected at third light-reflecting portion 1336 and is input to photodetector 1322. As a result the prescribed output is obtained even in this portion and the output level of the comparator 1309 stays high.

As the position-detecting gear 1305 moves yet further in the direction of the arrow and the second light-reflecting portion 1335 comes to a position facing the photoreflector 1301, light from the photoemitter 1320 no longer reaches the photodetector 1322. This is because the directions of polarization of the second polarizing sheet 1315 and the third polarizing sheet 1316 differ by 90°. As a result, the output from photodetector 1322 is at zero level and the output of the comparator 1309 also goes low.

The process for the second photoreflector 1313 is similar to that for the first photoreflector 1301. But when the second light-reflecting portion 1335 and the third light-reflecting portion 1336 come to the facing position, the outputs of the photodetector 1323 and the comparator 1310 are high, and when the first light-reflecting portion 1334 comes to the facing position, the outputs of the photodetector 1323 and the comparator 1310 are low as shown in the parts (c) and (e) of FIG. 83. This is because the direction of polarization of the fourth polarizing sheet 1317 is the same as that of the second polarizing sheet 1315, and differs from that of first polarizing sheet 1314 by 90°.

In the twenty-fifth embodiment described above, the front faces of the photoemitter and the photodetectors of the photoreflector 1301 and the photoreflector 1313 are provided with polarizing sheets, but it is equally possible to provide polarizing sheets on the front faces of the photodetectors only (the third and fourth polarizing sheets 1316 and 1317 for the photodetectors 1322 and 1323 respectively.)

Twenty-sixth Embodiment

The twenty-fifth embodiment described above shows a case in which a position-detecting gear 1305 was provided with the first and second polarizing sheets, provided, respectively, with the first, second and third light-reflecting portions 1334, 1335 and 1336, along with a non-reflecting portion; the photoemitters 1320 and 1330 and photodetectors 1322 and 1323 are provided facing position-detecting gear 1305, and the polarizing sheets 1316 and 1317 are provided for the front fates of each of the photodetectors. However, the twenty-sixth embodiment of the present invention comprises a position-detecting gear provided, in addition to a light-reflecting portion and a non-reflecting portion, with a magnetic portion, so that a photoemitter, a photodetector and a magnetic sensor are provided facing the position-detecting gear.

Figure 84:
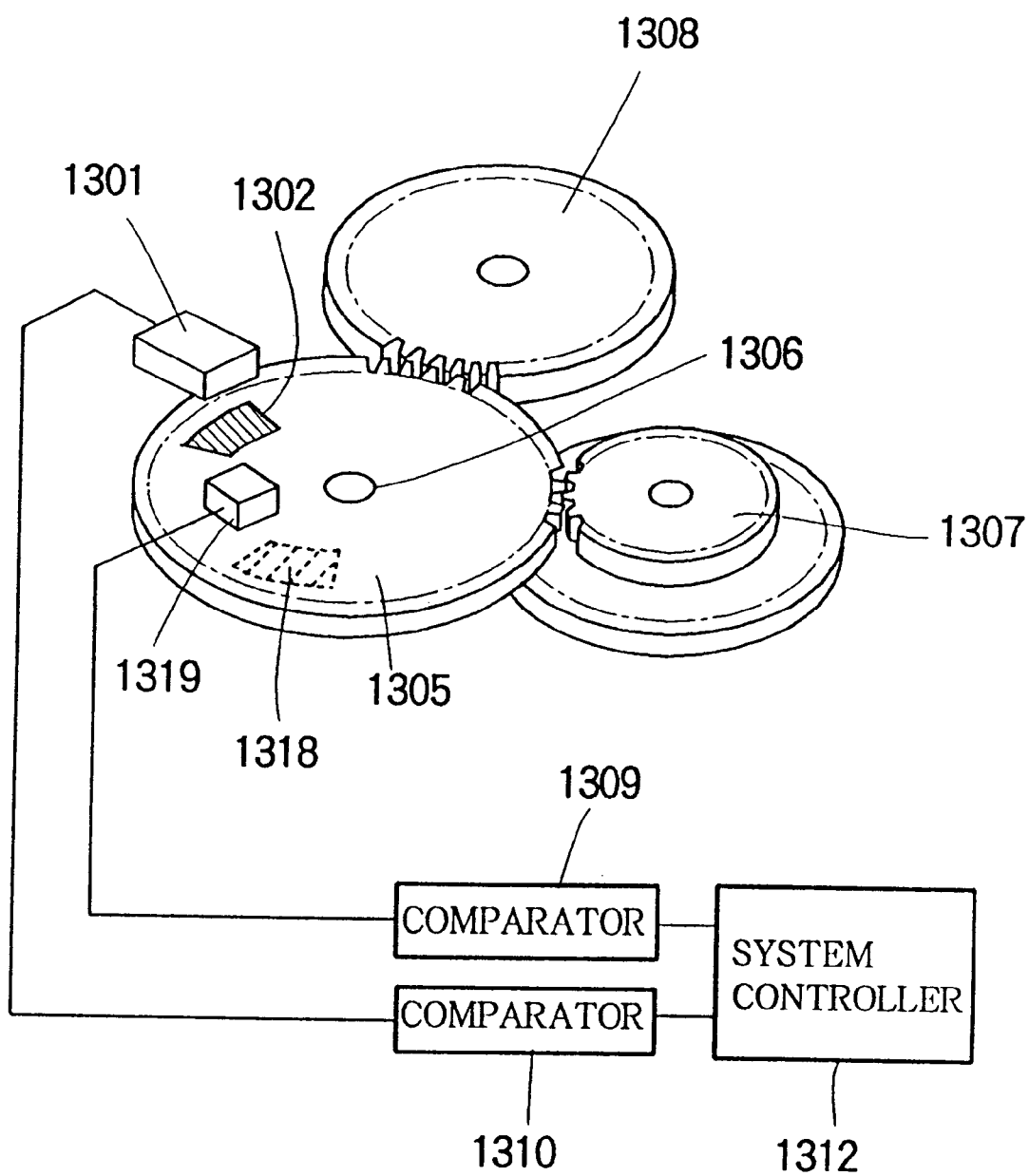
FIG. 84 is a perspective view showing the structure of the position-detecting apparatus of a twenty-sixth embodiment of the present invention.

Following is a description of the twenty-sixth embodiment with reference to FIG. 84, which is a perspective view showing the structure of the position-detecting apparatus of the twenty-sixth embodiment. Those portions that are the same as or equivalent to those shown in the twenty-fourth embodiment are assigned the same symbols and their description is omitted.

In the figure, a reference numeral 1301 designates a photoreflector; 1302 a light-reflecting portion provided on the surface of position-detecting gear 1305; and 1318 a magnetic portion provided within position-detecting gear 1305. The magnetic portion 1318 may equally be provided on the same circular path as the light-reflecting portion 1302 (at a different angular position) or on a different circular path. A reference numeral 1319 designates a magnetic detection means such as a Hall element, magnetic resistor or the like. The case described in the twenty-sixth embodiment involves the use of a Hall element.

Figure 85:
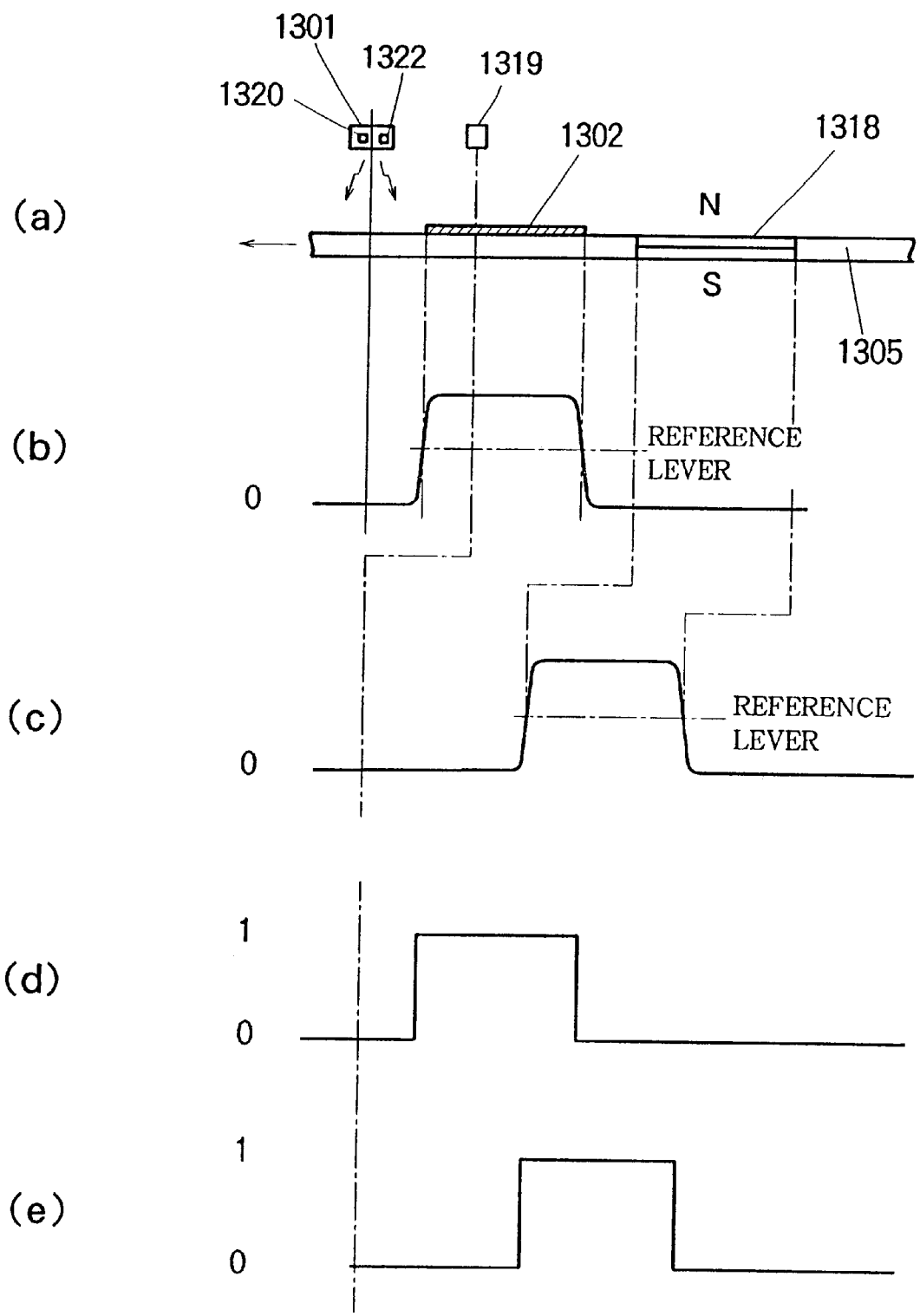
FIG. 85 is a diagram showing the position-detecting operation of a twenty-seventh embodiment {of the present invention}.

Following is a description of the position-detecting operation. FIG. 85 is a drawing showing the operation of the position-detecting apparatus of the twenty-sixth embodiment. Part (b) of FIG. 85 represents the output signal obtained from the photodetector 1322 within the photoreflector 1301, and part (c) of FIG. 85 represents the output signal of Hall element 1319. Part (d) of FIG. 85 shows the rectangular wave obtained when the output signal obtained from the photodetector 1322 within the photoreflector 1301 is passed through the comparator 1309, and part (e) of FIG. 85 shows the rectangular wave obtained when the output signal obtained from Hall element 1319 is passed through comparator 1310.

The detection operation of the photoreflector 1301 is the same as in the twenty-fourth embodiment and its description is accordingly omitted. Following is a description of the operation of the hall element 1319. Initially, the Hall element 1319, which is a position-detecting element, is positioned facing the non-magnetic portion (those portions other than the portion at which is provided magnet 1318) of position-detecting gear 1305, and the output of the Hall element 1319 is at zero level.

Next, as the position-detecting gear 1305 moves in the direction of the arrow and magnet portion 1318 comes to a position facing the Hall element 1319, the magnetic field acts thereon. At this point, as shown in the part (c) of FIG. 85, the prescribed output voltage is obtained from the Hall element 1319, and this output signal is amplified and compared at the comparator 1110 with a reference signal to obtain the rectangular wave signal shown in the part (e) of FIG. 85.

If this is input to the system controller 1312, the system controller 1312 detects the position of the position-detecting gear 1305 based on the rectangular wave signals thus obtained and applies the detected result to the control of the motor.

Twenty-seventh Embodiment

Figure 86:
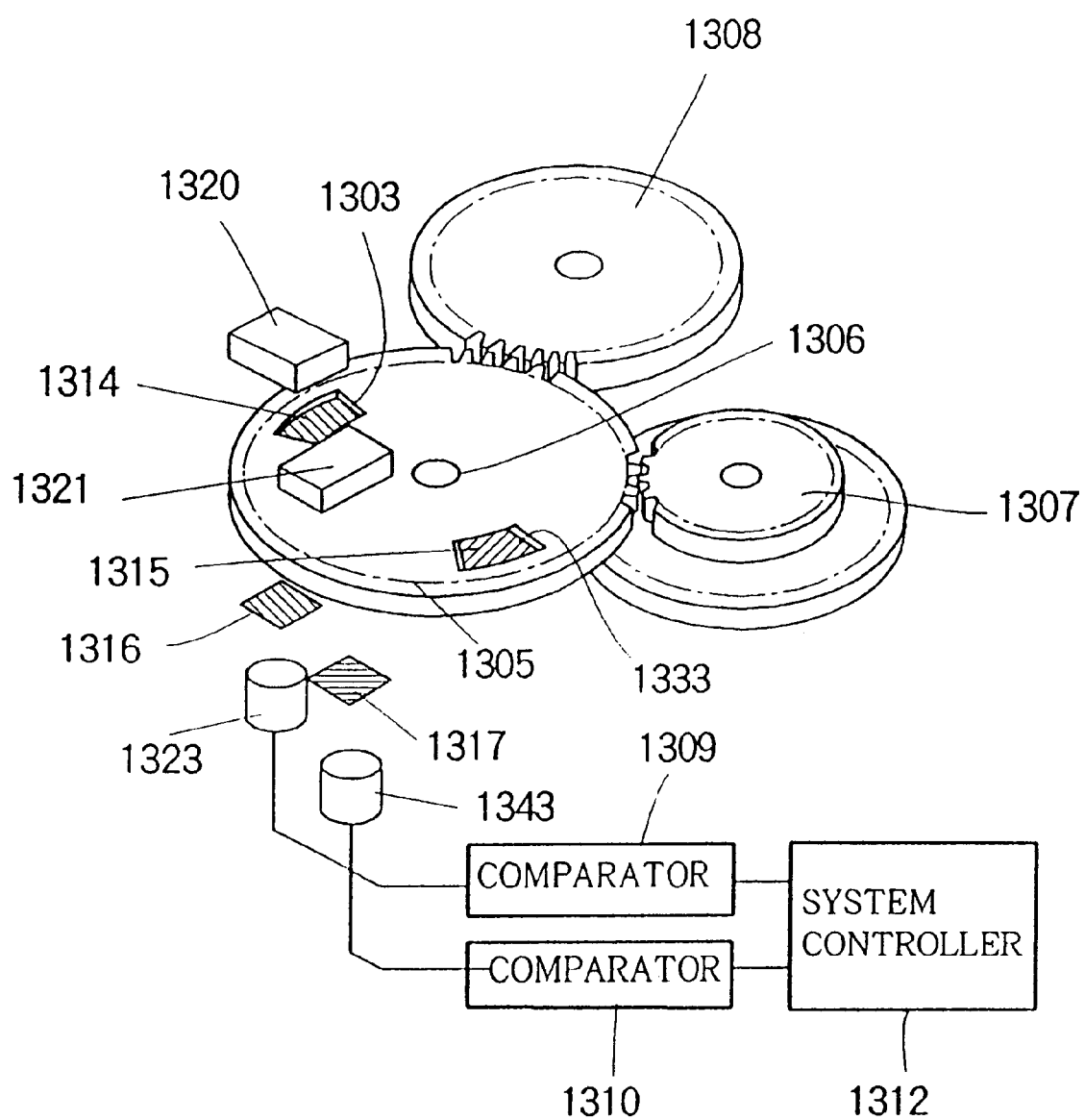
FIG. 86 is a perspective view showing the structure of the position-detecting apparatus of a twenty-eighth embodiment of the present invention.

The twenty-fifth embodiment described above shows a case in which the position-detecting gear 1305 is provided with the first and second polarizing sheets, provided, respectively, with the first, second and third light-reflecting portions 1334, 1335 and 1336, along with the non-reflecting portion; the photoemitters 1320 and 1330 and the photodetectors 1322 and 1323 provided facing the position-detecting gear 1305, and the polarizing sheets 1316 and 1317 provided for the front faces of each of the photodetectors. However, the twenty-seventh embodiment of the present invention, as shown in FIG. 86, comprises, in place of a light-reflecting portion 1302 with a polarizing sheet, the light-transmitting portions 1303 and 1333 equipped with polarizing sheets, together with a non-transmitting portion, and the light passing through these light-transmitting portions is detected by photodetectors 1323 and 1343. That is to say, a gear 1305 is provided, on a single circular path, with a light-transmitting portion 1303 having a first polarizing sheet 1314 and a light-transmitting portion second 1333 having a second polarizing sheet 1315. The photodetectors 1323 and 1343 are disposed on the side opposite to the photoemitters 1320 and 1321 so that the gear 1305 is sandwiched between the photoemitters 1320 and 1321. The front faces of the photodetectors 1323 and 1343 are provided with the third and fourth polarizing sheets 1316 and 1317.

The direction of polarization of the first polarizing sheet 1314 and second polarizing sheet 1315 differ by 90°. The direction of polarization of the third polarizing sheet 1316 and fourth polarizing sheet 1317 differ by 90°. The direction of polarization of the first polarizing sheet 1314 and third polarizing sheet 1316 are the same. The direction of polarization of the second polarizing sheet 1315 and fourth polarizing sheet 1317 are the same.

Figure 87:
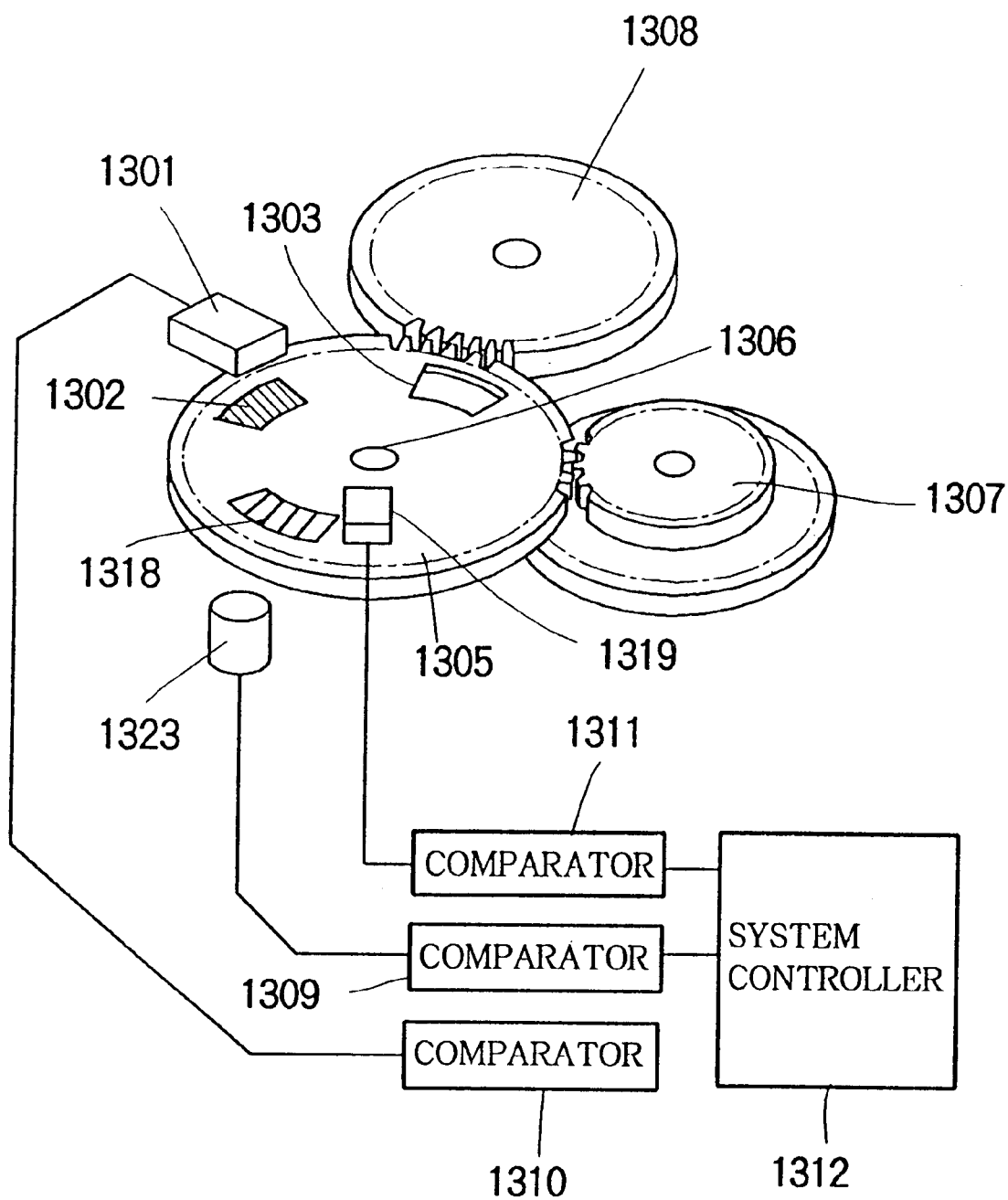
FIG. 87 is a perspective view showing the structure of the position-detecting apparatus of a twenty-ninth embodiment of the present invention.
Figure 88:
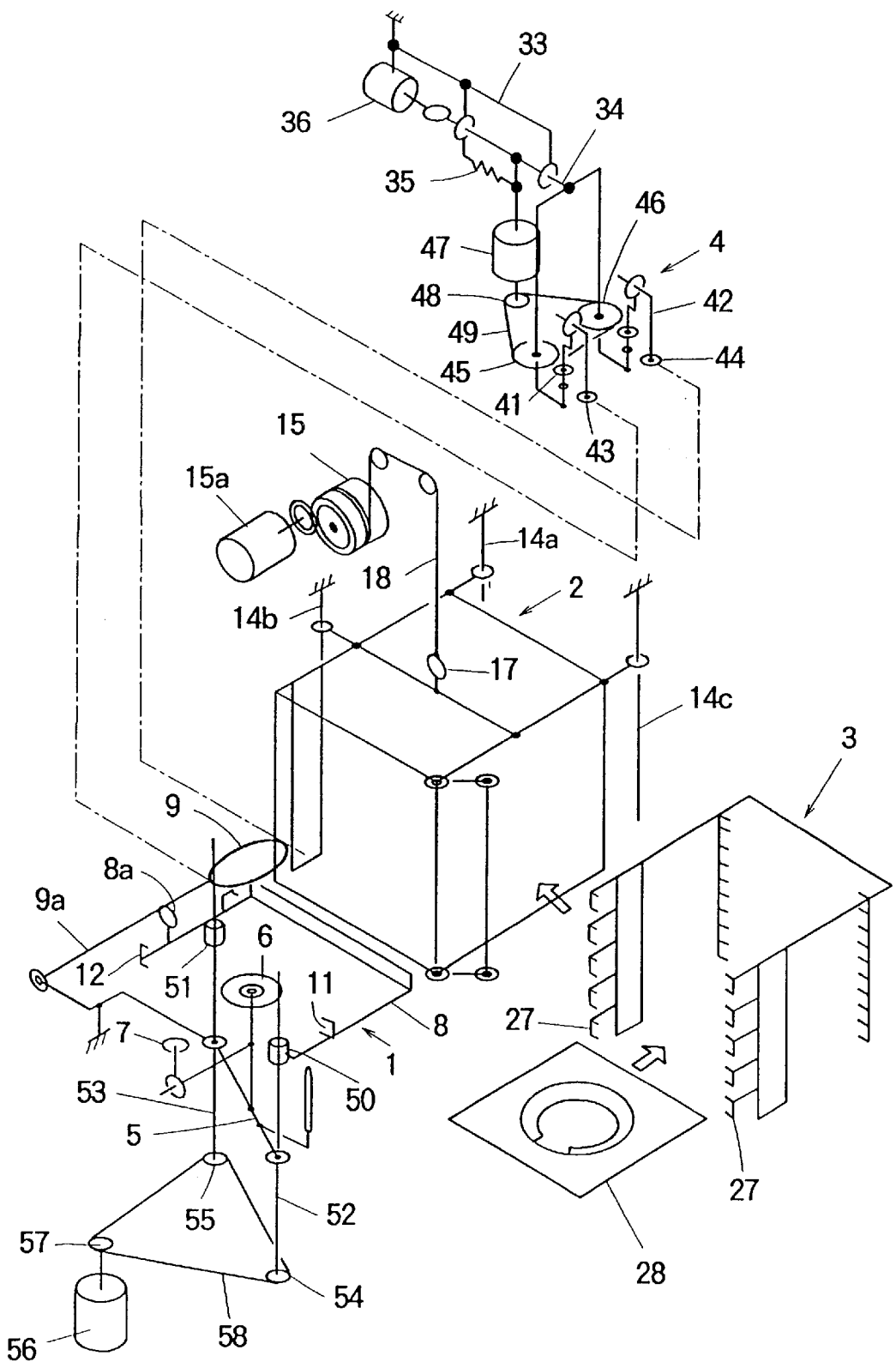
FIG. 88 is a conceptual diagram showing the structure and operation of a conventional automatic disc-changing apparatus.

A position-detecting apparatus having this structure also operates in the same manner as the twenty-fifth embodiment in FIG. 82. There is, however, nothing to correspond to the third light-reflecting portion 1336 of FIG. 82, and while on the one hand the light passing through the first light-transmitting portion 1303 impinges on the first photodetector 1323, and riot on the second photodetector 1343, the light passing through the second light-transmitting portion 1333 impinges on second photodetector 1343, and not on the first photodetector 1323, Twenty-eighth Embodiment As shown in FIG. 87, the number of detection positions in the twenty-fourth, twenty-fifth and twenty-seventh embodiments can be increased by the addition of the magnetic portion 1318, the magnet detection element 1319 and the comparator 1311 of the twenty-sixth embodiment.

In the twenty-fourth through twenty-eighth embodiments described above, the detecting elements are disposed in a single row in the direction of rotation, but the number of detection positions can be increased by providing a plurality of rows of detection elements.

In the embodiments described above, the angle of rotation of a rotating body such as a gear is detected but each of this embodiments can be applied to the detection of an object that moves in a straight fine or along a prescribed curve. In any of these (cases, a plurality of detection elements may be disposed along the direction of movement, in one row or a plurality of rows.

Twenty-ninth Embodiment

In each of the the twenty-fourth through twenty-eighth embodiments, a plurality of detection elements are disposed along the direction of movement of a moving member, so that in conventional apparatus described with reference to FIG. 94 through 97, there must be two or more rows of contacts arranged in the radial direction. In the twenty-ninth embodiment, by contrast detection can be effected even with one row. However, as shown in the conventional apparatus of FIG. 94 through FIG. 97, when there are six detection positions, it is necessary to provide, in configurations such as in the twenty-fourth through twenty-seventh embodiments, two rows of detection elements. If the number of detection elements is increased as in the twenty-eighth embodiment, however, detection can be effected even with one row, and even if the number of detection positions is increased there is no need for excessive increase in the diameter of the position-detecting gear, making the apparatus more compact.

EFFECTS OF THE INVENTION

In the automatic disc-changing apparatus of the present invention, a holding mechanism for standby is provided with a plurality of cartridge holders holding cartridges, any one of which cartridge holders can, by means of a holding mechanism for transport, which holds the cartridge holders; a transfer mechanism that moves the holding mechanism for transport horizontally; and an elevating mechanism that moves the holding mechanism for transport vertically, be transported from the standby position to the recording and reproducing position above the layer, or from the recording and reproducing position to the standby position, with the effect that the user can reproduce from or record onto the desired cartridge merely by the operation of selecting it from among the plurality of cartridges.

Further, the holding mechanism for standby is provided with a plurality of cartridge insertion ports corresponding, respectively, to the plurality of cartridge holders, so that cartridges can be loaded into each of the cartridge holders by inserting them into the insertion ports, with the effect that, in comparison with conventional apparatus in which discs could be changed only after withdrawing the magazine, operation is simplified.

Further, the loading gear, which is supported so as to rotate freely on an elevator which moves vertically with respect to the chassis, is caused to engage a cylindrical gear, to which driving power is transmitted from a drive motor mounted on the chassis, so that the loading gear, which is supported by the elevator, the vertical height of which changes, is engaged with the cylindrical gear and power from the drive motor is transmitted irrespective of the height at which the elevator is positioned, enabling driving power to be transmitted to moving components by a simple mechanism, with the effect of achieving an apparatus having fewer components and lower cost.

Further, the engaging pins implanted in the loading gear, which rotates freely on the elevator, are caused to engage with a Y-shaped cam hole formed in the transporter, which is supported slidably on the elevator, with the effect that the structure of the transporter is simplified, with the effect of achieving an apparatus having fewer Components and lower cost.

Further, the engaging pin that is implanted in the loading gear is inserted through a Y-shaped cam hole formed in the transporter establishing butt contact with with a holding mechanism for transport supported on the transporter so as to rotate freely, with the effect that the motion by the transporter horizontally to the front and rear, and the hold and release actions by the holding mechanism for transport can be carried out by a simple mechanism, achieving an apparatus having fewer components and lower cost.

Further, the cam gear provided with the cam hole is engaged from the drive motor through the reduction gears, and the floating arm for positioning arid securing the player is engaged to the cam hole of the cam gear, with the effect that the driving of the loading lever and the floating arm are controlled simultaneously by the cam gear, achieving the apparatus having fewer components and lower cost.

Further, the rack is engaged with the cylindrical gear that transmits driving power to the transporter, and the detecting switch is provided to sense a pattern on the rack corresponding to the sliding motion of the rack, enabling detection of the angle of rotation of the loading gear, which is supported on the elevator, the (sliding component), with the effect that there was no need to provide electrical wiring on the moving portion to achieve the apparatus of higher reliability, in which open circuits and the like were unlikely to occur.

Further, the cam grooves provided in the slide cams, structured slidably on the chassis, are engaged with the pins provided on both ends of the loading lever, so that the slide cams can be driven by the rotation of the loading lever horizontally to the front and rear with respect to the chassis, with the effect of achieving an apparatus having fewer components and lower cost.

Further, the horizontal motion of the cartridge and the cartridge hold and release actions are driven by a single motor, and the vertical motion of the cartridge and the action of clamping the cartridge to the player are driven by a single motor, achieving an apparatus that is compact and inexpensive.

Further, the portion for the horizontal transport of the cartridge moves vertically, so that the requisite height of the apparatus can be made equal to the sum of the height of the portion accommodating the cartridges and the height of the player, reducing the cubic volume of the apparatus.

Further, when the chucking arm is open and engages with each of the cartridge holders, an pressing portion mounted on the chucking arm exerts pressure from the periphery on the positioning spring of the cartridge holder, regulating the sag in the positioning spring and preventing inadvertent ejection operations while the cartridge is in motion.

Further, there is provided the rotatable clamping lever that clamps the cartridge holder in which the cartridges are loaded to the player which plays the discs, and the compressive spring that applies force to the clamping lever, so that the cartridge is clamped to the player even when the player floats from the chassis, fixing the relative positions of the cartridge and the player in the floating state, with the effect of achieving the apparatus of outstanding durability.

Further, the hook is formed on the sliding plate that toggles between the positioning kind securing, and the floating of the player, and the pin, which engages with the hook, is implanted in the clamping lever that is supported rotatably on the player, go that driving power to clamp the cartridge to the player can be obtained from the drive means that toggles the player between the floating state and the fixed state with respect to the chassis, with the effect of eliminating the need for a dedicated drive motor for clamping of the cartridge and achieving an apparatus in which the number of components is reduced.

Further, control is such that the cartridge holder is loaded to the player while the player is fixed to the chassis, and the player is then floated from the chassis, so that even when the structure is such that when the cartridge that has been transported is to be loaded to the player the player is positioned and fixed to the chassis, and is in the floating state during playing, the cartridge moves vertically at the specific position of the player during loading and unloading, with the effect of improving the positioning accuracy of the apparatus.

Further, the cartridges can be loaded from the outside, and a plurality of cartridge holders are provided, freely mountable to and dismountable from the transport mechanism, with the effect that a plurality of cartridges can be loaded directly and individually in the standby position, without using a dedicated magazine rack, with the effect of achieving an apparatus that is more convenient to use.

Further, the cartridges can be loaded so that the label surface of the loaded cartridge is at approximately the same height as the surface of the control panel, so that the titles inscribed on the label surface can be seen directly from the control panel, with the effect of achieving an apparatus that is more convenient to use.

Further, the tapered portions are provided above and below the rear edge of the cartridge holder, so that even if the cartridge that has been transported from the player to the standby position may have, in the course of its horizontal motion, been displaced upward or downward from its intended height, it will be guided by butt contact established with the tapered portion of the other cartridge holders being held in the standby position, and will be held accurately in the standby position, with the effect of achieving an apparatus that is of higher reliability.

Further, the eject lever allowing cartridges in any of a plurality of cartridge holders to be ejected, so that any cartridge loaded in the standby position can be ejected and replaced even while another disc is being played, with the effect of achieving the apparatus that is more convenient to use.

Further, the rotatable engagement arm is supported axially on a plurality of cartridge holders and a block guide that engages with the engagement arm on the chassis that rotates in linkage with the transport mechanism, so that the cartridge holders is held by the block guide during cartridge ejection and the block is released when it is transported to the player, enabling toggling between the locking and releasing of the cartridge holders with a simpler mechanism, with the effect of achieving an apparatus having fewer components and lower cost.

Further, the slide cams of the transport mechanism and the stopper plate that fixes the player to the chassis are caused to engage, so that the driving power for effecting toggling between the floating state and the fixed state of the player relative to the chassis can be obtained without a dedicated driving mechanism from the slide cams, which are driven by the transport mechanism, with the effect of achieving an apparatus having fewer components and lower cost.

Further, the stopper plates that engage with the slide cams that drive and control the mechanism for transporting the cartridges is in linkage with the slide cain drive enabling the player to be moved against the resilience of the vibration damping materials by which is is flexibly held, so that when interference occurs with the cartridge being horizontally transported to the player in the height direction of the player, the player will move in a direction so as to avoid interference, achieving an apparatus whose height dimension is greatly reduced rendering it more compact.

Further, the player is provided with a rotatable stopper and a spring that applies force to the stopper, in a configuration such that the stopper clamps the cartridge automatically, so that the cartridge is clamped to the player by the cartridge holder descending Prom the player, with the effect eliminating the need for a dedicated clamping drive mechanism and achieving an apparatus having fewer components and lower cost.

Further, when a new cartridge is loaded into a cartridge holder, the cartridge being played can be transported to the standby position and the TOC of the newly inserted cartridge is displayed on the display panel without interrupting the reproduction of its audio signal, with the effect of achieving an apparatus that is more convenient to use.

Further, when any cartridge is ejected, a text message, such as "NO DISC" is (displayed on the display panel for the corresponding cartridge holder, allowing the user to realize from the text message on the display panel that no cartridge is loaded in the corresponding cartridge holder, with the effect of achieving an apparatus that is more convenient to use.

Further, when a new cartridge is loaded, a text message, such as "NEW DISC" is displayed on the display panel for the corresponding cartridge holder, allowing the user to realize from the text message on the display panel that a new cartridge has loaded in the corresponding cartridge holder, with the effect of achieving an apparatus that is more convenient to use.

Further, in the case of cartridges that have been loaded into the cartridge holder and transported to the player, but whose audio signal has not been reproduced, the corresponding indicator lamp blinks on and off, allowing the user to realize from the blinking of the indicator lamp that the cartridge in that cartridge holder has not yet been played, so that when it is intended to select a new cartridge to be played next, selection of the new cartridge is facilitated, with the effect of achieving an apparatus that is more convenient to use.

Further, in the disc-chucking apparatus, means of controlling attractive force by means of, the chucking magnet has been provided so that the force holding the disc to the turntable can be reduced during withdrawal of the disc only, without reducing holding force during recording and reproducing, and there is no need to strengthen the spring used to flip up the cartridge holder and the holder can be loaded into the apparatus with light force, with the effect of improving the operational feel.

Further, axial force is applied to the rotating spindle supporting the turntable by means of a resilient body to that vibration of the base is attenuated by the resilient body and vibration of the turntable is suppressed, with the effect of achieving a highly reliable apparatus having less signal reading error.

Further, the magnetic material permeable to magnetic flux is provided between the magnet used in the motor and the clamping plate, so that the magnetic flux of the magnet used in the motor penetrates the magnetic material to attract the clamping plate, with the effect of eliminating the need for a chucking magnet and reducing the number of components.

Further, the turntable is formed of a magnetic material and a magnetized surface capable of being used as the magnet of a motor is applied, the disc clamping plate is attracted to the magnetized turntable in a position facing the magnetized surface, and the turntable in rotationally driven by a oppositely placed excitation coil, with the effect of eliminating the need for a chucking magnet or a magnet for the motor and reducing the number of components.

Further, the vibration-damping rubber pads and compressed springs are disposed between the base and the chassis below the spindle for the purpose of suppressing vibration of the chassis so that vibration of the base is attenuated by the vibration-damping rubber pads and compressed springs and vibration of the turntable suppressed, with the effect of achieving a highly reliable apparatus having less signal reading error.

Further, the excitation coil is disposed oppositely to the magnetized turntable so that by energizing the excitation coil the turntable floats, with the effect of making it more difficult for vibration of the base to be transmitted to the turntable and achieving a highly reliable apparatus having less signal reading error.

Further, the excitation coil is disposed oppositely to the magnetized turntable and the energizing of the excitation coil is linked to the movement of the cartridge transport mechanism, so that it is possible to overlap the height of the cartridge being moved horizontally by the cartridge transport mechanism and the height of the turntable, with the effect of achieving a thinner apparatus.

Further, the excitation coil is disposed oppositely to the magnetized turntable and a drive circuit for driving a focus actuator and a detector for detecting the focusing error of an optical lens are linked to control energization of the excitation coil, so that the optical pickup can read or write signals even when the height of the disc varies beyond the range of motion of the focus actuator, with the effect of increasing the tolerance with which the turntable must be assembled and at the same time achieving a highly reliable apparatus having less signal reading error.

Further, the magnet for the motor that rotationally drives the turntable and a disc attracting and holding magnet for attracting and holding the clamping plate provided on the disc are mounted oppositely on the rear surface with an interposed magnetic material permeable to the magnetic flux of the motor magnet, and there is formed on said magnetic material by outset molding a centering portion and flange for positioning, so that magnetic material to prevent demagnetization of the magnet can be configured cheaply by press molding or the like, with the effect of forming a flange and centering portion of high accuracy.

Further, the screw threads are formed on the disc clamping magnet that attracts and holds the disc clamping plate and on the turntable allowing the height of the disc clamping magnet relative to the turntable to be adjusted, so that the gap between the clamping plate and the disc clamping magnet can be reduced by adjusting the height of the disc clamping magnet relative to the turntable, increasing the magnetic flux density in the gap and increasing the clamping force, with the effect of allowing the use of ferrite or other low-cost magnets.

Further, a plurality of suspension means, each consisting of a combination of suspension magnet and suspension coil are installed at various angles and the voltage applied to each suspension coil is varied in response to changes in the attitude of the apparatus, so that a force responsive to the angle can be generated to act against gravity, when the disc surface is installed horizontally and vertically with respect to the earth's surface, or is installed at some other angle, with the effect of simplifying the configuration of the suspension means relating and improving ease of assembly.

Further, the disc release coil is mounted on the holder of the magnetic recording head mounted on the chassis, so that the disc release coil holds the holder of the magnetic recording head, with the effect of eliminating the need for a support member for the disc release coil and achieving an apparatus having fewer components and lower cost.

Further, the disc release magnet is mounted on the holder of the magnetic recording head mounted on the chassis so as to be slidable with respect to the recording surface, so that the disc release magnet is brought close to the clamping plate by means of the driving power that moved the magnetic recording head toward the outward edge of the disc, with the effect of simplifying the drive means for the disc release magnet.

Further, the turntable is provided with the chucking magnet, the transfer member is provided with the coil, and the holder on which is mounted a recording head is mounted rotatably on the chassis, by means of the driving means for driving the recording head along the recording surface, so that the transfer member is rotated in linkage and the chucking release magnet is brought close to the turntable by means of the driving power that moved the magnetic recording head toward the outward edge of the cartridge, with the effect of simplifying the drive means for the chucking magnet.

Further, in the position-detecting apparatus, detection of the position of moving members is effected without contact using optical detection elements or magnetic detection elements, so that highly reliable position detection can be performed without wear to the terminals. Further a plurality of positions can be detected with a single row of detection elements.

What is claimed is:

1. A disc apparatus for recording and reproducing signals using light or magnetism, comprising:

a turntable supported rotatably and also supported slidably in an axial direction with respect to a base, said turntable having a first surface for holding a disc and a second surface on an opposite side, and in part magnetized with a magnetized surface formed on said opposite side;

an excitation coil mounted on said base and disposed oppositely to said magnetized surface of said turntable;

a drive circuit driving a focus actuator;

a detector detecting focusing error of an optical pickup; and a control circuit controlling the energization of said excitation coil in accordance with the output of said detector and moving said turntable in said axial direction by means of the magnetic force between said excitation coil and said magnetized turntable.

2. The disc apparatus of claim 1 wherein said drive circuit drives the focus actuator in accordance with the output of said detector;

wherein, when said focusing error is within a prescribed range, control is effected to reduce the focusing error by driving the focus actuator, and when focusing error exceeds said prescribed range, said excitation coil is energized and said turntable is caused to move in said axial direction so that said focusing error is within said prescribed range.

3. A disc apparatus, comprising:

a base;

a turntable that rotates and is slidably supported in an axial direction relative to said base, said turntable having a first surface for holding a disc and a magnetized second surface opposite said first surface;

an excitation coil mounted on said base, opposite said magnetized second surface of said turntable; and a control circuit controlling energization of said excitation coil in accordance with a focusing error of said disc apparatus to alter a magnetic force between said excitation coil and said magnetized second surface of said turntable and thereby move said turntable in said axial direction.

4. The disc apparatus of claim 3, further comprising:

an optical pickup that optically reproduces and/or records information from/to said disc, said optical pickup including an optical lens and a focus error detector that detects focus errors caused by distance deviations between a signal recording surface of said disc and said optical pickup, wherein said control circuit receives focus error signals output by said focus error detector to control energization of said excitation coil to move said turntable in said axial direction via altered magnetic force between said excitation coil and said magnetized second surface of said turntable.

5. The disc apparatus of claim 4, further comprising:

a focus actuator that adjusts positioning of said optical lens, wherein said control circuit controls said focus actuator to adjust positioning of said optical lens in accordance with focus error signals output by said focus error detector.

6. The disc apparatus of claim 3, wherein said excitation coil is wound on a projecting portion that extends perpendicular to said axial direction, said disc apparatus further comprises a magnet that is connected to said turntable, and a magnetic force between said magnet and said projecting portion counteracts the magnetic force between said excitation coil and said magnetized second surface of said turntable to thereby position said turntable in a floating state.

7. A method of correcting a focus error of a disc apparatus that includes a base; a turntable that rotates and is slidably supported in an axial direction relative to said base, said turntable having a first surface for holding a disc and a magnetized second surface opposite said first surface; and an excitation coil mounted on said base, opposite said magnetized second surface of said turntable, said method comprising:

detecting a focusing error of said disc apparatus; and controlling energization of said excitation coil in accordance with the detected focusing error to alter a magnetic force between said excitation coil and said magnetized second surface of said turntable and thereby move said turntable in said axial direction.

8. The method of claim 7, wherein said disc apparatus further includes an optical pickup that optically reproduces and/or records information from/to said disc, said optical pickup including an optical lens and a focus error detector that detects focus errors caused by distance deviations between a signal recording surface of said disc and said optical pickup, and said method further comprises adjusting positioning of said optical lens in accordance with focus error signals output by said focus error detector.

* * * * *